US012788012B2

(12) United States Patent
Bereznak et al.

(10) Patent No.: US 12,788,012 B2
(45) Date of Patent: Nov. 10, 2026

(54) SUBSTITUTED TOLYL FUNGICIDES AND THEIR MIXTURES

(71) Applicant: FMC Corporation, Philadelphia, PA (US)

(72) Inventors: James Francis Bereznak, Newtown Square, PA (US); Stephen P. Bolgunas, Swedesboro, NJ (US); Andrew Edmund Taggi, New Hope, PA (US); Byron Vega-Jimenez, Wilmington, DE (US); Srinivasa Rao Uppalapati, Grimes, IA (US)

(73) Assignee: FMC Corporation, Philadelphia, PA (US)

( * ) Notice: Subject to any disclaimer, the term of this patent is extended or adjusted under 35 U.S.C. 154(b) by 823 days.

(21) Appl. No.: 17/922,624

(22) PCT Filed: May 5, 2021

(86) PCT No.: PCT/US2021/030888

§ 371 (c)(1),
(2) Date: Nov. 1, 2022

(87) PCT Pub. No.: WO2021/226234

PCT Pub. Date: Nov. 11, 2021

(65) Prior Publication Data

US 2023/0165251 A1 Jun. 1, 2023

Related U.S. Application Data

(60) Provisional application No. 63/020,728, filed on May 6, 2020.

(51) Int. Cl.

| | |
|---|---|
| ***A01N 43/56*** | (2006.01) |
| ***A01N 43/647*** | (2006.01) |
| ***A01N 47/12*** | (2006.01) |

(52) U.S. Cl.

CPC ........... *A01N 43/56* (2013.01); *A01N 43/647* (2013.01); *A01N 47/12* (2013.01)

(58) Field of Classification Search

CPC ....... A01N 43/56; A01N 47/12; A01N 43/647
See application file for complete search history.

(56) References Cited

U.S. PATENT DOCUMENTS

| | | | | |
|---|---|---|---|---|
| 11,634,393 B2 * | 4/2023 | Bereznak | ............. | C07D 249/10 548/255 |
| 2018/0289007 A1 | 10/2018 | Harschneck et al. | | |

FOREIGN PATENT DOCUMENTS

| | | | | |
|---|---|---|---|---|
| WO | 2008/124092 A2 | 10/2008 | | |
| WO | 2011/059619 A1 | 5/2011 | | |
| WO | 2014/066120 A1 | 5/2014 | | |
| WO | 2015/157005 A1 | 10/2015 | | |
| WO | WO-2020097012 A1 * | 5/2020 | ............. | A01N 43/56 |

OTHER PUBLICATIONS

International Search Report of Corresponding PCT/US2021/030888 patent application.

* cited by examiner

*Primary Examiner* — Svetlana M Ivanova
(74) *Attorney, Agent, or Firm* — Charlene G. Sternberg; FMC Corporation

(57) ABSTRACT

Disclosed is a fungicidal composition comprising (a) at least one compound selected from the compounds of Formula 1, including all geometric and stereoisomers, N-oxides, and salts thereof, wherein A, Q, $R^1$, $R^2$, $R^3$, $R^4$, W and Y are as defined in the disclosure; and (b) at least one additional fungicidal compound. Also disclosed is a method for controlling plant diseases caused by fungal plant pathogens comprising applying to the plant or portion thereof, or to the plant seed, a fungicidally effective amount of a compound of Formula 1, an N-oxide, or salt thereof (e.g., as a component in the aforesaid composition). Also disclosed is a composition comprising: (a) at least one compound selected from the compounds of Formula 1 described above, N-oxides, and salts thereof; and at least one invertebrate pest control compound or agent.

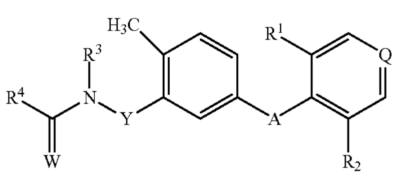

1

19 Claims, No Drawings

SUBSTITUTED TOLYL FUNGICIDES AND THEIR MIXTURES

FIELD OF THE INVENTION

This invention relates to certain tolyl derivatives, their N-oxides and salts, and to mixtures and compositions comprising such tolyl derivatives and methods for using such tolyl derivatives and their mixtures and compositions as fungicides.

BACKGROUND OF THE INVENTION

The control of plant diseases caused by fungal plant pathogens is extremely important in achieving high crop efficiency. Plant disease damage to ornamental, vegetable, field, cereal and fruit crops can cause significant reduction in productivity and thereby result in increased costs to the consumer. In addition to often being highly destructive, plant diseases can be difficult to control and may develop resistance to commercial fungicides. Many products are commercially available for these purposes, but the need continues for new fungicidal compounds which are more effective, less costly, less toxic, environmentally safer or have different sites of action. Besides introduction of new fungicides, combinations of fungicides are often used to facilitate disease control, to broaden spectrum of control and to retard resistance development. Furthermore, certain rare combinations of fungicides demonstrate a greater-than-additive (i.e. synergistic) effect to provide commercially important levels of plant disease control. The advantages of particular fungicide combinations are recognized in the art to vary, depending on such factors as the particular plant species and plant disease to be treated, and whether the plants are treated before or after infection with the fungal plant pathogen. Accordingly, new advantageous combinations are needed to provide a variety of options to best satisfy particular plant disease control needs. Such combinations have now been discovered.

PCT Patent Publications WO 2008/124092, WO 2011/059619, WO 2014/066120, WO 2015/157005 and WO 2020/097012 and disclose tolyl derivatives and methods of using such derivatives as fungicides.

SUMMARY OF THE INVENTION

This invention relates to a fungicidal composition (i.e. combination, mixture) comprising (a) at least one compound selected from the compounds of Formula 1 (including all stereoisomers), N-oxides, and salts thereof,

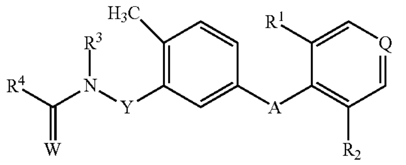

1 wherein

A is a radical selected from the group consisting of

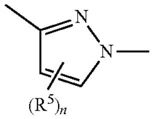

A-1

,

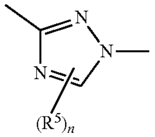

A-2

,

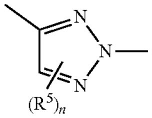

A-3 and

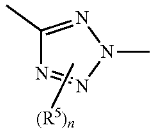

A-4

, wherein the bond extending to the right is attached to the ring containing Q and the bond extending to the left is attached to the phenyl ring bearing the Y—N($R^3$)C(═W)$R^4$ substituent;

Q is $CR^6$ or N;

Y is $CR^{7a}R^{7b}$, O or $NR^8$;

W is O or S;

$R^1$ and $R^2$ are each independently halogen, cyano, hydroxy, nitro, amino, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_2$-$C_6$ cyanoalkyl, $C_3$-$C_6$ cycloalkyl, $C_3$-$C_6$ halocycloalkyl, $C_4$-$C_8$ cycloalkylalkyl, $C_2$-$C_6$ alkoxyalkyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_2$-$C_6$ cyanoalkoxy, $C_3$-$C_6$ cycloalkoxy, $C_4$-$C_8$ cycloalkylalkoxy, $C_2$-$C_6$ alkoxyalkoxy, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl or $C_1$-$C_6$ haloalkylsulfonyl;

$R^3$ is H, $C_1$-$C_3$ alkyl, $C_1$-$C_3$ haloalkyl, cyclopropyl, $C_2$-$C_4$ alkylcarbonyl, $C_2$-$C_4$ haloalkylcarbonyl, $C_2$-$C_4$ alkoxycarbonyl or $C_2$-$C_4$ haloalkoxycarbonyl;

$R^4$ is $C_1$-$C_3$ alkyl, $C_1$-$C_3$ haloalkyl, $C_1$-$C_3$ alkoxy, $C_1$-$C_3$ haloalkoxy, $C_1$-$C_3$ alkylamino or $C_2$-$C_4$ dialkylamino;

each $R^5$ is independently halogen, cyano, $C_1$-$C_3$ alkyl, $C_1$-$C_3$ haloalkyl, $C_1$-$C_3$ alkoxy or $C_1$-$C_3$ haloalkoxy;

n is 0, 1 or 2;

$R^6$ is H, halogen, cyano, hydroxy, nitro, amino, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_2$-$C_6$ cyanoalkyl, $C_1$-$C_6$ hydroxyalkyl, $C_2$-$C_6$ alkoxyalkyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_2$-$C_6$ cyanoalkoxy, $C_2$-$C_6$ alkoxyalkoxy, $C_1$-$C_6$ alkylamino, $C_1$-$C_6$ haloalkylamino, $C_2$-$C_6$ dialkylamino, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, —ZC(═O)V, $CR^{10a}$═$NOR^{10b}$, ON═$CR^{11a}R^{11b}$, $CR^{12a}$═$NNR^{12b}R^{12c}$ or -L-J;

$R^{7a}$ is H, hydroxy, halogen, cyano, $C_1$-$C_3$ alkyl, $C_1$-$C_3$ haloalkyl, $C_2$-$C_3$ alkoxyalkyl, $C_1$-$C_3$ alkoxy, $C_1$-$C_3$ haloalkoxy, $C_1$-$C_3$ alkylsulfinyl or $C_1$-$C_3$ alkylsulfonyl;

$R^{7b}$ is H, $C_1$-$C_3$ alkyl, $C_1$-$C_3$ haloalkyl, $C_2$-$C_3$ alkoxyalkyl, $C_1$-$C_3$ alkoxy or $C_1$-$C_3$ haloalkoxy;

$R^8$ is H, $C_1$-$C_3$ alkyl, $C_1$-$C_3$ haloalkyl, $C_2$-$C_3$ alkylcarbonyl or $C_2$-$C_3$ haloalkylcarbonyl;

Z is a direct bond, O, S or NH; or $CH_2$ optionally substituted with up to 2 substituents independently selected from halogen, methyl or methoxy;

V is $R^9$ or $OR^9$;

$R^9$, $R^{10b}$, $R^{11a}$ and $R^{12c}$ are each H, $C_1$-$C_3$ alkyl, $C_1$-$C_3$ haloalkyl, $C_2$-$C_4$ alkenyl, $C_2$-$C_4$ haloalkenyl, $C_2$-$C_4$ alkynyl, $C_3$-$C_6$ cycloalkyl, $C_3$-$C_6$ halocycloalkyl or $C_4$-$C_8$ cycloalkylalkyl;

$R^{10a}$, $R^{11b}$, $R^{12a}$ and $R^{12b}$ are each independently H, $C_1$-$C_3$ alkyl or $C_1$-$C_3$ haloalkyl;

L is a direct bond, $CH_2$, O, S, $NR^{13}$, $OCH_2$, $CH_2O$, C(═O), S(═O) or $S(=O)_2$;

J is a 3- to 6-membered nonaromatic carbocyclic ring, wherein up to 3 carbon atom ring members are independently selected from C(═O) and C(═S), each ring optionally substituted with up to 4 substituents independently selected from $R^{14}$; or J is a 3- to 6-membered heterocyclic ring, each ring containing ring members selected from carbon atoms and 1 to 4 heteroatoms independently selected from up to 2 O, up to 2 S and up to 4 N atoms, wherein up to 3 carbon atom ring members are independently selected from C(═O) and C(═S), each ring optionally substituted with up to 4 substituents independently selected from $R^{14}$;

$R^{13}$ is H, $C_1$-$C_3$ alkyl, $C_1$-$C_3$ haloalkyl, $C_2$-$C_3$ alkylcarbonyl or $C_2$-$C_3$ haloalkylcarbonyl;

each $R^{14}$ is independently halogen, hydroxy, cyano, nitro, $C_1$-$C_4$ alkyl, $C_1$-$C_4$ haloalkyl, $C_2$-$C_4$ alkenyl, $C_2$-$C_4$ haloalkenyl, $C_1$-$C_4$ alkoxy, $C_1$-$C_4$ haloalkoxy or $C(=O)OR^{15}$; and each $R^{15}$ is independently H, $C_1$-$C_3$ alkyl, $C_1$-$C_3$ haloalkyl, $C_2$-$C_4$ alkenyl, $C_2$-$C_4$ haloalkenyl, $C_2$-$C_4$ alkynyl, $C_3$-$C_6$ cycloalkyl or $C_3$-$C_6$ halocycloalkyl; and (b) at least one additional fungicidal compound.

This invention also relates to a composition comprising: (a) at least one compound selected from the compounds of Formula 1 described above, N-oxides, and salts thereof; and at least one invertebrate pest control compound or agent.

This invention also relates to a composition comprising one of the aforesaid compositions comprising component (a) and at least one additional component selected from the group consisting of surfactants, solid diluents and liquid diluents.

This invention also relates to a method for controlling plant diseases caused by fungal plant pathogens comprising applying to the plant or portion thereof, or to the plant seed, a fungicidally effective amount of one of the aforesaid compositions.

The aforedescribed method can also be described as a method for protecting a plant or plant seed from diseases caused by fungal pathogens comprising applying a fungicidally effective amount of one of the aforesaid compositions to the plant (or portion thereof) or plant seed (directly or through the environment (e.g., growing medium) of the plant or plant seed).

This invention also relates to a compound of Formula 1 described above, an N-oxide or salt thereof.

DETAILS OF THE INVENTION

As used herein, the terms "comprises," "comprising," "includes," "including," "has," "having," "contains," "containing," "characterized by" or any other variation thereof, are intended to cover a non-exclusive inclusion, subject to any limitation explicitly indicated. For example, a composition, mixture, process, method, article, or apparatus that comprises a list of elements is not necessarily limited to only those elements but may include other elements not expressly listed or inherent to such composition, mixture, process, method, article, or apparatus.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where applicants have defined an invention or a portion thereof with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The term "agronomic" refers to the production of field crops such as for food and fiber and includes the growth of maize or corn, soybeans and other legumes, rice, cereal (e.g., wheat, oats, barley, rye and rice), leafy vegetables (e.g., lettuce, cabbage, and other cole crops), fruiting vegetables (e.g., tomatoes, pepper, eggplant, crucifers and cucurbits), potatoes, sweet potatoes, grapes, cotton, tree fruits (e.g., pome, stone and citrus), small fruit (e.g., berries and cherries) and other specialty crops (e.g., canola, sunflower and olives).

The term "nonagronomic" refers to other than field crops, such as horticultural crops (e.g., greenhouse, nursery or ornamental plants not grown in a field), residential, agricultural, commercial and industrial structures, turf (e.g., sod farm, pasture, golf course, lawn, sports field, etc.), wood products, stored product, agro-forestry and vegetation management, public health (i.e. human) and animal health (e.g., domesticated animals such as pets, livestock and poultry, undomesticated animals such as wildlife) applications.

The term "crop vigor" refers to rate of growth or biomass accumulation of a crop plant. An "increase in vigor" refers to an increase in growth or biomass accumulation in a crop plant relative to an untreated control crop plant. The term "crop yield" refers to the return on crop material, in terms of both quantity and quality, obtained after harvesting a crop plant. An "increase in crop yield" refers to an increase in crop yield relative to an untreated control crop plant.

The term "biologically effective amount" refers to the amount of a biologically active compound (e.g., a compound of Formula 1) sufficient to produce the desired biological effect when applied to (i.e. contacted with) a fungus to be controlled or its environment, or to a plant, the seed from which the plant is grown, or the locus of the plant (e.g., growth medium) to protect the plant from injury by the fungal disease or for other desired effect (e.g., increasing plant vigor).

As referred to in the present disclosure and claims, "plant" includes members of Kingdom Plantae, particularly seed plants (Spermatopsida), at all life stages, including young plants (e.g., germinating seeds developing into seedlings) and mature, reproductive stages (e.g., plants producing flowers and seeds). Portions of plants include geotropic members typically growing beneath the surface of the growing medium (e.g., soil), such as roots, tubers, bulbs and corms, and also members growing above the growing medium, such as foliage (including stems and leaves), flowers, fruits and seeds.

As referred to herein, the term "seedling", used either alone or in a combination of words means a young plant developing from the embryo of a seed.

As referred to herein, the term "broadleaf" used either alone or in words such as "broadleaf crop" means dicot or dicotyledon, a term used to describe a group of angiosperms characterized by embryos having two cotyledons.

As referred to in this disclosure, the terms "fungal pathogen" and "fungal plant pathogen" include pathogens in the Ascomycota, Basidiomycota and Zygomycota phyla, and the fungal-like Oomycota class that are the causal agents of a broad spectrum of plant diseases of economic importance, affecting ornamental, turf, vegetable, field, cereal and fruit crops. In the context of this disclosure, "protecting a plant from disease" or "control of a plant disease" includes preventative action (interruption of the fungal cycle of infection, colonization, symptom development and spore production) and/or curative action (inhibition of colonization of plant host tissues).

As used herein, the term "mode of action" (MOA) is as define by the Fungicide Resistance Action Committee (FRAC), and is used to distinguish fungicides according to their biochemical mode of action in the biosynthetic pathways of plant pathogens, and their resistance risk. FRAC-defined modes of actions include (A) nucleic acid synthesis, (B) mitosis and cell division, (C) respiration, (D) amino acid and protein synthesis, (E) signal transduction, (F) lipid synthesis and membrane integrity, (G) sterol biosynthesis in membranes, (H) cell wall biosynthesis, (I) melanin synthesis in cell wall, (P) host plant defense induction, (U) unknown mode of action, (NC) not classified, (M) multi-site contact activity and (BM) biologicals with multiple modes of action. Each mode of action (i.e. letters A through BM) contain one or more subgroups (e.g., A includes subgroups A1, A2, A3 and A4) based either on individual validated target sites of action, or in cases where the precise target site is unknown, based on cross resistance profiles within a group or in relation to other groups. Each of these subgroups (e.g., A1, A2, A3 and A4) is assigned a FRAC code (a number and/or letter). For example, the FRAC code for subgroup A1 is 4. Additional information on target sites and FRAC codes can be obtained from publicly available databases maintained, for example, by FRAC.

As used herein, the term "cross resistance" refers to the phenomenon that occurs when a pathogen develops resistance to one fungicide and simultaneously becomes resistant to one or more other fungicides. These other fungicides are typically, but not always, in the same chemical class or have the same target site of action, or can be detoxified by the same mechanism.

Generally, when a molecular fragment (i.e. radical) is denoted by a series of atom symbols (e.g., C, H, N, O and S) the implicit point or points of attachment will be easily recognized by those skilled in the art. In some instances herein, particularly when alternative points of attachment are possible, the point or points of attachment may be explicitly indicated by a hyphen ("-"). For example, "—NCS" indicates that the point of attachment is the nitrogen atom (i.e. isothiocyanato, not thiocyanato).

As used herein, the term "alkylating agent" refers to a chemical compound in which a carbon-containing radical is bound through a carbon atom to a leaving group such as halide or sulfonate, which is displaceable by bonding of a nucleophile to said carbon atom. Unless otherwise indicated, the term "alkylating" does not limit the carbon-containing radical to alkyl; the carbon-containing radicals in alkylating agents include the variety of carbon-bound substituent radicals specified, for example, for $R^1$ and $R^2$.

In the above recitations, the term "alkyl", used either alone or in compound words such as "alkylthio" or "haloalkyl" includes straight-chain or branched alkyl such as methyl, ethyl, n-propyl and i-propyl, or the different butyl, pentyl or hexyl isomers. "Alkenyl" includes straight-chain or branched alkenes such as ethenyl, 1-propenyl, 2-propenyl, and the different butenyl, pentenyl and hexenyl isomers. "Alkenyl" also includes polyenes such as 1,2-propadienyl and 2,4-hexadienyl. "Alkynyl" includes straight-chain or branched alkynes such as ethynyl, 1-propynyl, 2-propynyl and the different butynyl, pentynyl and hexynyl isomers. "Alkynyl" can also include moieties comprised of multiple triple bonds such as 2,5-hexadiynyl.

"Alkoxy" includes, for example, methoxy, ethoxy, n-propyloxy, i-propyloxy and the different butoxy, pentoxy and hexyloxy isomers. "Alkoxyalkyl" denotes alkoxy substitution on alkyl. Examples of "alkoxyalkyl" include $CH_3OCH_2$, $CH_3OCH_2CH_2$, $CH_3CH_2OCH_2$, $CH_3CH_2CH_2CH_2OCH_2$ and $CH_3CH_2OCH_2CH_2$. "Alkenyloxy" includes straight-chain or branched alkenyl attached to and linked through an oxygen atom. Examples of "alkenyloxy" include $H_2C{=}CHCH_2O$, $(CH_3)_2C{=}CHCH_2O$, $CH_3CH{=}CHCH_2O$, $CH_3CH{=}C(CH_3)CH_2O$ and $CH_2{=}CHCH_2CH_2O$. "Alkynyloxy" includes straight-chain or branched alkynyl attached to and linked through an oxygen atom. Examples of "alkynyloxy" include $HC{\equiv}CCH_2O$, $CH_3C{\equiv}CCH_2O$ and $CH_3C{\equiv}CCH_2CH_2O$. "Alkoxyalkoxy" denotes alkoxy substitution on another alkoxy moiety. Examples of "alkoxyalkoxy" include $CH_3OCH_2O$, $CH_3OCH_2O$ and $CH_3CH_2OCH_2O$.

"Alkylthio" includes branched or straight-chain alkylthio moieties such as methylthio, ethylthio, and the different propyl, butyl, pentyl and hexylthio isomers. "Alkylsulfinyl" includes both enantiomers of an alkylsulfinyl group. Examples of "alkylsulfinyl" include $CH_3S({=}O)$, $CH_3CH_2S({=}O)$, $CH_3CH_2CH_2S({=}O)$, $(CH_3)_2CHS({=}O)$ and the different butylsulfinyl, pentylsulfinyl and hexylsulfinyl isomers. Examples of "alkylsulfonyl" include $CH_3S({=}O)_2$, $CH_3CH_2S(=O)_2$, $CH_3CH_2CH_2S(=O)_2$, $(CH_3)_2CHS(=O)_2$ and the different butylsulfonyl, pentylsulfonyl and hexylsulfonyl isomers.

"Alkylamino" includes an NH radical substituted with straight-chain or branched alkyl. Examples of "alkylamino" include $CH_3NH$, $CH_3CH_2NH$, $CH_3CH_2CH_2NH$ and $(CH_3)_2CHNH$. Examples of "dialkylamino" include $(CH_3)_2N$, $(CH_3CH_2)_2N$ and $CH_3CH_2(CH_3)N$.

The term "cycloalkyl" denotes a saturated carbocyclic ring consisting of between 3 to 6 carbon atoms linked to one another by single bonds. Examples of "cycloalkyl" include cyclopropyl, cyclobutyl, cyclopentyl and cyclohexyl. The term "cycloalkylalkyl" denotes cycloalkyl substitution on an alkyl group. Examples of "cycloalkylalkyl" include cyclopropylmethyl, cyclopentylethyl, and other cycloalkyl moieties bonded to straight-chain or branched alkyl groups. The term "cycloalkoxy" denotes cycloalkyl attached to and linked through an oxygen atom such as cyclopentyloxy and cyclohexyloxy. "Cycloalkylalkoxy" denotes cycloalkyl substitution on an alkoxy group. Examples of "cycloalkylalkoxy" include cyclopropylmethoxy, cyclopentylethoxy, and other cycloalkyl moieties bonded to straight-chain or branched alkoxy groups.

"Alkylcarbonyl" denotes a straight-chain or branched alkyl group bonded to a $C(=O)$ moiety. Examples of "alkylcarbonyl" include $CH_3C(=O)$, $CH_3CH_2CH_2C(=O)$ and $(CH_3)_2CHC(=O)$. Examples of "alkoxycarbonyl" include $CH_3OC(=O)$, $CH_3CH_2OC(=O)$, $CH_3CH_2CH_2OC(=O)$ and $(CH_3)_2CHOC(=O)$.

The term "halogen", either alone or in compound words such as "haloalkyl", or when used in descriptions such as "alkyl substituted with halogen" includes fluorine, chlorine, bromine or iodine. Further, when used in compound words such as "haloalkyl", or when used in descriptions such as "alkyl substituted with halogen" said alkyl may be partially or fully substituted with halogen atoms which may be the same or different. Examples of "haloalkyl" or "alkyl substituted with halogen" include $F_3C$, $ClCH_2$, $CF_3CH_2$ and $CF_3CCl_2$. The term "haloalkoxy", and the like, are defined analogously to the term "haloalkyl". Examples of "haloalkoxy" include $CF_3O$, $CCl_3CH_2O$, $F_2CHCH_2CH_2O$ and $CF_3CH_2O$.

"Cyanoalkyl" denotes an alkyl group substituted with one cyano group. Examples of "cyanoalkyl" include $NCCH_2$, $NCCH_2CH_2$ and $CH_3CH(CN)CH_2$. The term "cyanoalkoxy" denotes an alkyloxy group substituted with one cyano group. Examples of "cyanoalkoxy" include $NCCH_2O$, $NCCH_2CH_2O$ and $CH_3CH(CN)CH_2O$. "Hydroxyalkyl" denotes an alkyl group substituted with one hydroxy group. Examples of "hydroxyalkyl" include $HOCH_2CH_2$, $CH_3CH_2(OH)CH$ and $HOCH_2CH_2CH_2CH_2$.

The total number of carbon atoms in a substituent group is indicated by the "$C_i$-$C_j$" prefix where i and j are numbers from 1 to 6. For example, $C_1$-$C_3$ alkylsulfonyl designates methylsulfonyl through propylsulfonyl; $C_2$ alkoxyalkyl designates $CH_3OCH_2$; $C_3$ alkoxyalkyl designates, for example, $CH_3OCH_2CH_2$ or $CH_3CH_2OCH_2$; and $C_4$ alkoxyalkyl designates the various isomers of an alkyl group substituted with an alkoxy group containing a total of four carbon atoms, examples including $CH_3CH_2CH_2OCH_2$ and $CH_3CH_2OCH_2CH_2$.

The term "unsubstituted" in connection with a group such as a ring or ring system means the group does not have any substituents other than its one or more attachments to the remainder of Formula 1. The term "optionally substituted" means that the number of substituents can be zero. Unless otherwise indicated, optionally substituted groups may be substituted with as many optional substituents as can be accommodated by replacing a hydrogen atom with a non-hydrogen substituent on any available carbon or nitrogen atom. Commonly, the number of optional substituents (when present) ranges from 1 to 3. As used herein, the term "optionally substituted" is used interchangeably with the phrase "substituted or unsubstituted" or with the term "(un)substituted."

The number of optional substituents may be restricted by an expressed limitation. For example, the phrase "optionally substituted with up to 4 substituents independently selected from $R^{14}$" means that 0, 1, 2, 3 or 4 substituents can be present.

When a compound is substituted with a substituent bearing a subscript that indicates the number of said substituents can vary (e.g., $(R^5)_n$ in Formula 1 wherein n is 0 to 2), then said substituents are independently selected from the group of defined substituents, unless otherwise indicated. When a variable group is shown to be optionally attached to a position, for example $(R^5)_n$ wherein n may be 0, then hydrogen may be at the position even if not recited in the definition of the variable group.

Naming of substituents in the present disclosure uses recognized terminology providing conciseness in precisely conveying to those skilled in the art the chemical structure. For sake of conciseness, locant descriptors may be omitted.

Unless otherwise indicated, a "ring" as a component of Formula 1 (e.g., J) is carbocyclic or heterocyclic. The term "ring member" refers to an atom (e.g., C, O, N or S) or other moiety (e.g., $C(=O)$ and $C(=S)$) forming the backbone of a ring or ring system. The term "aromatic" indicates that each of the ring atoms is essentially in the same plane and has a p-orbital perpendicular to the ring plane, and that $(4n+2)$ $\pi$ electrons, where n is a positive integer, are associated with the ring to comply with Hückel's rule.

The term "carbocyclic ring" denotes a ring wherein the atoms forming the ring backbone are selected only from carbon. Unless otherwise indicated, a carbocyclic ring can be a saturated, partially unsaturated, or fully unsaturated ring. When a fully unsaturated carbocyclic ring satisfies Hückel's rule, then said ring is also called an "aromatic ring". "Saturated carbocyclic" refers to a ring having a backbone consisting of carbon atoms linked to one another by single bonds; unless otherwise specified, the remaining carbon valences are occupied by hydrogen atoms.

As used herein, the term "partially unsaturated ring" or "partially unsaturated heterocycle" refers to a ring which contains unsaturated ring atoms and one or more double bonds but is not aromatic.

The terms "heterocyclic ring" or "heterocycle" denotes a ring wherein at least one of the atoms forming the ring backbone is other than carbon. Unless otherwise indicated, a heterocyclic ring can be a saturated, partially unsaturated, or fully unsaturated ring. When a fully unsaturated heterocyclic ring satisfies Hückel's rule, then said ring is also called a "heteroaromatic ring" or aromatic heterocyclic ring. "Saturated heterocyclic ring" refers to a heterocyclic ring containing only single bonds between ring members.

Unless otherwise indicated, heterocyclic rings are attached to the remainder of Formula 1 through any available carbon or nitrogen atom by replacement of a hydrogen on said carbon or nitrogen atom.

Compounds of this invention can exist as one or more stereoisomers. Stereoisomers are isomers of identical constitution but differing in the arrangement of their atoms in space and include enantiomers, diastereomers, cis- and trans-isomers (also known as geometric isomers) and atropisomers. Atropisomers result from restricted rotation about single bonds where the rotational barrier is high enough to permit isolation of the isomeric species. One skilled in the art will appreciate that one stereoisomer may be more active and/or may exhibit beneficial effects when enriched relative to the other stereoisomer(s) or when separated from the other stereoisomer(s). Additionally, the skilled artisan knows how to separate, enrich, and/or to selectively prepare said stereoisomers. For a comprehensive discussion of all aspects of stereoisomerism, see Ernest L. Eliel and Samuel H. Wilen, *Stereochemistry of Organic Compounds*, John Wiley & Sons, 1994.

This invention also includes compounds of Formula 1 wherein one stereoisomer is enriched relative to the other stereoisomer(s). For example, the ratio of the (Z)- to (E)-isomers in any compounds of Formula 1, whether produced stereoselectivity or non-stereoselectivity, may take on a broad range of values. In addition, this invention includes compounds that are enriched compared to the racemic mixture in an enantiomer of Formula 1. Also included are the essentially pure enantiomers of compounds of Formula 1. When enantiomerically enriched, one enantiomer is present in greater amounts than the other, and the extent of enrichment can be defined by an expression of enantiomeric excess ("ee"), which is defined as $(2x-1)\cdot 100\%$, where x is the mole fraction of the dominant enantiomer in the mixture (e.g., an ee of 20% corresponds to a 60:40 ratio of enantiomers).

Preferably the compositions of this invention have at least a 50% enantiomeric excess; more preferably at least a 75% enantiomeric excess; still more preferably at least a 90% enantiomeric excess; and the most preferably at least a 94% enantiomeric excess of the more active isomer. Of particular note are enantiomerically pure embodiments of the more active isomer.

Compounds of this invention can exist as one or more conformational isomers due to restricted rotation about an amide bond (e.g., C(=O)—N) in Formula 1. This invention comprises mixtures of conformational isomers. In addition, this invention includes compounds that are enriched in one conformer relative to others.

This invention comprises all stereoisomers, conformational isomers and mixtures thereof in all proportions as well as isotopic forms such as deuterated compounds.

One skilled in the art will appreciate that not all nitrogen containing heterocycles can form N-oxides since the nitrogen requires an available lone pair for oxidation to the oxide; one skilled in the art will recognize those nitrogen-containing heterocycles which can form N-oxides. One skilled in the art will also recognize that tertiary amines can form N-oxides. Synthetic methods for the preparation of N-oxides of heterocycles and tertiary amines are very well known by one skilled in the art including the oxidation of heterocycles and tertiary amines with peroxy acids such as peracetic and m-chloroperbenzoic acid (MCPBA), hydrogen peroxide, alkyl hydroperoxides such as t-butyl hydroperoxide, sodium perborate, and dioxiranes such as dimethyldioxirane. These methods for the preparation of N-oxides have been extensively described and reviewed in the literature, see for example: T. L. Gilchrist in *Comprehensive Organic Synthesis*, vol. 7, pp 748-750, S. V. Ley, Ed., Pergamon Press; M. Tisler and B. Stanovnik in *Comprehensive Heterocyclic Chemistry*, vol. 3, pp 18-20, A. J. Boulton and A. McKillop, Eds., Pergamon Press; M. R. Grimmett and B. R. T. Keene in *Advances in Heterocyclic Chemistry*, vol. 43, pp 149-161, A. R. Katritzky, Ed., Academic Press; M. Tisler and B. Stanovnik in *Advances in Heterocyclic Chemistry*, vol. 9, pp 285-291, A. R. Katritzky and A. J. Boulton, Eds., Academic Press; and G. W. H. Cheeseman and E. S. G. Werstiuk in *Advances in Heterocyclic Chemistry*, vol. 22, pp 390-392, A. R. Katritzky and A. J. Boulton, Eds., Academic Press.

One skilled in the art recognizes that because in the environment and under physiological conditions salts of chemical compounds are in equilibrium with their corresponding nonsalt forms, salts share the biological utility of the nonsalt forms. Thus a wide variety of salts of the compounds of Formula 1 are useful for control of plant diseases caused by fungal plant pathogens (i.e. are agriculturally suitable). The salts of the compounds of Formula 1 include acid-addition salts with inorganic or organic acids such as hydrobromic, hydrochloric, nitric, phosphoric, sulfuric, acetic, butyric, fumaric, lactic, maleic, malonic, oxalic, propionic, salicylic, tartaric, 4-toluenesulfonic or valeric acids. When a compound of Formula 1 contains an acidic moiety such as a carboxylic acid, salts also include those formed with organic or inorganic bases such as pyridine, triethylamine or ammonia, or amides, hydrides, hydroxides or carbonates of sodium, potassium, lithium, calcium, magnesium or barium. Accordingly, the present invention comprises compounds selected from Formula 1, N-oxides, and agriculturally suitable salts, and solvates thereof.

Compounds selected from Formula 1, stereoisomers, tautomers, N-oxides, and salts thereof, typically exist in more than one form, and Formula 1 thus includes all crystalline and non-crystalline forms of the compounds that Formula 1 represents. Non-crystalline forms include embodiments which are solids such as waxes and gums as well as embodiments which are liquids such as solutions and melts. Crystalline forms include embodiments which represent essentially a single crystal type and embodiments which represent a mixture of polymorphs (i.e. different crystalline types). The term "polymorph" refers to a particular crystalline form of a chemical compound that can crystallize in different crystalline forms, these forms having different arrangements and/or conformations of the molecules in the crystal lattice. Although polymorphs can have the same chemical composition, they can also differ in composition due to the presence or absence of co-crystallized water or other molecules, which can be weakly or strongly bound in the lattice. Polymorphs can differ in such chemical, physical and biological properties as crystal shape, density, hardness, color, chemical stability, melting point, hygroscopicity, suspensibility, dissolution rate and biological availability. One skilled in the art will appreciate that a polymorph of a compound represented by Formula 1 can exhibit beneficial effects (e.g., suitability for preparation of useful formulations, improved biological performance) relative to another polymorph or a mixture of polymorphs of the same compound represented by Formula 1. Preparation and isolation of a particular polymorph of a compound represented by Formula 1 can be achieved by methods known to those skilled in the art including, for example, crystallization using selected solvents and temperatures. For a comprehensive discussion of polymorphism see R. Hilfiker, Ed., *Polymorphism in the Pharmaceutical Industry*, Wiley-VCH, Weinheim, 2006.

As described in the Summary of the Invention, an aspect of the present invention is directed at a composition comprising (a) at least one compound selected from Formula 1, N-oxides, and salts thereof, with (b) at least one additional fungicidal compound. More particularly, Component (b) is selected from the group consisting of (b1) methyl benzimidazole carbamate (MBC) fungicides;
(b2) dicarboximide fungicides;
(b3) demethylation inhibitor (DMI) fungicides;
(b4) phenylamide (PA) fungicides;
(b5) amine/morpholine fungicides;
(b6) phospholipid biosynthesis inhibitor fungicides;
(b7) succinate dehydrogenase inhibitor (SDHI) fungicides;
(b8) hydroxy(2-amino)pyrimidine fungicides;
(b9) anilinopyrimidine (AP) fungicides;
(b10) N-phenyl carbamate fungicides;
(b11) quinone outside inhibitor (QoI) fungicides;
(b12) phenylpyrrole (PP) fungicides;
(b13) azanaphthalene fungicides;
(b14) cell peroxidation inhibitor fungicides;
(b15) melanin biosynthesis inhibitor-reductase (MBI-R) fungicides;
(b16a) melanin biosynthesis inhibitor-dehydratase (MBI-D) fungicides;
(b16b) melanin biosynthesis inhibitor-polyketide synthase (MBI-P) fungicides;
(b17) keto reductase inhibitor (KRI) fungicides;
(b18) squalene-epoxidase inhibitor fungicides;
(b19) polyoxin fungicides;
(b20) phenylurea fungicides;
(b21) quinone inside inhibitor (QiI) fungicides;
(b22) benzamide and thiazole carboxamide fungicides;
(b23) enopyranuronic acid antibiotic fungicides;
(b24) hexopyranosyl antibiotic fungicides;
(b25) glucopyranosyl antibiotic: protein synthesis fungicides;
(b26) glucopyranosyl antibiotic fungicides;
(b27) cyanoacetamide-oxime fungicides;
(b28) carbamate fungicides;
(b29) oxidative phosphorylation uncoupling fungicides;
(b30) organo tin fungicides;
(b31) carboxylic acid fungicides;
(b32) heteroaromatic fungicides;
(b33) phosphonate fungicides;
(b34) phthalamic acid fungicides;
(b35) benzotriazine fungicides;
(b36) benzene-sulfonamide fungicides;
(b37) pyridazinone fungicides;
(b38) thiophene-carboxamide fungicides;
(b39) complex I NADH oxidoreductase inhibitor fungicides;
(b40) carboxylic acid amide (CAA) fungicides;
(b41) tetracycline antibiotic fungicides;
(b42) thiocarbamate fungicides;
(b43) benzamide fungicides;
(b44) microbial fungicides;
(b45) quinone outside inhibitor, stigmatellin binding (QoSI) fungicides;
(b46) plant extract fungicides;
(b47) cyanoacrylate fungicides;
(b48) polyene fungicides;
(b49) oxysterol binding protein inhibitor (OSBPI) fungicides;
(b50) aryl-phenyl-ketone fungicides;
(b51) host plant defense induction fungicides;
(b52) multi-site activity fungicides;
(b53) biologicals with multiple modes of action;
(b54) fungicides other than fungicides of component (a) and components (b1) through (b53); and salts of compounds of (b1) through (b54).

Of note are embodiments wherein component (b) comprises at least one fungicidal compound from each of two different groups selected from (b1) through (b54).

"Methyl benzimidazole carbamate (MBC) fungicides (b1)" (FRAC code 1) inhibit mitosis by binding to β-tubulin during microtubule assembly. Inhibition of microtubule assembly can disrupt cell division, transport within the cell and cell structure. Methyl benzimidazole carbamate fungicides include benzimidazole and thiophanate fungicides. The benzimidazoles include benomyl, carbendazim, fuberidazole and thiabendazole. The thiophanates include thiophanate and thiophanate-methyl.

"Dicarboximide fungicides (b2)" (FRAC code 2) inhibit a mitogen-activated protein (MAP)/histidine kinase in osmotic signal transduction. Examples include chlozolinate, dimethachlone, iprodione, procymidone and vinclozolin.

"Demethylation inhibitor (DMI) fungicides (b3)" (FRAC code 3) (Sterol Biosynthesis Inhibitors (SBI): Class I) inhibit C14-demethylase, which plays a role in sterol production. Sterols, such as ergosterol, are needed for membrane structure and function, making them essential for the development of functional cell walls. Therefore, exposure to these fungicides results in abnormal growth and eventually death of sensitive fungi. DMI fungicides are divided between several chemical classes: piperazines, pyridines, pyrimidines, imidazoles, triazoles and triazolinthiones. The piperazines include triforine. The pyridines include buthiobate, pyrifenox, pyrisoxazole and (αS)-[3-(4-chloro-2-fluorophenyl)-5-(2,4-difluorophenyl)-4-isoxazolyl]-3-pyridinemethanol. The pyrimidines include fenarimol, nuarimol and triarimol. The imidazoles include econazole, imazalil, oxpoconazole, pefurazoate, prochloraz and triflumizole. The triazoles include azaconazole, bitertanol, bromuconazole, cyproconazole, difenoconazole, diniconazole (including diniconazole-M), epoxiconazole, etaconazole, fenbuconazole, fluquinconazole, flusilazole, flutriafol, hexaconazole, imibenconazole, ipconazole, ipfentrifluconazole, mefentrifluconazole, metconazole, myclobutanil, penconazole, propiconazole, quinconazole, simeconazole, tebuconazole, tetraconazole, triadimefon, triadimenol, triticonazole, uniconazole, uniconazole-P, α-(1-chlorocyclopropyl)-α-[2-(2,2-dichlorocyclopropyl)ethyl]-1H-1,2,4-triazole-1-ethanol, rel-1-[[(2R,3S)-3-(2-chlorophenyl)-2-(2,4-difluorophenyl)-2-oxiranyl]methyl]-1H-1,2,4-triazole, rel-2-[[(2R,3S)-3-(2-chlorophenyl)-2-(2,4-difluorophenyl)-2-oxiranyl]methyl]-1,2-dihydro-3H-1,2,4-triazole-3-thione and rel-1-[[(2R,3S)-3-(2-chlorophenyl)-2-(2,4-difluorophenyl)-2-oxiranyl]methyl]-5-(2-propen-1-ylthio)-1H-1,2,4-triazole. The triazolinthiones include prothioconazole. Biochemical investigations have shown that all of the above mentioned fungicides are DMT fungicides as described by K. H. Kuck et al. in *Modern Selective Fungicides—Properties, Applications and Mechanisms of Action*, H. Lyr (Ed.), Gustav Fischer Verlag: New York, 1995, 205-258.

"Phenylamide (PA) fungicides (b4)" (FRAC code 4) are specific inhibitors of RNA polymerase in Oomycete fungi. Sensitive fungi exposed to these fungicides show a reduced capacity to incorporate uridine into rRNA. Growth and development in sensitive fungi is prevented by exposure to this class of fungicide. Phenylamide fungicides include acylalanine, oxazolidinone and butyrolactone fungicides. The acylalanines include benalaxyl, benalaxyl-M (also known as kiralaxyl), furalaxyl, metalaxyl and metalaxyl-M (also known as mefenoxam). The oxazolidinones include oxadixyl. The butyrolactones include ofurace.

"Amine/morpholine fungicides (b5)" (FRAC code 5) (SBJ: Class II) inhibit two target sites within the sterol biosynthetic pathway, $\Delta^8 \rightarrow \Delta^7$ isomerase and $\Delta^{14}$ reductase. Sterols, such as ergosterol, are needed for membrane structure and function, making them essential for the development of functional cell walls. Therefore, exposure to these fungicides results in abnormal growth and eventually death of sensitive fungi. Amine/morpholine fungicides (also known as non-DMI sterol biosynthesis inhibitors) include morpholine, piperidine and spiroketal-amine fungicides. The morpholines include aldimorph, dodemorph, fenpropimorph, tridemorph and trimorphamide. The piperidines include fenpropidin and piperalin. The spiroketal-amines include spiroxamine.

"Phospholipid biosynthesis inhibitor fungicides (b6)" (FRAC code 6) inhibit growth of fungi by affecting phospholipid biosynthesis. Phospholipid biosynthesis fungicides include phosphorothiolates and dithiolane fungicides. The phosphorothiolates include edifenphos, iprobenfos and pyrazophos. The dithiolanes include isoprothiolane.

"Succinate dehydrogenase inhibitor (SDHI) fungicides (b7)" (FRAC code 7) inhibit complex II fungal respiration by disrupting a key enzyme in the Krebs Cycle (TCA cycle) named succinate dehydrogenase. Inhibiting respiration prevents the fungus from making ATP, and thus inhibits growth and reproduction. SDHI fungicides include phenylbenzamide, phenyl-oxo-ethyl thiophene amide, pyridinyl-ethyl-benzamides, furan carboxamide, oxathiin carboxamide, thiazole carboxamide, pyrazole-4-carboxamide, N-cyclopropyl-N-benzyl-pyrazole carboxamide, N-methoxy(phenylethyl)pyrazole carboxamide, pyridine carboxamide and pyrazine carboxamide fungicides. The phenylbenzamides include benodanil, flutolanil and mepronil. The phenyl-oxo-ethyl thiophene amides include isofetamid. The pyridinyl-ethyl-benzamides include fluopyram. The furan carboxamides include fenfuram. The oxathiin carboxamides include carboxin and oxycarboxin. The thiazole carboxamides include thifluzamide. The pyrazole-4-carboxamides include benzovindiflupyr, bixafen, flubeneteram (provisional common name, Registry Number 1676101-39-5), fluindapyr, fluxapyroxad, furametpyr, inpyrfluxam, isopyrazam, penflufen, penthiopyrad, pyrapropoyne (provisional common name, Registry Number 1803108-03-3), sedaxane and N-[2-(2,4-dichlorophenyl)-2-methoxy-1-methylethyl]-3-(difluoromethyl)-1-methyl-1H-pyrazole-4-carboxamide. The N-cyclopropyl-N-benzyl-pyrazole carboxamides include isoflucypram. The N-methoxy(phenylethyl)pyrazole carboxamides include pydiflumetofen. The pyridine carboxamides include boscalid. The pyrazine carboxamides include pyraziflumid.

"Hydroxy(2-amino)pyrimidine fungicides (b8)" (FRAC code 8) inhibit nucleic acid synthesis by interfering with adenosine deaminase. Examples include bupirimate, dimethirimol and ethirimol.

"Anilinopyrimidine (AP) fungicides (b9)" (FRAC code 9) are proposed to inhibit biosynthesis of the amino acid methionine and to disrupt the secretion of hydrolytic enzymes that lyse plant cells during infection. Examples include cyprodinil, mepanipyrim and pyrimethanil.

"N-Phenyl carbamate fungicides (b10)" (FRAC code 10) inhibit mitosis by binding to (3-tubulin and disrupting microtubule assembly. Inhibition of microtubule assembly can disrupt cell division, transport within the cell and cell structure. Examples include diethofencarb.

"Quinone outside inhibitor (QoI) fungicides (b11)" (FRAC code 11) inhibit complex III mitochondrial respiration in fungi by affecting ubiquinol oxidase. Oxidation of ubiquinol is blocked at the "quinone outside" (Qo) site of the cytochrome $bc_1$ complex, which is located in the inner mitochondrial membrane of fungi. Inhibiting mitochondrial respiration prevents normal fungal growth and development. Quinone outside inhibitor fungicides include methoxyacrylate, methoxyacetamide, methoxycarbamate, oximinoacetate, oximinoacetamide and dihydrodioxazine fungicides (collectively also known as strobilurin fungicides), and oxazolidinedione, imidazolinone and benzyl-carbamate fungicides. The methoxyacrylates include azoxystrobin, coumoxystrobin, enoxastrobin (also known as enestroburin), flufenoxystrobin, picoxystrobin and pyraoxystrobin. The methoxyacetamides include mandestrobin. The methoxycarbamates include pyraclostrobin, pyrametostrobin and triclopyricarb. The oximino-acetates include kresoxim-methyl and trifloxystrobin. The oximino-acetamides include dimoxystrobin, fenaminstrobin, metominostrobin and orysastrobin. The dihydrodioxazines include fluoxastrobin. The oxazolidinediones include famoxadone. The imidazolinones include fenamidone. The benzyl-carbamates include pyribencarb.

"Phenylpyrrole (PP) fungicides (b12)" (FRAC code 12) inhibit a MAP/histidine kinase associated with osmotic signal transduction in fungi. Fenpiclonil and fludioxonil are examples of this fungicide class.

"Azanaphthalene fungicides (b13)" (FRAC code 13) are proposed to inhibit signal transduction by a mechanism which is as yet unknown. They have been shown to interfere with germination and/or appressorium formation in fungi that cause powdery mildew diseases. Azanaphthalene fungicides include aryloxyquinolines and quinazolinones. The aryloxyquinolines include quinoxyfen. The quinazolinones include proquinazid.

"Cell peroxidation inhibitor fungicides (b14)" (FRAC code 14) are proposed to inhibit lipid peroxidation which affects membrane synthesis in fungi. Members of this class, such as etridiazole, may also affect other biological processes such as respiration and melanin biosynthesis. Cell peroxidation fungicides include aromatic hydrocarbon and 1,2,4-thiadiazole fungicides. The aromatic hydrocarbon fungicides include biphenyl, chloroneb, dicloran, quintozene, tecnazene and tolclofos-methyl. The 1,2,4-thiadiazoles include etridiazole.

"Melanin biosynthesis inhibitor-reductase (MBI-R) fungicides (b15)" (FRAC code 16.1) inhibit the naphthal reduction step in melanin biosynthesis. Melanin is required for host plant infection by some fungi. Melanin biosynthesis inhibitor-reductase fungicides include isobenzofuranone, pyrroloquinolinone and triazolobenzothiazole fungicides. The isobenzofuranones include fthalide. The pyrroloquinolinones include pyroquilon. The triazolobenzothiazoles include tricyclazole.

"Melanin biosynthesis inhibitor-dehydratase (MBI-D) fungicides (b16a)" (FRAC code 16.2) inhibit scytalone dehydratase in melanin biosynthesis. Melanin is required for host plant infection by some fungi. Melanin biosynthesis inhibitor-dehydratase fungicides include cyclopropanecarboxamide, carboxamide and propionamide fungicides. The cyclopropanecarboxamides include carpropamid. The carboxamides include diclocymet. The propionamides include fenoxanil.

"Melanin biosynthesis inhibitor-polyketide synthase (MBI-P) fungicides (b16b)" (FRAC code 16.3) inhibit polyketide synthase in melanin biosynthesis. Melanin is required for host plant infection by some fungi. Melanin biosynthesis inhibitor-polyketide synthase fungicides include trifluoroethylcarbamate fungicides. The trifluoroethylcarbamates include tolprocarb.

"Keto reductase inhibitor (KRI) fungicides (b17)" (FRAC code 17) inhibit 3-keto reductase during C4-demethylation in sterol production. Keto reductase inhibitor fungicides (also known as Sterol Biosynthesis Inhibitors (SBI): Class III) include hydroxyanilides and amino-pyrazolinones. Hydroxyanilides include fenhexamid. Amino-pyrazolinones include fenpyrazamine. Additionally, Quinofumelin (provisional common name, Registry Number 861647-84-9) and ipflufenoquin (provisional common name, Registry Number 1314008-27-9) are believed to be keto reductase inhibitor fungicides.

"Squalene-epoxidase inhibitor fungicides (b18)" (FRAC code 18) (SBJ: Class IV) inhibit squalene-epoxidase in the sterol biosynthesis pathway. Sterols such as ergosterol are needed for membrane structure and function, making them essential for the development of functional cell walls. Therefore exposure to these fungicides results in abnormal growth and eventually death of sensitive fungi. Squalene-epoxidase inhibitor fungicides include thiocarbamate and allylamine fungicides. The thiocarbamates include pyributicarb. The allylamines include naftifine and terbinafine.

"Polyoxin fungicides (b19)" (FRAC code 19) inhibit chitin synthase. Examples include polyoxin.

"Phenylurea fungicides (b20)" (FRAC code 20) are proposed to affect cell division. Examples include pencycuron.

"Quinone inside inhibitor (QiI) fungicides (b21)" (FRAC code 21) inhibit complex III mitochondrial respiration in fungi by affecting ubiquinone reductase. Reduction of ubiquinone is blocked at the "quinone inside" (Qi) site of the cytochrome $bc_1$ complex, which is located in the inner mitochondrial membrane of fungi. Inhibiting mitochondrial respiration prevents normal fungal growth and development. Quinone inside inhibitor fungicides include cyanoimidazole, sulfamoyl-triazole and picolinamide fungicides. The cyanoimidazoles include cyazofamid. The sulfamoyl-triazoles include amisulbrom. The picolinamides include fenpicoxamid.

"Benzamide and thiazole carboxamide fungicides (b22)" (FRAC code 22) inhibit mitosis by binding to β-tubulin and disrupting microtubule assembly. Inhibition of microtubule assembly can disrupt cell division, transport within the cell and cell structure. The benzamides include toluamides such as zoxamide. The thiazole carboxamides include ethylamino-thiazole carboxamides such as ethaboxam.

"Enopyranuronic acid antibiotic fungicides (b23)" (FRAC code 23) inhibit growth of fungi by affecting protein biosynthesis. Examples include blasticidin-S.

"Hexopyranosyl antibiotic fungicides (b24)" (FRAC code 24) inhibit growth of fungi by affecting protein biosynthesis. Examples include kasugamycin.

"Glucopyranosyl antibiotic: protein synthesis fungicides (b25)" (FRAC code 25) inhibit growth of fungi by affecting protein biosynthesis. Examples include streptomycin.

"Glucopyranosyl antibiotic fungicides (b26)" (FRAC code U18, previously FRAC code 26 reclassified to U18) are proposed to inhibit trehalase and inositol biosynthesis. Examples include validamycin.

"Cyanoacetamide-oxime fungicides (b27)" (FRAC code 27) include cymoxanil.

"Carbamate fungicides (b28)" (FRAC code 28) are considered multi-site inhibitors of fungal growth. They are proposed to interfere with the synthesis of fatty acids in cell membranes, which then disrupts cell membrane permeability. Iodocarb, propamacarb and prothiocarb are examples of this fungicide class.

"Oxidative phosphorylation uncoupling fungicides (b29)" (FRAC code 29) inhibit fungal respiration by uncoupling oxidative phosphorylation. Inhibiting respiration prevents normal fungal growth and development. This class includes dinitrophenyl crotonates such as binapacryl, meptyldinocap and dinocap, and 2,6-dinitroanilines such as fluazinam.

"Organo tin fungicides (b30)" (FRAC code 30) inhibit adenosine triphosphate (ATP) synthase in oxidative phosphorylation pathway. Examples include fentin acetate, fentin chloride and fentin hydroxide.

"Carboxylic acid fungicides (b31)" (FRAC code 31) inhibit growth of fungi by affecting deoxyribonucleic acid (DNA) topoisomerase type II (gyrase). Examples include oxolinic acid.

"Heteroaromatic fungicides (b32)" (FRAC code 32) are proposed to affect DNA/ribonucleic acid (RNA) synthesis. Heteroaromatic fungicides include isoxazoles and isothiazolones. The isoxazoles include hymexazole and the isothiazolones include octhilinone.

"Phosphonate fungicides (b33)" (FRAC code P07, previously FRAC code 33 reclassified to P07) include phosphorous acid and its various salts, including fosetyl-aluminum.

"Phthalamic acid fungicides (b34)" (FRAC code 34) include tecloftalam.

"Benzotriazine fungicides (b35)" (FRAC code 35) include triazoxide.

"Benzene-sulfonamide fungicides (b36)" (FRAC code 36) include flusulfamide.

"Pyridazinone fungicides (b37)" (FRAC code 37) include diclomezine.

"Thiophene-carboxamide fungicides (b38)" (FRAC code 38) are proposed to affect ATP production. Examples include silthiofam.

"Complex I NADH oxidoreductase inhibitor fungicides (b39)" (FRAC code 39) inhibit electron transport in mitochondria and include pyrimidinamines such as diflumetorim, pyrazole-5-carboxamides such as tolfenpyrad, and quinazoline such as fenazaquin.

"Carboxylic acid amide (CAA) fungicides (b40)" (FRAC code 40) inhibit cellulose synthase which prevents growth and leads to death of the target fungus. Carboxylic acid amide fungicides include cinnamic acid amide, valinamide carbamate and mandelic acid amide fungicides. The cinnamic acid amides include dimethomorph, flumorph and pyrimorph. The valinamide carbamates include benthiavalicarb, benthiavalicarb-isopropyl, iprovalicarb, tolprocarb and valifenalate (also known as valiphenal). The mandelic acid amides include mandipropamid, N-[2-[4-[[3-(4-chlorophenyl)-2-propyn-1-yl]oxy]-3-methoxyphenyl]ethyl]-3-methyl-2-[(methylsulfonyl)amino]butanamide and N-[2-[4-[[3-(4-chlorophenyl)-2-propyn-1-yl]oxy]-3-methoxyphenyl]ethyl]-3-methyl-2-[(ethylsulfonyl)amino]butanamide.

"Tetracycline antibiotic fungicides (b41)" (FRAC code 41) inhibit growth of fungi by affecting protein synthesis. Examples include oxytetracycline.

"Thiocarbamate fungicides (b42)" (FRAC code M12, previously FRAC code 42 reclassified to M12) include methasulfocarb.

"Benzamide fungicides (b43)" (FRAC code 43) inhibit growth of fungi by delocalization of spectrin-like proteins. Examples include pyridinylmethyl benzamides such as fluopicolide and fluopimomide.

"Microbial fungicides (b44)" (FRAC code BM02, previously FRAC code 44 reclassified to BM02) disrupt fungal pathogen cell membranes. Microbial fungicides include *Bacillus* species such as *Bacillus amyloliquefaciens* strains AP-136, AP-188, AP-218, AP-219, AP-295, QST713, FZB24, F727, MB1600, D747, FCC1256 (deposited as ATCC No. PTA-122162, disclosed in PCT/US2019/053424), TJ100 (also called strain 1 BE; known from EP2962568), and the fungicidal lipopeptides which they produce.

"Quinone outside inhibitor, stigmatellin binding (QoSI) fungicides (b45)" (FRAC code 45) inhibit complex III mitochondrial respiration in fungi by affecting ubiquinone reductase at the "quinone outside" (Qo) site, stigmatellin binding sub-site, of the cytochrome $bc_1$ complex. Inhibiting mitochondrial respiration prevents normal fungal growth and development. QoSI fungicides include triazolo-pyrimidylamines such as ametoctradin.

"Plant extract fungicides (b46)" (FRAC code 46) cause cell membrane disruption. Plant extract fungicides include terpene hydrocarbons, terpene alcohols and terpen phenols such as the extract from *Melaleuca alternfolia* (tea tree) and plant oils (mixtures) such as eugenol, geraniol and thymol.

"Cyanoacrylate fungicides (b47)" (FRAC code 47) bind to the myosin motor domain and effect motor activity and actin assembly. Cyanoacrylates include fungicides such as phenamacril.

"Polyene fungicides (b48)" (FRAC code 48) cause disruption of the fungal cell membrane by binding to ergosterol, the main sterol in the membrane. Examples include natamycin (pimaricin).

"Oxysterol binding protein inhibitor (OSBPI) Fungicides (b49)" (FRAC code 49) bind to the oxysterol-binding protein in oomycetes causing inhibition of zoospore release, zoospore motility and sporangia germination. Oxysterol binding fungicides include piperidinyl-thiazole-isoxazolines such as oxathiapiprolin and fluoxapiprolin.

"Aryl-phenyl-ketone fungicides (b50)" (FRAC code 50, previously FRAC code U8 reclassified to 50) inhibit the growth of mycelium in fungi. Aryl-phenyl ketone fungicides include benzophenones such as metrafenone, and benzoylpyridines such as pyriofenone.

"Host plant defense induction fungicides (b51)" induce host plant defense mechanisms. Host plant defense induction fungicides include benzothiadiazole (FRAC code P01), benzisothiazole (FRAC code P02), thiadiazole carboxamide (FRAC code P03), polysaccharide (FRAC code P04), plant extract (FRAC code P05), microbial (FRAC code P06) and phosphonate fungicides (FRAC code P07, see (b33) above). The benzothiadiazoles include acibenzolar-S-methyl. The benzisothiazoles include probenazole. The thiadiazole carboxamides include tiadinil and isotianil. The polysaccharides include laminarin. The plant extracts include extract from *Reynoutria sachalinensis* (giant knotweed). The microbials include *Bacillus mycoides* isolate J and cell walls of *Saccharomyces cerevisiae* strain LAS117.

"Multi-site activity fungicides (b52)" inhibit fungal growth through multiple sites of action and have contact/preventive activity. Multi-site activity fungicides include copper fungicides (FRAC code M01), sulfur fungicides (FRAC code M02), dithiocarbamate fungicides (FRAC code M03), phthalimide fungicides (FRAC code M04), chloronitrile fungicides (FRAC code M05), sulfamide fungicides (FRAC code M06), multi-site contact guanidine fungicides (FRAC code M07), triazine fungicides (FRAC code M08), quinone fungicides (FRAC code M09), quinoxaline fungicides (FRAC code M10), maleimide fungicides (FRAC code M11) and thiocarbamate (FRAC code M12, see (b42) above) fungicides. Copper fungicides are inorganic compounds containing copper, typically in the copper(II) oxidation state; examples include copper oxychloride, copper sulfate and copper hydroxide, including compositions such as Bordeaux mixture (tribasic copper sulfate). Sulfur fungicides are inorganic chemicals containing rings or chains of sulfur atoms; examples include elemental sulfur. Dithiocarbamate fungicides contain a dithiocarbamate molecular moiety; examples include ferbam, mancozeb, maneb, metiram, propineb, thiram, zinc thiazole, zineb and ziram. Phthalimide fungicides contain a phthalimide molecular moiety; examples include folpet, captan and captafol. Chloronitrile fungicides contain an aromatic ring substituted with chloro and cyano; examples include chlorothalonil. Sulfamide fungicides include dichlofluanid and tolyfluanid. Multi-site contact guanidine fungicides include, guazatine, iminoctadine albesilate and iminoctadine triacetate. Triazine fungicides include anilazine. Quinone fungicides include dithianon. Quinoxaline fungicides include quinomethionate (also known as chinomethionate). Maleimide fungicides include fluoroimide.

"Biologicals with multiple modes of action (b53)" include agents from biological origins showing multiple mechanisms of action without evidence of a dominating mode of action. This class of fungicides includes polypeptide (lectin), phenol, sesquiterpene, tritepenoid and coumarin fungicides (FRAC code BM01) such as extract from the cotyledons of lupine plantlets. This class also includes microbial fungicides (FRAC code BM02, see (b44) above).

"Fungicides other than fungicides of component (a) and components (b1) through (b53); (b54)"; include certain fungicides whose mode of action may be unknown. These include: (b54.1) "phenyl-acetamide fungicides" (FRAC code U06), (b54.2) "guanidine fungicides" (FRAC code U12), (b54.3) "thiazolidine fungicides" (FRAC code U13), (b54.4) "pyrimidinone-hydrazone fungicides" (FRAC code U14), (b54.5) "4-quinolylacetate fungicides" (FRAC code U16), (54.6) "tetrazolyloxime fungicides" (FRAC code U17) and "glucopyranosyl antibiotic fungicides" (FRAC code U18, see (b26) above). The phenyl-acetamides include cyflufenamid. The guanidines include dodine. The thiazolidines include flutianil. The pyrimidinone-hydrazones include ferimzone. The 4-quinolylacetates include tebufloquin. The tetrazolyloximes include picarbutrazox.

The (b54) class also includes bethoxazin, dichlobentiazox (provisional common name, Registry Number 957144-77-3), dipymetitrone (provisional common name, Registry Number 16114-35-5), flometoquin, neo-asozin (ferric methanearsonate), pyrrolnitrin, tolnifanide (Registry Number 304911-98-6), N'-[4-[4-chloro-3-(trifluoromethyl)phenoxy]-2,5-dimethylphenyl]-N-ethyl-N-methylmethanimidamide, 5-fluoro-2-[(4-fluorophenyl)methoxy]-4-pyrimidinamine and 4-fluorophenyl N-[1-[[[1-(4-cyanophenyl)ethyl]sulfonyl]methyl]propyl]carbamate.

Additional "Fungicides other than fungicides of classes (1) through (54)" whose mode of action may be unknown, or may not yet be classified include a fungicidal compound selected from components (b54.7) through (b54.11), as shown below.

Component (54.7) relates to florylpicoxamid (provisional common name) (Registry Number 1961312-55-9, CAS name (1S)-2,2-bis(4-fluorophenyl)-1-methylethyl N-[[3-(acetyloxy)-4-methoxy-2-pyridinyl]carbonyl]-L-alaninate) which is believed to be a quinone inside inhibitor (QiI) fungicide (FRAC code 21) inhibiting the Complex III mitochondrial respiration in fungi.

Component (54.8) relates to metyltetraprole (provisional common name) (Registry Number 1472649-01-6, CAS name 1-[2-[[[1-(4-chlorophenyl)-1H-pyrazol-3-yl]oxy]methyl]-3-methylphenyl]-1,4-dihydro-4-methyl-5H-tetrazol-5-one) which is believed to be a quinone outside inhibitor (QoI) fungicide (FRAC code 45) inhibiting the Complex III mitochondrial respiration in fungi, and is effective against QoI resistant strains.

Component (54.9) relates to 3-chloro-4-(2,6-difluorophenyl)-6-methyl-5-phenylpyridazine (provisional common name pyridachlometyl, Registry Number 1358061-55-8), which is believed to be promoter tubulin polymerization, resulting antifungal activity against fungal species belonging to the phyla Ascomycota and Basidiomycota.

Component (54.10) relates to aminopyrifen (provisional common name) (Registry Number 1531626-08-0, CAS name 4-phenoxyphenyl)methyl 2-amino-6-methyl-pyridine-3-carboxylate) which is believed to inhibit GWT-1 protein in glycosylphosphatidylinositol-anchor biosynthesis in *Neurospora crassa.*

Component (b54.11) relates a compound of Formula b54.11 b54.11

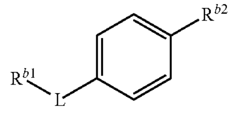

wherein $R^{b1}$ is

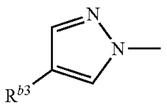

or

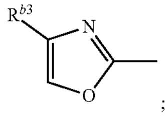

;

$R^{b3}$ is $C_2$-$C_3$ alkoxycarbonyl or $C_2$-$C_3$ haloalkylaminocarbonyl;

L is $CH_2$ or $CH_2O$, wherein the atom to the right is connected to the phenyl ring in Formula b54.11;

$R^{b2}$ is

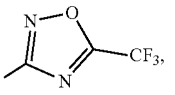

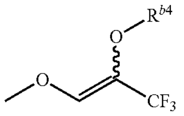

or

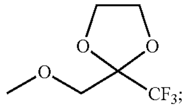

$R^{b4}$ is $C_1$-$C_3$ alkyl, wherein the wavy bond indicates the adjacent double bond is either (Z)- or (E)-configuration, or a mixture thereof.

Examples of compounds of Formula b54.11 include (b54.11a) N-(2,2,2-trifluoroethyl)-2-[[4-[5-(trifluoromethyl)-1,2,4-oxadiazol-3-yl]phenyl]methyl]-4-oxazolecarboxamide, (b54.11b) ethyl 1-[[4-[5-(trifluoromethyl)-1,2,4-oxadiazol-3-yl]phenoxy]methyl]-1H-pyrazole-4-carboxylate, (b54.11c) ethyl 1-[[4-[[(1Z)-2-ethoxy-3,3,3-trifluoro-1-propen-1-yl]oxy]phenyl]methyl]-1H-pyrazole-4-carboxylate and (b54.11d) ethyl 1-[[4-[[2-(trifluoromethyl)-1,3-dioxolan-2-yl]methoxy]phenyl]methyl]-1H-pyrazole-4-carboxylate. Compounds of Formula b54.11, their use as fungicides and methods of preparation are generally known; see, for example, PCT Patent Publications WO 2018/187553 and WO 2020/056090.

Component (b54.12) relates a compound of Formula b54.12 b54.12

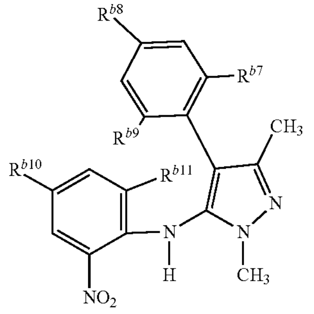

wherein $R^{b7}$, $R^{b8}$ and $R^{b9}$ are each independently H, halogen or cyano; and $R^{b10}$ and $R^{b11}$ are each independently H, halogen, $C_1$-$C_3$ alkyl or $C_1$-$C_3$ methoxy. Examples of compounds of Formula b54.12 include (b54.12a) 4-(2-chloro-4-fluorophenyl)-N-(2-fluoro-4-methyl-6-nitrophenyl)-1,3-dimethyl-1H-pyrazol-5-amine, (b54.12b) 4-(2-chloro-4-fluorophenyl)-N-(2-fluoro-6-nitrophenyl)-1,3-dimethyl-1H-pyrazol-5-amine, (b54.12c) 3,5-difluoro-4-[5-[(4-methoxy-2-nitrophenyl)amino]-1,3-dimethyl-1H-pyrazol-4-yl]-benzonitrile and (b54.12d) N-(2-chloro-4-fluoro-6-nitrophenyl)-4-(2-chloro-4-fluorophenyl)-1,3-dimethyl-1H-pyrazol-5-amine.

Compounds of Formula b54.12, their use as fungicides and methods of preparation are generally known; see, for example, PCT Patent Publication WO 2020/051402.

Embodiments of the present invention as described in the Summary of the Invention include those described below. In the following Embodiments, Formula 1 includes stereoisomers, N-oxides, and salts thereof, and reference to "a compound of Formula 1" includes the definitions of substituents specified in the Summary of the Invention unless further defined in the Embodiments.

Embodiment 1. The composition comprising components (a) and (b) described in the Summary of the Invention wherein in Formula 1, A is A-1, A-3 or A-4.

Embodiment 2. The composition of Embodiment 1 wherein A is A-1 or A-3.

Embodiment 3. The composition of Embodiment 1 wherein A is A-1

Embodiment 4. The composition of Embodiment 1 wherein A is A-3.

Embodiment 5. The composition of Embodiment 1 wherein A is A-4.

Embodiment 6. The composition comprising components (a) and (b) described in the Summary of the Invention wherein in Formula 1, A is A-2.

Embodiment 7. The composition comprising components (a) and (b) described in the Summary of the Invention or any one of Embodiments 1 through 6 wherein in Formula 1, wherein Q is $CR^6$.

Embodiment 8. The composition comprising components (a) and (b) described in the Summary of the Invention or any one of Embodiments 1 through 6 wherein in Formula 1, Q is N.

Embodiment 9. The composition comprising components (a) and (b) described in the Summary of the Invention or any one of Embodiments 1 through 8 wherein in Formula 1, Y is $CR^{7a}R^{7b}$ or O.

Embodiment 10. The composition comprising components (a) and (b) described in the Summary of the Invention or any one of Embodiments 1 through 8 wherein in Formula 1, Y is $CR^{7a}R^{7b}$ or $NR^8$.

Embodiment 11. The composition of Embodiments 9 or 10 wherein Y is $CR^{7a}R^{7b}$.

Embodiment 12. The composition of Embodiment 9 wherein Y is O.

Embodiment 13. The composition of Embodiment 10 wherein Y is $NR^8$.

Embodiment 14. The composition comprising components (a) and (b) described in the Summary of the Invention or any one of Embodiments 1 through 13 wherein in Formula 1, W is O.

Embodiment 15. The composition comprising components (a) and (b) described in the Summary of the Invention or any one of Embodiments 1 through 13 wherein in Formula 1, W is S.

Embodiment 16. The composition comprising components (a) and (b) described in the Summary of the Invention or any one of Embodiments 1 through 15 wherein in Formula 1, $R^1$ and $R^2$ are each independently halogen, cyano, hydroxy, nitro, amino, $C_1$-$C_3$ alkyl, $C_1$-$C_3$ haloalkyl, $C_2$-$C_4$ alkenyl, $C_2$-$C_4$ haloalkenyl, $C_2$-$C_4$ alkynyl, $C_2$-$C_4$ haloalkynyl, $C_2$-$C_4$ cyanoalkyl, $C_3$-$C_6$ cycloalkyl, $C_3$-$C_6$ halocycloalkyl, $C_4$-$C_6$ cycloalkylalkyl, $C_2$-$C_4$ alkoxyalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ alkynyloxy, $C_2$-$C_4$ haloalkynyloxy, $C_2$-$C_4$ cyanoalkoxy, $C_3$-$C_6$ cycloalkoxy, $C_4$-$C_6$ cycloalkylalkoxy, $C_2$-$C_4$ alkoxyalkoxy, $C_1$-$C_3$ alkylthio, $C_1$-$C_3$ haloalkylthio, $C_1$-$C_3$ alkylsulfinyl, $C_1$-$C_3$ haloalkylsulfinyl, $C_1$-$C_3$ alkylsulfonyl or $C_1$-$C_3$ haloalkylsulfonyl.

Embodiment 17. The composition of Embodiment 16 wherein $R^1$ and $R^2$ are each independently halogen, cyano, $C_1$-$C_3$ alkyl, $C_1$-$C_3$ haloalkyl, $C_2$-$C_4$ alkenyl, $C_2$-$C_4$ haloalkenyl, $C_2$-$C_4$ cyanoalkyl, $C_2$-$C_4$ alkoxyalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ cyanoalkoxy, $C_2$-$C_4$ alkoxyalkoxy, $C_1$-$C_3$ alkylthio, $C_1$-$C_3$ haloalkylthio, $C_1$-$C_3$ alkylsulfinyl, $C_1$-$C_3$ haloalkylsulfinyl, $C_1$-$C_3$ alkylsulfonyl or $C_1$-$C_3$ haloalkylsulfonyl.

Embodiment 18. The composition of Embodiment 17 wherein $R^1$ and $R^2$ are each independently halogen, cyano, $C_1$-$C_3$ alkyl, $C_1$-$C_3$ haloalkyl, $C_2$-$C_4$ alkoxyalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ alkoxyalkoxy or $C_1$-$C_3$ alkylthio.

Embodiment 19. The composition of Embodiment 18 wherein $R^1$ and $R^2$ are each independently halogen, cyano, $C_1$-$C_3$ alkyl, $C_1$-$C_3$ haloalkyl, $C_1$-$C_3$ alkoxy, $C_1$-$C_3$ haloalkoxy or $C_1$-$C_3$ alkylthio.

Embodiment 20. The composition of Embodiment 19 wherein $R^1$ and $R^2$ are each independently halogen, cyano, methyl, halomethyl, methoxy or halomethoxy.

Embodiment 21. The composition of Embodiment 20 wherein $R^1$ and $R^2$ are each independently Br, Cl, F, methyl, trifluoromethyl, methoxy or trifluoromethoxy.

Embodiment 21a. The composition of Embodiment 21 wherein $R^1$ and $R^2$ are each independently Br, Cl, F, methyl or trifluoromethyl.

Embodiment 22. The composition of Embodiment 21a wherein $R^1$ and $R^2$ are each independently Cl, F or methyl.

Embodiment 23. The composition of Embodiment 22 wherein $R^1$ and $R^2$ are each independently Cl or F.

Embodiment 24. The composition of Embodiment 23 wherein $R^1$ and $R^2$ are each F.

Embodiment 25. The composition comprising components (a) and (b) described in the Summary of the Invention or any one of Embodiments 1 through 24 wherein in Formula 1, $R^3$ is H, $C_1$-$C_3$ alkyl, $C_2$-$C_4$ alkylcarbonyl or $C_2$-$C_4$ alkoxycarbonyl.

Embodiment 26. A compound of Embodiment 25 wherein $R^3$ is H, methyl, methylcarbonyl or methoxycarbonyl.

Embodiment 27. The composition of Embodiment 26 wherein $R^3$ is H or methyl.

Embodiment 28. The composition of Embodiment 27 wherein $R^3$ is H.

Embodiment 29. The composition comprising components (a) and (b) described in the Summary of the Invention or any one of Embodiments 1 through 28 wherein in Formula 1, $R^4$ is methyl, methoxy, ethoxy, methylamino or dimethylamino.

Embodiment 30. The composition of Embodiment 29 wherein $R^4$ is methyl, methoxy or ethoxy.

Embodiment 30a. The composition of Embodiment 30 wherein $R^4$ is methoxy or ethoxy.

Embodiment 31. The composition of Embodiment 30a wherein $R^4$ is methoxy.

Embodiment 32. The composition comprising components (a) and (b) described in the Summary of the Invention or any one of Embodiments 1 through 31 wherein in Formula 1, each $R^5$ is independently halogen, cyano, methyl or methoxy.

Embodiment 33. The composition of Embodiment 32 wherein each $R^5$ is independently halogen or methyl.

Embodiment 34. The composition of Embodiment 33 wherein each $R^5$ is methyl.

Embodiment 35. The composition comprising components (a) and (b) described in the Summary of the Invention or any one of Embodiments 1 through 34 wherein in Formula 1, n is 0 or 1.

Embodiment 36. The composition of Embodiment 35 wherein n is 0.

Embodiment 37. The composition comprising components (a) and (b) described in the Summary of the Invention or any one of Embodiments 1 through 36 wherein in Formula 1, $R^6$ is H, halogen, cyano, nitro, amino, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_2$-$C_6$ alkoxyalkyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_2$-$C_6$ alkoxyalkoxy, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, —ZC(=O)V, $CR^{10a}$=$NOR^{10b}$, ON=$CR^{11a}R^{11b}$, $CR^{12a}$=$NNR^{12b}R^{12c}$ or -L-J.

Embodiment 38. The composition of Embodiment 37 wherein $R^6$ is H, halogen, cyano, nitro, amino, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_2$-$C_6$ alkoxyalkyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_2$-$C_6$ alkoxyalkoxy, $C_1$-$C_6$ alkylthio, $C_1$-$C_6$ haloalkylthio, —ZC(=O)V, $CR^{10a}$=$NOR^{10b}$, $CR^{12a}$=$NNR^{12b}R^{12c}$ or -L-J.

Embodiment 39. The composition of Embodiment 38 wherein $R^6$ is H, halogen, cyano, nitro, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_1$-$C_6$ alkylthio, $C_1$-$C_6$ haloalkylthio, $CR^{10a}$=$NOR^{10b}$ or -L-J.

Embodiment 40. The composition of Embodiment 39 wherein $R^6$ is H, halogen, cyano, $C_1$-$C_3$ alkyl, $C_1$-$C_3$ haloalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ alkynyloxy, $CR^{10a}$=$NOR^{10b}$ or -L-J.

Embodiment 41. The composition of Embodiment 40 wherein $R^6$ is H, halogen, cyano, $C_1$-$C_3$ alkyl, $C_1$-$C_3$ haloalkyl, $C_1$-$C_3$ alkoxy, $C_1$-$C_3$ haloalkoxy, $C_2$-$C_4$ alkynyloxy, $CR^{10a}$=$NOR^{10b}$ or -L-J.

Embodiment 42. The composition of Embodiment 41 wherein $R^6$ is H, Br, Cl, methyl, propyl, i-propyl, $CH_2F$, $CHF_2$, trifluoromethyl, methoxy, ethoxy, i-propyloxy, $OCH_2F$, $OCHF_2$, trifluoromethoxy, $OCH_2C{\equiv}CH$, CH=$NOCH_3$, C(Me)=$NOCH_3$ or -L-J.

Embodiment 43. The composition of Embodiment 42 wherein $R^6$ is Br, Cl, methyl, i-propyl, $CHF_2$, trifluoromethyl, methoxy, ethoxy, i-propyloxy, trifluoromethoxy, $OCH_2C{\equiv}CH$, C(Me)=$NOCH_3$ or -L-J.

Embodiment 44. The composition of Embodiment 43 wherein $R^6$ is Br, Cl, methyl, i-propyl, $CHF_2$, trifluoromethyl, i-propyloxy, $C(CH_3)$=$NOCH_3$ or -L-J.

Embodiment 45. The composition of Embodiment 44 wherein $R^6$ is Br, Cl, methyl, i-propyl, trifluoromethyl or -L-J.

Embodiment 46. The composition of Embodiment 45 wherein $R^6$ is Br, Cl, i-propyl, trifluoromethyl or -L-J.

Embodiment 47. The composition of Embodiment 46 wherein $R^6$ is Cl, i-propyl, trifluoromethyl or -L-J.

Embodiment 48. The composition comprising components (a) and (b) described in the Summary of the Invention or any one of Embodiments 1 through 47 wherein in Formula 1, $R^{7a}$ is H, hydroxy, halogen, cyano, methyl, halomethyl, methoxy or halomethoxy.

Embodiment 49. The composition of Embodiment 48 wherein $R^{7a}$ is H, halogen, methyl or methoxy.

Embodiment 50. The composition of Embodiment 49 wherein $R^{7a}$ is H or methyl.

Embodiment 51. The composition of Embodiment 50 wherein $R^{7a}$ is H.

Embodiment 52. The composition comprising components (a) and (b) described in the Summary of the Invention or any one of Embodiments 1 through 51 wherein in Formula 1, $R^{7b}$ is H, methyl, halomethyl, methoxy or halomethoxy.

Embodiment 53. The composition of Embodiment 52 wherein $R^{7b}$ is H, methyl or methoxy.

Embodiment 54. The composition of Embodiment 53 wherein $R^{7b}$ is H or methyl.

Embodiment 55. The composition of Embodiment 54 wherein $R^{7b}$ is H.

Embodiment 56. The composition comprising components (a) and (b) described in the Summary of the Invention or any one of Embodiments 1 through 55 wherein in Formula 1, $R^8$ is H, methyl, halomethyl or methylcarbonyl.

Embodiment 57. The composition of Embodiment 56 wherein $R^8$ is H or methyl.

Embodiment 58. The composition of Embodiment 57 wherein $R^8$ is H.

Embodiment 59. The composition comprising components (a) and (b) described in the Summary of the Invention or any one of Embodiments 1 through 58 wherein in Formula 1, Z is a direct bond, O, NH, $CH_2$ or $CH(OCH_3)$.

Embodiment 60. The composition of Embodiment 59 wherein Z is a direct bond, O or $CH_2$.

Embodiment 61. The composition of Embodiment 60 wherein Z is a direct bond.

Embodiment 62. The composition of Embodiment 61 wherein Z is O.

Embodiment 63. The composition of Embodiment 62 wherein Z is $CH_2$.

Embodiment 64. The composition comprising components (a) and (b) described in the Summary of the Invention or any one of Embodiments 1 through 63 wherein in Formula 1, $R^9$, $R^{10b}$, $R^{11a}$ and $R^{12c}$ are each H, $C_1$-$C_3$ alkyl, $C_1$-$C_3$ haloalkyl, $C_2$-$C_4$ alkenyl, $C_2$-$C_4$ haloalkenyl or $C_2$-$C_4$ alkynyl.

Embodiment 65. The composition of Embodiment 64 wherein $R^9$, $R^{10b}$, $R^{11a}$ and $R^{12c}$ are each H, $C_1$-$C_3$ alkyl, $C_1$-$C_3$ haloalkyl, $C_2$-$C_4$ alkenyl or $C_2$-$C_4$ haloalkenyl.

Embodiment 66. The composition of Embodiment 65 wherein $R^9$, $R^{10b}$, $R^{11a}$ and $R^{12c}$ are each H, methyl, ethyl or $C_2$-$C_4$ alkenyl.

Embodiment 67. The composition of Embodiment 66 wherein $R^9$, $R^{10b}$, $R^{11a}$ and $R^{12c}$ are each H or methyl.

Embodiment 68. The composition of Embodiment 67 wherein $R^9$, $R^{10b}$, $R^{11a}$ and $R^{12c}$ are each H.

Embodiment 69. The composition of Embodiment 67 wherein $R^9$, $R^{10b}$, $R^{11a}$ and $R^{12c}$ are each methyl.

Embodiment 70. The composition comprising components (a) and (b) described in the Summary of the Invention or any one of Embodiments 1 through 69 wherein in Formula 1, $R^{10a}$, $R^{11b}$, $R^{12a}$ and $R^{12b}$ are each independently H, methyl or halomethyl.

Embodiment 71. The composition of Embodiment 70 wherein $R^{10a}$, $R^{11b}$, $R^{12a}$ and $R^{12b}$ are each independently H or methyl.

Embodiment 72. The composition of Embodiment 71 wherein $R^{10a}$, $R^{11b}$, $R^{12a}$ and $R^{12b}$ are each H.

Embodiment 73. The composition of Embodiment 71 wherein $R^{10a}$, $R^{11b}$, $R^{12a}$ and $R^{12b}$ are each methyl.

Embodiment 74. The composition comprising components (a) and (b) described in the Summary of the Invention or any one of Embodiments 1 through 73 wherein in Formula 1, L is a direct bond, $CH_2$, O, S, $NR^{13}$, $OCH_2$, $CH_2O$ or C(=O).

Embodiment 75. The composition of Embodiment 74 wherein L is a direct bond, $CH_2$, O, $OCH_2$, $CH_2O$ or C(=O).

Embodiment 76. The composition of Embodiment 75 wherein L is a direct bond, $CH_2$, O, $OCH_2$ or $CH_2O$.

Embodiment 77. The composition of Embodiment 76 wherein L is a direct bond, O or $OCH_2$.

Embodiment 77a. The composition of Embodiments 74 through 77 wherein L is a direct bond or O.

Embodiment 78. The composition of Embodiment 77a wherein L is a direct bond.

Embodiment 79. The composition of Embodiment 77a wherein L is O.

Embodiment 80. The composition of Embodiment 76 wherein L is $CH_2$.

Embodiment 81. The composition of Embodiment 76 wherein L is $OCH_2$ or $CH_2O$.

Embodiment 82. The composition comprising components (a) and (b) described in the Summary of the Invention or any one of Embodiments 1 through 81 wherein in Formula 1, J is selected from J-1 through J-71 as depicted in Exhibit A
Exhibit A
J-1
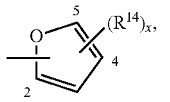
J-2
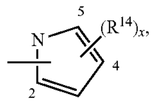
J-3
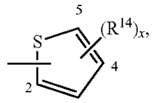
J-4
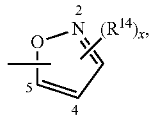
J-5
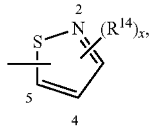
J-6
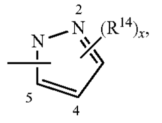
J-7
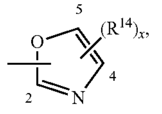
J-8
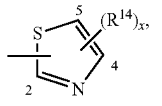
J-9
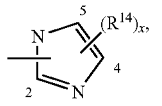
J-10
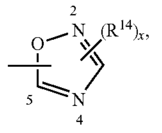
-continued
J-11
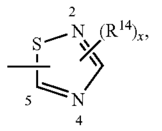
J-12
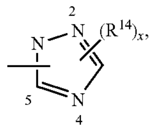
J-13
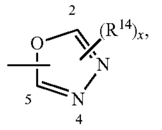
J-14
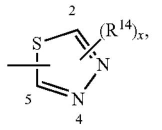
J-15
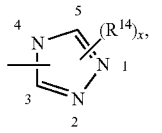
J-16
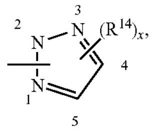
J-17
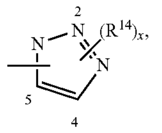
J-18
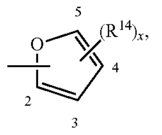
J-19
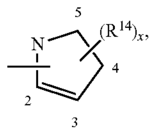
J-20
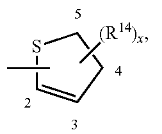

-continued
J-21
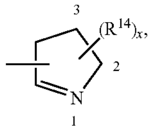
J-22
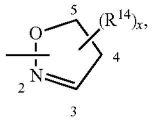
J-23
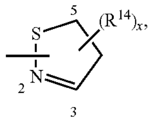
J-24
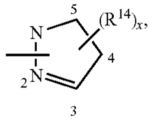
J-25
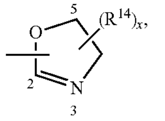
J-26
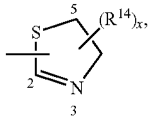
J-27
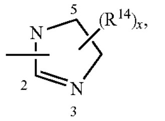
J-28
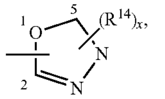
J-29
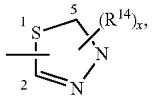
J-30
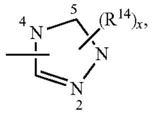
J-31
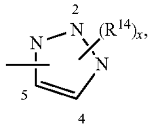
-continued
J-32
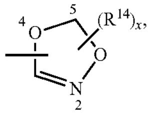
J-33
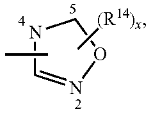
J-34
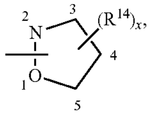
J-35
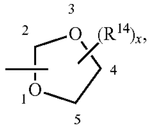
J-36
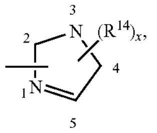
J-37
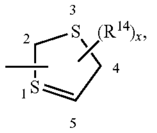
J-38
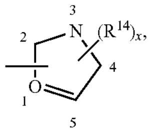
J-39
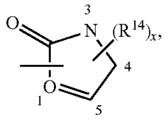
J-40
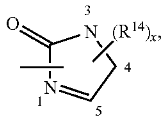
J-41
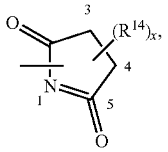

-continued
J-42
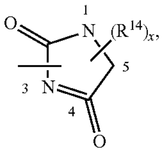
J-43
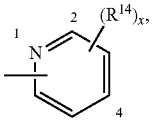
J-44
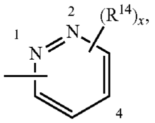
J-45
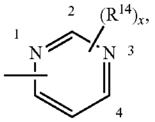
J-46
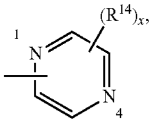
J-47
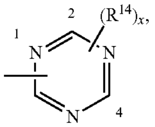
J-48
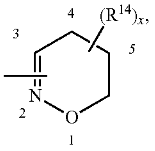
J-49
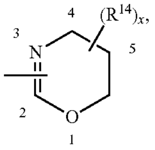
J-50
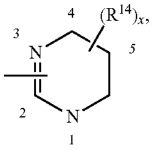
J-51
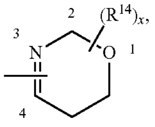
-continued
J-52
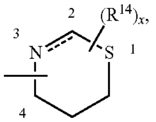
J-53
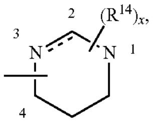
J-54
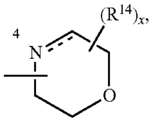
J-56
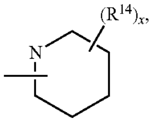
J-57
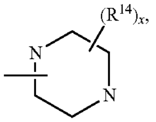
J-58
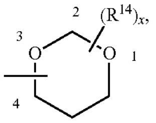
J-59
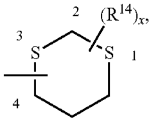
J-60
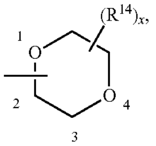
J-61
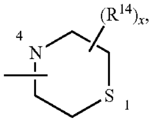
J-62
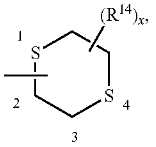
J-63
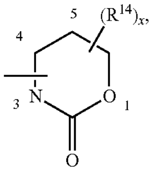

-continued

J-64

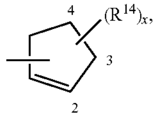

J-65

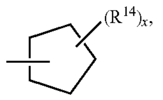

J-66

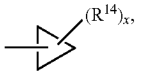

J-67

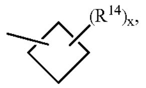

J-68

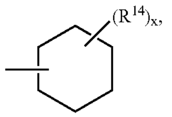

J-69

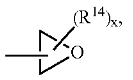

J-70

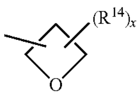

and

J-71

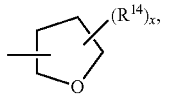

wherein the floating bond is connected to L through any available carbon or nitrogen atom of the depicted ring; and x is 0, 1, 2 or 3.

Embodiment 83. The composition of Embodiment 82 wherein J is J-4, J-5, J-6, J-7, J-8, J-9, J-18, J-19, J-20, J-21, J-22, J-23, J-24, J-25, J-26, J-27, J-34, J-35, J-36, J-37, J-38, J-53, J-56, J-57, J-58, J-59, J-60, J-61, J-63, J-64, J-65, J-66, J-67, J-68, J-69 or J-70.

Embodiment 84. The composition of Embodiment 83 wherein J is J-4, J-5, J-6, J-22, J-23, J-24, J-35, J-36, J-37, J-38, J-53, J-57, J-58, J-59, J-60, J-63, J-64, J-65, J-66, J-67, J-68, J-69 or J-70.

Embodiment 85. The composition of Embodiment 84 wherein J is J-53, J-58, J-59, J-60, J-65, J-66, J-67, J-68, J-69 or J-70.

Embodiment 86. The composition of Embodiment 85 wherein J is J-53, J-58, J-59, J-60, J-65, J-66, J-67 or J-68.

Embodiment 87. The composition of Embodiment 86 wherein J is J-58, J-66 or J-67.

Embodiment 88. The composition of Embodiment 87 wherein J is J-66 or J-67.

Embodiment 89. The composition of Embodiment 87 wherein J is J-58.

Embodiment 90. The composition of Embodiment 87 wherein J is J-66.

Embodiment 91. The composition of Embodiment 87 wherein J is J-67.

Embodiment 92. The composition of Embodiment 91 wherein J is J-66 and x is 1 or 2.

Embodiment 93. The composition of Embodiment 92 wherein J is J-66 and x is 2.

Embodiment 94. The composition of any one of Embodiments 82 through 93 wherein x is 0, 1 or 2.

Embodiment 95. The composition of Embodiment 94 wherein x is 2.

Embodiment 95a. The composition of Embodiment 94 wherein x is 1.

Embodiment 96. The composition of Embodiment 94 wherein x is 0.

Embodiment 97. The composition comprising components (a) and (b) described in the Summary of the Invention or any one of Embodiments 1 through 96 wherein in Formula 1, each $R^{14}$ is independently halogen, cyano, $C_1$-$C_4$ alkyl, $C_1$-$C_4$ haloalkyl, $C_1$-$C_4$ alkoxy, $C_1$-$C_4$ haloalkoxy or C(═O)OR$^{15}$.

Embodiment 98. The composition of Embodiment 97 wherein each $R^{14}$ is independently halogen, cyano, methyl, halomethyl, methoxy, halomethoxy or C(═O)OR$^{15}$.

Embodiment 99. The composition of Embodiment 98 wherein each $R^{14}$ is independently halogen, methyl, methoxy or C(═O)OR$^{15}$.

Embodiment 100. The composition of Embodiment 99 wherein each $R^{14}$ is independently halogen, methyl or C(═O)OR$^{15}$.

Embodiment 101. The composition of Embodiment 100 wherein each $R^{14}$ is independently halogen or methyl.

Embodiment 102. The composition of Embodiment 101 wherein each $R^{14}$ is independently Br, Cl, F or methyl.

Embodiment 103. The composition comprising components (a) and (b) described in the Summary of the Invention or any one of Embodiments 1 through 102 wherein in Formula 1, each $R^{15}$ is independently $C_1$-$C_3$ alkyl, $C_1$-$C_3$ haloalkyl or cyclopropyl.

Embodiment 104. The composition of Embodiment 103 wherein each $R^{15}$ is independently $C_1$-$C_3$ alkyl or $C_1$-$C_3$ haloalkyl.

Embodiment 105. The composition of Embodiment 104 wherein each $R^{15}$ is independently methyl or ethyl.

Embodiment 106. The composition of Embodiment 105 wherein each $R^{15}$ is methyl.

Embodiment 107. The composition comprising components (a) and (b) described in the Summary of the Invention or any one of Embodiments 1 through 106 wherein component (a) does not comprise an N-oxide of a compound of Formula 1.

Embodiment 108. The composition comprising components (a) and (b) described in the Summary of the Invention or any one of Embodiments 1 through 107 wherein component (a) comprises a compound selected from the group consisting of methyl N-[[5-[1-(2,6-difluoro-4-nitrophenyl)-1H-pyrazol-3-yl]-2-methylphenyl]methyl]carbamate (Compound 1);

methyl N-[[5-[1-(2,6-difluoro-4-methoxyphenyl)-1H-pyrazol-3-yl]-2-methylphenyl]methyl]carbamate (Compound 3);

methyl N-[[5-[1-(2,6-difluorophenyl)-1H-pyrazol-3-yl]-2-methylphenyl]-methyl]carbamate (Compound 4);

methyl N-[[5-[1-(4-amino-2,6-difluorophenyl)-1H-pyrazol-3-yl]-2-methylphenyl]methyl]carbamate (Compound 5);

methyl N-[[5-[1-(4-chloro-2,6-difluorophenyl)-1H-pyrazol-3-yl]-2-methylphenyl]methyl]carbamate (Compound 6);

methyl N-[[5-[1-(4-bromo-2,6-difluorophenyl)-1H-pyrazol-3-yl]-2-methylphenyl]methyl]carbamate (Compound 7);

methyl N-[[5-[1-(2,6-difluoro-4-iodophenyl)-1H-pyrazol-3-yl]-2-methylphenyl]methyl]carbamate (Compound 8);
methyl N-[[5-[1-(2,6-difluoro-4-hydroxyphenyl)-1H-pyrazol-3-yl]-2-methylphenyl]methyl]carbamate (Compound 10);
methyl N-[[5-[1-(4-ethoxy-2,6-difluorophenyl)-1H-pyrazol-3-yl]-2-methylphenyl]methyl]carbamate (Compound 11);
methyl N-[[5-[1-[4-(cyclobutyloxy)-2,6-difluorophenyl]-1H-pyrazol-3-yl]-2-methylphenyl]methyl]carbamate (Compound 13);
methyl N-[[5-[1-[2,6-difluoro-4-(1-methylethoxy)phenyl]-1H-pyrazol-3-yl]-2-methylphenyl]methyl]carbamate (Compound 14);
methyl N-[[5-[1-[4-(difluoromethoxy)-2,6-difluorophenyl]-1H-pyrazol-3-yl]-2-methylphenyl]methyl]carbamate (Compound 15);
methyl N-[[5-[1-[2,6-difluoro-4-(2-propyn-1-yloxy)phenyl]-1H-pyrazol-3-yl]-2-methylphenyl]methyl]carbamate (Compound 30);
methyl N-[[5-[1-(2,6-difluoro-4-methoxyphenyl)-1H-pyrazol-3-yl]-2-methylphenyl]methyl]carbamate (Compound 33);
methyl N-[[5-[1-(4-cyclopropyl-2,6-difluorophenyl)-1H-pyrazol-3-yl]-2-methylphenyl]methyl]carbamate (Compound 41);
methyl N-[[5-[1-[4-[(1,1-dimethylethyl)thio]-2,6-difluorophenyl]-1H-pyrazol-3-yl]-2-methylphenyl]methyl]carbamate (Compound 42);
methyl N-[[5-[1-[4-[(difluoromethyl)thio]-2,6-difluorophenyl]-1H-pyrazol-3-yl]-2-methylphenyl]methyl]carbamate (Compound 43);
methyl N-[[5-[1-(4-ethynyl-2,6-difluorophenyl)-1H-pyrazol-3-yl]-2-methylphenyl]methyl]carbamate (Compound 53);
methyl N-[[5-[1-[2,6-difluoro-4-(1-methylethyl)phenyl]-1H-pyrazol-3-yl]-2-methylphenyl]methyl]carbamate (Compound 63);
methyl N-[[5-[1-[2,6-difluoro-4-(trifluoromethyl)phenyl]-1H-pyrazol-3-yl]-2-methylphenyl]methyl]carbamate (Compound 64);
methyl N-[[5-[1-(2,6-dichloro-4-cyclopropylphenyl)-1H-pyrazol-3-yl]-2-methylphenyl]methyl]carbamate (Compound 65);
methyl N-[[5-[1-[4-(cyclopropyloxy)-2,6-difluorophenyl]-1H-pyrazol-3-yl]-2-methylphenyl]methyl]carbamate (Compound 66);
methyl N-[[5-[1-(2,6-difluoro-4-formylphenyl)-1H-pyrazol-3-yl]-2-methylphenyl]methyl]carbamate (Compound 67);
methyl N-[[5-[1-(4-acetyl-2,6-difluorophenyl)-1H-pyrazol-3-yl]-2-methylphenyl]methyl]carbamate (Compound 68);
methyl 3,5-difluoro-4-[3-[3-[[(methoxycarbonyl)amino]methyl]-4-methylphenyl]-1H-pyrazol-1-yl]benzoate (Compound 70);
methyl N-[[5-[1-[2,6-difluoro-4-(hydroxymethyl)phenyl]-1H-pyrazol-3-yl]-2-methylphenyl]methyl]carbamate (Compound 71);
methyl N-[[5-[1-[2,6-difluoro-4-(trifluoromethoxy)phenyl]-1H-pyrazol-3-yl]-2-methylphenyl]methyl]carbamate (Compound 78);
methyl (E)-N-[[5-[1-[2,6-difluoro-4-[1-(methoxyimino)ethyl]phenyl]-1H-pyrazol-3-yl]-2-methylphenyl]methyl]carbamate (Compound 83);
methyl N-[[5-[1-[4-(difluoromethyl)-2,6-difluorophenyl]-1H-pyrazol-3-yl]-2-methylphenyl]methyl]carbamate (Compound 87);
methyl N-[[5-[1-[4-(2,2-difluorocyclopropyl)-2,6-difluorophenyl]-1H-pyrazol-3-yl]-2-methylphenyl]methyl]carbamate (Compound 89);
methyl N-[[5-[1-[4-[(1,1-dimethylethoxy)-2,6-difluorophenyl]-1H-pyrazol-3-yl]-2-methylphenyl]methyl]carbamate (Compound 93);
methyl (Z)-N-[[5-[1-[2,6-difluoro-4-[1-(methoxyimino)ethyl]phenyl]-1H-pyrazol-3-yl]-2-methylphenyl]methyl]carbamate (Compound 99);
methyl N-[[5-[2-[2,6-difluoro-4-(1-methylethyl)phenyl]-2H-1,2,3-triazol-4-yl]-2-methylphenyl]methyl]carbamate (Compound 108);
methyl N-[[5-[2-[2,6-difluoro-4-methylphenyl]-2H-1,2,3-triazol-4-yl]-2-methylphenyl]methyl]carbamate (Compound 111);
methyl N-[[5-[2-[4-cyclopropyl-2,6-difluorophenyl)-2H-1,2,3-triazol-4-yl)-2-methylbenzyl)carbamate (Compound 113);
methyl N-[[5-[2-(4-amino-2,6-difluorophenyl)-2H-1,2,3-triazol-4-yl]-2-methylphenyl]methyl]carbamate (Compound 115);
methyl N-[[5-[2-(4-chloro-2,6-difluorophenyl)-2H-1,2,3-triazol-4-yl]-2-methylphenyl]methyl]carbamate (Compound 117);
methyl N-[[5-[2-(2,6-difluoro-4-nitrophenyl)-2H-1,2,3-triazol-4-yl]-2-methylphenyl]methyl]carbamate (Compound 118);
methyl N-[[5-[1-(4-chloro-2,6-difluorophenyl)-1H-1,2,3-triazol-4-yl]-2-methylphenyl]methyl]carbamate (Compound 121);
methyl N-[[5-[1-(4-amino-2,6-difluorophenyl)-1H-1,2,3-triazol-4-yl]-2-methylphenyl]methyl]carbamate (Compound 131);
methyl N-[[5-[1-(2,6-difluoro-4-nitrophenyl)-1H-1,2,3-triazol-4-yl]-2-methylphenyl]methyl]carbamate (Compound 132);
methyl N-[[5-[1-[4-(1,3-dioxan-2-yl)-2,6-difluorophenyl)]-1H-pyrazol-3-yl]-2-methylphenyl]methyl]carbamate (Compound 134);
methyl N-[[5-[1-[2,6-dichloro-4-(1,1-dimethylethyl)phenyl]-1H-pyrazol-3-yl]-2-methylphenyl]methyl]carbamate (Compound 135);
methyl N-[[5-[2-[2,6-difluoro-4-(1-methylpropyl)phenyl]-2H-1,2,3-triazol-4-yl]-2-methylphenyl]methyl]carbamate (Compound 139); and
methyl (E)-N-[[5-[2-[2,6-difluoro-4-[1-(methoxyimino)ethyl]phenyl]-2H-1,2,3-triazol-4-yl]-2-methylphenyl]methyl]carbamate (Compound 142).

Embodiment 109. The composition of Embodiment 108 wherein component (a) comprises a compound selected from the group consisting of Compounds 3, 4, 6, 7, 11, 13, 14, 15, 30, 33, 41, 63, 64, 66, 78, 83, 87, 89, 93, 99, 108, 111, 113, 117, 134, 135 and 142.

Embodiment 110. The composition of Embodiment 109 wherein component (a) comprises a compound selected from the group consisting of Compounds 3, 4, 6, 7, 11, 13, 14, 15, 30, 33, 41, 63, 64, 78, 99, 108 and 117.

Embodiment 111. The composition of Embodiment 110 wherein component (a) comprises a compound selected from the group consisting of Compounds 3, 4, 6, 7, 11, 14, 15, 30, 33, 41, 63, 64, 78 and 99.

Embodiment 112. The composition of Embodiment 111 wherein component (a) comprises a compound selected from the group consisting of Compounds 3, 4, 6, 15, 41, 63 and 64.

Embodiment 113. The composition of Embodiment 114 wherein component (a) comprises a compound selected from the group consisting of Compounds 6, 41, 63 and 64.

Embodiment 114. The composition of Embodiment 113 wherein component (a) comprises Compound 6.

Embodiment 115. The composition of Embodiment 113 wherein component (a) comprises compound 41.

Embodiment 116. The composition of Embodiment 113 wherein component (a) comprises compound 63.

Embodiment 117. The composition of Embodiment 113 wherein component (a) comprises compound 64.

Embodiment 118. The composition of Embodiments 108 through 117 wherein component (b) comprises at least two fungicidal compounds selected from the group consisting of azoxystrobin, benzovindiflupyr, bixafen, chlorothalonil, copper sulfate, cyproconazole, difenoconazole, epoxiconazole, fenpropimorph, florylpicoxamid, fluindapyr, flutriafol, fluxapyroxad, inpyrfluxam, isoflucypram, mancozeb, mefentrifluconazole, metominostrobin, picoxystrobin, prothioconazole, pydiflumetofen, pyraclostrobin, tebuconazole and trifloxystrobin.

Embodiments of this invention, including Embodiments 1-118 above as well as any other embodiments described herein, can be combined in any manner, and the descriptions of variables in the embodiments pertain not only to the compositions comprising compounds of Formula 1 with at least one other fungicidal compound, but also to compositions comprising compounds of Formula 1 with at least one invertebrate pest control compound or agent, and also to the compounds of Formula 1 and their compositions, and also to the starting compounds and intermediate compounds useful for preparing the compounds of Formula 1. In addition, embodiments of this invention, including Embodiments 1-118 above as well as any other embodiments described herein, and any combination thereof, pertain to the methods of the present invention. Therefore of note as a further embodiment is the composition disclosed above comprising (a) at least one compound selected from the compounds of Formula 1 described above, N-oxides, and salts thereof; and at least one invertebrate pest control compound or agent.

Combinations of Embodiments 1-118 are illustrated by:

Embodiment A. The composition comprising components (a) and (b) described Summary of the Invention wherein component (a) comprises a compound of Formula 1 or salt thereof, wherein in Formula 1, A is A-1, A-3 or A-4;

Q is $CR^6$;

Y is $CR^{7a}R^{7b}$;

W is O;

$R^1$ and $R^2$ are each independently halogen, cyano, $C_1$-$C_3$ alkyl, $C_1$-$C_3$ haloalkyl, $C_2$-$C_4$ alkoxyalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ alkoxyalkoxy or $C_1$-$C_3$ alkylthio;

$R^3$ is H, methyl, methylcarbonyl or methoxycarbonyl;

$R^4$ is methyl, methoxy, ethoxy, methylamino or dimethylamino;

each $R^5$ is independently halogen or methyl;

$R^6$ is H, halogen, cyano, nitro, amino, $C_1$-$C_6$ alkyl, $C_1$-$C_6$ haloalkyl, $C_2$-$C_6$ alkenyl, $C_2$-$C_6$ haloalkenyl, $C_2$-$C_6$ alkynyl, $C_2$-$C_6$ haloalkynyl, $C_2$-$C_6$ alkoxyalkyl, $C_1$-$C_6$ alkoxy, $C_1$-$C_6$ haloalkoxy, $C_2$-$C_6$ alkenyloxy, $C_2$-$C_6$ haloalkenyloxy, $C_2$-$C_6$ alkynyloxy, $C_2$-$C_6$ haloalkynyloxy, $C_2$-$C_6$ alkoxyalkoxy, $C_1$-$C_6$ alkylthio, $C_1$-$C_6$ haloalkylthio, —ZC(=O)V, $CR^{10a}$=$NOR^{10b}$, $CR^{12a}$=$NNR^{12b}R^{12c}$ or -L-J;

$R^{7a}$ is H, halogen, methyl or methoxy;

$R^{7b}$ is H or methyl;

Z is a direct bond, O, NH, $CH_2$ or $CH(OCH_3)$;

$R^9$, $R^{10b}$ and $R^{12c}$ are each H, $C_1$-$C_3$ alkyl, $C_1$-$C_3$ haloalkyl, $C_2$-$C_4$ alkenyl or $C_2$-$C_4$ haloalkenyl;

$R^{10a}$, $R^{12a}$ and $R^{12b}$ are each independently H, methyl or halomethyl;

L is a direct bond, $CH_2$, O, $OCH_2$ or $CH_2O$;

J is selected from J-1 through J-71

J-1

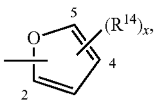

J-2

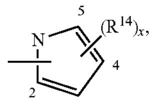

J-3

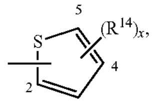

J-4

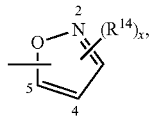

J-5

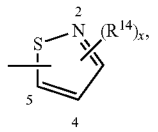

J-6

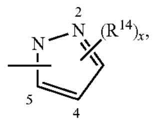

J-7

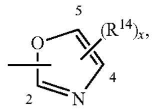

J-8

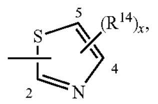

J-9

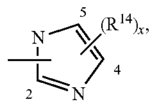

-continued
J-10
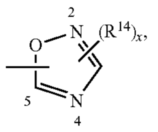
J-11
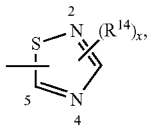
J-12
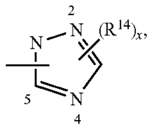
J-13
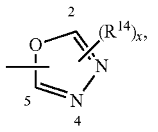
J-14
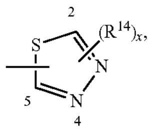
J-15
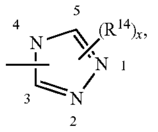
J-16
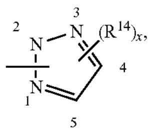
J-17
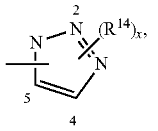
J-18
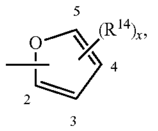
J-19
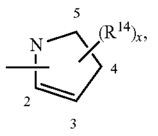
-continued
J-20
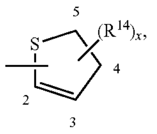
J-21
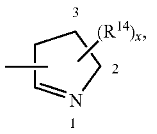
J-22
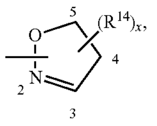
J-23
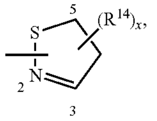
J-24
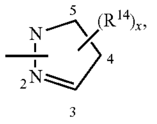
J-25
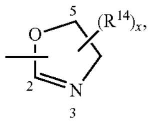
J-26
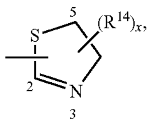
J-27
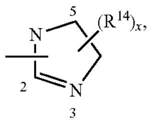
J-28
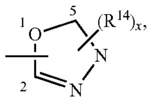
J-29
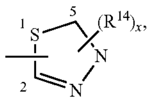
J-30
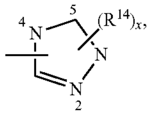

-continued
J-31
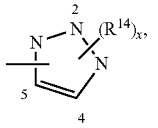
J-32
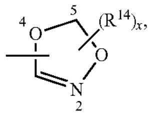
J-33
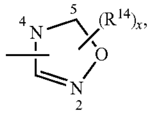
J-34
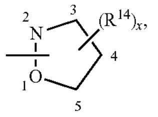
J-35
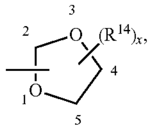
J-36
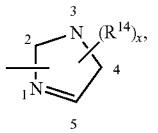
J-37
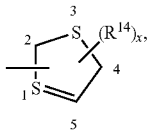
J-38
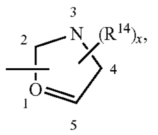
J-39
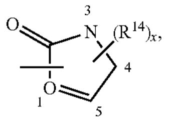
J-40
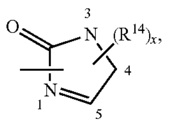
-continued
J-41
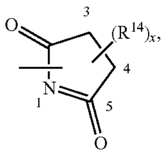
J-42
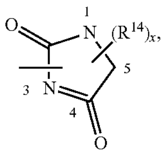
J-43
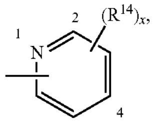
J-44
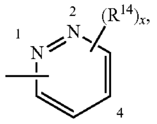
J-45
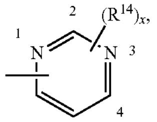
J-46
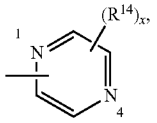
J-47
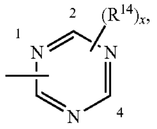
J-48
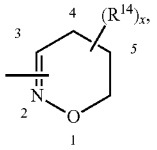
J-49
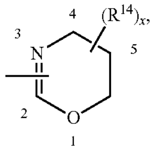
J-50
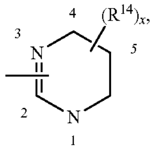

-continued

J-51

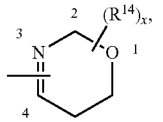

J-52

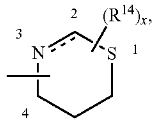

J-53

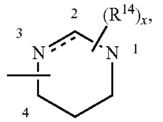

J-54

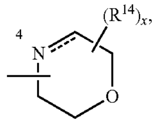

J-56

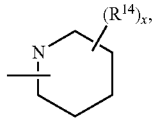

J-57

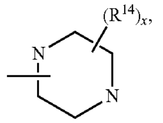

J-58

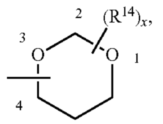

J-59

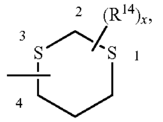

J-60

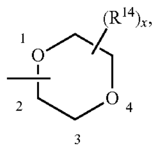

J-61

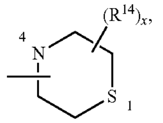

J-62

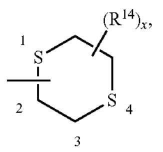

-continued

J-63

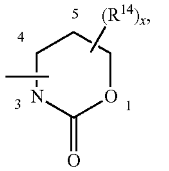

J-64

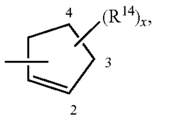

J-65

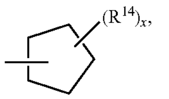

J-66

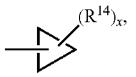

J-67

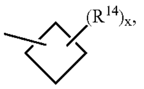

J-68

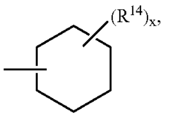

J-69

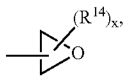

J-70

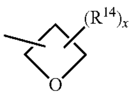

and

J-71

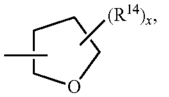

wherein the floating bond is connected to L through any available carbon or nitrogen atom of the depicted ring; and x is 0, 1, 2 or 3;

each $R^{14}$ is independently halogen, methyl, methoxy or C(=O)O$R^{15}$; and each $R^{15}$ is independently $C_1$-$C_3$ alkyl, $C_1$-$C_3$ haloalkyl or cyclopropyl.

Embodiment AA. The composition of Embodiment A wherein in Formula 1,

A is A-1;

$R^1$ and $R^2$ are each independently Br, Cl, F, methyl or trifluoromethyl;

$R^3$ is H or methyl;

$R^4$ is methoxy or ethoxy;

n is 0;

$R^{7a}$ is H;

$R^{7b}$ is H;

$R^9$, $R^{10b}$ and $R^{12c}$ are each H or methyl;

$R^{10a}$, $R^{12a}$ and $R^{12b}$ are each independently H or methyl;

L is direct bond or O;

J is J-58, J-66 or J-67; and each $R^{14}$ is independently halogen or methyl.

Embodiment B. The composition of Embodiment A wherein in Formula 1, A is A-1;

$R^1$ and $R^2$ are each independently Br, Cl, F, methyl, trifluoromethyl, methoxy or trifluoromethoxy;

$R^3$ is H or methyl;

$R^4$ is methyl, methoxy or ethoxy;

each $R^5$ is methyl;

$R^6$ is H, halogen, cyano, $C_1$-$C_3$ alkyl, $C_1$-$C_3$ haloalkyl, $C_1$-$C_3$ alkoxy, $C_1$-$C_3$ haloalkoxy, $C_2$-$C_4$ alkenyloxy, $C_2$-$C_4$ haloalkenyloxy, $C_2$-$C_4$ alkynyloxy, $CR^{10a}$=$NOR^{10b}$ or -L-J;

$R^{7a}$ is H or methyl;

$R^{10b}$ is H, methyl, ethyl or $C_2$-$C_4$ alkenyl;

$R^{10a}$ is H or methyl;

L is direct bond or O;

J is J-53, J-58, J-59, J-60, J-65, J-66, J-67 or J-68; and each $R^{14}$ is independently halogen or methyl.

Embodiment C. The composition of Embodiment B wherein in Formula 1, $R^1$ and $R^2$ are each independently $C_1$ or F;

$R^3$ is H;

$R^4$ is methoxy;

n is 0;

$R^6$ is Br, Cl, methyl, i-propyl, $CHF_2$, trifluoromethyl, methoxy, ethoxy, i-propyloxy, trifluoromethoxy, $OCH_2C{\equiv}CH$, C(Me)=$NOCH_3$ or -L-J;

$R^{7a}$ is H;

$R^{7b}$ is H;

L is a direct bond; and

J is J-58, J-66 or J-67.

Embodiment D. The composition of Embodiment C wherein in Formula 1, $R^1$ and $R^2$ are each F;

$R^6$ is Br, Cl, methyl, i-propyl, $CHF_2$, trifluoromethyl, i-propyloxy, $C(CH_3)$=$NOCH_3$ or -L-J;

J is J-66;

x is 0, 1 or 2; and $R^{14}$ is Br, Cl, F or methyl.

Embodiment E. The composition of Embodiment D wherein in Formula 1, $R^6$ is $C_1$, i-propyl, trifluoromethyl or -L-J; and x is 0.

Embodiment F. The composition of any one of Embodiments A through E wherein component (a) comprises a compound selected from the group consisting of: Compound 3, Compound 4, Compound 6, Compound 7, Compound 11, Compound 13, Compound 14, Compound 15, Compound 30, Compound 33, Compound 41, Compound 63, Compound 64, Compound 66, Compound 78, Compound 83, Compound 87, Compound 89, Compound 93, Compound 99, Compound 108, Compound 111, Compound 113, Compound 117, Compound 134, Compound 135 and Compound 142.

Embodiment G. The composition of Embodiment F wherein component (a) comprises a compound selected from the group consisting of: Compound 3, Compound 4, Compound 6, Compound 7, Compound 11, Compound 14, Compound 15, Compound 30, Compound 33, Compound 41, Compound 63, Compound 64, Compound 78 and Compound 99.

Embodiment H. The composition of Embodiment G wherein component (a) comprises a compound selected from the group consisting of: Compound 3, Compound 4, Compound 6, Compound 15, Compound 41, Compound 63 and Compound 64.

Embodiment I. The composition of Embodiment H wherein component (a) comprises a compound selected from the group consisting of: Compound 6, Compound 41, Compound 63 and Compound 64.

Embodiment J. The composition of Embodiment I wherein component (a) comprises Compound 63.

Embodiment B1. The composition described in the Summary of the Invention (including but not limited to the composition of any one of Embodiments 1 through 118 and A through J) wherein component (b) includes at least one compound selected from (b1) methyl benzimidazole carbamate fungicides such as benomyl, carbendazim, fuberidazole thiabendazole, thiophanate and thiophanate-methyl.

Embodiment B2. The composition described in the Summary of the Invention (including but not limited to the composition of any one of Embodiments 1 through 118 and A through J) wherein component (b) includes at least one compound selected from (b2) dicarboximide fungicides such as chlozolinate, dimethachlone, iprodione, procymidone and vinclozolin.

Embodiment B3. The composition described in the Summary of the Invention (including but not limited to the composition of any one of Embodiments 1 through 118 and A through J) wherein component (b) includes at least one compound selected from (b3) demethylation inhibitor fungicides such as azaconazole, bitertanol, bromuconazole, buthiobate, cyproconazole, difenoconazole, diniconazole (including diniconazole-M), econazole, epoxiconazole, etaconazole, fenarimol, fenbuconazole, fluquinconazole, flusilazole, flutriafol, hexaconazole, imazalil, imibenconazole, ipconazole, ipfentrifluconazole, mefentrifluconazole, metconazole, myclobutanil, nuarimol, oxpoconazole, pefurazoate, penconazole, prochloraz, propiconazole, pyrifenox, pyrisoxazole, quinconazole, simeconazole, tebuconazole, tetraconazole, triadimefon, triadimenol, triarimol, triflumizole, triforine, triticonazole, uniconazole and uniconazole-P.

Embodiment B4. The composition described in the Summary of the Invention (including but not limited to the composition of any one of Embodiments 1 through 118 and A through J) wherein component (b) includes at least one compound selected from (b4) phenylamide fungicides such as benalaxyl, benalaxyl-M, furalaxyl, metalaxyl, metalaxyl-M, ofurace and oxadixyl.

Embodiment B5. The composition described in the Summary of the Invention (including but not limited to the composition of any one of Embodiments 1 through 118 and A through J) wherein component (b) includes at least one compound selected from (b5) amine/morpholine fungicides such as aldimorph, dodemorph, fenpropidin, fenpropimorph, piperalin, spiroxamine, tridemorph and trimorphamide.

Embodiment B6. The composition described in the Summary of the Invention (including but not limited to the composition of any one of Embodiments 1 through 118 and A through J) wherein component (b) includes at least one compound selected from (b6) phospholipid biosynthesis inhibitor fungicides such as edifenphos, iprobenfos, isoprothiolane and pyrazophos.

Embodiment B7. The composition described in the Summary of the Invention (including but not limited to the composition of any one of Embodiments 1 through 118 and A through J) wherein component (b) includes at least one compound selected from (b7) succinate dehydrogenase inhibitor fungicides such as benodanil, benzovindiflupyr, bixafen, boscalid, carboxin, fenfuram, flubeneteram, fluindapyr, fluopyram, flutolanil, fluxapyroxad, furametpyr, inpyrfluxam, isofetamid, isoflucypram, isopyrazam, mepronil, oxycarboxin, penflufen, penthiopyrad, pydiflumetofen, pyrapropoyne, pyraziflumid, sedaxane and thifluzamide.

Embodiment B8. The composition described in the Summary of the Invention (including but not limited to the composition of any one of Embodiments 1 through 118 and A through J) wherein component (b) includes at least one compound selected from (b8) hydroxy(2-amino)pyrimidine fungicides such as bupirimate, dimethirimol and ethirimol.

Embodiment B9. The composition described in the Summary of the Invention (including but not limited to the composition of any one of Embodiments 1 through 118 and A through J) wherein component (b) includes at least one compound selected from (b9) anilinopyrimidine fungicides such as cyprodinil, mepanipyrim and pyrimethanil.

Embodiment B10. The composition described in the Summary of the Invention (including but not limited to the composition of any one of Embodiments 1 through 118 and A through J) wherein component (b) includes at least one compound selected from (b10) N-phenyl carbamate fungicides such as diethofencarb.

Embodiment B11. The composition described in the Summary of the Invention (including but not limited to the composition of any one of Embodiments 1 through 118 and A through J) wherein component (b) includes at least one compound selected from (b11) fungicides quinone outside inhibitor fungicides such as azoxystrobin, coumoxystrobin, dimoxystrobin, enoxastrobin, famoxadone, fenamidone, fenaminstrobin, flufenoxystrobin, fluoxastrobin, kresoxim-methyl, mandestrobin, metominostrobin, orysastrobin, picoxystrobin, pyraclostrobin, pyrametostrobin, pyraoxystrobin, pyribencarb, triclopyricarb and trifloxystrobin.

Embodiment B12. The composition described in the Summary of the Invention (including but not limited to the composition of any one of Embodiments 1 through 118 and A through J) wherein component (b) includes at least one compound selected from (b12) phenylpyrrole fungicides compound such as fenpiclonil and fludioxonil.

Embodiment B13. The composition described in the Summary of the Invention (including but not limited to the composition of any one of Embodiments 1 through 118 and A through J) wherein component (b) includes at least one compound selected from (b13) azanaphthalene fungicides such as quinoxyfen and proquinazid.

Embodiment B14. The composition described in the Summary of the Invention (including but not limited to the composition of any one of Embodiments 1 through 118 and A through J) wherein component (b) includes at least one compound selected from (b14) cell peroxidation inhibitor fungicides such as biphenyl, chloroneb, dicloran, etridiazole quintozene, tecnazene and tolclofos-methyl.

Embodiment B15. The composition described in the Summary of the Invention (including but not limited to the composition of any one of Embodiments 1 through 118 and A through J) wherein component (b) includes at least one compound selected from (b15) melanin biosynthesis inhibitors-reductase fungicides such as fthalide, pyroquilon and tricyclazole.

Embodiment B16a. The composition described in the Summary of the Invention (including but not limited to the composition of any one of Embodiments 1 through 118 and A through J) wherein component (b) includes at least one compound selected from (b16a) melanin biosynthesis inhibitors-dehydratase fungicides such as carpropamid, diclocymet and fenoxanil.

Embodiment B16b. The composition described in the Summary of the Invention (including but not limited to the composition of any one of Embodiments 1 through 118 and A through J) wherein component (b) includes at least one compound selected from (b16b) melanin biosynthesis inhibitor-polyketide synthase fungicides such as tolprocarb.

Embodiment B17. The composition described in the Summary of the Invention (including but not limited to the composition of any one of Embodiments 1 through 118 and A through J) wherein component (b) includes at least one compound selected from (b17) keto reductase inhibitor fungicides such as fenhexamid, fenpyrazamine, ipflufenoquin and quinofumelin.

Embodiment B18. The composition described in the Summary of the Invention (including but not limited to the composition of any one of Embodiments 1 through 118 and A through J) wherein component (b) includes at least one compound selected from (b18) squalene-epoxidase inhibitor fungicides such as naftifine, pyributicarb and terbinafine.

Embodiment B19. The composition described in the Summary of the Invention (including but not limited to the composition of any one of Embodiments 1 through 118 and A through J) wherein component (b) includes at least one compound selected from (b19) polyoxin fungicides such as polyoxin.

Embodiment B20. The composition described in the Summary of the Invention (including but not limited to the composition of any one of Embodiments 1 through 118 and A through J) wherein component (b) includes at least one compound selected from (b20) phenylurea fungicides such as pencycuron.

Embodiment B21. The composition described in the Summary of the Invention (including but not limited to the composition of any one of Embodiments 1 through 118 and A through J) wherein component (b) includes at least one compound selected from (b21) quinone inside inhibitor fungicides such as amisulbrom, cyazofamid and fenpicoxamid.

Embodiment B22. The composition described in the Summary of the Invention (including but not limited to the composition of any one of Embodiments 1 through 118 and A through J) wherein component (b) includes at least one compound selected from (b22) benzamide and thiazole carboxamide fungicides such as ethaboxam and zoxamide.

Embodiment B23. The composition described in the Summary of the Invention (including but not limited to the composition of any one of Embodiments 1 through 118 and A through J) wherein component (b) includes at least one compound selected from (b23) enopyranuronic acid antibiotic fungicides such as blasticidin-S.

Embodiment B24. The composition described in the Summary of the Invention (including but not limited to the composition of any one of Embodiments 1 through 118 and A through J) wherein component (b) includes at least one compound selected from (b24) hexopyranosyl antibiotic fungicides such as kasugamycin.

Embodiment B25. The composition described in the Summary of the Invention (including but not limited to the composition of any one of Embodiments 1 through 118 and A through J) wherein component (b) includes at least one compound selected from (b25) glucopyranosyl antibiotic: protein synthesis fungicides such as streptomycin.

Embodiment B26. The composition described in the Summary of the Invention (including but not limited to the composition of any one of Embodiments 1 through 118 and A through J) wherein component (b) includes at least one compound selected from (b26) glucopyranosyl antibiotic: trehalase and inositol biosynthesis fungicides such as validamycin.

Embodiment B27. The composition described in the Summary of the Invention (including but not limited to the composition of any one of Embodiments 1 through 118 and A through J) wherein component (b) includes at least one compound selected from (b27) cyanoacetamide-oxime fungicides such as cymoxanil.

Embodiment B28. The composition described in the Summary of the Invention (including but not limited to the composition of any one of Embodiments 1 through 118 and A through J) wherein component (b) includes at least one compound selected from (b28) carbamate fungicides such as iodocarb, propamacarb and prothiocarb.

Embodiment B29. The composition described in the Summary of the Invention (including but not limited to the composition of any one of Embodiments 1 through 118 and A through J) wherein component (b) includes at least one compound selected from (b29) oxidative phosphorylation uncoupling fungicides such as binapacryl, dinocap, fluazinam and meptyldinocap.

Embodiment B30. The composition described in the Summary of the Invention (including but not limited to the composition of any one of Embodiments 1 through 118 and A through J) wherein component (b) includes at least one compound selected from (b30) organo tin fungicides such as fentin acetate, fentin chloride and fentin hydroxide.

Embodiment B31. The composition described in the Summary of the Invention (including but not limited to the composition of any one of Embodiments 1 through 118 and A through J) wherein component (b) includes at least one compound selected from (b31) carboxylic acid fungicides such as oxolinic acid.

Embodiment B32. The composition described in the Summary of the Invention (including but not limited to the composition of any one of Embodiments 1 through 118 and A through J) wherein component (b) includes at least one compound selected from (b32) heteroaromatic fungicides such as hymexazole and octhilinone.

Embodiment B33. The composition described in the Summary of the Invention (including but not limited to the composition of any one of Embodiments 1 through 118 and A through J) wherein component (b) includes at least one compound selected from (b33) phosphonate fungicides such as phosphorous acid and its various salts, including fosetyl-aluminum.

Embodiment B34. The composition described in the Summary of the Invention (including but not limited to the composition of any one of Embodiments 1 through 118 and A through J) wherein component (b) includes at least one compound selected from (b34) phthalamic acid fungicides such as teclofthalam.

Embodiment B35. The composition described in the Summary of the Invention (including but not limited to the composition of any one of Embodiments 1 through 118 and A through J) wherein component (b) includes at least one compound selected from (b35) benzotriazine fungicides such as triazoxide.

Embodiment B36. The composition described in the Summary of the Invention (including but not limited to the composition of any one of Embodiments 1 through 118 and A through J) wherein component (b) includes at least one compound selected from (b36) benzene-sulfonamide fungicides such as flusulfamide.

Embodiment B37. The composition described in the Summary of the Invention (including but not limited to the composition of any one of Embodiments 1 through 118 and A through J) wherein component (b) includes at least one compound selected from (b37) pyridazinone fungicides such as diclomezine.

Embodiment B38. The composition described in the Summary of the Invention (including but not limited to the composition of any one of Embodiments 1 through 118 and A through J) wherein component (b) includes at least one compound selected from (b38) thiophene-carboxamide fungicides such as silthiofam.

Embodiment B39. The composition described in the Summary of the Invention (including but not limited to the composition of any one of Embodiments 1 through 118 and A through J) wherein component (b) includes at least one compound selected from (b39) complex I NADH oxidoreductase inhibitor fungicides such as diflumetorim, fenazaquin and tolfenpyrad.

Embodiment B40. The composition described in the Summary of the Invention (including but not limited to the composition of any one of Embodiments 1 through 118 and A through J) wherein component (b) includes at least one compound selected from (b40) carboxylic acid amide fungicides such as benthiavalicarb, benthiavalicarb-isopropyl, dimethomorph, flumorph, iprovalicarb, mandipropamid, pyrimorph, tolprocarb and valifenalate.

Embodiment B41. The composition described in the Summary of the Invention (including but not limited to the composition of any one of Embodiments 1 through 118 and A through J) wherein component (b) includes at least one compound selected from (b41) tetracycline antibiotic fungicides such as oxytetracycline.

Embodiment B42. The composition described in the Summary of the Invention (including but not limited to the composition of any one of Embodiments 1 through 118 and A through J) wherein component (b) includes at least one compound selected from (b42) thiocarbamate fungicides such as methasulfocarb.

Embodiment B43. The composition described in the Summary of the Invention (including but not limited to the composition of any one of Embodiments 1 through 118 and A through J) wherein component (b) includes at least one compound selected from (b43) benzamide fungicides such as fluopicolide and fluopimomide.

Embodiment B44. The composition described in the Summary of the Invention (including but not limited to the composition of any one of Embodiments 1 through 118 and A through J) wherein component (b) includes at least one compound selected from (b44) microbial fungicides such as *Bacillus amyloliquefaciens* strains AP-136, AP-188, AP-218, AP-219, AP-295, D747, F727, FCC1256, FZB24, FZB42, MB1600, QST713, RTI301, RTI472, TJ100 (also called strain 1 BE; known from EP2962568), and the fungicidal lipopeptides which they produce.

Embodiment B45. The composition described in the Summary of the Invention (including but not limited to the composition of any one of Embodiments 1 through 118 and A through J) wherein component (b) includes at least one compound selected from (b45) quinone outside inhibitor, stigmatellin binding fungicides such as ametoctradin.

Embodiment B46. The composition described in the Summary of the Invention (including but not limited to the composition of any one of Embodiments 1 through 118 and A through J) wherein component (b) includes at least one compound selected from (b46) plant extract fungicides such as eugenol, geraniol and thymol.

Embodiment B47. The composition described in the Summary of the Invention (including but not limited to the composition of any one of Embodiments 1 through 118 and A through J) wherein component (b) includes at least one compound selected from (b47) cyanoacrylate fungicides such as phenamacril.

Embodiment B48. The composition described in the Summary of the Invention (including but not limited to the composition of any one of Embodiments 1 through 118 and A through J) wherein component (b) includes at least one compound selected from (b48) polyene fungicides such as natamycin.

Embodiment B49. The composition described in the Summary of the Invention (including but not limited to the composition of any one of Embodiments 1 through 118 and A through J) wherein component (b) includes at least one compound selected from (b49) oxysterol binding protein inhibitor fungicides such as oxathiapiprolin and fluoxapiprolin.

Embodiment B50. The composition described in the Summary of the Invention (including but not limited to the composition of any one of Embodiments 1 through 118 and A through J) wherein component (b) includes at least one compound selected from (b50) aryl-phenyl-ketone fungicides such as metrafenone and pyriofenone.

Embodiment B51. The composition described in the Summary of the Invention (including but not limited to the composition of any one of Embodiments 1 through 118 and A through J) wherein component (b) includes at least one compound selected from (b51) host plant defense induction fungicides such as acibenzolar-S-methyl, probenazole, tiadinil, isotianil, laminarin, extract from *Reynoutria sachalinensis* and *Bacillus mycoides* isolate J and cell walls of *Saccharomyces cerevisiae* strain LAS117.

Embodiment B52. The composition described in the Summary of the Invention (including but not limited to the composition of any one of Embodiments 1 through 118 and A through J) wherein component (b) includes at least one compound selected from (b52) multi-site activity fungicides such as copper oxychloride, copper sulfate, copper hydroxide, Bordeaux composition (tribasic copper sulfide), elemental sulfur, ferbam, mancozeb, maneb, metiram, propineb, thiram, zinc thiazole, zineb, ziram, folpet, captan, captafol, chlorothalonil, dichlofluanid, tolyfluanid, guazatine, iminoctadine albesilate, iminoctadine triacetate, anilazine, dithianon, quinomethionate and fluoroimide.

Embodiment B53. The composition described in the Summary of the Invention (including but not limited to the composition of any one of Embodiments 1 through 118 and A through J) wherein component (b) includes at least one compound selected from (b53) biological fungicides with multiple modes of action such as extract from the cotyledons of lupine plantlets.

Embodiment B54. The composition described in the Summary of the Invention (including but not limited to the composition of any one of Embodiments 1 through 118 and A through J) wherein component (b) includes at least one compound selected from (b54) fungicides other than fungicides of component (a) and components (b1) through (b53), such as bethoxazin, cyflufenamid, dichlobentiazox, dipymetitrone, dodine, ferimzone, flometoquin, flutianil, neo-asozin, picarbutrazox, pyrrolnitrin, tebufloquin, tolnifanide, N'-[4-[4-chloro-3-(trifluoromethyl)phenoxy]-2,5-dimethylphenyl]-N-ethyl-N-methylmethanimidamide, 5-fluoro-2-[(4-fluorophenyl)methoxy]-4-pyrimidinamine and 4-fluorophenyl N-[1-[[[1-(4-cyanophenyl)ethyl]sulfonyl]methyl]propyl]carbamate (XR-539).

Embodiment B55. The composition described in the Summary of the Invention (including but not limited to the composition of any one of Embodiments 1 through 118 and A through J) wherein component (b) includes florylpicoxamid.

Embodiment B56. The composition described in the Summary of the Invention (including but not limited to the composition of any one of Embodiments 1 through 118 and A through J) wherein component (b) includes metyltetraprole.

Embodiment B57. The composition described in the Summary of the Invention (including but not limited to the composition of any one of Embodiments 1 through 118 and A through J) wherein component (b) includes 3-chloro-4-(2,6-difluorophenyl)-6-methyl-5-phenylpyridazine (provisional common name pyridachlometyl).

Embodiment B58. The composition described in the Summary of the Invention (including but not limited to the composition of any one of Embodiments 1 through 118 and A through J) wherein component (b) includes aminopyrifen.

Embodiment B59. The composition described in the Summary of the Invention (including but not limited to the composition of any one of Embodiments 1 through 118 and A through J) wherein component (b) includes at least one compound selected from (b54.11) (i.e. Formula b54.11)

b54.11

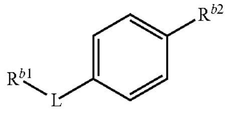

wherein $R^{b1}$ is

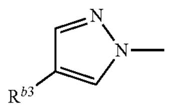

or

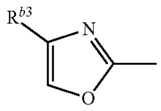

;

$R^{b3}$ is $C_2$-$C_3$ alkoxycarbonyl or $C_2$-$C_3$ haloalkylaminocarbonyl;

L is $CH_2$ or $CH_2O$, wherein the atom to the right is connected to the phenyl ring in Formula b54.11;

$R^{b2}$ is

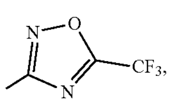

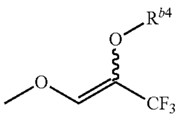

or

-continued

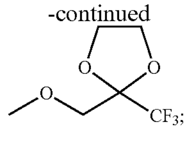

and $R^{b4}$ is $C_1$-$C_3$ alkyl, wherein the wavy bond indicates the adjacent double bond is either (Z)- or (E)-configuration, or a mixture thereof.

Embodiment B60. The composition of Embodiment B59 wherein component (b) includes at least one fungicidal compound selected from the group consisting of N-(2,2,2-trifluoroethyl)-2-[[4-[5-(trifluoromethyl)-1,2,4-oxadiazol-3-yl]phenyl]methyl]-4-oxazolecarboxamide, ethyl 1-[[4-[5-(trifluoromethyl)-1,2,4-oxadiazol-3-yl]phenoxy]methyl]-1H-pyrazole-4-carboxylate, ethyl 1-[[4-[[(1Z)-2-ethoxy-3,3,3-trifluoro-1-propen-1-yl]oxy]phenyl]methyl]-1H-pyrazole-4-carboxylate and ethyl 1-[[4-[[2-(trifluoromethyl)-1,3-dioxolan-2-yl]methoxy]phenyl]methyl]-1H-pyrazole-4-carboxylate.

Embodiment B60a. The composition of Embodiment B60 wherein component (b) includes at least one fungicidal compound selected from the group consisting of ethyl 1-[[4-[[(1Z)-2-ethoxy-3,3,3-trifluoro-1-propen-1-yl]oxy]phenyl]methyl]-1H-pyrazole-4-carboxylate and ethyl 1-[[4-[[2-(trifluoromethyl)-1,3-dioxolan-2-yl]methoxy]phenyl]methyl]-1H-pyrazole-4-carboxylate.

Embodiment B61. The composition described in the Summary of the Invention (including but not limited to the composition of any one of Embodiments 1 through 118 and A through J) wherein component (b) includes at least one compound selected from (b54.12) (i.e. Formula b54.12)

b54.12

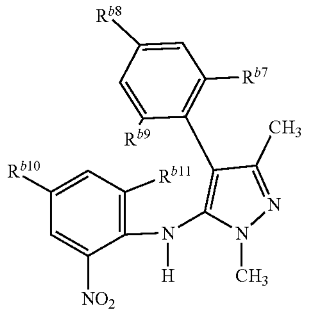

wherein $R^{b7}$, $R^{b8}$ and $R^{b9}$ are each independently H, halogen or cyano; and $R^{b10}$ and $R^{b11}$ are each independently H, halogen. $C_1$-$C_3$ alkyl or $C_1$-$C_3$ methoxy.

Embodiment B62. The composition of Embodiment B61 wherein component (b) includes at least one fungicidal compound selected from the group consisting of 4-(2-chloro-4-fluorophenyl)-N-(2-fluoro-4-methyl-6-nitrophenyl)-1,3-dimethyl-1H-pyrazol-5-amine, 4-(2-chloro-4-fluorophenyl)-N-(2-fluoro-6-nitrophenyl)-1,3-dimethyl-1H-pyrazol-5-amine, 3,5-difluoro-4-[5-[(4-methoxy-2-nitrophenyl)amino]-1,3-dimethyl-1H-pyrazol-4-yl]-benzonitrile and N-(2-chloro-4-fluoro-6-nitrophenyl)-4-(2-chloro-4-fluorophenyl)-1,3-dimethyl-1H-pyrazol-5-amine.

Embodiment B63. The composition described in the Summary of the Invention (including but not limited to the composition of any one of Embodiments 1 through 118 and A through J) wherein component (b) includes at least one fungicidal compound (fungicide) selected from the group consisting of azoxystrobin, benzovindiflupyr, boscalid (nicobifen), bixafen, bromuconazole, carbendazim, chlorothalonil, copper sulfate, cyflufenamid, cyproconazole, difenoconazole, dimoxystrobin, epoxiconazole, famoxadone, fenbuconazole, fenpropidin, fenpropimorph, florylpicoxamid, fluindapyr, flusilazole, flutriafol, fluxapyroxad, hexaconazole, inpyrfluxam, ipconazole, isoflucypram, kresoxim-methyl, mancozeb, mefentrifluconazole, manzate, metconazole, metominostrobin, metrafenone, myclobutanil, penconazole, penthiopyrad, picoxystrobin, prochloraz, propiconazole, proquinazid, prothioconazole, pydiflumetofen, pyraclostrobin, pyrametostrobin, pyraoxystrobin, pyriofenone quinoxyfen, tebuconazole, trifloxystrobin, triticonazole, N-(2,2,2-trifluoroethyl)-2-[[4-[5-(trifluoromethyl)-1,2,4-oxadiazol-3-yl]phenyl]methyl]-4-oxazolecarboxamide, ethyl 1-[[4-[5-(trifluoromethyl)-1,2,4-oxadiazol-3-yl]phenoxy]methyl]-1H-pyrazole-4-carboxylate, ethyl 1-[[4-[[(1Z)-2-ethoxy-3,3,3-trifluoro-1-propen-1-yl]oxy]phenyl]methyl]-1H-pyrazole-4-carboxylate and ethyl 1-[[4-[[2-(trifluoromethyl)-1,3-dioxolan-2-yl]methoxy]phenyl]methyl]-1H-pyrazole-4-carboxylate.

Embodiment B64. The composition of Embodiment B63 wherein component (b) includes at least one compound selected from the group consisting of azoxystrobin, benzovindiflupyr, bixafen, chlorothalonil, copper sulfate, cyflufenamid, cyproconazole, difenoconazole, dimoxystrobin, epoxiconazole, famoxadone, fenpropidin, fenpropimorph, florylpicoxamid, fluindapyr, flusilazole, flutriafol, fluxapyroxad, inpyrfluxam, isoflucypram, kresoxim-methyl, mancozeb, manzate, mefentrifluconazole, metconazole, metominostrobin, metrafenone, myclobutanil, penthiopyrad, picoxystrobin, propiconazole, proquinazid, prothioconazole, pydiflumetofen, pyraclostrobin, pyrametostrobin, pyraoxystrobin, pyriofenone, quinoxyfen, tebuconazole, trifloxystrobin, triticonazole, N-(2,2,2-trifluoroethyl)-2-[[4-[5-(trifluoromethyl)-1,2,4-oxadiazol-3-yl]phenyl]methyl]-4-oxazolecarboxamide, ethyl 1-[[4-[5-(trifluoromethyl)-1,2,4-oxadiazol-3-yl]phenoxy]methyl]-1H-pyrazole-4-carboxylate, ethyl 1-[[4-[[(1Z)-2-ethoxy-3,3,3-trifluoro-1-propen-1-yl]oxy]phenyl]methyl]-1H-pyrazole-4-carboxylate and ethyl 1-[[4-[[2-(trifluoromethyl)-1,3-dioxolan-2-yl]methoxy]phenyl]methyl]-1H-pyrazole-4-carboxylate.

Embodiment B65. The composition of Embodiment B64 wherein component (b) includes at least one compound selected from the group consisting of azoxystrobin, benzovindiflupyr, bixafen, chlorothalonil, copper sulfate, cyproconazole, difenoconazole, epoxiconazole, fenpropimorph, florylpicoxamid, fluindapyr, flutriafol, fluxapyroxad, inpyrfluxam, isoflucypram, mancozeb, mefentrifluconazole, metominostrobin, picoxystrobin, prothioconazole, pydiflumetofen, pyraclostrobin, tebuconazole, trifloxystrobin, ethyl 1-[[4-[[(1Z)-2-ethoxy-3,3,3-trifluoro-1-propen-1-yl]oxy]phenyl]methyl]-1H-pyrazole-4-carboxylate and ethyl 1-[[4-[[2-(trifluoromethyl)-1,3-dioxolan-2-yl]methoxy]phenyl]methyl]-1H-pyrazole-4-carboxylate.

Embodiment B66. The composition of Embodiment B65 wherein component (b) includes at least one compound selected from the group consisting of azoxystrobin, benzovindiflupyr, bixafen, chlorothalonil, copper sulfate, cyproconazole, difenoconazole, epoxiconazole, fenpropimorph, florylpicoxamid, fluindapyr, flutriafol, fluxapyroxad, inpyrfluxam, isoflucypram, mancozeb, mefentrifluconazole, metominostrobin, picoxystrobin, prothioconazole, pydiflumetofen, pyraclostrobin, tebuconazole and trifloxystrobin.

Embodiment B67. The composition of Embodiment B66 wherein component (b) includes at least one compound selected from the group consisting of azoxystrobin, benzovindiflupyr, chlorothalonil, cyproconazole, difenoconazole, epoxiconazole, fenpropimorph, fluindapyr, flutriafol, mancozeb, mefentrifluconazole, picoxystrobin, prothioconazole, pydiflumetofen, tebuconazole and trifloxystrobin.

Of note is the composition of any one of the embodiments described herein, including any Embodiments 1 through 118, A through J, and B1 through B67, wherein reference to Formula 1 includes salts thereof but not N-oxides thereof; therefore the phrase "a compound of Formula 1" can be replaced by the phrase "a compound of Formula 1 or a salt thereof". In this composition of note, component (a) comprises a compound of Formula 1 or a salt thereof.

Also noteworthy as embodiments are fungicidal compositions of the present invention comprising a fungicidally effective amount of a composition of Embodiments 1 through 118, A through J, and B1 through B67, and at least one additional component selected from the group consisting of surfactants, solid diluents and liquid diluents.

Embodiments of the invention further include methods for controlling plant diseases caused by fungal plant pathogens comprising applying to the plant or portion thereof, or to the plant seed or seedling, a fungicidally effective amount of a composition described in any one of Embodiments 1 through 118, A through J, and B1 through B67 (e.g., as a composition including formulation ingredients as described herein). Embodiments of the invention also include methods for protecting a plant or plant seed from diseases caused by fungal pathogens comprising applying a fungicidally effective amount of a composition described in any one of Embodiments 1 through 118, A through J, and B1 through B67 to the plant or plant seed.

Some embodiments of the invention involve control of a plant disease or protection from a plant disease that primarily afflicts plant foliage and/or applying the composition of the invention to plant foliage (i.e. plants instead of seeds). The preferred methods of use include those involving the above preferred compositions; and the diseases controlled with particular effectiveness include plant diseases caused by fungal plant pathogens. Combinations of fungicides used in accordance with this invention can facilitate disease control and retard resistance development.

Method embodiments further include:

Embodiment C1. A method for protecting a plant from a disease selected from rust, powdery mildew, *Septoria* and *Botrytis* diseases comprising applying to the plant a fungicidally effective amount of the composition comprising components (a) and (b) described in the Summary of the Invention or any one of Embodiments 1 through 118.

Embodiment C2. The method of Embodiment C1 wherein the disease is a rust disease and component (b) of the composition includes at least one fungicidal compound selected from (b3) demethylation inhibitor (DMI) fungicides, (b5) amine/morpholine fungicides, (b7) succinate dehydrogenase inhibitor fungicides, (b11) quinone outside inhibitor (QoI) fungicides, (b13) methyl benzimidazole carbamate fungicides and (b52) multi-site activity fungicides.

Embodiment C3. The method of Embodiment C2 wherein component (b) of the composition includes at least one fungicidal compound selected from (b3) demethylation inhibitor (DMI) fungicides, (b7) succinate dehydrogenase inhibitor fungicides, (b11) quinone outside inhibitor (QoI) fungicides and (b52) multi-site activity fungicides.

Embodiment C4. The method of Embodiment C3 wherein component (b) of the composition includes at least one fungicidal compound selected from (b3) demethylation inhibitor (DMI) fungicides, (b7) succinate dehydrogenase inhibitor fungicides and (b11) quinone outside inhibitor (QoI).

Embodiment C5. The method of any one of Embodiments C1 through C4 wherein component (b) of the composition includes at least one fungicidal compound selected from the group consisting of azoxystrobin, benzovindiflupyr, bixafen, cyproconazole, difenoconazole, epoxiconazole, fenpropimorph, florylpicoxamid, fluindapyr, flutriafol, fluxapyroxad, inpyrfluxam, isoflucypram, mancozeb, mefentrifluconazole, metominostrobin, picoxystrobin, prothioconazole, pydiflumetofen, pyraclostrobin, tebuconazole and trifloxystrobin.

Embodiment C6. The method of Embodiment C5 wherein component (b) of the composition includes at least one fungicidal compound selected from the group consisting of azoxystrobin, benzovindiflupyr, cyproconazole, epoxiconazole, fenpropimorph, flutriafol, fluxapyroxad, metominostrobin, picoxystrobin, prothioconazole, pydiflumetofen, tebuconazole and trifloxystrobin.

Embodiment C7. The method of any one of Embodiments C2 through C6 wherein the disease is Asian soybean rust caused by *Phakopsora pachyrhizi.*

Embodiment C8. The method of any one of Embodiments C2 through C6 wherein the disease is wheat leaf rust caused by *Puccinia recondita.*

Embodiment C9. The method of Embodiment C1 wherein the disease is a powdery mildew disease and component (b) of the composition includes at least one fungicidal compound selected from (b3) demethylation inhibitor (DMI) fungicides, (b11) quinine outside inhibitor (QoI) fungicides, (b13) azanaphthalene fungicides and (b52) multi-site activity fungicides.

Embodiment C10. The method of Embodiment C9 wherein component (b) of the composition includes at least one fungicidal compound selected from (b3) demethylation inhibitor (DMI) fungicides, (b11) quinone outside inhibitor (QoI) fungicides and (b52) multi-site activity fungicides.

Embodiment C11. The method of Embodiments C9 and C10 wherein component (b) of the composition includes at least one fungicidal compound selected from the group consisting of azoxystrobin, chlorothalonil, copper sulfate, cyproconazole, difenoconazole, epoxiconazole, flutriafol, mancozeb, mefentrifluconazole, metominostrobin, picoxystrobin, prothioconazole, pyraclostrobin, tebuconazole and trifloxystrobin.

Embodiment C12. The method of Embodiment C11 wherein component (b) of the composition includes at least one fungicidal compound selected from the group consisting of cyproconazole, difenoconazole, epoxiconazole, flutriafol, mancozeb, prothioconazole, tebuconazole and trifloxystrobin.

Embodiment C13. The method of Embodiment C10 wherein component (b) of the composition includes at least one fungicidal compound selected from (b3) DMI fungicides.

Embodiment C14. The method of Embodiment C13 wherein component (b) of the composition includes at least one fungicidal compound selected from the group consisting of cyproconazole, difenoconazole, epoxiconazole, flutriafol, prothioconazole and tebuconazole.

Embodiment C15. The method Embodiment C10 wherein component (b) of the composition includes at least one fungicidal compound selected from (b11) QoI fungicides.

Embodiment C16. The method of Embodiment C15 wherein component (b) of the composition includes at least one fungicidal compound selected from the group consisting of azoxystrobin, picoxystrobin, pyraclostrobin and trifloxystrobin.

Embodiment C17. The method of any one of Embodiments C9 through C16 wherein the disease is wheat powdery mildew caused by *Erysiphe graminis.*

Embodiment C18. The method of Embodiment C1 wherein the disease is a *Septoria* disease and component (b) of the composition includes at least one fungicidal compound selected from (b3) demethylation inhibitor (DMI) fungicides and (b11) quinine outside inhibitor (QoI) fungicides.

Embodiment C19. The method of Embodiment C18 wherein component (b) of the composition includes at least one fungicidal compound selected from the group consisting of azoxystrobin, cyproconazole, difenoconazole, epoxiconazole, fenpropimorph, florylpicoxamid, flutriafol, mefentrifluconazole, metominostrobin, picoxystrobin, prothioconazole, pyraclostrobin, tebuconazole and trifloxystrobin.

Embodiment C20. The method of any one of Embodiments C18 and C19 wherein the disease is wheat leaf blotch caused by Zymoseptoria *tritici.*

Embodiment C21. The method of Embodiment C1 wherein the disease is a *Botrytis* disease and component (b) of the composition includes at least one fungicidal compound selected from (b11) quinone outside inhibitor (QoI) fungicides and (b52) multi-site activity fungicides.

Embodiment C22. The method of Embodiment C21 wherein component (b) of the composition includes at least one fungicidal compound selected from the group consisting of azoxystrobin, chlorothalonil, mancozeb, metominostrobin, picoxystrobin, pyraclostrobin and trifloxystrobin.

Embodiment C23. The method of Embodiment C22 wherein component (b) of the composition includes at least one fungicidal compound selected from the group consisting of azoxystrobin mancozeb, and trifloxystrobin.

Embodiment C24. The method of any one of Embodiments C1 through C23 wherein components (a) and (b) are applied in synergistically effective amounts (and in a synergistic ratio relative to each other).

Of note are embodiments that are counterparts of Embodiments C1 through C24 relating to a method for controlling plant diseases caused by fungal plant pathogens comprising applying to the plant or portion thereof, a fungicidally effective amount of a fungicidal composition of the invention.

As noted in the Summary of the Invention, this invention also relates to a compound of Formula 1, or an N-oxide or salt thereof. Also noted is that the embodiments of this invention, including Embodiments 1-118, relate also to compounds of Formula 1.

This invention also provides a fungicidal composition comprising a compound of Formula 1 (including all stereoisomers, N-oxides, and salts thereof) (i.e. in a fungicidally effective amount), and at least one additional component selected from the group consisting of surfactants, solid diluents and liquid diluents. Of note as embodiments of such compositions are compositions comprising a compound corresponding to any of the compound embodiments described above.

One or more of the following methods and variations as described in Schemes 1-12 can be used to prepare the compounds of Formula 1. The definitions of A, Q, $R^1$, $R^2$, $R^3$, $R^4$, $R^5$, W, Y and n in the compounds of Formulae 1-16 below are as defined above in the Summary of the Invention unless otherwise noted. Compounds of Formulae 1a-1d are subsets of Formula 1, and all substituents for Formulae 1a-1d are as defined above for Formula 1 unless otherwise noted.

As shown in Scheme 1, compounds of Formula 1 can be prepared by reacting a compound of Formula 2 with a compound of Formula 3 under copper or palladium catalyzed cross-coupling conditions. For compounds of Formula 3 wherein X is halogen or triflate, Ullmann or Buchwald-Hartwig conditions can be used. For relevant references, see for example, *Chemical Reviews* 2002, 102(5), 1359-1470; *Angew. Chem. Int. Ed. Engl.* 2008, 47(34), 6338-6361; and *Chem. Sci.* 2010, 1(1), 13-31; and PCT patent application WO 2014/066120. Present Example 1 also illustrates the method of Scheme 1. These reactions typically require the presence of a base, such as a metal carbonate like potassium carbonate and a suitable catalyst and ligand, such as copper (I) iodide and a ligand such as trans-1,2-diamino-N,N'-dimethylcyclohexane. The reaction is commonly run in an aprotic solvent such as N,N-dimethylformamide, dioxane or toluene at a temperature between ambient and the boiling point of the solvent. In cases where compounds of Formula 3 contain electron-withdrawing substituents (e.g., when $R^1$, $R^2$ and/or $R^6$ are nitro, cyano or an ester) and X is halogen, direct nucleophilic displacement of X by compounds of Formula 2 can be achieved. These reactions are run in the presence of a base such as an alkali carbonate, hydride, alkoxide or trialkylamine at temperatures between about ambient to 130° C. in a solvent such as N,N-dimethylformamide, N,N-dimethylacetamide, dimethyl sulfoxide, dioxane, tetrahydrofuran or acetonitrile. For reaction conditions see, *Bioorganic & Medicinal Chemistry Letters* 2014, 24(24), 5805-5813; *Bioorganic & Medicinal Chemistry Letters* 2010, 20(15), 4521-4525; and *Journal of Materials Chemistry* A: Materials for Energy and Sustainability 2014, 2(21), 7917-7926; and PCT patent application WO 2016/187667. Also, present Examples 2, 7 and 11 illustrate the preparation of a compound of Formula 1 by direct nucleophilic displacement. For compounds of Formula 3 wherein X is a boronic acid, Chan-Lam conditions can be used. These reactions are run in the presence of a suitable base such as pyridine or triethylamine and a catalyst such as copper(II) acetate. Typically the reaction is conducted in an aprotic solvent like dichloromethane or chloroform, at a temperature between about ambient and the boiling point of the solvent, and in the presence of oxygen. For leading references see for example, *Tetrahedron* 2018, 74(5), 606-617; and *Tetrahedron Lett.* 1998, 39(19), 2933-2936.

Scheme 1

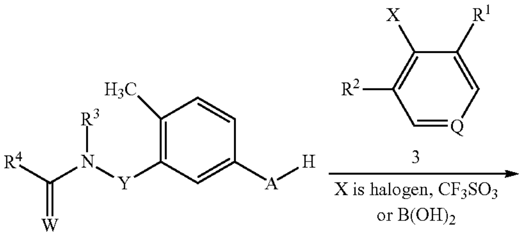

3

2 wherein A is unsubstituted on a N atom ring member (i.e. A is a 5-membered heteroaromatic ring comprising a ring memeber —NH— )

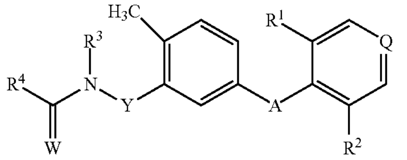

1

Compounds of Formula 3 are widely available from commercial sources and can easily be prepared using commercial precursors and known methods (see, for example, US 2013/0158004 and WO 2018/011094).

In some cases, the method of Scheme 1 results in two regioisomers. For example, as shown in Scheme 2, reaction of compounds of Formula 2a (i.e. Formula 2 wherein A is A-4) with a compound of Formula 3 typically provides an isomeric mixture of compounds of Formula 1a' (i.e. Formula 1 wherein A is A-4) and Formula 1a'' (i.e. Formula 1 wherein A is A-3). Purification of the regioisomers can be achieved using standard techniques such as column chromatography. For a relevant reference, see for example, PCT Patent Publication WO 2009/013211. Also, the method of Scheme 2 is illustrated in Example 18, Step F.

Scheme 2

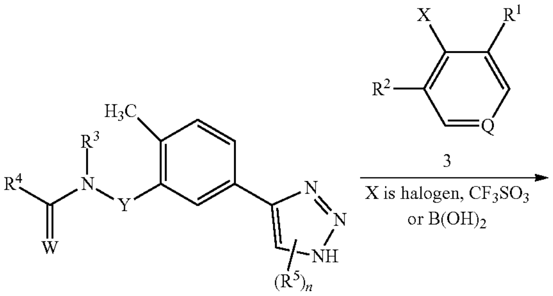

3

2a

-continued

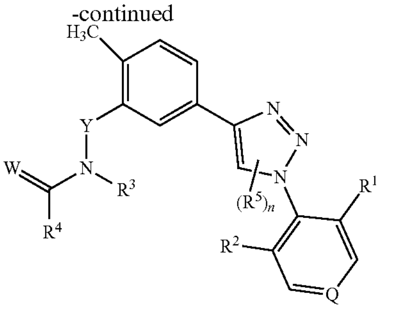

1a'

+

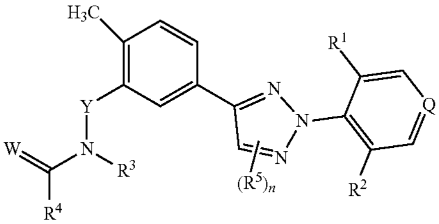

1a''

As shown in Scheme 3, compounds of Formula 2a (i.e. Formula 2 wherein A is A-4) can be prepared by reacting alkynes of Formula 4 with a suitable source of azide ions in the presence of a copper(I) salt. Suitable azide sources include, for example, trimethylsilyl azide and sodium azide. Suitable copper(I) salts include copper(I) iodide, copper(I) bromide and copper(I) chloride. Alternatively, a copper(II) salt can be used in combination with a mild reducing agent, for example copper(II) sulfate with sodium ascorbate. The reaction is typically run in a solvent such as N,N-dimethylformamide, tetrahydrofuran, methanol, tert-butanol, dimethyl sulfoxide (optionally comprising water), at temperatures from about 25 to 100° C. The use of lower boiling solvents can in some cases necessitate the need for elevated pressure to facilitate running the reaction at temperatures higher than the normal boiling point of the solvent. For leading references, see for example, *Organic Letters* 2009, 11(23), 5490-5493; *European J. Organic Chem.* 2004, (18), 3789-3791; *Synlett* 2005, (19), 2941-2947; and *Tetrahedron Letters* 2006, 47(18), 3035-3038; and PCT Patent Publication WO 2004/072243. The method of Scheme 3 is also illustrated in present Example 18, Step E.

Scheme 3

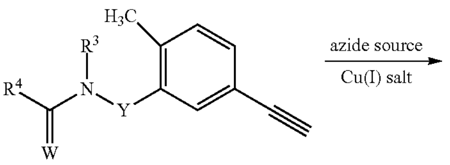

4

-continued

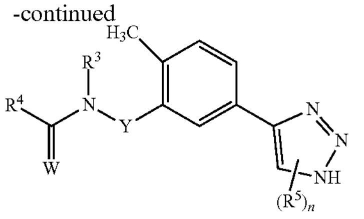

2a wherein $R^5$ is H, i.e. n is 0

Scheme 4 outlines two methods for preparing compounds of Formula 4. As shown in Method A, compounds of Formula 4 can be prepared from compounds of Formula 5 and alkynes of Formula 6 using Sonogashira reaction coupling conditions. Sonogashira couplings are well-known in the literature. See, for example, Molecules 2010, 15, 9157-9173; Sonogashira, K. In *Handbook of Organopalladium Chemistry for Organic Synthesis*; Negishi, E., Ed.; Wiley-Interscience: New York, 2002, pp 493-529*; Palladium in Heterocyclic Chemistry, A Guide for the Synthetic Chemist*, Li, J.; Gribble, G., Eds. in *Tetrahedron Organic Series*, Volume 20; Pergamon Press: New York, 2000.

As shown in Method B, compounds of Formula 4 can be prepared by reacting a compound of Formula 5 with ethynyltrimethylsilane (Formula 7) in the presence of a suitable palladium catalyst (such as tetrakis(triphenylphosphine)palladium or dichlorobis-(triphenylphosphine)-palladium(II)) and a suitable copper catalyst (such copper(I) iodide). The reaction is preferably run in the presence of an amine base such as triethylamine, N,N-diisopropylethylamine, diethylamine or piperidine. The reaction is typically conducted in a solvent such as tetrahydrofuran, toluene or N,N-dimethylformamide; however, in some cases the reaction can be carried out without solvent other than the compound of Formula 5, the ethynyltrimethylsilane and the amine base. Removal of the trimethylsilane group, to obtain a compound of Formula 4, can be done using well-known conditions such as treatment with an alkali metal hydroxide or carbonate such as potassium hydroxide, sodium hydroxide or potassium carbonate in methanol or ethanol. The reaction is preferably conducted in a suitable organic solvent. Typically, the method is most satisfactorily conducted at a temperature ranging from about 0° C. to the reflux temperature of the solvent. For representative procedures, see *JACS* 2003, 125(38), 11545-11552 and *Bioorganic & Medicinal Chemistry* 2009, 17(24), 8149-8160. Also, present Example 18, Steps A and B, illustrate the method of Scheme 4.

As shown in Scheme 5, Compounds of Formula 2 can also be prepared by Suzuki coupling of compounds of Formula 5 with boron intermediates of Formula 8 wherein A is bonded to the boron through a carbon atom ring member and is unsubstituted on a N atom ring member (i.e. A is a 5-membered heteroaromatic ring comprising ring members —NH— and —(CB(OH)$_2$)—). The reaction is run in the presence of Pd(0) or Pd(II) salts, a suitable ligand and a base. Suitable bases for this transformation are potassium carbonate or cesium carbonate, while Pd(II) salts such as Pd(OAc)$_2$ or PdCl$_2$ are used in conjunction with ligands such as triphenylphosphine or 1,1'-bis(diphenylphosphino)ferrocene (dppf). Conditions for Suzuki couplings are well documented in the literature; see, for example, *Angewandte Chemie International Edition* 2006, 45(21), 3484-3488 and *Tetrahedron Letters* 2002, 43(16), 2885-2888. Boron intermediates of Formula 8 are commercially available and can be prepared from corresponding halides or trifluoromethanesulfonates by methods known in the literature; see, for example, PCT Patent Publication WO 2007/043278; U.S. Pat. No. 8,080,566*; Organic Letters* 2011, 13(6), 1366-1369*; European Journal of Medicinal Chemistry* 2014, 87, 529-539 and *Organic Letters* 2012, 14(2), 600-603.

Other coupling procedures offer a number of alternatives for introduction of the heterocyclic A ring onto Formula 5, including coupling methods published by Heck, Stille and Kumada. Also see, for example, Zificsak et al., *Tetrahedron* 2004, 60, 8991-9016.

Scheme 5

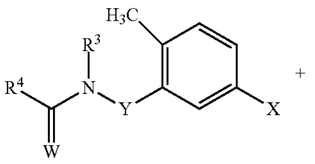

5

X is halogen, $CF_3SO_3$ or $B(OH)_2$

Scheme 4

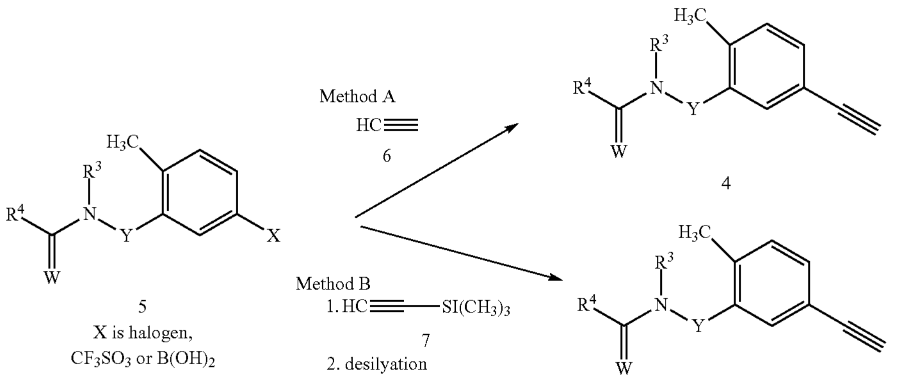

5

X is halogen, $CF_3SO_3$ or $B(OH)_2$

4

4

-continued

8 wherein A is bonded to boron through a carbon atom ring member and is unsubstituted on a N atom ring member (i.e. A is a 5-membered heteroaromatic ring comprising ring members —NH— and —($CB(OH)_2$—)

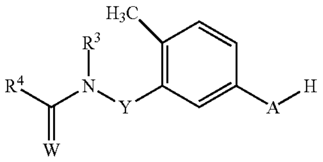

2 wherein A is unsubstituted on a N atom ring member (i.e. A is a 5-membered heteroaromatic ring comprising a ring member —NH—)

As shown in Scheme 6, compounds of Formula 5 can be prepared by reacting an amine of Formula 9 with an acid chloride of Formula 10 in the presence of a base such as potassium carbonate, triethylamine or pyridine. The reaction can be carried out without solvent other than the compounds of Formulae 9, 10 and the base, or in a solvent such as acetonitrile, dichloromethane, chloroform, diethyl ether or tetrahydrofuran at temperatures ranging from about 0 to 50° C. For reaction conditions see for example, PCT Patent Publication WO 2004/037770 and European patent EP 1586552. Also, the method of Scheme 6 is illustrated in present Example 18, Step D.

For synthesis of compounds of Formula 10, see *Advanced Organic Synthesis, 4th Edition*, Wiley & Sons 1992, 437, and references cited therein. Compounds of Formula 9 are commercially available and can be easily synthesized by general methods known to one skilled in the art.

Scheme 6

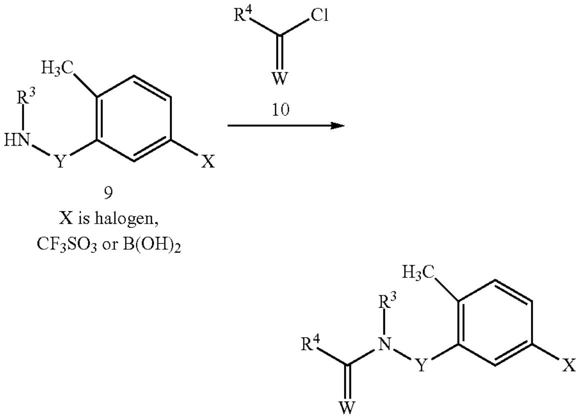

10

9

X is halogen, $CF_3SO_3$ or $B(OH)_2$

5

X is halogen, $CF_3SO_3$ or $B(OH)_2$

As shown in Scheme 7, compounds of Formula 1 can also be prepared by reaction with of acid chloride of Formula 10 with a compound of Formula 11, analogous to the method of Scheme 6. The method of Scheme 7 is illustrated in present Example 17, Step F.

Scheme 7

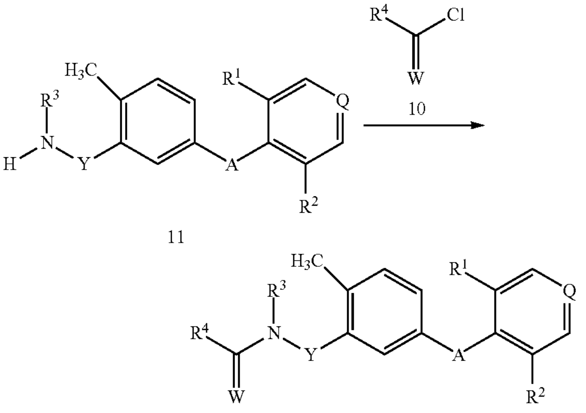

10

11

1

As shown in Scheme 8, compounds of Formula 11 can be prepared from nitriles of Formula 12 using an appropriate reducing agent such as lithium aluminum hydride or a borane/tetrahydrofuran complex or tris(pentafluorophenyl) borane in an aprotic solvent such as tetrahydrofuran at a temperature between ambient and the boiling point of the solvent. For related examples, see the procedures and references contained within PCT patent applications WO 2011/079102 and WO 2011/073444. Also, the method of Scheme 8 is illustrated in present Example 17, Step E.

Nitriles of Formula 12 can also be converted to amines of Formula 11 by catalytic hydrogenation. These reactions are traditionally carried out in the presence of a transition metal catalyst such as palladium(0) on carbon, Raney nickel, or platinum oxide in a lower alcohol solvent such as methanol or ethanol at a temperature between ambient and 100° C. under an atmosphere of hydrogen gas at a pressure between 1 and 7500 kPa. For related examples, see the procedures and references contained within PCT patent applications WO 2009/152868 and WO 2010/023161.

Scheme 8

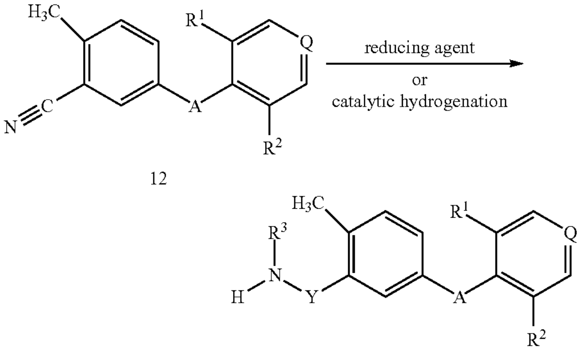

12

11

As shown in Scheme 9, compounds of Formula 12 can be prepared by coupling compounds of Formula 13 wherein A is unsubstituted on a N atom ring member (i.e. A is a 5-membered heteroaromatic ring comprising a ring member —NH—) with compounds of Formula 3 using a method analogous to Scheme 1. Present Example 17, Step A, illustrates the method of Scheme 9.

Scheme 9

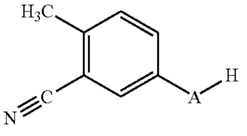

13 wherein A is unsubstituted on a N atom ring member (i.e. A is a 5-membered heteroaromatic ring comprising a ring memeber —NH— )

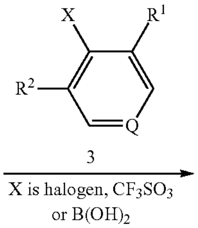

3

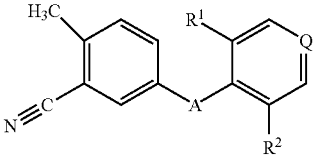

12

As shown in Scheme 10, compounds of Formula 13 can be prepared from compounds of Formula 14. In a typical procedure, a compound of Formula 14 is contacted with a cyanide salt such as copper(I) cyanide or zinc(II) cyanide, in the presence of a suitable transition metal-catalyst such as copper(I) iodide or tetrakis(triphenylphosphine) palladium (0), in a polar aprotic solvent such as N,N-dimethylformamide or dimethyl sulfoxide, at a temperature between about 50 to 150° C. For related procedures see PCT patent applications WO 2012/032528 and WO 2011/133882 and references contained within.

Scheme 10

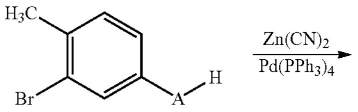

14 wherein A is unsubstituted on a N atom ring member (i.e. A is a 5-membered heteroaromatic ring comprising a ring memeber —NH— )

-continued

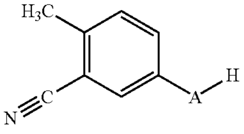

13 wherein A is unsubstituted on a N atom ring member (i.e. A is a 5-membered heteroaromatic ring comprising a ring memeber —NH— )

As shown in Scheme 11, compounds of Formula 14 can be prepared by first reacting a compound of Formula 15 with N,N-dimethylformamide dimethyl acetal (DMF-DMA) at a temperature between about 40 to 100° C. in a solvent such as toluene or benzene, to provide an intermediate compound of Formula 16. In a subsequent step, the compound of Formula 16 is reacted with hydrazine or a hydrazine salt in a lower alcohol solvent such as methanol or ethanol to provide a compound of Formula 14.

Scheme 11

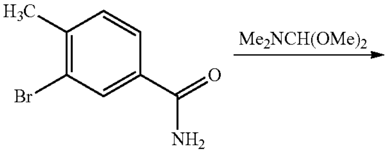

15

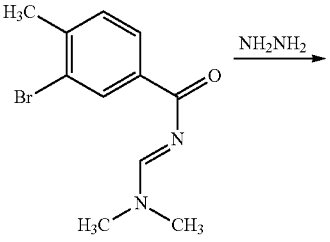

16

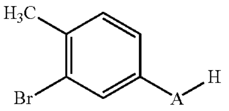

14 wherein A is unsubstituted on a N atom ring member (i.e. A is a 5-membered heteroaromatic ring comprising a ring memeber —NH— )

Compounds of Formula 1 and their intermediates described herein can be subjected to various electrophilic, nucleophilic, organometallic, oxidation and reduction reactions to add substituents or modify existing substituents, and thus provide other functionalized compounds of Formula 1. For example, as shown in Scheme 12, compounds of Formula 1c (i.e. Formula 1 wherein Q is $CR^6$ and $R^6$ is $NH_2$) can be prepared by reduction of corresponding nitro compounds of Formula 1b (i.e. Formula 1 wherein Q is $CR^6$ and $R^6$ is $NO_2$) using Fe, Zn or $SnCl_2$ in aqueous acidic solution at temperatures ranging from ambient to reflux. Alcohol co-solvents such as methanol, ethanol and i-propanol may also be employed. In a subsequent reaction, the amino group of Formula 1c can be converted to a halogen under diazotization conditions in the presence of a halogen source to provide a compound of Formula 1d (i.e. Formula 1 wherein Q is $CR^6$ and $R^6$ is halogen). A variety of halogen sources can be employed in the method of Scheme 12. For example, addition of tert-butyl nitrite to a solution of an amino compound of Formula 1c in the presence of copper(II) bromide in a solvent such as acetonitrile provides the corresponding bromide compound of Formula 1d; likewise, reaction with diiodomethane provides the corresponding iodo compound of Formula 1d. Compounds of Formula 1c can also be converted to a diazonium salt and then to a corresponding compound of Formula 1d by treatment with sodium nitrite in solvents such as water, acetic acid or trifluoroacetic acid, in the presence of a mineral acid typically containing the same halide atom (such as aqueous HI solution for $R^6$ being I), followed by treatment with the corresponding copper(I) or copper(II) salt according to general procedures well-known to those skilled in the art. Many known reduction, diazotization and halogenation methods can be readily adapted to prepare compounds of Formulae 1c and 1d, for example, see the procedures and references contained within U.S. patent applications US 2017/0121300, US 2017/069105, and US 2017/038909, and PCT patent application WO 2017/036357. Also, the method of Scheme 12 is illustrated in present Examples 3, 4 and 13.

Scheme 12

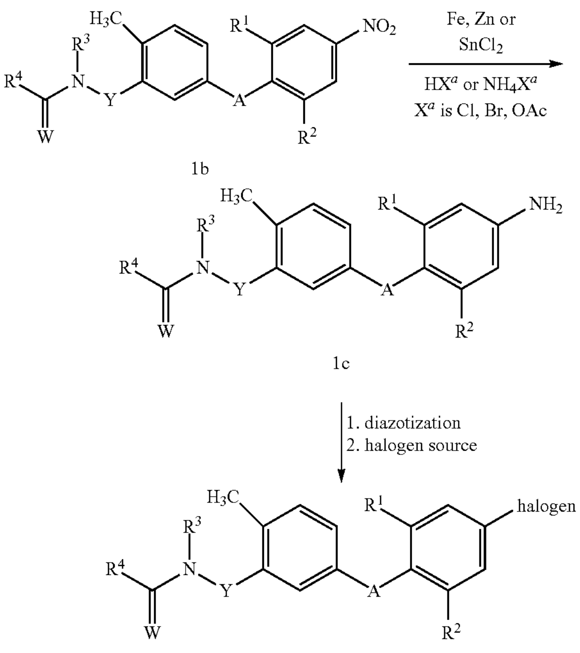

1b

1c

1d

The method of Scheme 12 provides just two examples of techniques for adding substituents or modifying existing substituents in compounds of Formula 1. One skilled in the art will recognize that compounds of Formula 1 can also be subjected to numerous reactions to provide other functionalized compounds of Formula 1. For example, aromatic halides of Formula 1 (e.g., Formula 1d wherein the halogen is Br or I) can react with alcohols or thiols under metal-catalyzed conditions to provide compounds of Formula 1 that contain an alkoxy or alkylthiol substituent (for conditions, see Example 15).

Compounds of Formula 1 and intermediates described in above methods wherein W is O can be converted to the corresponding thiolates wherein W is S using a variety of standard thiating reagents such as phosphorus pentasulfide or 2,4-bis(4-methoxyphenyl)-1,3-dithia-2,4-diphosphetane-2,4-disulfide (Lawesson's reagent). Reactions of this type are well-known see, for example, Heterocycles 1995, 40, 271-278*; Journal of Medicinal Chemistry* 2008, 51, 8124-8134*; Journal of Medicinal Chemistry* 1990, 33, 2697-706; Synthesis 1989, (5), 396-3977*; J. Chem. Soc., Perkin Trans.* 1, 1988, 1663-1668*; Tetrahedron* 1988 44, 3025-3036; and *Journal of Organic Chemistry* 1988 53(6), 1323-1326.

It is recognized that some reagents and reaction conditions described above for preparing compounds of Formula 1 may not be compatible with certain functionalities present in the intermediates. In these instances, the incorporation of protection/deprotection sequences or functional group interconversions into the synthesis will aid in obtaining the desired products. The use and choice of the protecting groups will be apparent to one skilled in chemical synthesis (see, for example, T. W. Greene and P. G. M. Wuts, *Protective Groups in Organic Synthesis,* 2nd ed.; Wiley: New York, 1991). One skilled in the art will recognize that, in some cases, after the introduction of a given reagent as it is depicted in any individual scheme, it may be necessary to perform additional routine synthetic steps not described in detail to complete the synthesis of compounds of Formula 1. One skilled in the art will also recognize that it may be necessary to perform a combination of the steps illustrated in the above schemes in an order other than that implied by the particular sequence presented to prepare the compounds of Formula 1.

Without further elaboration, it is believed that one skilled in the art using the preceding description can utilize the present invention to its fullest extent. The following examples are, therefore, to be construed as merely illustrative, and not limiting of the disclosure in any way whatsoever. Steps in the following examples illustrate a procedure for each step in an overall synthetic transformation, and the starting material for each step may not have necessarily been prepared by a particular preparative run whose procedure is described in other examples or steps.

Percentages are by weight except for chromatographic solvent mixtures or where otherwise indicated. Parts and percentages for chromatographic solvent mixtures are by volume unless otherwise indicated. $^1H$ NMR spectra are reported in ppm downfield from tetramethylsilane; "s" means singlet, "d" means doublet, "t" means triplet, "m" means multiplet, "br s" means broad singlet and "dd" means doublet of doublets. Mass spectra are reported as the molecular weight of the highest isotopic abundance parent ion (M+1) formed by addition of $H^+$ (molecular weight of 1) to the molecule, observed by using liquid chromatography coupled to a mass spectrometer (LCMS) using either atmospheric pressure chemical ionization ($AP^+$) or electrospray ionization ($ESI^+$).

Example 1

Preparation of methyl N-[[5-[1-(2,6-difluoro-4-methoxyphenyl)-1H-pyrazol-3-yl]-2-methylphenyl] methyl]carbamate (Compound 3)

To a mixture of methyl N-[[2-methyl-5-(1H-pyrazol-3-yl) phenyl]methyl]carbamate (1.12 g, 4.57 mmol) (see PCT Patent Publication WO 2008124092 for a method of preparation), copper(I) iodide (0.17 g, 0.914 mmol) and 2-bromo- 1,3-difluoro-5-methoxy-benzene (1.32 g, 5.94 mmol) was added potassium carbonate (11.4 mmol) followed by N,N-dimethylformamide (8 mL). Nitrogen gas was bubbled into the reaction mixture for 30 minutes, then trans-N,N'-dimethylcyclohexane-1,2-diamine (0.26 g, 1.83 mmol) was added. The reaction mixture was heated at 80° C. overnight, cooled to room temperature and diluted with ethyl acetate. The resulting mixture was washed with saturated aqueous sodium chloride solution (4×), dried over magnesium sulfate, filtered and concentrated under reduced pressure. The resulting material was purified by silica gel column chromatography (eluting with a gradient of 20 to 80% ethyl acetate in hexanes) to provide the title compound, a compound of the present invention, as a colorless oil (0.43 g).

$^1$H NMR ($CDCl_3$): δ 7.74 (d, 1H), 7.67 (dd, 1H), 7.59 (d, 1H), 7.22 (d, 1H), 6.74 (d, 1H), 6.61 (d, 2H), 4.87 (br s, 1H), 4.41 (d, 2H), 3.84 (s, 3H), 3.69 (s, 3H), 2.36 (s, 3H).

LCMS: m/z: 388 $[M+H]^+$

Example 2

Preparation of methyl N-[[5-[1-(2,6-difluoro-4-nitrophenyl)-1H-pyrazol-3-yl]-2-methylphenyl]methyl]carbamate (Compound 1)

To a stirred solution of methyl N-[[2-methyl-5-(1H-pyrazol-3-yl)phenyl]methyl]-carbamate (0.45 g, 1.84 mmol) (see PCT Patent Publication WO 2008124092 for a method of preparation) in dimethyl sulfoxide (5 mL) was added potassium carbonate (762 mg, 5.52 mmol) and 1,2,3-trifluoro-5-nitrobenzene (0.235 mL, 2.02 mmol). The reaction mixture was stirred at room temperature overnight and diluted with ethyl acetate. The resulting mixture washed with saturated aqueous sodium chloride solution (4×), dried over magnesium sulfate, filtered and concentrated under reduced pressure. The resulting material was purified by column chromatography (eluting with a gradient of 10 to 50% ethyl acetate in hexanes) to provide the title compound, a compound of the present invention, as a yellow solid (0.44 g).

$^1$H NMR ($CDCl_3$): δ 8.02 (d, 2H), 7.79 (dd, 1H), 7.75 (d, 1H), 7.69 (dd, 1H), 7.25 (d, 1H), 6.85 (d, 1H), 4.86 (br s, 1H), 4.44 (d, 2H), 3.71 (s, 3H), 2.38 (s, 3H).

Example 3

Preparation of methyl N-[[5-[1-(4-amino-2,6-difluorophenyl)-1H-pyrazol-3-yl]-2-methylphenyl]methyl]carbamate (Compound 5)

To a mixture of methyl N-[[5-[1-(2,6-difluoro-4-nitrophenyl)-1H-pyrazol-3-yl]-2-methylphenyl]methyl]carbamate (i.e. the product of Example 2) (0.4 g, 0.995 mmol) and ammonium chloride (32 mg, 0.597 mmol) in ethanol/water (9:1, 20 mL) was added iron powder (555 mg, 9.95 mmol) portionwise. The reaction mixture was heated at reflux for 1.5 h, and then cooled to room temperature and filtered through a pad of Celite® (diatomaceous filter aid), rinsing with ethyl acetate. The filtrate was washed with saturated aqueous sodium chloride solution (4×), dried over magnesium sulfate, filtered and concentrated under reduced pressure. The resulting material was purified by silica gel column chromatography (eluting with a gradient of 30 to 100% ethyl acetate in hexanes) to provide the title compound, a compound of the present invention, as a light-yellow solid (0.3 g).

$^1$H NMR ($CDCl_3$): δ 7.75 (d, 1H), 7.66 (dd, 1H), 7.56 (d, 1H), 7.21 (d, 1H), 6.72 (d, 1H), 6.31 (d, 2H), 4.82 (br s, 1H), 4.41 (d, 2H), 4.04 (br s, 2H), 3.69 (s, 3H), 2.36 (s, 3H).

Example 4

Preparation of methyl N-[[5-[1-(4-bromo-2,6-difluorophenyl)-1H-pyrazol-3-yl]-2-methylphenyl]methyl]carbamate (Compound 7)

To a mixture of methyl N-[[5-[1-(4-amino-2,6-difluorophenyl)-1H-pyrazol-3-yl]-2-methylphenyl]methyl]carbamate (i.e. the product of Example 3) (90 mg, 0.242 mmol) in acetonitrile (2 mL) was added copper(II) bromide (65 mg, 0.290 mmol). The reaction mixture was cooled to about 0° C. and n-butyl nitrite (0.043 mL, 0.363 mmol) was added. The reaction mixture was stirred at room temperature overnight, and then quenched with hydrochloric acid (1 N aqueous solution). The resulting mixture was extracted with ethyl acetate (2×), and the combined extracts were dried over magnesium sulfate, filtered and concentrated under reduced pressure. The resulting material was purified by silica gel column chromatography (eluting with a gradient of 10 to 40% ethyl acetate in hexanes). The resulting material was further purified by column chromatography (eluting with a gradient of 0 to 10% ethyl acetate in dichloromethane) to provide the title compound, a compound of the present invention, as a yellow oil (49 mg).

$^1$H NMR ($CDCl_3$): δ 7.74 (d, 1H), 7.67-7.65 (m, 2H), 7.29 (d, 2H), 7.23 (d, 1H), 6.78 (d, 1H), 4.83 (br s, 1H), 4.42 (d, 2H), 3.70 (s, 3H), 2.37 (s, 3H).

LCMS: m/z: 436 $[M+H]^+$

Example 5

Preparation of methyl N-[[5-[1-(2,6-difluoro-4-hydroxyphenyl)-1H-pyrazol-3-yl]-2-methylphenyl]methyl]carbamate (Compound 10)

To a mixture of methyl N-[[5-[1-(2,6-difluoro-4-methoxyphenyl)-1H-pyrazol-3-yl]-2-methylphenyl]methyl]carbamate (i.e. the product of Example 1) (1.20 g, 3.10 mmol) in dichloromethane (30 mL) at 0° C. was added boron tribromide (1 M solution in dichloromethane, 9.40 mL, 9.30 mmol) dropwise. The reaction mixture was allowed to warm to room temperature and stirred overnight. The reaction mixture was slowly quenched with water (35 mL), followed by a dropwise addition of methanol (35 mL), and then stirred at room temperature for 1 h. The layers were separated and the aqueous layer was extracted with dichloromethane (2×). The combined organic extracts were dried over magnesium sulfate, filtered and concentrated under reduced pressure. The resulting material was purified by silica gel column chromatography (eluting with a gradient of 20 to 70% ethyl acetate in hexanes) to provide the title compound, a compound of the present invention, as a white solid (0.87 g).

$^1$H NMR ($CDCl_3$): δ 7.74 (br s, 1H), 7.63 (dd, 1H), 7.60 (d, 1H), 7.24 (d, 1H), 6.75 (d, 1H), 6.46 (d, 2H), 4.95 (br s, 1H), 4.42 (d, 2H), 3.69 (s, 3H), 2.37 (s, 3H).

Example 6

Preparation of methyl N-[[5-[1-[2,6-difluoro-4-(1-methylethoxy)phenyl]-1H-pyrazol-3-yl]-2-methylphenyl]methyl]carbamate (Compound 14)

To a mixture of methyl N-[[5-[1-(2,6-difluoro-4-hydroxyphenyl)-1H-pyrazol-3-yl]-2-methylphenyl]methyl]carbamate (i.e. the product of Example 5) (87 mg) in tetrahydrofuran (3 mL) was added triphenylphosphine (122 mg, 0.46 mmol), followed by 2-propanol (0.035 mL, 0.46 mmol) and diethyl azodicarboxylate (0.073 mL, 0.46 mmol). The reaction mixture was stirred at room temperature for 48 h and concentrated under reduced pressure. The resulting material was purified by silica gel column chromatography (eluting with a gradient of 10 to 50% ethyl acetate in hexanes) to provide the title compound, a compound of the present invention, as a white solid (85 mg).

$^1$H NMR ($CDCl_3$): δ 7.75 (d, 1H), 7.67 (dd, 1H), 7.59 (d, 1H), 7.22 (d, 1H), 6.74 (d, 1H), 6.58 (d, 2H), 4.54 (m, 1H), 4.83 (br s, 1H), 4.42 (d, 2H), 3.70 (s, 3H), 2.36 (s, 3H), 1.37 (d, 6H).

LCMS: m/z: 416 $[M+H]^+$

Example 7

Preparation of methyl 3,5-difluoro-4-[3-[3-[[(methoxycarbonyl)amino]methyl]-4-methylphenyl]-1H-pyrazol-1-yl]benzoate (Compound 70)

To a mixture of methyl N-[[2-methyl-5-(1H-pyrazol-3-yl)phenyl]methyl]carbamate (2.58 g, 10.5 mmol) (see PCT Patent Publication WO 2008124092 for a method of preparation) and methyl 3,4,5-trifluorobenzoate (2.41 g, 12.6 mmol) in dimethyl sulfoxide (10 mL) was added potassium carbonate (4.35 g, 31.5 mmol). The reaction mixture was stirred at room temperature for 48 h and diluted with ethyl acetate. The resulting mixture was washed with saturated aqueous ammonium chloride solution (4×), dried over magnesium sulfate, filtered and concentrated under reduced pressure. The resulting material was purified by column chromatography (eluting with a gradient of 10 to 50% ethyl acetate in hexanes) to provide the title compound, a compound of the present invention, as a light pink solid (3.55 g).

$^1$H NMR ($CDCl_3$): δ 7.76 (d, 2H), 7.74 (m, 2H), 7.68 (d, 1H), 7.24 (d, 1H), 6.80 (d, 1H), 4.87 (br s, 1H), 4.42 (d, 2H), 3.97 (s, 3H), 3.70 (s, 3H), 2.37 (s, 3H).

Example 8

Preparation of methyl N-[[5-[1-[2,6-difluoro-4-(hydroxymethyl)phenyl]-1H-pyrazol-3-yl]-2-methylphenyl]methyl]carbamate (Compound 71)

To a mixture of methyl 3,5-difluoro-4-[3-[3-[[(methoxycarbonyl)amino]methyl]-4-methylphenyl]-1H-pyrazol-1-yl]benzoate (i.e. the product Example 7) (3.55 g, 8.55 mmol) in methanol (45 mL) was added sodium borohydride (1.94 g, 51.3 mmol) portionwise. The reaction mixture was stirred at room temperature overnight, then quenched with hydrochloric acid (1 N aqueous solution) and filtered. The filtrate was extracted with ethyl acetate (3×) and the combined extracts were dried over magnesium sulfate, filtered and concentrated under reduced pressure. The resulting material was purified by silica gel column chromatography (eluting with a gradient of 20 to 100% ethyl acetate in hexanes) to provide the title compound, a compound of the present invention, as a white solid (2.52 g).

$^1$H NMR (DMSO-$d_6$): S 8.11 (d, 1H), 7.73 (d, 1H), 7.65 (t, 1H), 7.62 (dd, 1H), 7.29 (d, 1H), 7.22 (d, 1H), 6.94 (d, 1H), 5.59 (t, 1H), 4.60 (d, 2H), 4.21 (d, 2H), 3.55 (s, 3H), 2.30 (s, 3H).

Example 9

Preparation of methyl N-[[5-[1-(2,6-difluoro-4-formylphenyl)-1H-pyrazol-3-yl]-2-methylphenyl]methyl]carbamate (Compound 67)

To a mixture of methyl N-[[5-[1-[2,6-difluoro-4-(hydroxymethyl)phenyl]-1H-pyrazol-3-yl]-2-methylphenyl]methyl]carbamate (i.e. the product of Example 8) (2.30 g, 5.94 mmol) in tetrahydrofuran (70 mL) was added Dess-Martin periodinane (2.52 g, 5.94 mmol) portionwise. The reaction mixture was stirred at room temperature overnight, then quenched with aqueous sodium carbonate solution and extracted with ethyl acetate (2×). The combined extracts were filtered, rising with ethyl acetate. The filtrate was washed with saturated aqueous sodium bicarbonate solution (3×), dried over magnesium sulfate, filtered and concentrated under reduced pressure. The resulting material was purified by silica gel column chromatography (eluting with a gradient of 20 to 60% ethyl acetate in hexanes) to provide the title compound, a compound of the present invention, as a white solid (1.78 g).

$^1$H NMR ($CDCl_3$): δ 9.98 (t, 1H), 7.76 (m, 2H), 7.69 (dd, 1H), 7.62 (d, 2H), 7.24 (d, 1H), 6.83 (d, 1H), 4.86 (br s, 1H), 4.43 (d, 2H), 3.71 (s, 3H), 2.38 (s, 3H).

Example 10

Preparation of methyl N-[[5-[1-[4-(difluoromethyl)-2,6-difluorophenyl]-1H-pyrazol-3-yl]-2-methylphenyl]methyl]carbamate (Compound 87)

To a mixture of methyl N-[[5-[1-(2,6-difluoro-4-formylphenyl)-1H-pyrazol-3-yl]-2-methylphenyl]methyl]carbamate (i.e. the product of Example 9) (0.25 g, 0.65 mmol) in dichloromethane (10 mL) at about 0° C. was added Deoxo-Fluor® (0.36 mL, 1.95 mmol) dropwise, followed by ethanol (1 drop). The reaction mixture was stirred at room temperature overnight, and then slowly poured into a solution of saturated aqueous sodium carbonate (200 mL). After 30 minutes, the layers were separated, and the aqueous layer was extracted with dichloromethane (1×). The combined organics were dried over magnesium sulfate, filtered and concentrated under reduced pressure. The resulting material was purified by silica gel column chromatography (eluting with a gradient of 10 to 50% ethyl acetate in hexanes) to provide the title compound, a compound of the present invention, as a colorless oil (0.23 g).

$^1$H NMR ($CDCl_3$): δ 7.75 (d, 1H), 7.71-7.68 (m, 2H), 7.27 (d, 2H), 7.23 (d, 1H), 6.80 (d, 1H), 6.78-6.55 (t, 1H), 4.85 (br s, 1H), 4.42 (d, 2H), 3.70 (s, 3H), 2.37 (s, 3H).

LCMS: m/z: 408 $[M+H]^+$

Example 11

Preparation of methyl N-[[5-[1-(4-acetyl-2,6-difluorophenyl)-1H-pyrazol-3-yl]-2-methylphenyl]methyl]carbamate (Compound 68)

To a mixture of methyl N-[[2-methyl-5-(1H-pyrazol-3-yl)phenyl]methyl]carbamate (2.0 g, 8.16 mmol) (see PCT Patent Publication WO 2008124092 for a method of preparation) and 1-(3,4,5-trifluorophenyl)ethanone (2.0 g, 11.4 mmol) in dimethyl sulfoxide (9 mL) was added potassium carbonate (3.38 g, 24.5 mmol). The reaction mixture was stirred at room temperature overnight, and then diluted with ethyl acetate. The resulting mixture was washed with saturated aqueous ammonium chloride solution (4×), dried over magnesium sulfate, filtered and concentrated under reduced pressure. The resulting material was purified by silica gel column chromatography (eluting with a gradient of 10 to 70% ethyl acetate in hexanes) to provide the title compound, a compound of the present invention, as a pale-orange solid (2.10 g).

$^1$H NMR ($CDCl_3$): δ 7.75 (m, 2H), 7.69 (dd, 1H), 7.67 (d, 2H), 7.24 (d, 1H), 6.81 (d, 1H), 4.87 (br s, 1H), 4.43 (d, 2H), 3.70 (s, 3H), 2.64 (s, 3H), 2.37 (s, 3H).

Example 12

Preparation of methyl (E)-N-[[5-[1-[2,6-difluoro-4-[1-(methoxyimino)ethyl]phenyl]-1H-pyrazol-3-yl]-2-methylphenyl]methyl]carbamate (Compound 83)

A mixture of methyl N-[[5-[1-(4-acetyl-2,6-difluorophenyl)-1H-pyrazol-3-yl]-2-methylphenyl]methyl]carbamate (i.e. the product of Example 11) (0.24 g, 0.602 mmol), O-methylhydroxylamine hydrochloride (60.3 mg, 0.722 mmol) and sodium acetate (59.2 mg, 0.722 mmol) in ethanol was heated at reflux overnight. The reaction mixture was cooled to room temperature and diluted with water. The resulting mixture was extracted with ethyl acetate (2×) and the combined extracts were dried over magnesium sulfate, filtered and concentrated under reduced pressure to provide the title compound, a compound of the present invention, as an amber-colored solid (239 mg).

$^1$H NMR ($CDCl_3$): δ 7.75 (d, 1H), 7.68 (m, 2H), 7.41 (d, 2H), 7.23 (d, 1H), 6.78 (d, 1H), 4.85 (br s, 1H), 4.42 (d, 2H), 4.04 (s, 3H), 3.70 (s, 3H), 2.37 (s, 3H), 2.21 (s, 3H).

LCMS: m/z: 429 $[M+H]^+$

Example 13

Preparation of methyl N-[[5-[1-(2,6-difluoro-4-iodophenyl)-1H-pyrazol-3-yl]-2-methylphenyl]methyl]carbamate (Compound 8)

To a mixture of methyl N-[[5-[1-(4-amino-2,6-difluorophenyl)-1H-pyrazol-3-yl]-2-methylphenyl]methyl]carbamate (i.e. the product of Example 3) (2.38 g, 6.40 mmol) in acetonitrile (50 mL) was added diiodomethane (2.1 mL, 25.6 mmol). The reaction mixture was cooled to about 0° C., and then tert-butyl nitrite (0.84 mL, 7.04 mmol) was added dropwise. The reaction mixture was stirred at room temperature for 5 h, and then more diiodomethane (12 mL, 150 mmol) was added. After stirring overnight, the reaction mixture was diluted with ethyl acetate and washed with saturated sodium metabisulfite solution (3×), saturated sodium chloride solution (2×) and hydrochloric acid (1 N aqueous solution). The mixture was dried over magnesium sulfate, filtered and concentrated under reduced pressure. The resulting material was purified by silica gel column chromatography (eluting with a gradient of 0 to 10% ethyl acetate in hexanes) to provide the title compound, a compound of the present invention, as an off-white solid (1.0 g).

$^1$H NMR ($CDCl_3$): δ 7.73 (d, 1H), 7.66-7.64 (m, 2H), 7.47 (d, 2H), 7.22 (d, 1H), 6.77 (d, 1H), 4.86 (br s, 1H), 4.42 (d, 2H), 3.70 (s, 3H), 2.36 (s, 3H).

Example 14

Preparation of methyl N-[[5-[1-(4-ethynyl-2,6-difluorophenyl)-1H-pyrazol-3-yl]-2-methylphenyl]methyl]carbamate (Compound 53)

Step A: Preparation of methyl N-[[5-[1-(2,6-difluorophenyl-4-(2-(trimethylsilyl)ethynyl)-1H-pyrazol-3-yl]-2-methylphenyl]methyl]carbamate To a mixture of methyl N-[[5-[1-(2,6-difluoro-4-iodophenyl)-1H-pyrazol-3-yl]-2-methylphenyl]methyl]carbamate (i.e. the product of Example 13) (0.2 g, 0.414 mmol), copper(I) iodide (8 mg, 0.041 mmol), N,N-dimethylformamide (4 mL), ethynyltrimethylsilane (0.088 mL, 0.621 mmol) and dichlorobis(triphenylphosphine)palladium (29 mg, 0.041 mmol) was added triethylamine (0.063 mL, 0.455 mmol). The reaction mixture was stirred at room temperature overnight, then diluted with ethyl acetate, washed with saturated sodium chloride solution (4×), dried over magnesium sulfate, filtered and concentrated under reduced pressure. The resulting material was purified by silica gel column chromatography (eluting with a gradient of 5 to 40% ethyl acetate in hexanes) to provide the title compound as a light brown oil (0.17 g).

$^1$H NMR ($CDCl_3$): δ 7.74 (d, 1H), 7.67 (m, 2H), 7.23 (d, 1H), 7.16 (d, 2H), 6.77 (d, 1H), 4.84 (br s, 1H), 4.42 (d, 2H), 3.70 (s, 3H), 2.37 (s, 3H), 0.27 (s, 9H).

Step B: Preparation of methyl N-[[5-[1-(4-ethynyl-2,6-difluorophenyl)-1H-pyrazol-3-yl]-2-methylphenyl]methyl]carbamate (Compound 53)

To a mixture of methyl N-[[5-[1-(2,6-difluorophenyl-4-(2-(trimethylsilyl)ethynyl)-1H-pyrazol-3-yl]-2-methylphenyl]methyl]carbamate (i.e. the product of Step A) (0.12 g, 0.265 mmol) in methanol (6 mL) was added potassium carbonate (44 mg, 0.318 mmol). The reaction mixture was stirred at room temperature for 1.5 h, then diluted with ethyl acetate and water, and allowed to stand at room temperature overnight. The resulting mixture was washed with saturated sodium chloride solution (2×), dried over magnesium sulfate, filtered and concentrated under reduced pressure. The resulting material was purified by silica gel column chromatography (eluting with a gradient of 10 to 50% ethyl acetate in hexanes) to provide the title compound, a compound of the present invention, as an amber oil (0.109 g).

$^1$H NMR ($CDCl_3$): δ 7.75 (d, 1H), 7.68-7.66 (m, 2H), 7.23 (d, 1H), 7.20 (d, 2H), 6.78 (d, 1H), 4.84 (br s, 1H), 4.42 (d, 2H), 3.70 (s, 3H), 3.24 (s, 1H), 2.37 (s, 3H).

LCMS m/z: 382 $[M+H]^+$

Example 15

Preparation of methyl N-[[5-[1-[4-[(1,1-dimethylethyl)thio]-2,6-difluorophenyl]-1H-pyrazol-3-yl]-2-methylphenyl]methyl]carbamate (Compound 42)

A mixture of methyl N-[[5-[1-(2,6-difluoro-4-iodophenyl)-1H-pyrazol-3-yl]-2-methylphenyl]methyl]carbamate (i.e. the product of Example 13) (0.217 g, 0.450 mmol) and N,N-dimethylformamide (2 mL) was purged with a stream of nitrogen gas for 10 to 15 minutes, and then tetrakis (triphenylphosphine)palladium (52 mg, 0.045 mmol) was added, followed by 2-methyl-2-propanethiol (0.100 mL, 0.900 mmol) and triethylamine (0.20 mL, 1.35 mmol). The reaction mixture was heated at 70° C. for 1 h, then cooled to room temperature, and diluted with ethyl acetate. The resulting mixture was washed with saturated sodium chloride solution (3×), dried over magnesium sulfate, filtered and concentrated under reduced pressure. The resulting material was purified by silica gel column chromatography (eluting with a gradient of 10 to 50% ethyl acetate in hexanes) to provide the title compound, a compound of the present invention, as an orange oil (0.189 g).

$^1$H NMR ($CDCl_3$): δ 7.75 (d, 1H), 7.69-7.67 (m, 2H), 7.27 (d, 2H), 7.23 (d, 1H), 6.79 (d, 1H), 4.84 (br s, 1H), 4.42 (d, 2H), 3.70 (s, 3H), 2.37 (s, 3H), 1.37 (s, 9H).

Example 16

Preparation of methyl N-[[5-[1-[4-[(difluoromethyl)thio]-2,6-difluorophenyl]-1H-pyrazol-3-yl]-2-methylphenyl]methyl]carbamate (Compound 43)

Step A: Preparation of methyl N-[[5-[1-(2,6-difluoro-4-mercaptophenyl)-1H-pyrazol-3-yl]-2-methylphenyl]methyl]carbamate To a mixture of methyl N-[[5-[1-[4-[(1,1-dimethylethyl)thio]-2,6-difluorophenyl]-1H-pyrazol-3-yl]-2-methylphenyl]methyl]carbamate (i.e. the product of Example 15) (0.16 g, 0.360 mmol) in dichloromethane (5 mL) at about 0° C. was added boron tribromide (1 M solution in dichloromethane, 1.10 mL, 1.08 mmol) dropwise. The reaction mixture was stirred at room temperature overnight and quenched water (6 mL) and methanol (6 mL). After stirring for 2 h, the layers were separated and the aqueous layer was extracted with dichloromethane (2×). The combined organics were dried over magnesium sulfate, filtered and concentrated under reduced pressure. The resulting material was purified by silica gel column chromatography (eluting with a gradient of 20 to 100% ethyl acetate in hexanes) to provide the title compound as a solid (77 mg).

$^1$H NMR ($CDCl_3$): δ 7.74 (d, 1H), 7.67 (dd, 1H), 7.62 (m, 1H), 7.22 (d, 1H), 6.98 (d, 2H), 6.75 (d, 1H), 4.83 (br s, 1H), 4.42 (d, 2H), 3.70 (s, 3H), 2.36 (s, 3H).

Step B: Preparation of methyl N-[[5-[1-[4-[(difluoromethyl)thio]-2,6-difluorophenyl]-1H-pyrazol-3-yl]-2-methylphenyl]methyl]carbamate To a mixture of methyl N-[[5-[1-(2,6-difluoro-4-mercaptophenyl)-1H-pyrazol-3-yl]-2-methylphenyl]methyl]carbamate (i.e. the product of Step A) (77 mg, 0.198 mmol) in acetonitrile and water (1:1, 2 mL) was added potassium hydroxide (222 mg, 3.96 mmol), followed by diethyl (bromodifluoromethyl)phosphonate (0.070 mL, 0.396 mmol). The reaction mixture was stirred at room temperature for 1.5 h, and then diluted with ethyl acetate. The resulting mixture was washed with saturated sodium chloride solution (2×), dried over magnesium sulfate, filtered and concentrated under reduced pressure. The resulting material was purified by silica gel column chromatography (eluting with a gradient of 10 to 50% ethyl acetate in hexanes) to provide the title compound, a compound of the present invention, as an off-white solid (64 mg).

$^1$H NMR ($CDCl_3$): δ 7.75 (d, 1H), 7.70-7.68 (m, 2H), 7.34 (d, 2H), 7.24 (d, 1H), 7.02-6.80 (t, 1H), 6.80 (d, 1H), 4.84 (br s, 1H), 4.42 (d, 2H), 3.70 (s, 3H), 2.37 (s, 3H).

LCMS m/z: 440 $[M+H]^+$

Example 17

Preparation of methyl N-[[5-[1-(2,6-dichloro-4-cyclopropylphenyl)-1H-pyrazol-3-yl]-2-methylphenyl]methyl]carbamate (Compound 65)

Step A: Preparation of 5-[1-(2,6-dichloro-4-nitrophenyl)-1H-pyrazol-3-yl]-2-methylbenzonitrile A mixture of 2-methyl-5-(1H-pyrazol-3-yl)benzonitrile (3.0 g, 16.4 mmol) (see PCT Patent Publication WO 2014066120 for a method of preparation), 1,3-dichloro-2-fluoro-5-nitrobenzene (4.12 g, 19.6 mmol) and potassium carbonate (2.72 g, 19.6 mmol) in N,N-dimethylformamide (51 mL) was heated at 80° C. for 4 h, and then stirred overnight at room temperature. The reaction mixture was diluted with water and the resulting precipitate was collected by filtration and rinsed with water. The solid precipitate was triturated in a mixture of hexanes/1-chlorobutane, filtered and air-dried, to provide the title compound (3.59 g).

$^1$H NMR ($CDCl_3$): δ 8.37 (s, 2H), 8.11 (s, 1H), 7.96 (d, 1H), 7.64 (s, 1H), 7.38 (d, 1H), 6.87 (s, 1H), 2.60 (s, 3H).

Step B: Preparation of 5-[1-(4-amino-2,6-dichlorophenyl)-1H-pyrazol-3-yl]-2-methylbenzonitrile To a mixture of tin(II) chloride dihydrate (12.82 g, 56.82 mmol), acetic acid (51.78 mL) and concentrated hydrochloric acid (34.57 mL) was added 5-[1-(2,6-dichloro-4-nitrophenyl)-1H-pyrazol-3-yl]-2-methylbenzonitrile (i.e. the product of Step A) (6.07 g, 16.26 mmol) portionwise while maintaining the reaction temperature at about 25° C. The reaction mixture was stirred overnight, and then slowly poured into a mixture of potassium hydroxide (200 g), water (200 g) and ice (400 g). The resulting solid precipitate was collected by filtration and dried to provide the title product (6.8 g).

$^1$H NMR ($CDCl_3$): δ 8.22 (s, 1H), 7.98 (d, 1H), 7.55 (s, 1H), 7.35 (d, 1H), 6.76 (s, 1H), 6.71 (s, 2H), 4.06 (s, 2H), 2.57 (s, 3H).

Step C: Preparation of 5-[1-(4-bromo-2,6-dichlorophenyl)-1H-pyrazol-3-yl]-2-methylbenzonitrile A mixture of 5-[1-(4-amino-2,6-dichlorophenyl)-1H-pyrazol-3-yl]-2-methylbenzonitrile (i.e. the product of Step B) (6.75 g, 18.67 mmol) and n-butyl nitrite (27.38 mL, 233.7 mmol) was heated at reflux overnight, then cooled to room temperature and concentrated under reduced pressure. The resulting material was purified by silica gel column chromatography (eluting with 20% ethyl acetate in hexanes) to provide the title compound (4.3 g).

$^1$H NMR ($CDCl_3$): δ 8.22 (s, 1H), 7.96 (d, 1H), 7.66 (s, 2H), 7.58 (s, 1H), 7.36 (d, 1H), 6.80 (s, 1H), 2.57 (s, 3H).

Step D: Preparation of 5-[1-(2,6-dichloro-4-cyclopropylphenyl)-1H-pyrazol-3-yl]-2-methylbenzonitrile A mixture of 5-[1-(4-bromo-2,6-dichlorophenyl)-1H-pyrazol-3-yl]-2-methylbenzonitrile (i.e. the product of Step C) (2.19 g, 5.37 mmol), cyclopropylboronic acid (0.53 g, 6.31 mmol), sodium carbonate (1.99 g, 18.75 mmol) and bis(triphenylphosphine)palladium(II) dichloride (0.46 g, 0.66 mmol) in 1,2-dimethoxyethane (43.7 mL) and water (10.03 mL) was heated at 85° C. overnight. The reaction mixture was cooled to room temperature and partitioned between water and ethyl acetate. The organic layer was separated, dried over magnesium sulfate, filtered and concentrated under reduced pressure. The resulting material was purified by silica gel column chromatography (eluting with a gradient of 0 to 10% ethyl acetate in hexanes) to provide the title compound (0.90 g).

$^1$H NMR ($CDCl_3$): δ 8.13 (s, 1H), 7.97 (d, 1H), 7.55 (s, 1H), 7.34 (d, 1H), 7.15 (s, 2H), 6.78 (s, 1H), 2.57 (s, 3H), 1.98-1.90 (m, 1H), 1.14-1.08 (m, 2H), 0.81-0.75 (m, 2H).

Step E: Preparation of 5-[1-(2,6-dichloro-4-cyclopropylphenyl)-1H-pyrazol-3-yl]-2-methylbenzenemethanamine hydrochloride To a mixture of 5-[1-(2,6-dichloro-4-cyclopropylphenyl)-1H-pyrazol-3-yl]-2-methylbenzonitrile (i.e. the product of Step D) (0.88 g, 2.39 mmol) in dichloromethane (5 mL) was added tris(2,3,4,5,6-pentafluorophenyl)borane (0.01 g, 0.07 mmol), followed by diethylsilane (0.53 g, 5.97 mmol). The reaction mixture was stirred at room temperature overnight, cooled to about 0-5° C., and then hydrochloric acid (4 N solution in dioxane, 2.02 mL) was added dropwise. The resulting precipitate was collected by filtration and air-dried to provide the title compound as a solid (0.82 g).

$^1$H NMR ($CDCl_3$): δ 8.30 (br s, 3H), 8.03 (s, 1H), 7.95 (s, 1H), 7.77 (d, 1H), 7.43 (s, 2H), 7.32 (d, 1H), 6.97 (s, 1H), 3.57 (s, 2H), 2.36 (s, 3H), 2.13-2.05 (m, 1H), 1.14-1.05 (m, 2H), 0.91-0.85 (m, 2H).

Step F: Preparation of methyl N-[[5-[1-(2,6-dichloro-4-cyclopropylphenyl)-1H-pyrazol-3-yl]-2-methylphenyl]methyl]carbamate To a mixture of 5-[1-(2,6-dichloro-4-cyclopropylphenyl)-1H-pyrazol-3-yl]-2-methylbenzenemethanamine hydrochloride (i.e. the product of Step E) (0.82 g, 2.01 mmol) and potassium carbonate (0.83 g, 6.02 mmol) in acetonitrile (10 mL) at about 0-5° C. was added methyl chloroformate (0.21 g, 2.21 mmol). The reaction mixture was stirred overnight at room temperature and concentrated under reduced pressure. The resulting material was purified by silica gel column chromatography (eluting with a gradient of 0% to 100% ethyl acetate in hexanes) to provide the title compound, a compound of the present invention, as a solid (0.87 g).

$^1$H NMR ($CDCl_3$): δ 7.78 (s, 1H), 7.70 (d, 1H), 7.63 (s, 1H), 7.22 (d, 1H), 7.15 (s, 2H), 6.76 (s, 1H), 4.82 (br s, 1H), 4.41 (br s, 2H), 3.70 (s, 3H), 2.37 (s, 3H), 1.95-1.88 (m, 1H), 1.12-1.08 (m, 2H), 0.80-0.72 (m, 2H).

LCMS: m/z 430 $[M+H]^+$

Example 18

Preparation of methyl N-[[5-[2-(2,6-difluoro-4-nitrophenyl)-2H-1,2,3-triazol-4-yl]-2-methylphenyl]methyl]carbamate (Compound 118), and methyl N-[[5-[1-(2,6-difluoro-4-nitrophenyl)-1H-1,2,3-triazol-4-yl]-2-methylphenyl]methyl]carbamate (Compound 132)

Step A: Preparation of 2-methyl-5-[2-(trimethylsilyl)ethynyl]benzonitrile

To a mixture of 2-amino-5-bromobenzonitrile (50 g, 255 mmol) and ethynyltrimethylsilane (181 mL, 1275 mmol) in tetrahydrofuran (600 mL) was added bis(triphenylphosphine)palladium(II) dichloride (26 g, 38 mmol), copper(I) iodide (14.5 g, 76.5 mmol), triphenylphosphine (20 g, 76.5 mmol) and triethylamine (600 mL). The reaction mixture was stirred at room temperature for 24 h and concentrated under reduced pressure. The resulting material was purified by silica gel column chromatography (eluting with 5% ethyl acetate in petroleum ether) to provide the title compound as a solid (45 g).

$^1$H NMR ($CDCl_3$): δ 7.68 (d, 1H), 7.63 (dd, 1H), 7.24 (s, 1H), 2.53 (s, 3H), 0.24 (s, 9H).

Step B: Preparation of 5-ethynyl-2-methylbenzonitrile

To a mixture of 2-methyl-5-[2-(trimethylsilyl)ethynyl]benzonitrile (i.e. the product of Step A) (40 g, 187.7 mmol) in methanol (800 mL) was added potassium hydroxide (67 mL, 1% in methanol). The reaction mixture was stirred at room temperature for 16 h, and then distilled to remove the methanol. The resulting mixture was diluted with water (200 mL) and extracted with ethyl acetate. The combined organic extracts were washed with saturated sodium chloride solution, dried over sodium sulfate, filtered and concentrated under reduced pressure. The resulting material was purified by silica gel column chromatography (eluting with 12% ethyl acetate in petroleum ether) to provide the title compound as a solid (15 g).

$^1$H NMR ($CDCl_3$): δ 7.70 (d, 1H), 7.57 (dd, 1H), 7.28 (d, 1H), 3.12 (s, 1H), 2.55 (s, 3H).

Step C: Preparation of 5-ethynyl-2-methylbenzenemethanamine hydrochloride

To a mixture of diphenylsilane (81 mL, 443 mmol) in chloroform (250 mL) was added tris(2,3,4,5,6-pentafluorophenyl)borane, (2.7 g, 5.3 mmol), followed by a solution of 5-ethynyl-2-methylbenzonitrile (i.e. the product of Step B) (25 g, 177.3 mmol) in chloroform. The reaction mixture was stirred at room temperature for 16 h and concentrated under reduce pressure. Hydrochloric acid (2 N solution in diethyl ether) was added to the resulting material and the mixture was stirring for 1 h.

The resulting solid precipitate was collected by filtration and dried to provide the title compound as a solid (30 g).

$^1$H NMR (DMSO-$d_6$): δ 8.26 (br s, 3H), 7.53 (s, 1H), 7.37-7.39 (m, 1H), 7.27-7.25 (m, 1H), 4.19 (s, 1H), 4.01 (s, 2H), 2.35 (s, 3H).

Step D: Preparation of methyl [(5-ethynyl-2-methylphenyl)methyl]carbamate

To a mixture of 5-ethynyl-2-methylbenzenemethanamine hydrochloride (i.e. the product of Step C) (30 g, 165.7 mmol) and potassium carbonate (68.5 g, 497 mmol) in acetonitrile (330 mL) at 0° C. was added methyl chloroformate (23.3 g, 248.6 mmol) dropwise over 20 minutes. The reaction mixture was stirred at room temperature for 16 h, then diluted with water (200 mL) and extracted with ethyl acetate. The combined organic extracts were washed with saturated sodium chloride solution, dried over sodium sulfate, filtered and concentrated under reduced pressure. The resulting material was purified by column chromatography (eluting with 30% ethyl acetate in petroleum ether) to provide the title compound as a solid (25 g).

$^1$H NMR ($CDCl_3$): δ 7.38 (br s, 1H), 7.33-7.31 (m, 1H), 7.13-7.11 (m, 1H), 4.83 (br s, 1H) 4.34 (d, 2H), 3.71 (s, 3H), 3.04 (s, 1H), 2.32 (s, 3H).

Step E: Preparation of methyl N-[[5-(1H-1,2,3-triazol-4-yl)-2-methylphenyl]methyl]-carbamate To a mixture of methyl [(5-ethynyl-2-methylphenyl) methyl]carbamate (i.e. the product of Step D) (30 g, 165.7 mmol) in N,N-dimethylformamide (117 mL) was added methanol (12 mL), trimethylsilyl azide (11.7 mL, 88.6 mmol) and copper(I) iodide (0.56 g, 2.9 mmol). The reaction mixture was heated at 100° C. for 16 h, then diluted with saturated ammonium chloride solution and extracted with ethyl acetate. The combined organic extracts were washed with water and saturated sodium chloride solution, dried over sodium sulfate, filtered and concentrated under reduced pressure. The resulting material was purified by silica gel column chromatography (eluting with 20% ethyl acetate in petroleum ether) to provide the title compound as a solid (4 g).

$^1$H NMR ($CDCl_3$): δ 11.8 (br s, 1H), 7.94 (s, 1H), 7.71 (s, 1H), 7.64-7.61 (m, 1H), 7.24 (s, 1H), 4.93 (br s, 1H), 4.43 (d, 2H), 3.71 (s, 3H), 2.37 (s, 3H).

Step F: Preparation of methyl N-[[5-[2-(2,6-difluoro-4-nitrophenyl)-2H-1,2,3-triazol-4-yl]-2-methylphenyl]methyl]carbamate (Compound 118) and methyl N-[[5-[1-(2,6-difluoro-4-nitrophenyl)-1H-1,2,3-triazol-4-yl]-2-methylphenyl]-methyl]carbamate (Compound 132)

To a mixture of methyl N-[[5-(1H-1,2,3-triazol-4-yl)-2-methylphenyl]methyl]carbamate (i.e. the product of Step E) (4 g, 16.2 mmol) in dimethyl sulfoxide (40 mL) was added potassium carbonate (6.7 g, 48.6 mmol) followed by 1,2,3-trifluoro-5-nitrobenzene (3.1 g, 17.8 mmol). The reaction mixture was stirred at room temperature for 16 h, and then diluted with water (30 mL) and extracted with ethyl acetate. The combined organic extracts were washed with saturated sodium chloride solution, dried over sodium sulfate, filtered and concentrated under reduced pressure. The resulting material was purified by silica gel chromatography (eluting with 20% ethyl acetate in petroleum ether) to provide methyl N-[[5-[2-(2,6-difluoro-4-nitrophenyl)-2H-1,2,3-triazol-4-yl]-2-methylphenyl]methyl]carbamate (Compound 118), a compound of the present invention, as a solid (2 g).

$^1$H NMR (DMSO-$d_6$): δ 8.77 (s, 1H), 8.45 (dd, 2H), 7.80 (s, 1H), 7.76-7.74 (m, 1H), 7.69-7.66 (m, 1H), 7.32 (d, 1H), 4.24 (d, 2H), 3.55 (s, 3H), 2.33 (s, 3H).

LCMS: m/z: 404 $[M+H]^+$.

Also obtained was a solid comprising a mixture of methyl N-[[5-[2-(2,6-difluoro-4-nitrophenyl)-2H-1,2,3-triazol-4-yl]-2-methylphenyl]methyl]carbamate (Compound 118) and methyl N-[[5-[1-(2,6-difluoro-4-nitrophenyl)-1H-1,2,3-triazol-4-yl]-2-methylphenyl]methyl]carbamate (Compound 132). Further purification of the solid by silica gel chromatography provided methyl N-[[5-[1-(2,6-difluoro-4-nitrophenyl)-1H-1,2,300-triazol-4-yl]-2-methylphenyl]methyl] carbamate (Compound 132), a compound of the present invention, as a solid (800 mg).

$^1$H NMR (DMSO-$d_6$): δ 9.08 (s, 1H), 8.50 (d, 2H), 7.83-7.82 (m, 2H), 7.71-7.67 (m, 2H), 7.29 (d, 1H), 4.24 (d, 2H), 3.57 (s, 3H), 2.32 (s, 3H).

LCMS: m/z: 404 $[M+H]^+$.

Example 19

Preparation of methyl N-[[5-[2-(4-amino-2,6-difluorophenyl)-2H-1,2,3-triazol-4-yl]-2-methylphenyl] methyl]carbamate (Compound 115)

To a mixture of methyl N-[[5-[2-(2,6-difluoro-4-nitrophenyl)-2H-1,2,3-triazol-4-yl]-2-methylphenyl]methyl]carbamate (i.e. the product of Example 18, Step F, Compound 118) (2 g, 4.9 mmol) in ethanol (18 mL) and water (2 mL) was added iron powder (2.7 g, 49.6 mmol) and ammonium chloride (0.16 g, 2.9 mmol). The reaction mixture was heated at reflux for 1.5 h, stirred at room temperature for 16 h, and then filtered through a pad of Celite® (diatomaceous filter aid), rinsing with ethyl acetate (30 mL). The filtrate was diluted with water and extracted with ethyl acetate. The combined organics were washed with saturated sodium chloride solution, dried over sodium sulfate, filtered and concentrated under reduce pressure. The resulting material was purified by silica gel chromatography (eluting with 30% ethyl acetate in petroleum ether) to provide the title compound, a compound of the present invention, as a solid (1.6 g).

$^1$H NMR ($CDCl_3$): δ 8.08 (s, 1H), 7.74-7.73 (m, 1H), 7.67-7.65 (m, 1H), 7.24 (s, 1H), 6.33-6.30 (m, 2H), 4.89 (br s, 1H), 4.42 (d, 2H), 4.13 (s, 2H), 3.70 (s, 3H), 2.37 (s, 3H

LCMS: m/z: 374 $[M+H]^+$.

The following compound was prepared analogous to the method in Example 19: methyl N-[[5-[1-(4-amino-2,6-difluorophenyl)-1H-1,2,3-triazol-4-yl]-2-methylphenyl]-methyl]carbamate (Compound 131).

$^1$H NMR ($CDCl_3$): δ 7.91 (s, 1H), 7.81 (s, 1H), 7.70 (d, 1H), 7.25 (s, 1H), 6.35 (d, 2H), 4.93 (br s, 1H), 4.45 (s, 2H), 4.19 (br s, 2H), 3.71 (s, 3H), 2.39 (s, 3H).

Example 20

Preparation of methyl N-[[5-[2-(4-chloro-2,6-difluorophenyl)-2H-1,2,3-triazol-4-yl]-2-methylphenyl] methyl]carbamate (Compound 117)

To a mixture of methyl N-[[5-[2-(4-amino-2,6-difluorophenyl)-2H-1,2,3-triazol-4-yl]-2-methylphenyl]methyl]carbamate (i.e. the product of Example 19) (1 g, 2.68 mmol) in carbon tetrachloride (125 mL) was added n-butyl nitrite (3.3 g, 32.17 mmol). The reaction mixture was heated at reflux for 16 h, and then filtered through a pad of Celite® (diatomaceous filter aid), rinsing with ethyl acetate (20 mL). The filtrate was diluted with water (60 mL) and extracted with ethyl acetate. The combined organics were washed with saturated sodium chloride solution, dried over sodium sulfate, filtered and concentrated under reduced pressure. The resulting material was purified by silica gel chromatography (eluting with 30% ethyl acetate in petroleum ether) to provide the title compound, a compound of the present invention, as a solid (0.12 g).

$^1$H NMR ($CDCl_3$): δ 8.13 (s, 1H), 7.74-7.73 (m, 1H), 7.66 (dd, 1H), 7.28 (s, 1H), 7.19-7.15 (m, 2H), 4.90 (br s, 1H), 4.43 (d, 2H), 4.71 (s, 3H), 2.38 (s, 3H).

LCMS: m/z: 393 $[M+H]^+$.

The following compound was prepared analogous to the method in Example 20: methyl N-[[5-[1-(4-chloro-2,6-difluorophenyl)-1H-1,2,3-triazol-4-yl]-2-methylphenyl]-methyl]carbamate (Compound 121).

$^1$H NMR ($CDCl_3$): δ 7.98 (s, 1H), 7.79 (br s, 1H), 7.70 (d, 1H), 7.27-7.20 (m, 3H), 4.91 (br s, 1H), 4.44-4.43 (m, 2H), 3.71 (s, 3H), 2.38 (s, 3H).

LCMS: m/z: 393 $[M+H]^+$.

By the procedures described herein, together with methods known in the art, the following compounds of Tables 1A to 33D can be prepared. The following abbreviations are used in the Tables which follow: n means normal, i means iso, c means cyclo, Me means methyl, Et means ethyl, Pr means propyl, MeO means methoxy, EOt means ethoxy, MeS means methylthio, EtS means ethylthio, —CN means cyano and —$NO_2$ means nitro.

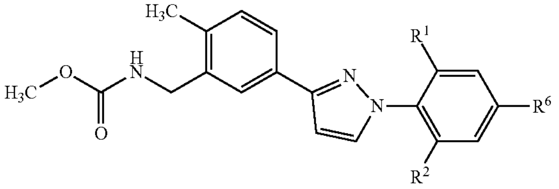

TABLE 1A

| $R^1$ and $R^2$ are F | | | |
|---|---|---|---|
| $R^6$ | $R^6$ | $R^6$ | $R^6$ |
| H | CH═CHCH$_3$ | OCH$_2$(c-Pr) | CH$_2$OH |
| F | CH$_2$CH═CH$_2$ | CH$_2$(c-Pr) | CH$_2$OCH$_3$ |
| Cl | C≡CH | OCH$_2$CH═CH$_2$ | CH$_2$CH$_2$OCH$_3$ |
| Br | C≡CCH$_3$ | OCH$_2$CH═CH(CH$_3$) | CH$_2$OCH$_2$CH$_3$ |
| I | CH$_2$C≡CH | OCH$_2$C≡CH | OCH$_2$CF$_3$ |
| CN | CF$_3$ | OCH$_2$C≡CCH$_3$ | OCF$_2$CF$_2$H |
| NH$_2$ | CHF$_2$ | OCH$_2$CH═CHCl | CH═NOH |
| NO$_2$ | CH$_2$F | OCH$_2$CH═CCl$_2$ | C(Me)═NOH |
| Me | OMe | OCH$_2$C≡CCF$_3$ | CH═NOMe |
| Et | OEt | OCH$_2$OCH$_3$ | C(Me)═NOMe |
| n-Pr | O(n-Pr) | OCH$_2$CH$_2$OCH$_3$ | CH═NOEt |
| i-Pr | OCF$_3$ | SMe | C(Me)═NOEt |
| c-Pr | OCHF$_2$ | SEt | CH═NOCH$_2$CH═CH$_2$ |
| CH═CH$_2$ | O(c-Pr) | CH$_2$CN | C(Me)═NOCH$_2$CH═CH$_2$ |

The present disclosure also includes Tables 2A through 33A, each of which is constructed the same as Table 1A above except that the row heading in Table 1A (i.e. "$R^1$ and $R^2$ are F") is replaced with the respective row headings shown below. For example, in Table 2A the row heading is "$R^1$ and $R^2$ are Cl", and $R^6$ is as defined in Table 1A above.

TABLE 1B

| Table | Table Headings |
|---|---|
| 2A | $R^1$ and $R^2$ are Cl |
| 3A | $R^1$ and $R^2$ are Br |
| 4A | $R^1$ and $R^2$ are I |
| 5A | $R^1$ and $R^2$ are Me |
| 6A | $R^1$ and $R^2$ are MeO |
| 7A | $R^1$ and $R^2$ are MeS |
| 8A | $R^1$ is Cl and $R^2$ is Br |
| 9A | $R^1$ is F and $R^2$ is Br |
| 10A | $R^1$ is I and $R^2$ is Br |
| 11A | $R^1$ is Me and $R^2$ is Br |
| 12A | $R^1$ is Br and $R^2$ is F |
| 13A | $R^1$ is Cl and $R^2$ is F |
| 14A | $R^1$ is I and $R^2$ is F |
| 15A | $R^1$ is Me and $R^2$ is F |
| 16A | $R^1$ is Cl and $R^2$ is MeO |
| 17A | $R^1$ is F and $R^2$ is MeO |
| 18A | $R^1$ is I and $R^2$ is MeO |
| 19A | $R^1$ is Cl and $R^2$ is MeS |
| 20A | $R^1$ is Br and $R^2$ is MeS |
| 21A | $R^1$ is F and $R^2$ is MeS |
| 22A | $R^1$ is Br and $R^2$ is $NO_2$ |
| 23A | $R^1$ is $CF_3$ and $R^2$ is F |
| 24A | $R^1$ is $CH_2F$ and $R^2$ is F |
| 25A | $R^1$ is $CHF_2$ and $R^2$ is F |
| 26A | $R^1$ is Cl and $R^2$ is EtO |
| 27A | $R^1$ is F and $R^2$ is EtO |
| 28A | $R^1$ is Cl and $R^2$ is n-PrO |
| 29A | $R^1$ is F and $R^2$ is n-PrO |
| 30A | $R^1$ is Cl and $R^2$ is c-PrOCH$_2$ |

TABLE 1B-continued

| Table | Table Headings |
|---|---|
| 31A | $R^1$ is F and $R^2$ is c-PrOCH$_2$ |
| 32A | $R^1$ is Cl and $R^2$ is $CF_3O$ |
| 33A | $R^1$ is F and $R^2$ is $CF_3O$ |

Table 1B is identical to Table 1A, except that the chemical structure in the Table 1A is replaced with the following structure:

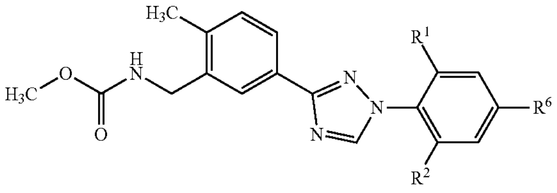

Tables 2B-33B

Tables 2B through 33B are constructed in a similar manner as Tables 2A through 33A.

Table 1C

Table 1C is identical to Table 1A, except that the chemical structure in the Table 1A is replaced with the following structure:

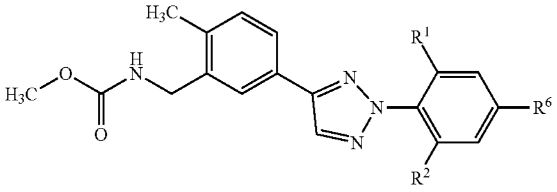

Tables 2C-33C

Tables 2C through 33C are constructed in a similar manner as Tables 2A through 33A.

Table 1D

Table 1D is identical to Table 1A, except that the chemical structure in the Table 1A is replaced with the following structure:

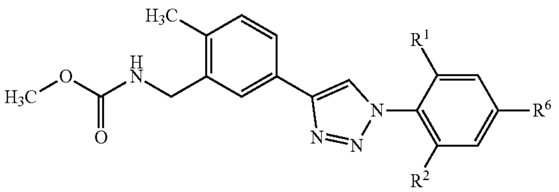

Tables 2D-33D

Tables 2D through 33D are constructed in a similar manner as Tables 2A through 33A.

Formulation/Utility

A compound of Formula 1 of this invention (including N-oxides and salts thereof), or a mixture (i.e. composition) comprising the compound with at least one additional fungicidal compound as described in the Summary of the Invention, will generally be used as a fungicidal active ingredient in a composition, i.e. formulation, with at least one additional component selected from the group consisting of surfactants, solid diluents and liquid diluents, which serve as a carrier. The formulation or composition ingredients are selected to be consistent with the physical properties of the active ingredient, mode of application and environmental factors such as soil type, moisture and temperature.

The mixtures of component (a) (i.e. at least one compound of Formula 1, N-oxides, or salts thereof) with component (b) (e.g., selected from (b1) to (b54) and salts thereof as described above) and/or one or more other biologically active compound or agent (i.e. insecticides, other fungicides, nematocides, acaricides, herbicides and other biological agents) can be formulated in a number of ways, including:

(i) component (a), component (b) and/or one or more other biologically active compounds or agents can be formulated separately and applied separately or applied simultaneously in an appropriate weight ratio, e.g., as a tank mix; or (ii) component (a), component (b) and/or one or more other biologically active compounds or agents can be formulated together in the proper weight ratio.

Useful formulations include both liquid and solid compositions. Liquid compositions include solutions (including emulsifiable concentrates), suspensions, emulsions (including microemulsions, oil-in-water emulsions, flowable concentrates and/or suspoemulsions) and the like, which optionally can be thickened into gels. The general types of aqueous liquid compositions are soluble concentrate, suspension concentrate, capsule suspension, concentrated emulsion, microemulsion, oil-in-water emulsion, flowable concentrate and suspoemulsion. The general types of nonaqueous liquid compositions are emulsifiable concentrate, microemulsifiable concentrate, dispersible concentrate and oil dispersion.

The general types of solid compositions are dusts, powders, granules, pellets, prills, pastilles, tablets, filled films (including seed coatings) and the like, which can be water-dispersible ("wettable") or water-soluble. Films and coatings formed from film-forming solutions or flowable suspensions are particularly useful for seed treatment. Active ingredient can be (micro)encapsulated and further formed into a suspension or solid formulation; alternatively the entire formulation of active ingredient can be encapsulated (or "overcoated"). Encapsulation can control or delay release of the active ingredient. An emulsifiable granule combines the advantages of both an emulsifiable concentrate formulation and a dry granular formulation. High-strength compositions are primarily used as intermediates for further formulation.

Of note is a composition embodiment wherein granules of a solid composition comprising a compound of Formula 1 (or an N-oxide or salt thereof) is mixed with granules of a solid composition comprising component (b). These mixtures can be further mixed with granules comprising additional agricultural protectants. Alternatively, two or more agricultural protectants (e.g., a component (a) (Formula 1) compound, a component (b) compound, an agricultural protectant other than component (a) or (b)) can be combined in the solid composition of one set of granules, which is then mixed with one or more sets of granules of solid compositions comprising one or more additional agricultural protectants. These granule mixtures can be in accordance with the general granule mixture disclosure of PCT Patent Publication WO 94/24861 or more preferably the homogeneous granule mixture teaching of U.S. Pat. No. 6,022,552.

Sprayable formulations are typically extended in a suitable medium before spraying. Such liquid and solid formulations are formulated to be readily diluted in the spray medium, usually water, but occasionally another suitable medium like an aromatic or paraffinic hydrocarbon or vegetable oil. Spray volumes can range from about one to several thousand liters per hectare, but more typically are in the range from about ten to several hundred liters per hectare. Sprayable formulations can be tank mixed with water or another suitable medium for foliar treatment by aerial or ground application, or for application to the growing medium of the plant. Liquid and dry formulations can be metered directly into drip irrigation systems or metered into the furrow during planting. Liquid and solid formulations can be applied onto seeds of crops and other desirable vegetation as seed treatments before planting to protect developing roots and other subterranean plant parts and/or foliage through systemic uptake.

The formulations will typically contain effective amounts of active ingredient, diluent and surfactant within the following approximate ranges which add up to 100 percent by weight.

| | Weight Percent | | |
|---|---|---|---|
| | Active Ingredient | Diluent | Surfactant |
| Water-Dispersible and Water-soluble Granules, Tablets and Powders | 0.001-90 | 0-99.999 | 0-15 |
| Oil Dispersions, Suspensions, Emulsions, Solutions (including Emulsifiable Concentrates) | 1-50 | 40-99 | 0-50 |
| Dusts | 1-25 | 70-99 | 0-5 |
| Granules and Pellets | 0.001-95 | 5-99.999 | 0-15 |
| High Strength Compositions | 90-99 | 0-10 | 0-2 |

Solid diluents include, for example, clays such as bentonite, montmorillonite, attapulgite and kaolin, gypsum, cellulose, titanium dioxide, zinc oxide, starch, dextrin, sugars (e.g., lactose, sucrose), silica, talc, mica, diatomaceous earth, urea, calcium carbonate, sodium carbonate and bicarbonate, and sodium sulfate. Typical solid diluents are described in Watkins et al., *Handbook of Insecticide Dust Diluents and Carriers,* 2nd Ed., Dorland Books, Caldwell, New Jersey Liquid diluents include, for example, water, N,N-dimethylalkanamides (e.g., N,N-dimethylformamide), limonene, dimethyl sulfoxide, N-alkylpyrrolidones (e.g., N-methylpyrrolidinone), alkyl phosphates (e.g., triethyl phosphate), ethylene glycol, triethylene glycol, propylene glycol, dipropylene glycol, polypropylene glycol, propylene carbonate, butylene carbonate, paraffins (e.g., white mineral oils, normal paraffins, isoparaffins), alkylbenzenes, alkylnaphthalenes, glycerine, glycerol triacetate, sorbitol, aromatic hydrocarbons, dearomatized aliphatics, alkylbenzenes, alkylnaphthalenes, ketones such as cyclohexanone, 2-heptanone, isophorone and 4-hydroxy-4-methyl-2-pentanone, acetates such as isoamyl acetate, hexyl acetate, heptyl acetate, octyl acetate, nonyl acetate, tridecyl acetate and isobornyl acetate, other esters such as alkylated lactate esters, dibasic esters, alkyl and aryl benzoates and 7-butyrolactone, and alcohols, which can be linear, branched, saturated or unsaturated, such as methanol, ethanol, n-propanol, isopropyl alcohol, n-butanol, isobutyl alcohol, n-hexanol, 2-ethylhexanol, n-octanol, decanol, isodecyl alcohol, isooctadecanol, cetyl alcohol, lauryl alcohol, tridecyl alcohol, oleyl alcohol, cyclohexanol, tetrahydrofurfuryl alcohol, diacetone alcohol, cresol and benzyl alcohol. Liquid diluents also include glycerol esters of saturated and unsaturated fatty acids (typically $C_6$-$C_{22}$), such as plant seed and fruit oils (e.g., oils of olive, castor, linseed, sesame, corn (maize), peanut, sunflower, grapeseed, safflower, cottonseed, soybean, rapeseed, coconut and palm kernel), animal-sourced fats (e.g., beef tallow, pork tallow, lard, cod liver oil, fish oil), and mixtures thereof. Liquid diluents also include alkylated fatty acids (e.g., methylated, ethylated, butylated) wherein the fatty acids may be obtained by hydrolysis of glycerol esters from plant and animal sources, and can be purified by distillation. Typical liquid diluents are described in Marsden, *Solvents Guide,* 2nd Ed., Interscience, New York, 1950.

The solid and liquid compositions of the present invention often include one or more surfactants. When added to a liquid, surfactants (also known as "surface-active agents") generally modify, most often reduce, the surface tension of the liquid. Depending on the nature of the hydrophilic and lipophilic groups in a surfactant molecule, surfactants can be useful as wetting agents, dispersants, emulsifiers or defoaming agents.

Surfactants can be classified as nonionic, anionic or cationic. Nonionic surfactants useful for the present compositions include, but are not limited to: alcohol alkoxylates such as alcohol alkoxylates based on natural and synthetic alcohols (which may be branched or linear) and prepared from the alcohols and ethylene oxide, propylene oxide, butylene oxide or mixtures thereof; amine ethoxylates, alkanolamides and ethoxylated alkanolamides; alkoxylated triglycerides such as ethoxylated soybean, castor and rapeseed oils; alkylphenol alkoxylates such as octylphenol ethoxylates, nonylphenol ethoxylates, dinonyl phenol ethoxylates and dodecyl phenol ethoxylates (prepared from the phenols and ethylene oxide, propylene oxide, butylene oxide or mixtures thereof); block polymers prepared from ethylene oxide or propylene oxide and reverse block polymers where the terminal blocks are prepared from propylene oxide; ethoxylated fatty acids; ethoxylated fatty esters and oils; ethoxylated methyl esters; ethoxylated tristyrylphenol (including those prepared from ethylene oxide, propylene oxide, butylene oxide or mixtures thereof); fatty acid esters, glycerol esters, lanolin-based derivatives, polyethoxylate esters such as polyethoxylated sorbitan fatty acid esters, polyethoxylated sorbitol fatty acid esters and polyethoxylated glycerol fatty acid esters; other sorbitan derivatives such as sorbitan esters; polymeric surfactants such as random copolymers, block copolymers, alkyd peg (polyethylene glycol) resins, graft or comb polymers and star polymers; polyethylene glycols (pegs); polyethylene glycol fatty acid esters; silicone-based surfactants; and sugar-derivatives such as sucrose esters, alkyl polyglycosides; alkyl polysaccharides; and glucamides such as mixtures of octyl-N-methylglucamide and decyl-N-methylglucamide (e.g., products is obtainable under the Synergen® GA name from Clariant).

Useful anionic surfactants include, but are not limited to: alkylaryl sulfonic acids and their salts; carboxylated alcohol or alkylphenol ethoxylates; diphenyl sulfonate derivatives; lignin and lignin derivatives such as lignosulfonates; maleic or succinic acids or their anhydrides; olefin sulfonates; phosphate esters such as phosphate esters of alcohol alkoxylates, phosphate esters of alkylphenol alkoxylates and phosphate esters of styryl phenol ethoxylates; protein-based surfactants; sarcosine derivatives; styryl phenol ether sulfate; sulfates and sulfonates of oils and fatty acids; sulfates and sulfonates of ethoxylated alkylphenols; sulfates of alcohols; sulfates of ethoxylated alcohols; sulfonates of amines and amides such as N,N-alkyltaurates; sulfonates of benzene, cumene, toluene, xylene, and dodecyl and tridecylbenzenes; sulfonates of condensed naphthalenes; sulfonates of naphthalene and alkyl naphthalene; sulfonates of fractionated petroleum; sulfosuccinamates; and sulfosuccinates and their derivatives such as dialkyl sulfosuccinate salts.

Useful cationic surfactants include, but are not limited to: amides and ethoxylated amides; amines such as N-alkyl propanediamines, tripropylenetriamines and dipropylenetetramines, and ethoxylated amines, ethoxylated diamines and propoxylated amines (prepared from the amines and ethylene oxide, propylene oxide, butylene oxide or mixtures thereof); amine salts such as amine acetates and diamine salts; quaternary ammonium salts such as quaternary salts, ethoxylated quaternary salts and diquaternary salts; and amine oxides such as alkyldimethylamine oxides and bis-(2-hydroxyethyl)-alkylamine oxides.

Also useful for the present compositions are mixtures of nonionic and anionic surfactants or mixtures of nonionic and cationic surfactants. Nonionic, anionic and cationic surfactants and their recommended uses are disclosed in a variety of published references including *McCutcheon's Emulsifiers and Detergents*, annual American and International Editions published by McCutcheon's Division, The Manufacturing Confectioner Publishing Co.; Sisely and Wood, *Encyclopedia of Surface Active Agents*, Chemical Publ. Co., Inc., New York, 1964; and A. S. Davidson and B. Milwidsky, *Synthetic Detergents*, Seventh Edition, John Wiley and Sons, New York, 1987.

Compositions of this invention may also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such polyorganosiloxanes), sedimentation of active ingredients (suspending agents), viscosity (thixotropic thickeners), in-container microbial growth (antimicrobials), product freezing (antifreezes), color (dyes/pigment dispersions), wash-off (film formers or stickers), evaporation (evaporation retardants), and other formulation attributes. Film formers include, for example, polyvinyl acetates, polyvinyl acetate copolymers, polyvinylpyrrolidone-vinyl acetate copolymer, polyvinyl alcohols, polyvinyl alcohol copolymers and waxes. Examples of formulation auxiliaries and additives include those listed in *McCutcheon's Volume 2: Functional Materials*, annual International and North American editions published by McCutcheon's Division, The Manufacturing Confectioner Publishing Co.; and PCT Publication WO 03/024222.

The compound of Formula 1 and any other active ingredients are typically incorporated into the present compositions by dissolving the active ingredient in a solvent or by grinding in a liquid or dry diluent. Solutions, including emulsifiable concentrates, can be prepared by simply mixing the ingredients. If the solvent of a liquid composition intended for use as an emulsifiable concentrate is water-immiscible, an emulsifier is typically added to emulsify the active-containing solvent upon dilution with water. Active ingredient slurries, with particle diameters of up to 2,000 m can be wet milled using media mills to obtain particles with average diameters below 3 km. Aqueous slurries can be made into finished suspension concentrates (see, for example, U.S. Pat. No. 3,060,084) or further processed by spray drying to form water-dispersible granules. Dry formulations usually require dry milling processes, which produce average particle diameters in the 2 to 10 m range. Dusts and powders can be prepared by blending and usually grinding (such as with a hammer mill or fluid-energy mill). Granules and pellets can be prepared by spraying the active material upon preformed granular carriers or by agglomeration techniques. See Browning, "Agglomeration", *Chemical Engineering*, Dec. 4, 1967, pp 147-48, *Perry's Chemical Engineer's Handbook,* 4th Ed., McGraw-Hill, New York, 1963, pp 8-57 and following, and WO 91/13546. Pellets can be prepared as described in U.S. Pat. No. 4,172,714. Water-dispersible and water-soluble granules can be prepared as taught in U.S. Pat. Nos. 4,144,050, 3,920,442 and DE 3,246,493. Tablets can be prepared as taught in U.S. Pat. Nos. 5,180,587, 5,232,701 and 5,208,030. Films can be prepared as taught in GB 2,095,558 and U.S. Pat. No. 3,299,566.

One embodiment of the present invention relates to a method for controlling fungal pathogens, comprising diluting the fungicidal composition of the present invention (a compound of Formula 1 formulated with surfactants, solid diluents and liquid diluents or a formulated mixture of a compound of Formula 1 and at least one other fungicide) with water, and optionally adding an adjuvant to form a diluted composition, and contacting the fungal pathogen or its environment with an effective amount of said diluted composition.

Although a spray composition formed by diluting with water a sufficient concentration of the present fungicidal composition can provide sufficient efficacy for controlling fungal pathogens, separately formulated adjuvant products can also be added to spray tank mixtures. These additional adjuvants are commonly known as "spray adjuvants" or "tank-mix adjuvants", and include any substance mixed in a spray tank to improve the performance of a pesticide or alter the physical properties of the spray mixture. Adjuvants can be anionic or nonionic surfactants, emulsifying agents, petroleum-based crop oils, crop-derived seed oils, acidifiers, buffers, thickeners or defoaming agents. Adjuvants are used to enhancing efficacy (e.g., biological availability, adhesion, penetration, uniformity of coverage and durability of protection), or minimizing or eliminating spray application problems associated with incompatibility, foaming, drift, evaporation, volatilization and degradation. To obtain optimal performance, adjuvants are selected with regard to the properties of the active ingredient, formulation and target (e.g., crops, insect pests).

The amount of adjuvants added to spray mixtures is generally in the range of about 0.1% to 2.5% by volume. The application rates of adjuvants added to spray mixtures are typically between about 1 to 5 L per hectare. Representative examples of spray adjuvants include: Adigor® (Syngenta) 47% methylated rapeseed oil in liquid hydrocarbons, Silwet® (Helena Chemical Company) polyalkyleneoxide modified heptamethyltrisiloxane and Assist® (BASF) 17% surfactant blend in 83% paraffin based mineral oil.

One method of seed treatment is by spraying or dusting the seed with a compound of the invention (i.e. as a formulated composition) before sowing the seeds. Compositions formulated for seed treatment generally comprise a film former or adhesive agent. Therefore typically a seed coating composition of the present invention comprises a biologically effective amount of a compound of Formula 1 and a film former or adhesive agent. Seeds can be coated by spraying a flowable suspension concentrate directly into a tumbling bed of seeds and then drying the seeds. Alternatively, other formulation types such as wetted powders, solutions, suspoemulsions, emulsifiable concentrates and emulsions in water can be sprayed on the seed. This process is particularly useful for applying film coatings on seeds. Various coating machines and processes are available to one skilled in the art. Suitable processes include those listed in P. Kosters et al., *Seed Treatment: Progress and Prospects,* 1994 BCPC Mongraph No. 57, and references listed therein.

For further information regarding the art of formulation, see T. S. Woods, "The Formulator's Toolbox—Product Forms for Modern Agriculture" in *Pesticide Chemistry and Bioscience, The Food-Environment Challenge*, T. Brooks and T. R. Roberts, Eds., Proceedings of the 9th International Congress on Pesticide Chemistry, The Royal Society of Chemistry, Cambridge, 1999, pp. 120-133. Also see U.S. Pat. No. 3,235,361, Col. 6, line 16 through Col. 7, line 19 and Examples 10-41; U.S. Pat. No. 3,309,192, Col. 5, line 43 through Col. 7, line 62 and Examples 8, 12, 15, 39, 41, 52, 53, 58, 132, 138-140, 162-164, 166, 167 and 169-182; U.S. Pat. No. 2,891,855, Col. 3, line 66 through Col. 5, line 17 and Examples 1-4; Klingman, *Weed Control as a Science*, John Wiley and Sons, Inc., New York, 1961, pp 81-96; Hance et al., *Weed Control Handbook,* 8th Ed., Blackwell Scientific Publications, Oxford, 1989; and *Developments in formulation technology*, PJB Publications, Richmond, U K, 2000.

In the following Examples, all percentages are by weight and all formulations are prepared in conventional ways. Active ingredient refers to the compounds in Index Tables A-F disclosed herein. Without further elaboration, it is believed that one skilled in the art using the preceding description can utilize the present invention to its fullest extent. The following Examples are, therefore, to be constructed as merely illustrative, and not limiting of the disclosure in any way whatsoever.

| Example A<br>High Strength Concentrate | |
|---|---|
| Compound 3 | 98.5% |
| silica aerogel | 0.5% |
| synthetic amorphous fine silica | 1.0% |

-continued

| | |
|---|---|
| Example B<br>Wettable Powder | |
| Compound 4 | 65.0% |
| dodecylphenol polyethylene glycol ether | 2.0% |
| sodium ligninsulfonate | 4.0% |
| sodium silicoaluminate | 6.0% |
| montmorillonite (calcined) | 23.0% |
| Example C<br>Granule | |
| Compound 6 | 10.0% |
| attapulgite granules (low volatile matter, 0.71/0.30 mm; U.S.S. No. 25-50 sieves) | 90.0% |
| Example D<br>Extruded Pellet | |
| Compound 7 | 25.0% |
| anhydrous sodium sulfate | 10.0% |
| crude calcium ligninsulfonate | 5.0% |
| sodium alkylnaphthalenesulfonate | 1.0% |
| calcium/magnesium bentonite | 59.0% |
| Example E<br>Emulsifiable Concentrate | |
| Compound 11 | 10.0% |
| polyoxyethylene sorbitol hexoleate | 20.0% |
| $C_6$-$C_{10}$ fatty acid methyl ester | 70.0% |
| Example F<br>Microemulsion | |
| Compound 14 | 5.0% |
| polyvinylpyrrolidone-vinyl acetate copolymer | 30.0% |
| alkylpolyglycoside | 30.0% |
| glyceryl monooleate | 15.0% |
| water | 20.0% |
| Example G<br>Seed Treatment | |
| Compound 15 | 20.00% |
| polyvinylpyrrolidone-vinyl acetate copolymer | 5.00% |
| montan acid wax | 5.00% |
| calcium ligninsulfonate | 1.00% |
| polyoxyethylene/polyoxypropylene block copolymers | 1.00% |
| stearyl alcohol (POE 20) | 2.00% |
| polyorganosilane | 0.20% |
| colorant red dye | 0.05% |
| water | 65.75% |
| Example H<br>Fertilizer Stick | |
| Compound 30 | 2.50% |
| pyrrolidone-styrene copolymer | 4.80% |
| tristyrylphenyl 16-ethoxylate | 2.30% |
| talc | 0.80% |
| corn starch | 5.00% |
| slow-release fertilizer | 36.00% |
| kaolin | 38.00% |
| water | 10.60% |
| Example I<br>Suspension Concentrate | |
| Compound 33 | 35% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| water | 53.7% |
| Example J<br>Emulsion in Water | |
| Compound 41 | 10.0% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |

-continued

| | |
|---|---|
| propylene glycol | 5.0% |
| silicone based defoamer | 0.1% |
| 1,2-benzisothiazolin-3-one | 0.1% |
| aromatic petroleum based hydrocarbon | 20.0 |
| water | 58.7% |
| Example K<br>Oil Dispersion | |
| Compound 63 | 25% |
| polyoxyethylene sorbitol hexaoleate | 15% |
| organically modified bentonite clay | 2.5% |
| fatty acid methyl ester | 57.5% |
| Example L<br>Suspoemulsion | |
| Compound 64 | 10.0% |
| imidacloprid | 5.0% |
| butyl polyoxyethylene/polypropylene block copolymer | 4.0% |
| stearic acid/polyethylene glycol copolymer | 1.0% |
| styrene acrylic polymer | 1.0% |
| xanthan gum | 0.1% |
| propylene glycol | 5.0% |
| silicone based defoamer | 0.1% |
| 1,2-benzisothiazolin-3-one | 0.1% |
| aromatic petroleum based hydrocarbon | 20.0% |
| water | 53.7% |

Water-soluble and water-dispersible formulations are typically diluted with water to form aqueous compositions before application. Aqueous compositions for direct applications to the plant or portion thereof (e.g., spray tank compositions) typically contain at least about 1 ppm or more (e.g., from 1 ppm to 100 ppm) of the compound(s) of this invention.

Seed is normally treated at a rate of from about 0.001 g (more typically about 0.1 g) to about 10 g per kilogram of seed (i.e. from about 0.0001 to 1% by weight of the seed before treatment). A flowable suspension formulated for seed treatment typically comprises from about 0.5 to about 70% of the active ingredient, from about 0.5 to about 30% of a film-forming adhesive, from about 0.5 to about 20% of a dispersing agent, from 0 to about 5% of a thickener, from 0 to about 5% of a pigment and/or dye, from 0 to about 2% of an antifoaming agent, from 0 to about 1% of a preservative, and from 0 to about 75% of a volatile liquid diluent.

The compositions of this invention are useful as plant disease control agents. The present invention therefore further comprises a method for controlling plant diseases caused by fungal plant pathogens comprising applying to the plant or portion thereof to be protected, or to the plant seed to be protected, an effective amount of a compound of the invention or a fungicidal composition containing said compound. The compounds and/or compositions of this invention provide control of diseases caused by a broad spectrum of fungal plant pathogens in the Ascomycota, Basidiomycota, Zygomycota phyla, and the fungal-like Oomycota class. They are effective in controlling a broad spectrum of plant diseases, particularly foliar pathogens of ornamental, turf, vegetable, field, cereal, and fruit crops. These pathogens include but are not limited to those listed in Table 1-1. For Ascomycetes and Basidiomycetes, names for both the sexual/teleomorph/perfect stage as well as names for the asexual/anamorph/imperfect stage (in parentheses) are listed where known. Synonymous names for pathogens are indicated by an equal sign. For example, the sexual/teleomorph/perfect stage name *Phaeosphaeria nodorum* is followed by the corresponding asexual/anamorph/imperfect stage name *Stagnospora nodorum* and the synonymous older name *Septoria nodorum*.

TABLE 1-1

| |
|---|
| Ascomycetes in the order Pleosporales including *Alternaria solani*, *A. alternata* and *A. brassicae*, *Guignardia bidwellii*, *Venturia inaequalis*, *Pyrenophora tritici-repentis* (*Dreschlera tritici-repentis* = *Helminthosporium tritici-repentis*) and *Pyrenophora teres* (*Dreschlera teres* = *Helminthosporium teres*), *Corynespora cassiicola*, *Phaeosphaeria nodorum* (*Stagonospora nodorum* = *Septoria nodorum*), *Cochliobolus carbonum* and *C. heterostrophus*, *Leptosphaeria biglobosa* and *L. maculans*; |
| Ascomycetes in the order Mycosphaerellales including *Mycosphaerella graminicola* (*Zymoseptoria tritici* = *Septoria tritici*), *M. berkeleyi* (*Cercosporidium personatum*), *M. arachidis* (*Cercospora arachidicola*), *Passalora sojina* (*Cercospora sojina*), *Cercospora zeae-maydis* and *C. beticola*; |
| Ascomycetes in the order Erysiphales (the powdery mildews) such as *Blumeria graminis* f. sp. *tritici* and *Blumeria graminis* f. sp. *hordei*, *Erysiphe polygoni*, *E. necator* (=*Uncinula necator*), *Podosphaera fuliginea* (=*Sphaerotheca fuliginea*), and *Podosphaera leucotricha* (=*Sphaerotheca fuliginea*); |
| Ascomycetes in the order Helotiales such as *Botryotinia fuckeliana* (*Botrytis cinerea*), *Oculimacula yallundae* (=*Tapesia yallundae*; anamorph *Helgardia herpotrichoides* = *Pseudocercosporella herpetrichoides*), *Monilinia fructicola*, *Sclerotinia sclerotiorum*, *Sclerotinia minor*, and *Sclerotinia homoeocarpa*; |
| Ascomycetes in the order Hypocreales such as *Giberella zeae* (*Fusarium graminearum*), *G. monoliformis* (*Fusarium moniliforme*), *Fusarium solani* and *Verticillium dahliae*; |
| Ascomycetes in the order Eurotiales such as *Aspergillus flavus* and *A. parasiticus*; |
| Ascomycetes in the order Diaporthales such as *Cryptosphorella viticola* (=*Phomopsis viticola*), *Phomopsis longicolla*, and *Diaporthe phaseolorum*; |
| Other Ascomycete pathogens including *Magnaporthe grisea*, *Gaeumannomyces graminis*, *Rhynchosporium secalis*, and anthracnose pathogens such as *Glomerella acutata* (*Colletotrichum acutatum*), *G. graminicola* (*C. graminicola*) and *G. lagenaria* (*C. orbiculare*); |
| Basidiomycetes in the order Urediniales (the rusts) including *Puccinia recondita*, *P. striiformis*, *Puccinia hordei*, *P. graminis* and *P. arachidis*), *Hemileia vastatrix* and *Phakopsora pachyrhizi*; |
| Basidiomycetes in the order Ceratobasidiales such as *Thanatophorum cucumeris* (*Rhizoctonia solani*) and *Ceratobasidium oryzae-sativae* (*Rhizoctonia oryzae*); |
| Basidiomycetes in the order Polyporales such as *Athelia rolfsii* (*Sclerotium rolfsii*); |
| Basidiomycetes in the order Ustilaginales such as *Ustilago maydis*; |
| Zygomycetes in the order Mucorales such as *Rhizopus stolonifer*; |
| Oomycetes in the order Pythiales, including *Phytophthora infestans*, *P. megasperma*, *P. parasitica*, *P. sojae*, *P. cinnamomi* and *P. capsici*, and *Pythium* pathogens such as *Pythium aphanidermatum*, *P. graminicola*, *P. irregulare*, *P. ultimum* and *P. dissoticum*; |
| Oomycetes in the order Peronosporales such as *Plasmopara viticola*, *P. halstedii*, *Peronospora hyoscyami* (=*Peronospora tabacina*), *P. manshurica*, *Hyaloperonospora parasitica* (=*Peronospora parasitica*), *Pseudoperonospora cubensis* and *Bremia lactucae*; |
| and other genera and species closely related to all of the above pathogens. |

In addition to their fungicidal activity, the compositions or combinations also have activity against bacteria such as *Erwinia amylovora, Xanthomonas campestris, Pseudomonas syringae*, and other related species. By controlling harmful microorganisms, the compositions of this invention are useful for improving (i.e. increasing) the ratio of beneficial to harmful microorganisms in contact with crop plants or their propagules (e.g., seeds, corms, bulbs, tubers, cuttings) or in the agronomic environment of the crop plants or their propagules.

Compositions of this invention are useful in treating all plants, plant parts and seeds. Plant and seed varieties and cultivars can be obtained by conventional propagation and breeding methods or by genetic engineering methods. Genetically modified plants or seeds (transgenic plants or seeds) are those in which a heterologous gene (transgene) has been stably integrated into the plant's or seed's genome. A transgene that is defined by its particular location in the plant genome is called a transformation or transgenic event.

Genetically modified plant cultivars which can be treated according to the invention include those that are resistant against one or more biotic stresses (pests such as nematodes, insects, mites, fungi, etc.) or abiotic stresses (drought, cold temperature, soil salinity, etc.), or that contain other desirable characteristics. Plants can be genetically modified to exhibit traits of, for example, herbicide tolerance, insect-resistance, modified oil profiles or drought tolerance.

Treatment of genetically modified plants and seeds with compounds of the invention may result in super-additive or enhanced effects. For example, reduction in application rates, broadening of the activity spectrum, increased tolerance to biotic/abiotic stresses or enhanced storage stability may be greater than expected from just simple additive effects of the application of compounds of the invention on genetically modified plants and seeds.

Compounds and compositions of this invention are useful in seed treatments for protecting seeds from plant diseases. In the context of the present disclosure and claims, treating a seed means contacting the seed with a biologically effective amount of a compound of this invention, which is typically formulated as a composition of the invention. This seed treatment protects the seed from soil-borne disease pathogens and generally can also protect roots and other plant parts in contact with the soil of the seedling developing from the germinating seed. The seed treatment may also provide protection of foliage by translocation of the compound of this invention or a second active ingredient within the developing plant. Seed treatments can be applied to all types of seeds, including those from which plants genetically transformed to express specialized traits will germinate. Representative examples include those expressing proteins toxic to invertebrate pests, such as *Bacillus thuringiensis* toxin or those expressing herbicide resistance such as glyphosate acetyltransferase, which provides resistance to glyphosate. Seed treatments with compounds and compositions of this invention can also increase vigor of plants growing from the seed.

Compounds and compositions of this invention are particularly useful in seed treatment for crops including, but not limited to, maize or corn, soybeans, cotton, cereal (e.g., wheat, oats, barley, rye and rice), potatoes, vegetables and oilseed rape.

Furthermore, the compounds and compositions of this invention are useful in treating postharvest diseases of fruits and vegetables caused by fungi, oomycetes and bacteria. These infections can occur before, during and after harvest. For example, infections can occur before harvest and then remain dormant until some point during ripening (e.g., host begins tissue changes in such a way that infection can progress or conditions become conducive for disease development); also infections can arise from surface wounds created by mechanical or insect injury. In this respect, the compositions of this invention can reduce losses (i.e. losses resulting from quantity and quality) due to postharvest diseases which may occur at any time from harvest to consumption. Treatment of postharvest diseases with compounds of the invention can increase the period of time during which perishable edible plant parts (e.g., fruits, seeds, foliage, stems, bulbs, tubers) can be stored refrigerated or un-refrigerated after harvest, and remain edible and free from noticeable or harmful degradation or contamination by fungi or other microorganisms. Treatment of edible plant parts before or after harvest with compounds of the invention can also decrease the formation of toxic metabolites of fungi or other microorganisms, for example, mycotoxins such as aflatoxins.

Plant disease control is ordinarily accomplished by applying an effective amount of a compound of this invention either pre- or post-infection, to the portion of the plant to be protected such as the roots, stems, foliage, fruits, seeds, tubers or bulbs, or to the media (soil or sand) in which the plants to be protected are growing. The compounds can also be applied to seeds to protect the seeds and seedlings developing from the seeds. The compounds can also be applied through irrigation water to treat plants. Control of postharvest pathogens which infect the produce before harvest is typically accomplished by field application of a compound of this invention, and in cases where infection occurs after harvest the compounds can be applied to the harvested crop as dips, sprays, fumigants, treated wraps and box liners.

The compounds and compositions of this invention can also be applied using an unmanned aerial vehicle (UAV) for the dispension of the compositions disclosed herein over a planted area. In some embodiments the planted area is a crop-containing area. In some embodiments, the crop is selected from a monocot or dicot. In some embodiments, the crop is selected form rice, corn, barley, soybean, wheat, vegetable, tobacco, tea tree, fruit tree and sugar cane. In some embodiments, the compositions disclosed herein are formulated for spraying at an ultra-low volume. Products applied by drones may use water or oil as the spray carrier. Typical spray volume (including product) used for drone applications globally. 5.0 liters/ha-100 liters/ha (approximately 0.5-10 gpa). This includes the range of ultra low spray volume (ULV) to low spray volume (LV). Although not common there may be situations where even lower spray volumes could be used as low as 1.0 liter/ha (0.1 gpa).

Suitable rates of application (e.g., fungicidally effective amounts) of component (a) (i.e. at least one compound selected from compounds of Formula 1, N-oxides and salts thereof) as well as suitable rates of application (e.g., biologically effective amounts, fungicidally effective amounts or insecticidally effective amounts) for the mixtures and compositions comprising component (a) according to this invention can be influenced by factors such as the plant diseases to be controlled, the plant species to be protected, the population structure of the pathogen to be controlled, ambient moisture and temperature and should be determined under actual use conditions. One skilled in the art can easily determine through simple experimentation the fungicidally effective amount necessary for the desired level of plant disease control. Foliage can normally be protected when treated at a rate of from less than about 1 g/ha to about 5,000 g/ha of active ingredient. Seed and seedlings can normally be protected when seed is treated at a rate of from about 0.001 g (more typically about 0.1 g) to about 10 g per kilogram of seed. One skilled in the art can easily determine through simple experimentation the application rates of component (a), and mixtures and compositions thereof, containing particular combinations of active ingredients according to this invention needed to provide the desired spectrum of plant protection and control of plant diseases and optionally other plant pests.

Compounds and compositions of the present invention may also be useful for increasing vigor of a crop plant. This method comprises contacting the crop plant (e.g., foliage, flowers, fruit or roots) or the seed from which the crop plant is grown with a composition comprising a compound of Formula 1 in amount sufficient to achieve the desired plant vigor effect (i.e. biologically effective amount). Typically the compound of Formula 1 is applied in a formulated composition. Although the compound of Formula 1 is often applied directly to the crop plant or its seed, it can also be applied to the locus of the crop plant, i.e. the environment of the crop plant, particularly the portion of the environment in close enough proximity to allow the compound of Formula 1 to migrate to the crop plant. The locus relevant to this method most commonly comprises the growth medium (i.e. medium providing nutrients to the plant), typically soil in which the plant is grown. Treatment of a crop plant to increase vigor of the crop plant thus comprises contacting the crop plant, the seed from which the crop plant is grown or the locus of the crop plant with a biologically effective amount of a compound of Formula 1.

Increased crop vigor can result in one or more of the following observed effects: (a) optimal crop establishment as demonstrated by excellent seed germination, crop emergence and crop stand; (b) enhanced crop growth as demonstrated by rapid and robust leaf growth (e.g., measured by leaf area index), plant height, number of tillers (e.g., for rice), root mass and overall dry weight of vegetative mass of the crop; (c) improved crop yields, as demonstrated by time to flowering, duration of flowering, number of flowers, total biomass accumulation (i.e. yield quantity) and/or fruit or grain grade marketability of produce (i.e. yield quality); (d) enhanced ability of the crop to withstand or prevent plant disease infections and arthropod, nematode or mollusk pest infestations; and (e) increased ability of the crop to withstand environmental stresses such as exposure to thermal extremes, suboptimal moisture or phytotoxic chemicals.

The compounds and compositions of the present invention may increase the vigor of treated plants compared to untreated plants by preventing and/or curing plant diseases caused by fungal plant pathogens in the environment of the plants. In the absence of such control of plant diseases, the diseases reduce plant vigor by consuming plant tissues or sap, or transmitting plant pathogens such as viruses. Even in the absence of fungal plant pathogens, the compounds of the invention may increase plant vigor by modifying metabolism of plants. Generally, the vigor of a crop plant will be most significantly increased by treating the plant with a compound of the invention if the plant is grown in a nonideal environment, i.e. an environment comprising one or more aspects adverse to the plant achieving the full genetic potential it would exhibit in an ideal environment.

Of note is a method for increasing vigor of a crop plant wherein the crop plant is grown in an environment comprising plant diseases caused by fungal plant pathogens. Also of note is a method for increasing vigor of a crop plant wherein the crop plant is grown in an environment not comprising plant diseases caused by fungal plant pathogens. Also of note is a method for increasing vigor of a crop plant wherein the crop plant is grown in an environment comprising an amount of moisture less than ideal for supporting growth of the crop plant.

Compounds and compositions of this invention can also be mixed with one or more other biologically active compounds or agents including fungicides, insecticides, nematicides, bactericides, acaricides, herbicides, herbicide safeners, growth regulators such as insect molting inhibitors and rooting stimulants, chemosterilants, semiochemicals, repellents, attractants, pheromones, feeding stimulants, plant nutrients, other biologically active compounds or entomopathogenic bacteria, virus or fungi to form a multi-component pesticide giving an even broader spectrum of agricultural protection. Thus the present invention also pertains to a composition comprising a compound of Formula 1 (in a fungicidally effective amount) and at least one additional biologically active compound or agent (in a biologically effective amount) and can further comprise at least one of a surfactant, a solid diluent or a liquid diluent. The other biologically active compounds or agents can be formulated in compositions comprising at least one of a surfactant, solid or liquid diluent. For mixtures of the present invention, one or more other biologically active compounds or agents can be formulated together with a compound of Formula 1, to form a premix, or one or more other biologically active compounds or agents can be formulated separately from the compound of Formula 1, and the formulations combined together before application (e.g., in a spray tank) or, alternatively, applied in succession.

As mentioned in the Summary of the Invention, one aspect of the present invention is a fungicidal composition comprising (i.e. a mixture or combination of) a compound of Formula 1, an N-oxide, or a salt thereof (i.e. component (a)), and at least one other fungicide (i.e. component (b)). Of note is such a combination where the other fungicidal active ingredient has different site of action from the compound of Formula 1. In certain instances, a combination with at least one other fungicidal active ingredient having a similar spectrum of control but a different site of action will be particularly advantageous for resistance management. Thus, a composition of the present invention can further comprise a fungicidally effective amount of at least one additional fungicidal active ingredient having a similar spectrum of control but a different site of action.

Examples of component (b) fungicides include acibenzolar-S-methyl, aldimorph, ametoctradin, amisulbrom, anilazine, azaconazole, azoxystrobin, benalaxyl (including benalaxyl-M), benodanil, benomyl, benthiavalicarb (including benthiavalicarb-isopropyl), benzovindiflupyr, bethoxazin, binapacryl, biphenyl, bitertanol, bixafen, blasticidin-S, boscalid, bromuconazole, bupirimate, buthiobate, captafol, captan, carbendazim, carboxin, carpropamid, chloroneb, chlorothalonil, chlozolinate, clotrimazole, copper hydroxide, copper oxychloride, copper sulfate, coumoxystrobin, cyazofamid, cyflufenamid, cymoxanil, cyproconazole, cyprodinil, dichlofluanid, diclocymet, diclomezine, dicloran, diethofencarb, difenoconazole, diflumetorim, dimethirimol, dimethomorph, dimoxystrobin, diniconazole (including diniconazole-M), dinocap, dithianon, dithiolanes, dodemorph, dodine, dipymetitrone, econazole, edifenphos, enoxastrobin (also known as enestroburin), epoxiconazole, etaconazole, ethaboxam, ethirimol, etridiazole, famoxadone, fenamidone, fenarimol, fenaminstrobin, fenbuconazole, fenfuram, fenhexamid, fenoxanil, fenpiclonil, fenpropidin, fenpropimorph, fenpyrazamine, fentin acetate, fentin chloride, fentin hydroxide, ferbam, ferimzone, flometoquin, florylpicoxamid, fluazinam, fludioxonil, flufenoxystrobin, fluindapyr, flumorph, fluopicolide, fluopimomide, fluopyram, flouroimide, fluoxastrobin, fluquinconazole, flusilazole, flusulfamide, flutianil, flutolanil, flutriafol, fluxapyroxad, folpet, fthalide, fuberidazole, furalaxyl, furametpyr, guazatine, hexaconazole, hymexazole, imazalil, imibenconazole, iminoctadine albesilate, iminoctadine triacetate, iodocarb, ipconazole, ipfentrifluconazole, iprobenfos, iprodione, iprovalicarb, isoconazole, isofetamid, isoprothiolane, isoflucypram, isopyrazam, isotianil, kasugamycin, kresoxim-methyl, mancozeb, mandepropamid, mandestrobin, maneb, mepanipyrim, mepronil, meptyldinocap, metalaxyl (including metalaxyl-M/mefenoxam), mefentrifluconazole, metconazole, methasulfocarb, metiram, metominostrobin, metrafenone, miconazole, myclobutanil, naftifine, neo-asozin, nuarimol, octhilinone, ofurace, orysastrobin, oxadixyl, oxathiapiprolin, oxolinic acid, oxpoconazole, oxycarboxin, oxytetracycline, pefurazoate, penconazole, pencycuron, penflufen, penthiopyrad, phosphorous acid (including salts thereof, e.g., fosetyl-aluminum), picarbutrazox, picoxystrobin, piperalin, polyoxin, probenazole, prochloraz, procymidone, propamacarb, propiconazole, propineb, proquinazid, prothiocarb, prothioconazole, pyraclostrobin, pyrametostrobin, pyraoxystrobin, pyrazophos, pyribencarb, pyributicarb, pyrifenox, pyrimethanil, pyriofenone, pyrisoxazole, pyroquilon, pyrrolnitrin, quinconazole, quinofumelin (Registry Number 861647-84-9) quinomethionate, quinoxyfen, quintozene, sedaxane, silthiofam, simeconazole, spiroxamine, streptomycin, sulfur, tebuconazole, tebufloquin, teclofthalam, tecnazene, terbinafine, tetraconazole, thiabendazole, thifluzamide, thiophanate, thiophanate-methyl, thiram, tiadinil, tolclofos-methyl, tolnifanide, tolprocarb, tolyfluanid, triadimefon, triadimenol, triarimol, triticonazole, triazoxide, tribasic copper sulfate, tricyclazole, triclopyricarb, tridemorph, trifloxystrobin, triflumizole, triforine, trimorphamide, uniconazole, uniconazole-P, validamycin, valifenalate (also known as valiphenal), vinclozolin, zineb, ziram, zoxamide, N-[2-(1S,2R)-[1,1'-bicyclopropyl]-2-ylphenyl]-3-(difluoromethyl)-1-methyl-1H-pyrazole-4-carboxamide, α-(1-chlorocyclopropyl)-α-[2-(2,2-dichlorocyclopropyl)-ethyl]-1H-1,2,4-triazole-1-ethanol, (αS)-[3-(4-chloro-2-fluorophenyl)-5-(2,4-difluorophenyl)-4-isoxazolyl]-3-pyridinemethanol, rel-1-[[(2R,3S)-3-(2-chlorophenyl)-2-(2,4-difluorophenyl)-2-oxiranyl]methyl]-1H-1,2,4-triazole, rel-2-[[(2R,3S)-3-(2-chlorophenyl)-2-(2,4-difluorophenyl)-2-oxiranyl]methyl]-1,2-dihydro-3H-1,2,4-triazole-3-thione, rel-1-[[(2R,3S)-3-(2-chlorophenyl)-2-(2,4-difluorophenyl)-2-oxiranyl]methyl]-5-(2-propen-1-ylthio)-1H-1,2,4-triazole, N-[2-[4-[[3-(4-chlorophenyl)-2-propyn-1-yl]oxy]-3-methoxyphenyl]ethyl]-3-methyl-2-[(methylsulfonyl)-amino]butanamide, N-[2-[4-[[3-(4-chlorophenyl)-2-propyn-1-yl]oxy]-3-methoxyphenyl]ethyl]-3-methyl-2-[(ethylsulfonyl)amino]butanamide, N'-[4-[4-chloro-3-(trifluoromethyl)phenoxy]-2,5-dimethylphenyl]-N-ethyl-N-methylmethanimidamide, N-[2-(2,4-dichlorophenyl)-2-methoxy-1-methylethyl]-3-

(difluoromethyl)-1-methyl-1H-pyrazole-4-carboxamide, N-(3',4'-difluoro[1,1'-biphenyl]-2-yl)-3-(trifluoromethyl)-2-pyrazinecarboxamide, 3-(difluoromethyl)-N-(2,3-dihydro-1,1,3-trimethyl-1H-inden-4-yl)-1-methyl-1H-pyrazole-4-carboxamide, 5,8-difluoro-N-[2-[3-methoxy-4-[[4-(trifluoromethyl)-2-pyridinyl]oxy]phenyl]ethyl]-4-quinazolinamine, 1-[4-[4-[5R-[(2,6-difluorophenoxy)methyl]-4,5-dihydro-3-isoxazolyl]-2-thiazolyl]-1-piperdinyl]-2-[5-methyl-3-(trifluoromethyl)-1H-pyrazol-1-yl]ethanone, 4-fluorophenyl N-[1-[[[1-(4-cyanophenyl)ethyl]sulfonyl]methyl]propyl]carbamate, 5-fluoro-2-[(4-fluorophenyl)methoxy]-4-pyrimidinamine, α-(methoxyimino)-N-methyl-2-[[[1-[3-(trifluoromethyl)phenyl]ethoxy]imino]-methyl]benzeneacetamide, and [[4-methoxy-2-[[[(3S,7R,8R,9S)-9-methyl-8-(2-methyl-1-oxopropoxy)-2,6-dioxo-7-(phenylmethyl)-1,5-dioxonan-3-yl]amino]carbonyl]-3-pyridinyl]oxy]methyl 2-methylpropanoate. Therefore of note is a fungicidal composition comprising as component (a) a compound of Formula 1 (or an N-oxide or salt thereof) and as component (b) at least one fungicide selected from the preceding list.

Of particular note are combinations of compounds of Formula 1 (or an N-oxide or salt thereof) (i.e. Component (a) in compositions) with component (b) compounds selected from aminopyrifen (Registry Number 1531626-08-0), azoxystrobin, benzovindiflupyr, bixafen, captan, carpropamid, chlorothalonil, copper hydroxide, copper oxychloride, copper sulfate, cymoxanil, cyproconazole, cyprodinil, dichlobentiazox (Registry Number 957144-77-3), diethofencarb, difenoconazole, dimethomorph, dipymetitrone, epoxiconazole, ethaboxam, fenarimol, fenhexamid, fluazinam, fludioxonil, fluindapyr, fluopyram, flusilazole, flutianil, flutriafol, fluxapyroxad, folpet, ipflufenoquin (Registry Number 1314008-27-9), iprodione, isofetamid, isoflucypram, isopyrazam, kresoxim-methyl, mancozeb, mandestrobin, meptyldinocap, metalaxyl (including metalaxyl-M/mefenoxam), mefentrifluconazole, metconazole, metrafenone, metyltetraprole (Registry Number 1472649-01-6), myclobutanil, oxathiapiprolin, penflufen, penthiopyrad, phosphorous acid (including salts thereof, e.g., fosetyl-aluminum), picoxystrobin, propiconazole, proquinazid, prothioconazole, pyridachlometyl (Registry Number 1358061-55-8), pyraclostrobin, pyrapropoyne (Registry Number 1803108-03-3), pyrimethanil, sedaxane spiroxamine, sulfur, tebuconazole, thiophanate-methyl, trifloxystrobin, zoxamide, α-(1-chlorocyclopropyl)-α-[2-(2,2-dichlorocyclopropyl)ethyl]-1H-1,2,4-triazole-1-ethanol, N-[2-(2,4-dichlorophenyl)-2-methoxy-1-methylethyl]-3-(difluoromethyl)-1-methyl-1H-pyrazole-4-carboxamide, 3-(difluoromethyl)-N-(2,3-dihydro-1,1,3-trimethyl-1H-inden-4-yl)-1-methyl-1H-pyrazole-4-carboxamide, 1-[4-[4-[5R-(2,6-difluorophenyl)-4,5-dihydro-3-isoxazolyl]-2-thiazolyl]-1-piperidinyl]-2-[5-methyl-3-(trifluoromethyl)-1H-pyrazol-1-yl]ethanone, 1,1-dimethylethyl N-[6-[[[[(1-methyl-1H-tetrazol-5-yl)phenylmethylene]amino]oxy]methyl]-2-pyridinyl]carbamate, 5-fluoro-2-[(4-fluorophenyl)methoxy]-4-pyrimidinamine, (αS)-[3-(4-chloro-2-fluorophenyl)-5-(2,4-difluorophenyl)-4-isoxazolyl]-3-pyridinemethanol, rel-1-[[(2R,3S)-3-(2-chlorophenyl)-2-(2,4-difluorophenyl)-2-oxiranyl]methyl]-1H-1,2,4-triazole, rel-2-[[(2R,3S)-3-(2-chlorophenyl)-2-(2,4-difluorophenyl)-2-oxiranyl]methyl]-1,2-dihydro-3H-1,2,4-triazole-3-thione, and rel-1-[[(2R,3S)-3-(2-chlorophenyl)-2-(2,4-difluorophenyl)-2-oxiran-yl]methyl]-5-(2-propen-1-ylthio)-1H-1,2,4-triazole (i.e. as Component (b) in compositions).

Generally preferred for better control of plant diseases caused by fungal plant pathogens (e.g., lower use rate or broader spectrum of plant pathogens controlled) or resistance management are mixtures of a compound of Formula 1, an N-oxide, or salt thereof, with a fungicidal compound selected from the group: azoxystrobin, benzovindiflupyr, bixafen, boscalid, carbendazim, chlorothalonil, copper sulfate, cymoxanil, cyproconazole, difenoconazole, dimethomorph, dimoxystrobin, epoxiconazole, fenpropimorph, florylpicoxamid, fludioxonil, fluindapyr, fluquinconazole, fluopicolide, fluoxastrobin, flutriafol, fluxapyroxad, inpyrfluxam, ipfentrifluconazole, iprodione, isoflucypram, kresoxim-methyl, mancozeb, metalaxyl, mefentrifluconazole, metconazole, metominostrobin, picoxystrobin, prothioconazole, pydiflumetofen, pyraclostrobin, pyrametostrobin, pyraoxystrobin, pyriofenone, sedaxane, silthiofam, tebuconazole, thiabendazole, thiophanate-methyl, trifloxystrobin and triticonazole.

In the fungicidal compositions of the present invention, component (a) (i.e. at least one compound selected from compounds of Formula 1, N-oxides, and salts thereof) and component (b) are present in fungicidally effective amounts. The weight ratio of component (a) to component (b) (i.e. one or more additional fungicidal compounds) is generally between about 1:3000 to about 3000:1, and more typically between about 1:500 to about 500:1. Of note are compositions wherein the weight ratio of component (a) to component (b) is from about 125:1 to about 1:125. Of particular note are compositions wherein the weight ratio of component (a) to component (b) is from about 25:1 to about 1:25, or from about 5:1 to about 1:5. One skilled in the art can easily determine through simple experimentation the weight ratios and application rates of fungicidal compounds necessary for the desired spectrum of fungicidal protection and control. It will be evident that including additional fungicidal compounds in component (b) may expand the spectrum of plant diseases controlled beyond the spectrum controlled by component (a) alone. Furthermore, Tables A1 through A27 and C1 through C27 exemplify weight ratios combinations of fungicidal compounds of the present invention. Additionally, Table B1 lists typical, more typical and most typical ranges of ratios involving particular fungicidal compounds of component (b).

Tables A1 through A27 lists specific mixtures (compound numbers refer to compounds in Index Tables A through L) of the present invention. In Table A1, each line below the column headings "Component (a)" and "Component (b)" specifically discloses a mixture of Component (a), (i.e. Compound 3), with a Component (b) fungicidal compound. The entries under the heading "Illustrative Ratios" disclose three specific weight ratios of Component (a) to Component (b) for the disclosed mixture. For example, the first line of Table A1 discloses a mixture of Compound 3 with acibenzolar-S-methyl and lists weight ratios of Compound 3 relative to acibenzolar-S-methyl of 1:1, 1:4 or 1:18.

TABLE A1

| Component (a) | Component (b) | Illustrative Ratios(*) | | |
|---|---|---|---|---|
| Compound 3 | acibenzolar-S-methyl | 1:1 | 1:4 | 1:18 |
| Compound 3 | aldimorph | 7:1 | 3:1 | 1:1 |

TABLE A1-continued

| Component (a) | Component (b) | Illustrative Ratios(*) | | |
|---|---|---|---|---|
| Compound 3 | ametoctradin | 3:1 | 1:1 | 1:3 |
| Compound 3 | amisulbrom | 1:1 | 1:2 | 1:6 |
| Compound 3 | anilazine | 22:1 | 8:1 | 4:1 |
| Compound 3 | azaconazole | 2:1 | 1:2 | 1:4 |
| Compound 3 | azoxystrobin | 3:1 | 1:1 | 1:3 |
| Compound 3 | benalaxyl | 1:1 | 1:2 | 1:6 |
| Compound 3 | benalaxyl-M | 1:1 | 1:3 | 1:8 |
| Compound 3 | benodanil | 4:1 | 2:1 | 1:2 |
| Compound 3 | benomyl | 11:1 | 4:1 | 1:1 |
| Compound 3 | benthiavalicarb | 1:1 | 1:4 | 1:12 |
| Compound 3 | benthiavalicarb-isopropyl | 1:1 | 1:4 | 1:12 |
| Compound 3 | bethoxazin | 15:1 | 5:1 | 2:1 |
| Compound 3 | binapacryl | 15:1 | 5:1 | 2:1 |
| Compound 3 | biphenyl | 15:1 | 5:1 | 2:1 |
| Compound 3 | bitertanol | 3:1 | 1:1 | 1:2 |
| Compound 3 | bixafen | 2:1 | 1:1 | 1:3 |
| Compound 3 | blasticidin-S | 1:4 | 1:12 | 1:30 |
| Compound 3 | Bordeaux mixture (tribasic copper sulfate) | 45:1 | 15:1 | 5:1 |
| Compound 3 | boscalid | 4:1 | 2:1 | 1:2 |
| Compound 3 | bromuconazole | 3:1 | 1:1 | 1:3 |
| Compound 3 | bupirimate | 1:3 | 1:10 | 1:30 |
| Compound 3 | captafol | 15:1 | 5:1 | 2:1 |
| Compound 3 | captan | 15:1 | 5:1 | 2:1 |
| Compound 3 | carbendazim | 11:1 | 4:1 | 2:1 |
| Compound 3 | carboxin | 4:1 | 2:1 | 1:2 |
| Compound 3 | carpropamid | 3:1 | 1:1 | 1:3 |
| Compound 3 | chloroneb | 100:1 | 35:1 | 14:1 |
| Compound 3 | chlorothalonil | 15:1 | 5:1 | 2:1 |
| Compound 3 | chlozolinate | 11:1 | 4:1 | 2:1 |
| Compound 3 | clotrimazole | 3:1 | 1:1 | 1:3 |
| Compound 3 | copper hydroxide | 45:1 | 15:1 | 5:1 |
| Compound 3 | copper oxychloride | 45:1 | 15:1 | 5:1 |
| Compound 3 | cyazofamid | 1:1 | 1:2 | 1:6 |
| Compound 3 | cyflufenamid | 1:2 | 1:6 | 1:24 |
| Compound 3 | cymoxanil | 1:1 | 1:2 | 1:5 |
| Compound 3 | cyproconazole | 1:1 | 1:2 | 1:6 |
| Compound 3 | cyprodinil | 4:1 | 2:1 | 1:2 |
| Compound 3 | dichlofluanid | 15:1 | 5:1 | 2:1 |
| Compound 3 | diclocymet | 15:1 | 5:1 | 2:1 |
| Compound 3 | diclomezine | 3:1 | 1:1 | 1:3 |
| Compound 3 | dicloran | 15:1 | 5:1 | 2:1 |
| Compound 3 | diethofencarb | 7:1 | 2:1 | 1:2 |
| Compound 3 | difenoconazole | 1:1 | 1:3 | 1:12 |
| Compound 3 | diflumetorim | 15:1 | 5:1 | 2:1 |
| Compound 3 | dimethirimol | 1:3 | 1:8 | 1:30 |
| Compound 3 | dimethomorph | 3:1 | 1:1 | 1:2 |
| Compound 3 | dimoxystrobin | 2:1 | 1:1 | 1:4 |
| Compound 3 | diniconazole | 1:1 | 1:3 | 1:8 |
| Compound 3 | diniconazole-M | 1:1 | 1:3 | 1:12 |
| Compound 3 | dinocap | 2:1 | 1:1 | 1:3 |
| Compound 3 | dithianon | 5:1 | 2:1 | 1:2 |
| Compound 3 | dodemorph | 7:1 | 3:1 | 1:1 |
| Compound 3 | dodine | 10:1 | 4:1 | 2:1 |
| Compound 3 | edifenphos | 3:1 | 1:1 | 1:3 |
| Compound 3 | enestroburin | 2:1 | 1:1 | 1:4 |
| Compound 3 | epoxiconazole | 1:1 | 1:3 | 1:7 |
| Compound 3 | etaconazole | 1:1 | 1:3 | 1:7 |
| Compound 3 | ethaboxam | 2:1 | 1:1 | 1:3 |
| Compound 3 | ethirimol | 7:1 | 3:1 | 1:1 |
| Compound 3 | etridiazole | 7:1 | 2:1 | 1:2 |
| Compound 3 | famoxadone | 2:1 | 1:1 | 1:4 |
| Compound 3 | fenamidone | 2:1 | 1:1 | 1:4 |
| Compound 3 | fenaminstrobin | 3:1 | 1:1 | 1:3 |
| Compound 3 | fenarimol | 1:2 | 1:7 | 1:24 |
| Compound 3 | fenbuconazole | 1:1 | 1:3 | 1:10 |
| Compound 3 | fenfuram | 4:1 | 1:1 | 1:2 |
| Compound 3 | fenhexamid | 10:1 | 4:1 | 2:1 |
| Compound 3 | fenoxanil | 15:1 | 4:1 | 1:1 |
| Compound 3 | fenpiclonil | 15:1 | 5:1 | 2:1 |
| Compound 3 | fenpropidin | 7:1 | 2:1 | 1:1 |
| Compound 3 | fenpropimorph | 7:1 | 2:1 | 1:1 |
| Compound 3 | fenpyrazamine | 3:1 | 1:1 | 1:3 |
| Compound 3 | fentin salt such as fentin acetate, fentin chloride or fentin hydroxide | 3:1 | 1:1 | 1:3 |
| Compound 3 | ferbam | 30:1 | 10:1 | 4:1 |
| Compound 3 | ferimzone | 7:1 | 2:1 | 1:2 |
| Compound 3 | fluazinam | 3:1 | 1:1 | 1:2 |
| Compound 3 | fludioxonil | 2:1 | 1:1 | 1:4 |

TABLE A1-continued

| Component (a) | Component (b) | Illustrative Ratios(*) | | |
|---|---|---|---|---|
| Compound 3 | flumetover | 3:1 | 1:1 | 1:2 |
| Compound 3 | flumorph | 3:1 | 1:1 | 1:3 |
| Compound 3 | fluopicolide | 1:1 | 1:2 | 1:6 |
| Compound 3 | fluopyram | 3:1 | 1:1 | 1:3 |
| Compound 3 | fluoroimide | 37:1 | 14:1 | 5:1 |
| Compound 3 | fluoxastrobin | 1:1 | 1:2 | 1:6 |
| Compound 3 | fluquinconazole | 1:1 | 1:2 | 1:4 |
| Compound 3 | flusilazole | 3:1 | 1:1 | 1:3 |
| Compound 3 | flusulfamide | 15:1 | 5:1 | 2:1 |
| Compound 3 | flutianil | 1:1 | 1:2 | 1:6 |
| Compound 3 | flutolanil | 4:1 | 1:1 | 1:2 |
| Compound 3 | flutriafol | 1:1 | 1:2 | 1:4 |
| Compound 3 | fluxapyroxad | 2:1 | 1:1 | 1:3 |
| Compound 3 | folpet | 15:1 | 5:1 | 2:1 |
| Compound 3 | fosetyl-aluminum | 30:1 | 12:1 | 5:1 |
| Compound 3 | fuberidazole | 11:1 | 4:1 | 2:1 |
| Compound 3 | furalaxyl | 1:1 | 1:2 | 1:6 |
| Compound 3 | furametpyr | 15:1 | 5:1 | 2:1 |
| Compound 3 | guazatine | 15:1 | 5:1 | 2:1 |
| Compound 3 | hexaconazole | 1:1 | 1:2 | 1:5 |
| Compound 3 | hymexazol | 75:1 | 25:1 | 9:1 |
| Compound 3 | imazalil | 1:1 | 1:2 | 1:5 |
| Compound 3 | imibenconazole | 1:1 | 1:2 | 1:5 |
| Compound 3 | iminoctadine | 15:1 | 4:1 | 1:1 |
| Compound 3 | iodocarb | 15:1 | 5:1 | 2:1 |
| Compound 3 | ipconazole | 1:1 | 1:2 | 1:5 |
| Compound 3 | iprobenfos | 15:1 | 5:1 | 2:1 |
| Compound 3 | iprodione | 15:1 | 5:1 | 2:1 |
| Compound 3 | iprovalicarb | 2:1 | 1:1 | 1:3 |
| Compound 3 | isoprothiolane | 45:1 | 15:1 | 5:1 |
| Compound 3 | isopyrazam | 2:1 | 1:1 | 1:3 |
| Compound 3 | isotianil | 2:1 | 1:1 | 1:3 |
| Compound 3 | kasugamycin | 1:2 | 1:7 | 1:24 |
| Compound 3 | kresoxim-methyl | 2:1 | 1:1 | 1:4 |
| Compound 3 | mancozeb | 22:1 | 7:1 | 3:1 |
| Compound 3 | mandipropamid | 2:1 | 1:1 | 1:4 |
| Compound 3 | maneb | 22:1 | 7:1 | 3:1 |
| Compound 3 | mepanipyrim | 6:1 | 2:1 | 1:1 |
| Compound 3 | mepronil | 1:1 | 1:2 | 1:6 |
| Compound 3 | meptyldinocap | 2:1 | 1:1 | 1:3 |
| Compound 3 | metalaxyl | 1:1 | 1:2 | 1:6 |
| Compound 3 | metalaxyl-M | 1:1 | 1:4 | 1:12 |
| Compound 3 | metconazole | 1:1 | 1:2 | 1:6 |
| Compound 3 | methasulfocarb | 15:1 | 5:1 | 2:1 |
| Compound 3 | metiram | 15:1 | 5:1 | 2:1 |
| Compound 3 | metominostrobin | 3:1 | 1:1 | 1:3 |
| Compound 3 | metrafenone | 2:1 | 1:1 | 1:4 |
| Compound 3 | myclobutanil | 1:1 | 1:3 | 1:8 |
| Compound 3 | naftifine | 15:1 | 5:1 | 2:1 |
| Compound 3 | neo-asozin (ferric methanearsonate) | 15:1 | 5:1 | 2:1 |
| Compound 3 | nuarimol | 3:1 | 1:1 | 1:3 |
| Compound 3 | octhilinone | 15:1 | 4:1 | 1:1 |
| Compound 3 | ofurace | 1:1 | 1:2 | 1:6 |
| Compound 3 | orysastrobin | 3:1 | 1:1 | 1:3 |
| Compound 3 | oxadixyl | 1:1 | 1:2 | 1:6 |
| Compound 3 | oxolinic acid | 7:1 | 2:1 | 1:2 |
| Compound 3 | oxpoconazole | 1:1 | 1:2 | 1:5 |
| Compound 3 | oxycarboxin | 4:1 | 1:1 | 1:2 |
| Compound 3 | oxytetracycline | 3:1 | 1:1 | 1:3 |
| Compound 3 | pefurazoate | 15:1 | 5:1 | 2:1 |
| Compound 3 | penconazole | 1:2 | 1:6 | 1:15 |
| Compound 3 | pencycuron | 11:1 | 4:1 | 2:1 |
| Compound 3 | penflufen | 2:1 | 1:1 | 1:3 |
| Compound 3 | penthiopyrad | 2:1 | 1:1 | 1:3 |
| Compound 3 | phosphorous acid or a salt thereof | 15:1 | 6:1 | 2:1 |
| Compound 3 | phthalide | 15:1 | 6:1 | 2:1 |
| Compound 3 | picoxystrobin | 1:1 | 1:2 | 1:5 |
| Compound 3 | piperalin | 3:1 | 1:1 | 1:3 |
| Compound 3 | polyoxin | 3:1 | 1:1 | 1:3 |
| Compound 3 | probenazole | 3:1 | 1:1 | 1:3 |
| Compound 3 | prochloraz | 7:1 | 2:1 | 1:2 |
| Compound 3 | procymidone | 11:1 | 4:1 | 2:1 |
| Compound 3 | propamocarb or propamocarb-hydrochloride | 10:1 | 4:1 | 2:1 |
| Compound 3 | propiconazole | 1:1 | 1:2 | 1:5 |
| Compound 3 | propineb | 11:1 | 4:1 | 2:1 |
| Compound 3 | proquinazid | 1:1 | 1:3 | 1:12 |
| Compound 3 | prothiocarb | 3:1 | 1:1 | 1:3 |
| Compound 3 | prothioconazole | 1:1 | 1:2 | 1:5 |

TABLE A1-continued

| Component (a) | Component (b) | Illustrative Ratios(*) | | |
|---|---|---|---|---|
| Compound 3 | pyraclostrobin | 2:1 | 1:1 | 1:4 |
| Compound 3 | pyrametostrobin | 2:1 | 1:1 | 1:4 |
| Compound 3 | pyraoxystrobin | 2:1 | 1:1 | 1:4 |
| Compound 3 | pyrazophos | 15:1 | 4:1 | 1:1 |
| Compound 3 | pyribencarb | 4:1 | 1:1 | 1:2 |
| Compound 3 | pyributicarb | 15:1 | 4:1 | 1:1 |
| Compound 3 | pyrifenox | 3:1 | 1:1 | 1:3 |
| Compound 3 | pyrimethanil | 3:1 | 1:1 | 1:2 |
| Compound 3 | pyriofenone | 2:1 | 1:1 | 1:4 |
| Compound 3 | pyrisoxazole | 3:1 | 1:1 | 1:3 |
| Compound 3 | pyroquilon | 3:1 | 1:1 | 1:3 |
| Compound 3 | pyrrolnitrin | 15:1 | 5:1 | 2:1 |
| Compound 3 | quinconazole | 1:1 | 1:2 | 1:4 |
| Compound 3 | quinomethionate | 15:1 | 5:1 | 2:1 |
| Compound 3 | quinoxyfen | 1:1 | 1:2 | 1:6 |
| Compound 3 | quintozene | 15:1 | 5:1 | 2:1 |
| Compound 3 | silthiofam | 2:1 | 1:1 | 1:4 |
| Compound 3 | simeconazole | 1:1 | 1:2 | 1:5 |
| Compound 3 | spiroxamine | 5:1 | 2:1 | 1:2 |
| Compound 3 | streptomycin | 3:1 | 1:1 | 1:3 |
| Compound 3 | sulfur | 75:1 | 25:1 | 9:1 |
| Compound 3 | tebuconazole | 1:1 | 1:2 | 1:5 |
| Compound 3 | tebufloquin | 3:1 | 1:1 | 1:3 |
| Compound 3 | tecloftalam | 15:1 | 5:1 | 2:1 |
| Compound 3 | tecnazene | 15:1 | 5:1 | 2:1 |
| Compound 3 | terbinafine | 15:1 | 5:1 | 2:1 |
| Compound 3 | tetraconazole | 1:1 | 1:2 | 1:5 |
| Compound 3 | thiabendazole | 11:1 | 4:1 | 2:1 |
| Compound 3 | thifluzamide | 3:1 | 1:1 | 1:3 |
| Compound 3 | thiophanate | 11:1 | 4:1 | 2:1 |
| Compound 3 | thiophanate-methyl | 11:1 | 4:1 | 2:1 |
| Compound 3 | thiram | 37:1 | 14:1 | 5:1 |
| Compound 3 | tiadinil | 2:1 | 1:1 | 1:3 |
| Compound 3 | tolclofos-methyl | 37:1 | 14:1 | 5:1 |
| Compound 3 | tolnifanide | 3:1 | 1:1 | 1:3 |
| Compound 3 | tolylfluanid | 15:1 | 5:1 | 2:1 |
| Compound 3 | triadimefon | 1:1 | 1:2 | 1:5 |
| Compound 3 | triadimenol | 1:1 | 1:2 | 1:5 |
| Compound 3 | triarimol | 1:2 | 1:7 | 1:24 |
| Compound 3 | triazoxide | 15:1 | 5:1 | 2:1 |
| Compound 3 | tricyclazole | 3:1 | 1:1 | 1:3 |
| Compound 3 | tridemorph | 7:1 | 2:1 | 1:1 |
| Compound 3 | trifloxystrobin | 2:1 | 1:1 | 1:4 |
| Compound 3 | triflumizole | 3:1 | 1:1 | 1:3 |
| Compound 3 | triforine | 3:1 | 1:1 | 1:3 |
| Compound 3 | trimorphamide | 7:1 | 2:1 | 1:2 |
| Compound 3 | triticonazole | 1:1 | 1:2 | 1:5 |
| Compound 3 | uniconazole | 1:1 | 1:2 | 1:5 |
| Compound 3 | validamycin | 3:1 | 1:1 | 1:3 |
| Compound 3 | valifenalate | 2:1 | 1:1 | 1:4 |
| Compound 3 | vinclozolin | 15:1 | 6:1 | 2:1 |
| Compound 3 | zineb | 37:1 | 14:1 | 5:1 |
| Compound 3 | ziram | 37:1 | 14:1 | 5:1 |
| Compound 3 | zoxamide | 2:1 | 1:1 | 1:4 |
| Compound 3 | 5-chloro-6-(2,4,6-trifluorophenyl)-7-(4-methylpiperidin-1-yl)[1,2,4]triazolo[1,5-a]pyrimidine (DPX-BAS600F) | 1:1 | 1:2 | 1:6 |
| Compound 3 | N-[2-[4-[[3-(4-chlorophenyl)-2-propyn-1-yl]oxy]-3-methoxy-phenyl]ethyl]-3-methyl-2-[(methylsulfonyl)amino]-butanamide | 2:1 | 1:1 | 1:4 |
| Compound 3 | N-[2-[4-[[3-(4-chlorophenyl)-2-propyn-1-yl]oxy]-3-methoxy-phenyl]ethyl]-3-methyl-2-[(ethylsulfonyl)amino]butanamide | 2:1 | 1:1 | 1:4 |
| Compound 3 | 4-fluorophenyl N-[1-[[[1-(4-cyanophenyl)ethyl]sulfonyl]-methyl]propyl]carbamate | 2:1 | 1:1 | 1:4 |
| Compound 3 | α-[methoxyimino]-N-methyl-2-[[[1-[3-(trifluoromethyl)-phenyl]ethoxy]imino]methyl]benzeneacetamide | 3:1 | 1:1 | 1:3 |
| Compound 3 | N'-[4-[4-chloro-3-(trifluoromethyl)phenoxy]-2,5-dimethyl-phenyl]-N-ethyl-N-methylmethanimidamide | 3:1 | 1:1 | 1:3 |

(*)Ratios of Component (a) relative to Component (b) by weight.

Tables A2 through A27 are each constructed the same as Table A1 above except that entries below the "Component (a)" column heading are replaced with the respective Component (a) Column Entry shown below. Thus, for example, in Table A2 the entries below the "Component (a)" column heading all recite "Compound 4". Therefore, the first entry in Table A2 specifically discloses a mixture of Compound 4 with acibenzolar-S-methyl. Tables A3 through A27 are constructed similarly.

| Table Number | Component (a) Column Entry |
|---|---|
| A2 | Compound 4 |
| A3 | Compound 6 |
| A4 | Compound 7 |
| A5 | Compound 11 |
| A6 | Compound 13 |
| A7 | Compound 14 |
| A8 | Compound 15 |
| A9 | Compound 30 |
| A10 | Compound 33 |
| A11 | Compound 41 |
| A12 | Compound 63 |
| A13 | Compound 64 |
| A14 | Compound 66 |
| A15 | Compound 78 |
| A16 | Compound 83 |
| A17 | Compound 87 |
| A18 | Compound 89 |
| A19 | Compound 94 |
| A20 | Compound 99 |
| A21 | Compound 108 |
| A22 | Compound 111 |
| A23 | Compound 113 |
| A24 | Compound 117 |
| A25 | Compound 134 |
| A26 | Compound 135 |
| A27 | Compound 142 |

Table B1 lists combinations of a Component (b) compound with Component (a) compound illustrative of the mixtures, compositions and methods of the present invention. The first column of Table B1 lists the specific Component (b) compound (e.g., "acibenzolar-S-methyl" is the first entry). The second, third and fourth columns of Table B1 lists ranges of weight ratios for rates at which the Component (a) compound is typically applied to a field-grown crop relative to Component (b). Thus, for example, the first line of Table B1 discloses the combination of a compound of Component (a) with acibenzolar-S-methyl is typically applied in a weight ratio of Component (a) to Component (b) of between 2:1 to 1:180, more typically between 1:1 to 1:60, and most typically between 1:1 to 1:18. The remaining lines of Table B1 are to be construed similarly. Of particular note is a composition comprising a mixture of any one of the compounds listed in Embodiment 108 as Component (a) with a compound listed in the Component (b) column of Table B1 according to the weight ratios disclosed in Table B1. Table B1 thus supplements the specific ratios disclosed in Tables A1 through A27 with ranges of ratios for these combinations.

TABLE B1

| Component (b) | Typical Weight Ratio | More Typical Weight Ratio | Most Typical Weight Ratio |
|---|---|---|---|
| acibenzolar-S-methyl | 2:1 to 1:180 | 1:1 to 1:60 | 1:1 to 1:18 |
| aldimorph | 30:1 to 1:3 | 10:1 to 1:1 | 7:1 to 1:1 |
| ametoctradin | 9:1 to 1:18 | 3:1 to 1:6 | 3:1 to 1:3 |
| amisulbrom | 6:1 to 1:18 | 2:1 to 1:6 | 1:1 to 1:6 |
| anilazine | 90:1 to 2:1 | 30:1 to 4:1 | 22:1 to 4:1 |
| azaconazole | 7:1 to 1:18 | 2:1 to 1:6 | 2:1 to 1:4 |
| azoxystrobin | 9:1 to 1:12 | 3:1 to 1:4 | 3:1 to 1:3 |
| benalaxyl | 4:1 to 1:18 | 1:1 to 1:6 | 1:1 to 1:6 |
| benalaxyl-M | 4:1 to 1:36 | 1:1 to 1:12 | 1:1 to 1:8 |
| benodanil | 18:1 to 1:6 | 6:1 to 1:2 | 4:1 to 1:2 |
| benomyl | 45:1 to 1:4 | 15:1 to 1:1 | 11:1 to 1:1 |
| benthiavalicarb or benthiavalicarb-isopropyl | 2:1 to 1:36 | 1:1 to 1:12 | 1:1 to 1:12 |
| bethoxazin | 150:1 to 1:36 | 50:1 to 1:12 | 15:1 to 2:1 |
| binapacryl | 150:1 to 1:36 | 50:1 to 1:12 | 15:1 to 2:1 |
| biphenyl | 150:1 to 1:36 | 50:1 to 1:12 | 15:1 to 2:1 |
| bitertanol | 15:1 to 1:5 | 5:1 to 1:2 | 3:1 to 1:2 |
| bixafen | 12:1 to 1:9 | 4:1 to 1:3 | 2:1 to 1:3 |
| blasticidin-S | 3:1 to 1:90 | 1:1 to 1:30 | 1:4 to 1:30 |
| boscalid | 18:1 to 1:6 | 6:1 to 1:2 | 4:1 to 1:2 |
| bromuconazole | 15:1 to 1:9 | 5:1 to 1:3 | 3:1 to 1:3 |
| bupirimate | 3:1 to 1:90 | 1:1 to 1:30 | 1:3 to 1:30 |
| captafol | 90:1 to 1:4 | 30:1 to 1:2 | 15:1 to 2:1 |
| captan | 90:1 to 1:4 | 30:1 to 1:2 | 15:1 to 2:1 |
| carbendazim | 45:1 to 1:4 | 15:1 to 1:2 | 11:1 to 2:1 |
| carboxin | 18:1 to 1:6 | 6:1 to 1:2 | 4:1 to 1:2 |
| carpropamid | 15:1 to 1:9 | 5:1 to 1:3 | 3:1 to 1:3 |
| chloroneb | 300:1 to 2:1 | 100:1 to 4:1 | 100:1 to 14:1 |
| chlorothalonil | 90:1 to 1:4 | 30:1 to 1:2 | 15:1 to 2:1 |
| chlozolinate | 45:1 to 1:2 | 15:1 to 2:1 | 11:1 to 2:1 |
| clotrimazole | 15:1 to 1:9 | 5:1 to 1:3 | 3:1 to 1:3 |
| copper salts such as Bordeaux mixture (tribasic copper sulfate), copper oxychloride, copper sulfate and copper hydroxide | 450:1 to 1:1 | 150:1 to 4:1 | 45:1 to 5:1 |
| cyazofamid | 4:1 to 1:18 | 1:1 to 1:6 | 1:1 to 1:6 |
| cyflufenamid | 1:1 to 1:90 | 1:2 to 1:30 | 1:2 to 1:24 |
| cymoxanil | 6:1 to 1:18 | 2:1 to 1:6 | 1:1 to 1:5 |
| cyproconazole | 4:1 to 1:18 | 1:1 to 1:6 | 1:1 to 1:6 |
| cyprodinil | 22:1 to 1:9 | 7:1 to 1:3 | 4:1 to 1:2 |
| dichlofluanid | 150:1 to 1:36 | 50:1 to 1:12 | 15:1 to 2:1 |
| diclocymet | 150:1 to 1:36 | 50:1 to 1:12 | 15:1 to 2:1 |
| diclomezine | 15:1 to 1:9 | 5:1 to 1:3 | 3:1 to 1:3 |
| dicloran | 150:1 to 1:36 | 50:1 to 1:12 | 15:1 to 2:1 |
| diethofencarb | 22:1 to 1:9 | 7:1 to 1:3 | 7:1 to 1:2 |

TABLE B1-continued

| Component (b) | Typical Weight Ratio | More Typical Weight Ratio | Most Typical Weight Ratio |
|---|---|---|---|
| difenoconazole | 4:1 to 1:36 | 1:1 to 1:12 | 1:1 to 1:12 |
| diflumetorim | 150:1 to 1:36 | 50:1 to 1:12 | 15:1 to 2:1 |
| dimethirimol | 3:1 to 1:90 | 1:1 to 1:30 | 1:3 to 1:30 |
| dimethomorph | 9:1 to 1:6 | 3:1 to 1:2 | 3:1 to 1:2 |
| dimoxystrobin | 9:1 to 1:18 | 3:1 to 1:6 | 2:1 to 1:4 |
| diniconazole | 3:1 to 1:36 | 1:1 to 1:12 | 1:1 to 1:8 |
| diniconazole M | 3:1 to 1:90 | 1:1 to 1:30 | 1:1 to 1:12 |
| dinocap | 7:1 to 1:9 | 2:1 to 1:3 | 2:1 to 1:3 |
| dithianon | 15:1 to 1:4 | 5:1 to 1:2 | 5:1 to 1:2 |
| dodemorph | 30:1 to 1:3 | 10:1 to 1:1 | 7:1 to 1:1 |
| dodine | 30:1 to 1:2 | 10:1 to 2:1 | 10:1 to 2:1 |
| edifenphos | 30:1 to 1:9 | 10:1 to 1:3 | 3:1 to 1:3 |
| enestroburin | 9:1 to 1:18 | 3:1 to 1:6 | 2:1 to 1:4 |
| epoxiconazole | 3:1 to 1:36 | 1:1 to 1:12 | 1:1 to 1:7 |
| etaconazole | 3:1 to 1:36 | 1:1 to 1:12 | 1:1 to 1:7 |
| ethaboxam | 7:1 to 1:9 | 2:1 to 1:3 | 2:1 to 1:3 |
| ethirimol | 30:1 to 1:3 | 10:1 to 1:1 | 7:1 to 1:1 |
| etridiazole | 30:1 to 1:9 | 10:1 to 1:3 | 7:1 to 1:2 |
| famoxadone | 9:1 to 1:18 | 3:1 to 1:6 | 2:1 to 1:4 |
| fenamidone | 6:1 to 1:18 | 2:1 to 1:6 | 2:1 to 1:4 |
| fenarimol | 3:1 to 1:90 | 1:1 to 1:30 | 1:2 to 1:24 |
| fenbuconazole | 3:1 to 1:30 | 1:1 to 1:10 | 1:1 to 1:10 |
| fenfuram | 18:1 to 1:6 | 6:1 to 1:2 | 4:1 to 1:2 |
| fenhexamid | 30:1 to 1:2 | 10:1 to 2:1 | 10:1 to 2:1 |
| fenoxanil | 150:1 to 1:36 | 50:1 to 1:12 | 15:1 to 1:1 |
| fenpiclonil | 75:1 to 1:9 | 25:1 to 1:3 | 15:1 to 2:1 |
| fenpropidin | 30:1 to 1:3 | 10:1 to 1:1 | 7:1 to 1:1 |
| fenpropimorph | 30:1 to 1:3 | 10:1 to 1:1 | 7:1 to 1:1 |
| fenpyrazamine | 100:1 to 1:100 | 10:1 to 1:10 | 3:1 to 1:3 |
| fentin salt such as the acetate, chloride or hydroxide | 15:1 to 1:9 | 5:1 to 1:3 | 3:1 to 1:3 |
| ferbam | 300:1 to 1:2 | 100:1 to 2:1 | 30:1 to 4:1 |
| ferimzone | 30:1 to 1:5 | 10:1 to 1:2 | 7:1 to 1:2 |
| fluazinam | 22:1 to 1:5 | 7:1 to 1:2 | 3:1 to 1:2 |
| fludioxonil | 7:1 to 1:12 | 2:1 to 1:4 | 2:1 to 1:4 |
| flumetover | 9:1 to 1:6 | 3:1 to 1:2 | 3:1 to 1:2 |
| flumorph | 9:1 to 1:18 | 3:1 to 1:6 | 3:1 to 1:3 |
| fluopicolide | 3:1 to 1:18 | 1:1 to 1:6 | 1:1 to 1:6 |
| fluopyram | 15:1 to 1:90 | 5:1 to 1:30 | 3:1 to 1:3 |
| fluoromide | 150:1 to 2:1 | 50:1 to 4:1 | 37:1 to 5:1 |
| fluoxastrobin | 4:1 to 1:18 | 1:1 to 1:6 | 1:1 to 1:6 |
| fluquinconazole | 4:1 to 1:12 | 1:1 to 1:4 | 1:1 to 1:4 |
| flusilazole | 15:1 to 1:9 | 5:1 to 1:3 | 3:1 to 1:3 |
| flusulfamide | 90:1 to 1:2 | 30:1 to 2:1 | 15:1 to 2:1 |
| flutianil | 7:1 to 1:36 | 2:1 to 1:12 | 1:1 to 1:6 |
| flutolanil | 18:1 to 1:6 | 6:1 to 1:2 | 4:1 to 1:2 |
| flutriafol | 4:1 to 1:12 | 1:1 to 1:4 | 1:1 to 1:4 |
| fluxapyroxad | 12:1 to 1:9 | 4:1 to 1:3 | 2:1 to 1:3 |
| folpet | 90:1 to 1:4 | 30:1 to 1:2 | 15:1 to 2:1 |
| fosetyl-aluminum | 225:1 to 2:1 | 75:1 to 5:1 | 30:1 to 5:1 |
| fuberidazole | 45:1 to 1:4 | 15:1 to 1:2 | 11:1 to 2:1 |
| furalaxyl | 15:1 to 1:45 | 5:1 to 1:15 | 1:1 to 1:6 |
| furametpyr | 150:1 to 1:36 | 50:1 to 1:12 | 15:1 to 2:1 |
| guazatine or iminoctadine | 150:1 to 1:36 | 50:1 to 1:12 | 15:1 to 2:1 |
| hexaconazole | 15:1 to 1:36 | 5:1 to 1:12 | 1:1 to 1:5 |
| hymexazol | 225:1 to 2:1 | 75:1 to 4:1 | 75:1 to 9:1 |
| imazalil | 7:1 to 1:18 | 2:1 to 1:6 | 1:1 to 1:5 |
| imibenconazole | 15:1 to 1:36 | 5:1 to 1:12 | 1:1 to 1:5 |
| iodocarb | 150:1 to 1:36 | 50:1 to 1:12 | 15:1 to 2:1 |
| ipconazole | 15:1 to 1:36 | 5:1 to 1:12 | 1:1 to 1:5 |
| iprobenfos | 150:1 to 1:36 | 50:1 to 1:12 | 15:1 to 2:1 |
| iprodione | 120:1 to 1:2 | 40:1 to 2:1 | 15:1 to 2:1 |
| iprovalicarb | 9:1 to 1:9 | 3:1 to 1:3 | 2:1 to 1:3 |
| isoprothiolane | 150:1 to 2:1 | 50:1 to 4:1 | 45:1 to 5:1 |
| isopyrazam | 12:1 to 1:9 | 4:1 to 1:3 | 2:1 to 1:3 |
| isotianil | 12:1 to 1:9 | 4:1 to 1:3 | 2:1 to 1:3 |
| kasugamycin | 7:1 to 1:90 | 2:1 to 1:30 | 1:2 to 1:24 |
| kresoxim-methyl | 7:1 to 1:18 | 2:1 to 1:6 | 2:1 to 1:4 |
| mancozeb | 180:1 to 1:3 | 60:1 to 2:1 | 22:1 to 3:1 |
| mandipropamid | 6:1 to 1:18 | 2:1 to 1:6 | 2:1 to 1:4 |
| maneb | 180:1 to 1:3 | 60:1 to 2:1 | 22:1 to 3:1 |
| mepanipyrim | 18:1 to 1:3 | 6:1 to 1:1 | 6:1 to 1:1 |
| mepronil | 7:1 to 1:36 | 2:1 to 1:12 | 1:1 to 1:6 |
| meptyldinocap | 7:1 to 1:9 | 2:1 to 1:3 | 2:1 to 1:3 |
| metalaxyl | 15:1 to 1:45 | 5:1 to 1:15 | 1:1 to 1:6 |
| metalaxyl-M | 7:1 to 1:90 | 2:1 to 1:30 | 1:1 to 1:12 |
| metconazole | 3:1 to 1:18 | 1:1 to 1:6 | 1:1 to 1:6 |

TABLE B1-continued

| Component (b) | Typical Weight Ratio | More Typical Weight Ratio | Most Typical Weight Ratio |
|---|---|---|---|
| methasulfocarb | 150:1 to 1:36 | 50:1 to 1:12 | 15:1 to 1:1 |
| metiram | 150:1 to 1:36 | 50:1 to 1:12 | 15:1 to 1:1 |
| metominostrobin | 9:1 to 1:12 | 3:1 to 1:4 | 3:1 to 1:3 |
| metrafenone | 6:1 to 1:12 | 2:1 to 1:4 | 2:1 to 1:4 |
| myclobutanil | 5:1 to 1:26 | 1:1 to 1:9 | 1:1 to 1:8 |
| naftifine | 150:1 to 1:36 | 50:1 to 1:12 | 15:1 to 2:1 |
| neo-asozin (ferric methanearsonate) | 150:1 to 1:36 | 50:1 to 1:12 | 15:1 to 2:1 |
| nuarimol | 15:1 to 1:9 | 5:1 to 1:3 | 3:1 to 1:3 |
| octhilinone | 150:1 to 1:36 | 50:1 to 1:12 | 15:1 to 1:1 |
| ofurace | 15:1 to 1:45 | 5:1 to 1:15 | 1:1 to 1:6 |
| orysastrobin | 9:1 to 1:12 | 3:1 to 1:4 | 3:1 to 1:3 |
| oxadixyl | 15:1 to 1:45 | 5:1 to 1:15 | 1:1 to 1:6 |
| oxolinic acid | 30:1 to 1:9 | 10:1 to 1:3 | 7:1 to 1:2 |
| oxpoconazole | 15:1 to 1:36 | 5:1 to 1:12 | 1:1 to 1:5 |
| oxycarboxin | 18:1 to 1:6 | 6:1 to 1:2 | 4:1 to 1:2 |
| oxytetracycline | 15:1 to 1:9 | 5:1 to 1:3 | 3:1 to 1:3 |
| pefurazoate | 150:1 to 1:36 | 50:1 to 1:12 | 15:1 to 2:1 |
| penconazole | 1:1 to 1:45 | 1:2 to 1:15 | 1:2 to 1:15 |
| pencycuron | 150:1 to 1:2 | 50:1 to 2:1 | 11:1 to 2:1 |
| penflufen | 12:1 to 1:9 | 4:1 to 1:3 | 2:1 to 1:3 |
| penthiopyrad | 12:1 to 1:9 | 4:1 to 1:3 | 2:1 to 1:3 |
| phosphorous acid and salts thereof | 150:1 to 1:36 | 50:1 to 1:12 | 15:1 to 2:1 |
| phthalide | 150:1 to 1:36 | 50:1 to 1:12 | 15:1 to 2:1 |
| picoxystrobin | 7:1 to 1:18 | 2:1 to 1:6 | 1:1 to 1:5 |
| piperalin | 15:1 to 1:9 | 5:1 to 1:3 | 3:1 to 1:3 |
| polyoxin | 15:1 to 1:9 | 5:1 to 1:3 | 3:1 to 1:3 |
| probenazole | 15:1 to 1:9 | 5:1 to 1:3 | 3:1 to 1:3 |
| prochloraz | 22:1 to 1:4 | 7:1 to 1:1 | 7:1 to 1:2 |
| procymidone | 45:1 to 1:3 | 15:1 to 1:1 | 11:1 to 2:1 |
| propamocarb or propamocarb-hydrochloride | 30:1 to 1:2 | 10:1 to 2:1 | 10:1 to 2:1 |
| propiconazole | 4:1 to 1:18 | 1:1 to 1:6 | 1:1 to 1:5 |
| propineb | 45:1 to 1:2 | 15:1 to 2:1 | 11:1 to 2:1 |
| proquinazid | 3:1 to 1:36 | 1:1 to 1:12 | 1:1 to 1:12 |
| prothiocarb | 9:1 to 1:18 | 3:1 to 1:6 | 3:1 to 1:3 |
| prothioconazole | 6:1 to 1:18 | 2:1 to 1:6 | 1:1 to 1:5 |
| pyraclostrobin | 9:1 to 1:18 | 3:1 to 1:6 | 2:1 to 1:4 |
| pyrametostrobin | 9:1 to 1:18 | 3:1 to 1:6 | 2:1 to 1:4 |
| pyraoxystrobin | 9:1 to 1:18 | 3:1 to 1:6 | 2:1 to 1:4 |
| pyrazophos | 150:1 to 1:36 | 50:1 to 1:12 | 15:1 to 1:1 |
| pyribencarb | 15:1 to 1:6 | 5:1 to 1:2 | 4:1 to 1:2 |
| pyrifenox | 15:1 to 1:9 | 5:1 to 1:3 | 3:1 to 1:3 |
| pyrimethanil | 30:1 to 1:6 | 10:1 to 1:2 | 3:1 to 1:2 |
| pyriofenone | 6:1 to 1:12 | 2:1 to 1:4 | 2:1 to 1:4 |
| pyroquilon | 15:1 to 1:9 | 5:1 to 1:3 | 3:1 to 1:3 |
| pyrrolnitrin | 150:1 to 1:36 | 50:1 to 1:12 | 15:1 to 2:1 |
| quinconazole | 4:1 to 1:12 | 1:1 to 1:4 | 1:1 to 1:4 |
| quinmethionate | 150:1 to 1:36 | 50:1 to 1:12 | 15:1 to 2:1 |
| quinoxyfen | 4:1 to 1:18 | 1:1 to 1:6 | 1:1 to 1:6 |
| quintozene | 150:1 to 1:36 | 50:1 to 1:12 | 15:1 to 2:1 |
| silthiofam | 7:1 to 1:18 | 2:1 to 1:6 | 2:1 to 1:4 |
| simeconazole | 15:1 to 1:36 | 5:1 to 1:12 | 1:1 to 1:5 |
| spiroxamine | 22:1 to 1:4 | 7:1 to 1:2 | 5:1 to 1:2 |
| streptomycin | 15:1 to 1:9 | 5:1 to 1:3 | 3:1 to 1:3 |
| sulfur | 300:1 to 3:1 | 100:1 to 9:1 | 75:1 to 9:1 |
| tebuconazole | 7:1 to 1:18 | 2:1 to 1:6 | 1:1 to 1:5 |
| tebufloquin | 100:1 to 1:100 | 10:1 to 1:10 | 3:1 to 1:3 |
| tecloftalam | 150:1 to 1:36 | 50:1 to 1:12 | 15:1 to 2:1 |
| tecnazene | 150:1 to 1:36 | 50:1 to 1:12 | 15:1 to 2:1 |
| terbinafine | 150:1 to 1:36 | 50:1 to 1:12 | 15:1 to 2:1 |
| tetraconazole | 15:1 to 1:36 | 5:1 to 1:12 | 1:1 to 1:5 |
| thiabendazole | 45:1 to 1:4 | 15:1 to 1:2 | 11:1 to 2:1 |
| thifluzamide | 15:1 to 1:9 | 5:1 to 1:3 | 3:1 to 1:3 |
| thiophanate | 45:1 to 1:3 | 15:1 to 2:1 | 11:1 to 2:1 |
| thiophanate-methyl | 45:1 to 1:3 | 15:1 to 2:1 | 11:1 to 2:1 |
| thiram | 150:1 to 1:2 | 50:1 to 2:1 | 37:1 to 5:1 |
| tiadinil | 12:1 to 1:9 | 4:1 to 1:3 | 2:1 to 1:3 |
| tolclofos-methyl | 150:1 to 1:2 | 50:1 to 2:1 | 37:1 to 5:1 |
| tolylfluanid | 150:1 to 1:36 | 50:1 to 1:12 | 15:1 to 2:1 |
| triadimefon | 15:1 to 1:36 | 5:1 to 1:12 | 1:1 to 1:5 |
| triadimenol | 15:1 to 1:36 | 5:1 to 1:12 | 1:1 to 1:5 |
| triarimol | 3:1 to 1:90 | 1:1 to 1:30 | 1:2 to 1:24 |
| triazoxide | 150:1 to 1:36 | 50:1 to 1:12 | 15:1 to 2:1 |
| tricyclazole | 15:1 to 1:9 | 5:1 to 1:3 | 3:1 to 1:3 |
| tridemorph | 30:1 to 1:3 | 10:1 to 1:1 | 7:1 to 1:1 |
| trifloxystrobin | 6:1 to 1:18 | 2:1 to 1:6 | 2:1 to 1:4 |
| triflumizole | 15:1 to 1:9 | 5:1 to 1:3 | 3:1 to 1:3 |
| triforine | 15:1 to 1:9 | 5:1 to 1:3 | 3:1 to 1:3 |

TABLE B1-continued

| Component (b) | Typical Weight Ratio | More Typical Weight Ratio | Most Typical Weight Ratio |
|---|---|---|---|
| trimorphamide | 45:1 to 1:9 | 15:1 to 1:3 | 7:1 to 1:2 |
| triticonazole | 15:1 to 1:36 | 5:1 to 1:12 | 1:1 to 1:5 |
| uniconazole | 15:1 to 1:36 | 5:1 to 1:12 | 1:1 to 1:5 |
| validamycin | 150:1 to 1:36 | 50:1 to 1:12 | 3:1 to 1:3 |
| valifenalate | 6:1 to 1:18 | 2:1 to 1:6 | 2:1 to 1:4 |
| vinclozolin | 120:1 to 1:2 | 40:1 to 2:1 | 15:1 to 2:1 |
| zineb | 150:1 to 1:2 | 50:1 to 2:1 | 37:1 to 5:1 |
| ziram | 150:1 to 1:2 | 50:1 to 2:1 | 37:1 to 5:1 |
| zoxamide | 6:1 to 1:18 | 2:1 to 1:6 | 2:1 to 1:4 |
| 5-chloro-6-(2,4,6-trifluorophenyl)-7-(4-methylpiperidin-1-yl)[1,2,4]triazolo-[1,5-a]pyrimidine | 15:1 to 1:36 | 5:1 to 1:12 | 1:1 to 1:6 |
| N-[2-[4-[[3-(4-chlorophenyl)-2-propyn-1-yl]oxy]-3-methoxyphenyl]ethyl]-3-methyl-2-[(methylsulfonyl)amino]-butanamide | 6:1 to 1:18 | 2:1 to 1:6 | 2:1 to 1:4 |
| N-[2-[4-[[3-(4-chlorophenyl)-2-propyn-1-yl]oxy]-3-methoxyphenyl]ethyl]-3-methyl-2-[(ethylsulfonyl)amino]butanamide | 6:1 to 1:18 | 2:1 to 1:6 | 2:1 to 1:4 |
| 4-fluorophenyl N-[1-[[[1-(4-cyanophenyl)-ethyl]sulfonyl]methyl]propyl]carbamate | 6:1 to 1:18 | 2:1 to 1:6 | 2:1 to 1:4 |
| α-[methoxyimino]-N-methyl-2-[[[1-[3-(trifluoromethyl)phenyl]ethoxy]imino]-methyl]benzeneacetamide | 9:1 to 1:18 | 3:1 to 1:6 | 3:1 to 1:3 |
| N'-[4-[4-chloro-3-(trifluoromethyl)-phenoxy]-2,5-dimethylphenyl]-N-ethyl-N-methylmethanimidamide | 15:1 to 1:18 | 5:1 to 1:6 | 3:1 to 1:3 |

As already noted, the present invention includes embodiments wherein in the composition comprising components (a) and (b), wherein component (b) comprises at least one fungicidal compound from each of two groups selected from (b1) through (b54). Tables C1 through C27 list specific mixtures to illustrate embodiments wherein component (b) includes at least one fungicidal compound from each of two groups selected from (b1) through (b54). Table C1 discloses a mixture of Compound 3 of the present invention with at least two Component (b) compounds. The entries under the heading "Illustrative Ratios" disclose three specific weight ratios of Component (a) to each Component (b) compound. For example, the first line discloses a mixture of Compound 3 with cyproconazole and azoxystrobin and lists weight ratios of Compound 3 to cyproconazole to azoxystrobin of 1:1:1, 2:1:1 or 3:1:1

TABLE C1

| Component (a) | Component (b) | | | Illustrative Ratios(*) | | |
|---|---|---|---|---|---|---|
| Compound 3 | cyproconazole | azoxystrobin | | 1:1:1 | 2:1:1 | 3:1:1 |
| Compound 3 | cyproconazole | kresoxim-methyl | | 1:1:1 | 2:1:1 | 3:1:1 |
| Compound 3 | cyproconazole | picoxystrobin | | 1:1:1 | 2:1:1 | 3:1:1 |
| Compound 3 | cyproconazole | pyraclostrobin | | 1:1:1 | 2:1:1 | 3:1:1 |
| Compound 3 | cyproconazole | pyrametrostrobin | | 1:1:1 | 2:1:1 | 3:1:1 |
| Compound 3 | cyproconazole | pyraoxystrobin | | 1:1:1 | 2:1:1 | 3:1:1 |
| Compound 3 | cyproconazole | trifloxystrobin | | 1:1:1 | 2:1:1 | 3:1:1 |
| Compound 3 | cyproconazole | bixafen | | 1:1:2 | 2:1:2 | 3:1:2 |
| Compound 3 | cyproconazole | boscalid | | 1:1:2 | 2:1:2 | 3:1:2 |
| Compound 3 | cyproconazole | cyflufenamid | | 1:2:1 | 2:2:1 | 3:2:1 |
| Compound 3 | cyproconazole | fluopyram | | 1:1:2 | 2:1:2 | 3:1:2 |
| Compound 3 | cyproconazole | isopyrazam | | 1:1:2 | 2:1:2 | 3:1:2 |
| Compound 3 | cyproconazole | metrafenone | | 1:1:2 | 2:1:2 | 3:1:2 |
| Compound 3 | cyproconazole | penthiopyrad | | 1:1:2 | 2:1:2 | 3:1:2 |
| Compound 3 | cyproconazole | proquinazid | | 1:1:1 | 2:1:1 | 3:1:1 |
| Compound 3 | cyproconazole | pyriofenone | | 1:1:2 | 2:1:2 | 3:1:2 |
| Compound 3 | cyproconazole | quinoxyfen | | 1:1:1 | 2:1:1 | 3:1:1 |
| Compound 3 | cyproconazole | sedaxane | | 1:1:2 | 2:1:2 | 3:1:2 |
| Compound 3 | cyproconazole | picoxystrobin | proquinazid | 1:1:1:1 | 2:1:1:1 | 3:1:1:1 |
| Compound 3 | cyproconazole | trifloxystrobin | proquinazid | 1:1:1:1 | 2:1:1:1 | 3:1:1:1 |
| Compound 3 | difenoconazole | azoxystrobin | | 1:1:1 | 2:1:1 | 3:1:1 |
| Compound 3 | difenoconazole | kresoxim-methyl | | 1:1:1 | 2:1:1 | 3:1:1 |
| Compound 3 | difenoconazole | picoxystrobin | | 1:1:1 | 2:1:1 | 3:1:1 |
| Compound 3 | difenoconazole | pyraclostrobin | | 1:1:1 | 2:1:1 | 3:1:1 |
| Compound 3 | difenoconazole | pyrametostrobin | | 1:1:1 | 2:1:1 | 3:1:1 |
| Compound 3 | difenoconazole | pyraoxystrobin | | 1:1:1 | 2:1:1 | 3:1:1 |
| Compound 3 | difenoconazole | trifloxystrobin | | 1:1:1 | 2:1:1 | 3:1:1 |
| Compound 3 | difenoconazole | bixafen | | 1:1:2 | 2:1:2 | 3:1:2 |
| Compound 3 | difenoconazole | boscalid | | 1:1:2 | 2:1:2 | 3:1:2 |
| Compound 3 | difenoconazole | cyflufenamid | | 1:2:1 | 2:2:1 | 3:2:1 |
| Compound 3 | difenoconazole | fluopyram | | 1:1:2 | 2:1:2 | 3:1:2 |
| Compound 3 | difenoconazole | isopyrazam | | 1:1:2 | 2:1:2 | 3:1:2 |

TABLE C1-continued

| Component (a) | | Component (b) | | Illustrative Ratios(*) | | |
|---|---|---|---|---|---|---|
| Compound 3 | difenoconazole | metrafenone | | 1:1:2 | 2:1:2 | 3:1:2 |
| Compound 3 | difenoconazole | penthiopyrad | | 1:1:2 | 2:1:2 | 3:1:2 |
| Compound 3 | difenoconazole | proquinazid | | 1:1:1 | 2:1:1 | 3:1:1 |
| Compound 3 | difenoconazole | pyriofenone | | 1:1:2 | 2:1:2 | 3:1:2 |
| Compound 3 | difenoconazole | quinoxyfen | | 1:1:1 | 2:1:1 | 3:1:1 |
| Compound 3 | difenoconazole | sedaxane | | 1:1:2 | 2:1:2 | 3:1:2 |
| Compound 3 | difenoconazole | picoxystrobin | proquinazid | 1:1:1:1 | 2:1:1:1 | 3:1:1:1 |
| Compound 3 | difenoconazole | trifloxystrobin | proquinazid | 1:1:1:1 | 2:1:1:1 | 3:1:1:1 |
| Compound 3 | epoxiconazole | azoxystrobin | | 1:1:1 | 2:1:1 | 3:1:1 |
| Compound 3 | epoxiconazole | kresoxim-methyl | | 1:1:1 | 2:1:1 | 3:1:1 |
| Compound 3 | epoxiconazole | picoxystrobin | | 1:1:1 | 2:1:1 | 3:1:1 |
| Compound 3 | epoxiconazole | pyraclostrobin | | 1:1:1 | 2:1:1 | 3:1:1 |
| Compound 3 | epoxiconazole | pyrametostrobin | | 1:1:1 | 2:1:1 | 3:1:1 |
| Compound 3 | epoxiconazole | pyraoxystrobin | | 1:1:1 | 2:1:1 | 3:1:1 |
| Compound 3 | epoxiconazole | trifloxystrobin | | 1:1:1 | 2:1:1 | 3:1:1 |
| Compound 3 | epoxiconazole | bixafen | | 1:1:2 | 2:1:2 | 3:1:2 |
| Compound 3 | epoxiconazole | boscalid | | 1:1:2 | 2:1:2 | 3:1:2 |
| Compound 3 | epoxiconazole | cyflufenamid | | 1:2:1 | 2:2:1 | 3:2:1 |
| Compound 3 | epoxiconazole | fluopyram | | 1:1:2 | 2:1:2 | 3:1:2 |
| Compound 3 | epoxiconazole | isopyrazam | | 1:1:2 | 2:1:2 | 3:1:2 |
| Compound 3 | epoxiconazole | metrafenone | | 1:1:2 | 2:1:2 | 3:1:2 |
| Compound 3 | epoxiconazole | penthiopyrad | | 1:1:2 | 2:1:2 | 3:1:2 |
| Compound 3 | epoxiconazole | proquinazid | | 1:1:1 | 2:1:1 | 3:1:1 |
| Compound 3 | epoxiconazole | pyriofenone | | 1:1:2 | 2:1:2 | 3:1:2 |
| Compound 3 | epoxiconazole | quinoxyfen | | 1:1:1 | 2:1:1 | 3:1:1 |
| Compound 3 | epoxiconazole | sedaxane | | 1:1:2 | 2:1:2 | 3:1:2 |
| Compound 3 | epoxiconazole | picoxystrobin | proquinazid | 1:1:1:1 | 2:1:1:1 | 3:1:1:1 |
| Compound 3 | epoxiconazole | trifloxystrobin | proquinazid | 1:1:1:1 | 2:1:1:1 | 3:1:1:1 |
| Compound 3 | metconazole | azoxystrobin | | 1:1:1 | 2:1:1 | 3:1:1 |
| Compound 3 | metconazole | kresoxim-methyl | | 1:1:1 | 2:1:1 | 3:1:1 |
| Compound 3 | metconazole | picoxystrobin | | 1:1:1 | 2:1:1 | 3:1:1 |
| Compound 3 | metconazole | pyraclostrobin | | 1:1:1 | 2:1:1 | 3:1:1 |
| Compound 3 | metconazole | pyrametostrobin | | 1:1:1 | 2:1:1 | 3:1:1 |
| Compound 3 | metconazole | pyraoxystrobin | | 1:1:1 | 2:1:1 | 3:1:1 |
| Compound 3 | metconazole | trifloxystrobin | | 1:1:1 | 2:1:1 | 3:1:1 |
| Compound 3 | metconazole | bixafen | | 1:1:2 | 2:1:2 | 3:1:2 |
| Compound 3 | metconazole | boscalid | | 1:1:2 | 2:1:2 | 3:1:2 |
| Compound 3 | metconazole | cyflufenamid | | 1:2:1 | 2:2:1 | 3:2:1 |
| Compound 3 | metconazole | fluopyram | | 1:1:2 | 2:1:2 | 3:1:2 |
| Compound 3 | metconazole | isopyrazam | | 1:1:2 | 2:1:2 | 3:1:2 |
| Compound 3 | metconazole | metrafenone | | 1:1:2 | 2:1:2 | 3:1:2 |
| Compound 3 | metconazole | penthiopyrad | | 1:1:2 | 2:1:2 | 3:1:2 |
| Compound 3 | metconazole | proquinazid | | 1:1:1 | 2:1:1 | 3:1:1 |
| Compound 3 | metconazole | pyriofenone | | 1:1:2 | 2:1:2 | 3:1:2 |
| Compound 3 | metconazole | quinoxyfen | | 1:1:1 | 2:1:1 | 3:1:1 |
| Compound 3 | metconazole | sedaxane | | 1:1:2 | 2:1:2 | 3:1:2 |
| Compound 3 | metconazole | picoxystrobin | proquinazid | 1:1:1:1 | 2:1:1:1 | 3:1:1:1 |
| Compound 3 | metconazole | trifloxystrobin | proquinazid | 1:1:1:1 | 2:1:1:1 | 3:1:1:1 |
| Compound 3 | myclobutanil | azoxystrobin | | 1:1:1 | 2:1:1 | 3:1:1 |
| Compound 3 | myclobutanil | kresoxim-methyl | | 1:1:1 | 2:1:1 | 3:1:1 |
| Compound 3 | myclobutanil | picoxystrobin | | 1:1:1 | 2:1:1 | 3:1:1 |
| Compound 3 | myclobutanil | pyraclostrobin | | 1:1:1 | 2:1:1 | 3:1:1 |
| Compound 3 | myclobutanil | pyrametostrobin | | 1:1:1 | 2:1:1 | 3:1:1 |
| Compound 3 | myclobutanil | pyraoxystrobin | | 1:1:1 | 2:1:1 | 3:1:1 |
| Compound 3 | myclobutanil | trifloxystrobin | | 1:1:1 | 2:1:1 | 3:1:1 |
| Compound 3 | myclobutanil | bixafen | | 1:1:2 | 2:1:2 | 3:1:2 |
| Compound 3 | myclobutanil | boscalid | | 1:1:2 | 2:1:2 | 3:1:2 |
| Compound 3 | myclobutanil | cyflufenamid | | 1:2:1 | 2:2:1 | 3:2:1 |
| Compound 3 | myclobutanil | fluopyram | | 1:1:2 | 2:1:2 | 3:1:2 |
| Compound 3 | myclobutanil | isopyrazam | | 1:1:2 | 2:1:2 | 3:1:2 |
| Compound 3 | myclobutanil | metrafenone | | 1:1:2 | 2:1:2 | 3:1:2 |
| Compound 3 | myclobutanil | penthiopyrad | | 1:1:2 | 2:1:2 | 3:1:2 |
| Compound 3 | myclobutanil | proquinazid | | 1:1:1 | 2:1:1 | 3:1:1 |
| Compound 3 | myclobutanil | pyriofenone | | 1:1:2 | 2:1:2 | 3:1:2 |
| Compound 3 | myclobutanil | quinoxyfen | | 1:1:1 | 2:1:1 | 3:1:1 |
| Compound 3 | myclobutanil | sedaxane | | 1:1:2 | 2:1:2 | 3:1:2 |
| Compound 3 | myclobutanil | picoxystrobin | proquinazid | 1:1:1:1 | 2:1:1:1 | 3:1:1:1 |
| Compound 3 | myclobutanil | trifloxystrobin | proquinazid | 1:1:1:1 | 2:1:1:1 | 3:1:1:1 |
| Compound 3 | prothioconazole | azoxystrobin | | 1:1:1 | 2:1:1 | 3:1:1 |
| Compound 3 | prothioconazole | kresoxim-methyl | | 1:1:1 | 2:1:1 | 3:1:1 |
| Compound 3 | prothioconazole | picoxystrobin | | 1:1:1 | 2:1:1 | 3:1:1 |
| Compound 3 | prothioconazole | pyraclostrobin | | 1:1:1 | 2:1:1 | 3:1:1 |
| Compound 3 | prothioconazole | pyrametostrobin | | 1:1:1 | 2:1:1 | 3:1:1 |
| Compound 3 | prothioconazole | pyraoxystrobin | | 1:1:1 | 2:1:1 | 3:1:1 |
| Compound 3 | prothioconazole | trifloxystrobin | | 1:1:1 | 2:1:1 | 3:1:1 |
| Compound 3 | prothioconazole | bixafen | | 1:1:2 | 2:1:2 | 3:1:2 |
| Compound 3 | prothioconazole | boscalid | | 1:1:2 | 2:1:2 | 3:1:2 |
| Compound 3 | prothioconazole | cyflufenamid | | 1:2:1 | 2:2:1 | 3:2:1 |

TABLE C1-continued

| Component (a) | | Component (b) | | Illustrative Ratios(*) | | |
|---|---|---|---|---|---|---|
| Compound 3 | prothioconazole | fluopyram | | 1:1:2 | 2:1:2 | 3:1:2 |
| Compound 3 | prothioconazole | isopyrazam | | 1:1:2 | 2:1:2 | 3:1:2 |
| Compound 3 | prothioconazole | metrafenone | | 1:1:2 | 2:1:2 | 3:1:2 |
| Compound 3 | prothioconazole | penthiopyrad | | 1:1:2 | 2:1:2 | 3:1:2 |
| Compound 3 | prothioconazole | proquinazid | | 1:1:1 | 2:1:1 | 3:1:1 |
| Compound 3 | prothioconazole | pyriofenone | | 1:1:2 | 2:1:2 | 3:1:2 |
| Compound 3 | prothioconazole | quinoxyfen | | 1:1:1 | 2:1:1 | 3:1:1 |
| Compound 3 | prothioconazole | sedaxane | | 1:1:2 | 2:1:2 | 3:1:2 |
| Compound 3 | prothioconazole | picoxystrobin | proquinazid | 1:1:1:1 | 2:1:1:1 | 3:1:1:1 |
| Compound 3 | prothioconazole | trifloxystrobin | proquinazid | 1:1:1:1 | 2:1:1:1 | 3:1:1:1 |
| Compound 3 | tebuconazole | azoxystrobin | | 1:1:1 | 2:1:1 | 3:1:1 |
| Compound 3 | tebuconazole | kresoxim-methyl | | 1:1:1 | 2:1:1 | 3:1:1 |
| Compound 3 | tebuconazole | picoxystrobin | | 1:1:1 | 2:1:1 | 3:1:1 |
| Compound 3 | tebuconazole | pyraclostrobin | | 1:1:1 | 2:1:1 | 3:1:1 |
| Compound 3 | tebuconazole | pyrametostrobin | | 1:1:1 | 2:1:1 | 3:1:1 |
| Compound 3 | tebuconazole | pyraoxystrobin | | 1:1:1 | 2:1:1 | 3:1:1 |
| Compound 3 | tebuconazole | trifloxystrobin | | 1:1:1 | 2:1:1 | 3:1:1 |
| Compound 3 | tebuconazole | bixafen | | 1:1:2 | 2:1:2 | 3:1:2 |
| Compound 3 | tebuconazole | boscalid | | 1:1:2 | 2:1:2 | 3:1:2 |
| Compound 3 | tebuconazole | cyflufenamid | | 1:2:1 | 2:2:1 | 3:2:1 |
| Compound 3 | tebuconazole | fluopyram | | 1:1:2 | 2:1:2 | 3:1:2 |
| Compound 3 | tebuconazole | isopyrazam | | 1:1:2 | 2:1:2 | 3:1:2 |
| Compound 3 | tebuconazole | metrafenone | | 1:1:2 | 2:1:2 | 3:1:2 |
| Compound 3 | tebuconazole | penthiopyrad | | 1:1:2 | 2:1:2 | 3:1:2 |
| Compound 3 | tebuconazole | proquinazid | | 1:1:1 | 2:1:1 | 3:1:1 |
| Compound 3 | tebuconazole | pyriofenone | | 1:1:2 | 2:1:2 | 3:1:2 |
| Compound 3 | tebuconazole | quinoxyfen | | 1:1:1 | 2:1:1 | 3:1:1 |
| Compound 3 | tebuconazole | sedaxane | | 1:1:2 | 2:1:2 | 3:1:2 |
| Compound 3 | tebuconazole | picoxystrobin | proquinazid | 1:1:1:1 | 2:1:1:1 | 3:1:1:1 |
| Compound 3 | tebuconazole | trifloxystrobin | proquinazid | 1:1:1:1 | 2:1:1:1 | 3:1:1:1 |

(*)Ratios of Component (a) relative to Component (b) in sequence, by weight.

Tables C2 through C27 are each constructed the same as Table C1 above except that entries below the "Component (a)" column heading are replaced with the respective Component (a) Column Entry shown below. Thus, for example, in Table C2 the entries below the "Component (a)" column heading all recite "Compound 4". Therefore, the first entry in Table C2 specifically discloses a mixture of Compound 4 with cyproconazole and azoxystrobin, with the illustrative weight ratios of 1:1:1, 2:1:1 and 3:1:1 of Compound 4 to cyproconazole to azoxystrobin. Tables C3 through C27 are constructed similarly.

| Table Number | Component (a) Column Entry |
|---|---|
| C2 | Compound 4 |
| C3 | Compound 6 |
| C4 | Compound 7 |
| C5 | Compound 11 |
| C6 | Compound 13 |
| C7 | Compound 14 |
| C8 | Compound 15 |
| C9 | Compound 30 |
| C10 | Compound 33 |
| C11 | Compound 41 |
| C12 | Compound 63 |
| C13 | Compound 64 |
| C14 | Compound 66 |
| C15 | Compound 78 |
| C16 | Compound 83 |
| C17 | Compound 87 |
| C18 | Compound 89 |
| C19 | Compound 94 |
| C20 | Compound 99 |
| C21 | Compound 108 |
| C22 | Compound 111 |
| C23 | Compound 113 |
| C24 | Compound 117 |
| C25 | Compound 134 |

-continued

| Table Number | Component (a) Column Entry |
|---|---|
| C26 | Compound 135 |
| C27 | Compound 142 |

Of note is a composition of the present invention comprising a compound of Formula 1 (or an N-oxide or salt thereof) with at least one other fungicidal compound that has a different site of action from the compound of Formula 1. In certain instances, a combination with at least one other fungicidal compound having a similar spectrum of control but a different site of action will be particularly advantageous for resistance management. Thus, a composition of the present invention can advantageously comprise at least one fungicidal active compound selected from the group consisting of (b1) through (b54) as described above, having a similar spectrum of control but a different site of action.

Compositions of component (a), or component (a) with component (b), can be further mixed with one or more other biologically active compounds or agents including insecticides, nematocides, bactericides, acaricides, herbicides, herbicide safeners, growth regulators such as insect molting inhibitors and rooting stimulants, chemosterilants, semiochemicals, repellents, attractants, pheromones, feeding stimulants, plant nutrients, other biologically active compounds or entomopathogenic bacteria, virus or fungi to form a multi-component pesticide giving an even broader spectrum of agricultural protection. Thus the present invention also pertains to a composition comprising a fungicidally effective amount of component (a), or a mixture of component (a) with component (b), and a biologically effective amount of at least one additional biologically active compound or agent and can further comprise at least one of a surfactant, a solid diluent or a liquid diluent. The other biologically active compounds or agents can also be separately formulated in compositions comprising at least one of a surfactant, solid or liquid diluent. For compositions of the present invention, one or more other biologically active compounds or agents can be formulated together with one or both of components (a) and (b) to form a premix, or one or more other biologically active compounds or agents can be formulated separately from components (a) and (b) and the formulations combined together before application (e.g., in a spray tank) or, alternatively, applied in succession.

Examples of such biologically active compounds or agents with which compositions of component (a), or component (a) with component (b), can be formulated are: insecticides such as abamectin, acephate, acequinocyl, acetamiprid, acrinathrin, acynonapyr, afidopyropen, amidoflumet, amitraz, avermectin, azadirachtin, azinphos-methyl, benfuracarb, bensultap, benzpyrimoxan, bifenthrin, kappa-bifenthrin, bifenazate, bistrifluron, borate, broflanilide, buprofezin, cadusafos, carbaryl, carbofuran, cartap, carzol, chlorantraniliprole, chlorfenapyr, chlorfluazuron, chloroprallethrin, chlorpyrifos, chlorpyrifos-e, chlorpyrifos-methyl, chromafenozide, clofentezin, chloroprallethrin, clothianidin, cyantraniliprole, cyclaniliprole, cycloprothrin, cycloxaprid, cyenopyrafen, cyflumetofen, cyfluthrin, beta-cyfluthrin, cyhalodiamide, cyhalothrin, gamma-cyhalothrin, lambda-cyhalothrin, cypermethrin, alpha-cypermethrin, zeta-cypermethrin, cyromazine, deltamethrin, diafenthiuron, diazinon, dicloromesotiaz, dieldrin, diflubenzuron, dimefluthrin, dimehypo, dimethoate, dimpropyridaz, dinotefuran, diofenolan, emamectin, emamectin benzoate, endosulfan, esfenvalerate, ethiprole, etofenprox, epsilon-metofluthrin, etoxazole, fenbutatin oxide, fenitrothion, fenothiocarb, fenoxycarb, fenpropathrin, fenvalerate, fipronil, flometoquin, flonicamid, fluazaindolizine, flubendiamide, flucythrinate, flufenerim, flufenoxuron, flufenoxystrobin, fluensulfone, fluhexafon, fluopyram, flupiprole, flupyradifurone, flupyrimin, fluvalinate, tau-fluvalinate, fluxametamide, fonophos, formetanate, fosthiazate, gamma-cyhalothrin, halofenozide, heptafluthrin, hexaflumuron, hexythiazox, hydramethylnon, imidacloprid, indoxacarb, insecticidal soaps, isofenphos, isocycloseram, kappa-tefluthrin, lambda-cyhalothrin, lufenuron, malathion, meperfluthrin, metaflumizone, metaldehyde, methamidophos, methidathion, methiocarb, methomyl, methoprene, methoxychlor, metofluthrin, methoxyfenozide, epsilon-metofluthrin, epsilon-momfluorothrin, monocrotophos, monofluorothrin, nicotine, nitenpyram, nithiazine, novaluron, noviflumuron, oxamyl, oxazosulfyl, parathion, parathion-methyl, permethrin, phorate, phosalone, phosmet, phosphamidon, pirimicarb, profenofos, profluthrin, propargite, protrifenbute, pyflubumide, pymetrozine, pyrafluprole, pyrethrin, pyridaben, pyridalyl, pyrifluquinazon, pyriminostrobin, pyriprole, pyriproxyfen, rotenone, ryanodine, silafluofen, spinetoram, spinosad, spirodiclofen, spiromesifen, spiropidion, spirotetramat, sulprofos, sulfoxaflor, tebufenozide, tebufenpyrad, teflubenzuron, tefluthrin, kappa-tefluthrin, terbufos, tetrachlorantraniliprole, tetrachlorvinphos, tetramethrin, tetramethylfluthrin, tetraniliprole, thiacloprid, thiamethoxam, thiodicarb, thiosultap-sodium, tioxazafen, tolfenpyrad, tralomethrin, triazamate, trichlorfon, triflumezopyrim, triflumuron, tyclopyrazoflor, zeta-cypermethrin, *Bacillus thuringiensis* delta-endotoxins, entomopathogenic bacteria, entomopathogenic viruses or entomopathogenic fungi.

One embodiment of biological agents for mixing with compounds of this disclosure include entomopathogenic bacteria such as *Bacillus thuringiensis*, and the encapsulated delta-endotoxins of *Bacillus thuringiensis* such as MVP® and MVPII® bioinsecticides prepared by the CellCap® process (CellCap®, MVP® and MVPII® are trademarks of Mycogen Corporation, Indianapolis, Indiana, USA); entomopathogenic fungi such as green muscardine fungus; and entomopathogenic (both naturally occurring and genetically modified) viruses including baculovirus, nucleopolyhedro virus (NPV) such as *Helicoverpa zea* nucleopolyhedrovirus (HzNPV), Anagrapha falcifera nucleopolyhedrovirus (AfNPV); and granulosis virus (GV) such as *Cydia pomonella* granulosis virus (CpGV).

General references for these agricultural protectants (i.e. insecticides, fungicides, nematocides, acaricides, herbicides and biological agents) include *The Pesticide Manual, 13th Edition*, C. D. S. Tomlin, Ed., British Crop Protection Council, Farnham, Surrey, U. K., 2003 and *The BioPesticide Manual, 2nd Edition*, L. G. Copping, Ed., British Crop Protection Council, Farnham, Surrey, U. K., 2001.

For embodiments where one or more of invertebrate pest control compounds are used, the weight ratio of these compounds (in total) to the component (a) compounds is typically between about 1:3000 and about 3000:1. Of note are weight ratios between about 1:300 and about 300:1 (for example ratios between about 1:30 and about 30:1). One skilled in the art can easily determine through simple experimentation the biologically effective amounts of active ingredients necessary for the desired spectrum of biological activity.

Component (a) compounds and/or combinations thereof with component (b) compounds and/or one or more other biologically active compounds or agents can be applied to plants genetically transformed to express proteins toxic to invertebrate pests (such as *Bacillus thuringiensis* delta-endotoxins). The effect of the exogenously applied present component (a) alone or in combination with component (b) may be synergistic with the expressed toxin proteins.

Of note is the combination or the composition comprising component (a), or components (a) and (b), as described in the Summary of the Invention further comprising at least one invertebrate pest control compound or agent (e.g., insecticide, acaricide). Of particular note is a composition comprising component (a) and at least one (i.e. one or more) invertebrate pest control compound or agent, which then can be subsequently combined with component (b) to provide a composition comprising components (a) and (b) and the one or more invertebrate pest control compounds or agents. Alternatively without first mixing with component (b), a biologically effective amount of the composition comprising component (a) with at least one invertebrate pest control agent can be applied to a plant or plant seed (directly or through the environment of the plant or plant seed) to protect the plant or plant seed from diseases caused by fungal pathogens and injury caused by invertebrate pests.

Of note is a composition of the present invention which comprises in addition to a component (a) compound, alone or in combination with component (b), at least one invertebrate pest control compound or agent selected from the group consisting abamectin, acetamiprid, acrinathrin, acynonapyr, afidopyropen, amitraz, avermectin, azadirachtin, benfuracarb, bensultap, bifenthrin, buprofezin, broflanilide, cadusafos, carbaryl, cartap, chlorantraniliprole, chloroprallethrin, chlorfenapyr, chlorpyrifos, clothianidin, cyantraniliprole, cyclaniliprole, cycloprothrin, cyfluthrin, beta-cyfluthrin, cyhalothrin, gamma-cyhalothrin, lambda-cyhalothrin, cypermethrin, alpha-cypermethrin, zeta-cypermethrin, cyromazine, deltamethrin, dieldrin, dinotefuran, diofenolan, emamectin, endosulfan, epsilon-metofluthrin, esfenvalerate, ethiprole, etofenprox, etoxazole, fenitrothion, fenothiocarb, fenoxycarb, fenvalerate, fipronil, flometoquin, fluxametamide, flonicamid, flubendiamide, fluensulfone, flufenoxuron, flufenoxystrobin, flufensulfone, flupiprole, flupyrimin, flupyradifurone, fluvalinate, formetanate, fosthiazate, gamma-cyhalothrin, heptafluthrin, hexaflumuron, hydramethylnon, imidacloprid, indoxacarb, isocycloseram, kappa-tefluthrin, lambda-cyhalothrin, lufenuron, meperfluthrin, metaflumizone, methiodicarb, methomyl, methoprene, methoxyfenozide, metofluthrin, monofluorothrin, nitenpyram, nithiazine, novaluron, oxamyl, pyflubumide, pymetrozine, pyrethrin, pyridaben, pyridalyl, pyriminostrobin, pyriproxyfen, ryanodine, spinetoram, spinosad, spirodiclofen, spiromesifen, spirotetramat, sulfoxaflor, tebufenozide, tetramethrin, tetramethylfluthrin, thiacloprid, thiamethoxam, thiodicarb, thiosultap-sodium, tralomethrin, triazamate, triflumezopyrim, triflumuron, tyclopyrazoflor, zeta-cypermethrin, *Bacillus thuringiensis* delta-endotoxins, all strains of *Bacillus thuringiensis* and all strains of nucleo polyhedrosis viruses.

In certain instances, combinations of a a component (a) compound of this invention, alone or in mixture with component (b), with other biologically active (particularly fungicidal) compounds or agents (i.e. active ingredients) can result in a greater-than-additive (i.e. synergistic) effect. Reducing the quantity of active ingredients released in the environment while ensuring effective pest control is always desirable. When an enhanced effect of fungicidal active ingredients occurs at application rates giving agronomically satisfactory levels of fungal control, such combinations can be advantageous for reducing crop production cost and decreasing environmental load.

Table D1 lists specific combinations of invertebrate pest control agents with Compound 3 (compound numbers refer to compounds in Index Tables A through F) as a component (a) compound illustrative of mixtures and compositions comprising these active ingredients and methods using them according to the present invention. The second column of Table D1 lists the specific invertebrate pest control agents (e.g., "Abamectin" in the first line). The third column of Table D1 lists the mode of action (if known) or chemical class of the invertebrate pest control agents. The fourth column of Table D1 lists embodiment(s) of ranges of weight ratios for rates at which the invertebrate pest control agent is typically applied relative to Compound 32 alone or in combination with component (b) (e.g., "50:1 to 1:50" of abamectin relative to a Compound 32 by weight). Thus, for example, the first line of Table D1 specifically discloses the combination of Compound 3 with abamectin is typically applied in a weight ratio between 50:1 to 1:50. The remaining lines of Table D1 are to be construed similarly. Thus, for example, the first line of Table D1 specifically discloses the combination of Compound 3 with abamectin is typically applied in a weight ratio between 50:1 to 1:50. The remaining lines of Table D1 are to be construed similarly.

TABLE D1

| Component (a) | Invertebrate Pest Control Agent | Mode of Action or Chemical Class | Typical Weight Ratio |
|---|---|---|---|
| Compound 3 | Abamectin | macrocyclic lactones | 50:1 to 1:50 |
| Compound 3 | Acetamiprid | neonicotinoids | 150:1 to 1:200 |
| Compound 3 | Amitraz | octopamine receptor ligands | 200:1 to 1:100 |
| Compound 3 | Avermectin | macrocyclic lactones | 50:1 to 1:50 |
| Compound 3 | Azadirachtin | ecdysone agonists | 100:1 to 1:120 |
| Compound 3 | Beta-cyfluthrin | sodium channel modulators | 150:1 to 1:200 |
| Compound 3 | Bifenthrin | sodium channel modulators | 100:1 to 1:10 |
| Compound 3 | Buprofezin | chitin synthesis inhibitors | 500:1 to 1:50 |
| Compound 3 | Cartap | nereistoxin analogs | 100:1 to 1:200 |
| Compound 3 | Chlorantraniliprole | ryanodine receptor ligands | 100:1 to 1:120 |
| Compound 3 | Chlorfenapyr | mitochondrial electron transport inhibitors | 300:1 to 1:200 |
| Compound 3 | Chlorpyrifos | cholinesterase inhibitors | 500:1 to 1:200 |
| Compound 3 | Clothianidin | neonicotinoids | 100:1 to 1:400 |
| Compound 3 | Cyantraniliprole | ryanodine receptor ligands | 100:1 to 1:120 |
| Compound 3 | Cyfluthrin | sodium channel modulators | 150:1 to 1:200 |
| Compound 3 | Cyhalothrin | sodium channel modulators | 150:1 to 1:200 |
| Compound 3 | Cypermethrin | sodium channel modulators | 150:1 to 1:200 |
| Compound 3 | Cyromazine | chitin synthesis inhibitors | 400:1 to 1:50 |
| Compound 3 | Deltamethrin | sodium channel modulators | 50:1 to 1:400 |
| Compound 3 | Dieldrin | cyclodiene insecticides | 200:1 to 1:100 |
| Compound 3 | Dinotefuran | neonicotinoids | 150:1 to 1:200 |
| Compound 3 | Diofenolan | molting inhibitor | 150:1 to 1:200 |
| Compound 3 | Emamectin | macrocyclic lactones | 50:1 to 1:10 |
| Compound 3 | Endosulfan | cyclodiene insecticides | 200:1 to 1:100 |
| Compound 3 | Esfenvalerate | sodium channel modulators | 100:1 to 1:400 |
| Compound 3 | Ethiprole | GABA-regulated chloride channel blockers | 200:1 to 1:100 |
| Compound 3 | Fenothiocarb | | 150:1 to 1:200 |
| Compound 3 | Fenoxycarb | juvenile hormone mimics | 500:1 to 1:100 |
| Compound 3 | Fenvalerate | sodium channel modulators | 150:1 to 1:200 |
| Compound 3 | Fipronil | GABA-regulated chloride channel blockers | 150:1 to 1:100 |
| Compound 3 | Flonicamid | | 200:1 to 1:100 |
| Compound 3 | Flubendiamide | ryanodine receptor ligands | 100:1 to 1:120 |
| Compound 3 | Flufenoxuron | chitin synthesis inhibitors | 200:1 to 1:100 |
| Compound 3 | Hexaflumuron | chitin synthesis inhibitors | 300:1 to 1:50 |
| Compound 3 | Hydramethylnon | mitochondrial electron transport inhibitors | 150:1 to 1:250 |
| Compound 3 | Imidacloprid | neonicotinoids | 1000:1 to 1:1000 |
| Compound 3 | Indoxacarb | sodium channel modulators | 200:1 to 1:50 |
| Compound 3 | Lambda-cyhalothrin | sodium channel modulators | 50:1 to 1:250 |

TABLE D1-continued

| Component (a) | Invertebrate Pest Control Agent | Mode of Action or Chemical Class | Typical Weight Ratio |
|---|---|---|---|
| Compound 3 | Lufenuron | chitin synthesis inhibitors | 500:1 to 1:250 |
| Compound 3 | Meperfluthrin | sodium channel modulators | 100:1 to 1:400 |
| Compound 3 | Metaflumizone | | 200:1 to 1:200 |
| Compound 3 | Methomyl | cholinesterase inhibitors | 500:1 to 1:100 |
| Compound 3 | Methoprene | juvenile hormone mimics | 500:1 to 1:100 |
| Compound 3 | Methoxyfenozide | ecdysone agonists | 50:1 to 1:50 |
| Compound 3 | Nitenpyram | neonicotinoids | 150:1 to 1:200 |
| Compound 3 | Nithiazine | neonicotinoids | 150:1 to 1:200 |
| Compound 3 | Novaluron | chitin synthesis inhibitors | 500:1 to 1:150 |
| Compound 3 | Oxamyl | cholinesterase inhibitors | 200:1 to 1:200 |
| Compound 3 | Pymetrozine | | 200:1 to 1:100 |
| Compound 3 | Pyrethrin | sodium channel modulators | 100:1 to 1:10 |
| Compound 3 | Pyridaben | mitochondrial electron transport inhibitors | 200:1 to 1:100 |
| Compound 3 | Pyridalyl | | 200:1 to 1:100 |
| Compound 3 | Pyriproxyfen | juvenile hormone mimics | 500:1 to 1:100 |
| Compound 3 | Ryanodine | ryanodine receptor ligands | 100:1 to 1:120 |
| Compound 3 | Spinetoram | macrocyclic lactones | 150:1 to 1:100 |
| Compound 3 | Spinosad | macrocyclic lactones | 500:1 to 1:10 |
| Compound 3 | Spirodiclofen | lipid biosynthesis inhibitors | 200:1 to 1:200 |
| Compound 3 | Spiromesifen | lipid biosynthesis inhibitors | 200:1 to 1:200 |
| Compound 3 | Sulfoxaflor | | 200:1 to 1:200 |
| Compound 3 | Tebufenozide | ecdysone agonists | 500:1 to 1:250 |
| Compound 3 | Tetramethylfluthrin | sodium channel modulators | 100:1 to 1:40 |
| Compound 3 | Thiacloprid | neonicotinoids | 100:1 to 1:200 |
| Compound 3 | Thiamethoxam | neonicotinoids | 1250:1 to 1:1000 |
| Compound 3 | Thiodicarb | cholinesterase inhibitors | 500:1 to 1:400 |
| Compound 3 | Thiosultap-sodium | | 150:1 to 1:100 |
| Compound 3 | Tralomethrin | sodium channel modulators | 150:1 to 1:200 |
| Compound 3 | Triazamate | cholinesterase inhibitors | 250:1 to 1:100 |
| Compound 3 | Triflumuron | chitin synthesis inhibitors | 200:1 to 1:100 |
| Compound 3 | *Bacillus thuringiensis* | biological agents | 50:1 to 1:10 |
| Compound 3 | *Bacillus thuringiensis* delta-endotoxin | biological agents | 50:1 to 1:10 |
| Compound 3 | NPV (e.g., Gemstar) | biological agents | 50:1 to 1:10 |

Tables D2 through D27 are each constructed the same as Table D1 above except that entries below the "Component (a)" column heading are replaced with the respective Component (a) Column Entry shown below. Thus, for example, in Table D2 the entries below the "Component (a)" column heading all recite "Compound 4", and the first line in below the column headings in Table D2 specifically discloses a mixture of Compound 4 with abamectin. Tables D3 through D27 are constructed similarly.

| Table Number | Component (a) Column Entry |
|---|---|
| D2 | Compound 4 |
| D3 | Compound 6 |
| D4 | Compound 7 |
| D5 | Compound 11 |
| D6 | Compound 13 |
| D7 | Compound 14 |
| D8 | Compound 15 |
| D9 | Compound 30 |
| D10 | Compound 33 |
| D11 | Compound 41 |
| D12 | Compound 63 |
| D13 | Compound 64 |
| D14 | Compound 66 |
| D15 | Compound 78 |
| D16 | Compound 83 |
| D17 | Compound 87 |
| D18 | Compound 89 |
| D19 | Compound 94 |
| D20 | Compound 99 |
| D21 | Compound 108 |
| D22 | Compound 111 |
| D23 | Compound 113 |
| D24 | Compound 117 |
| D25 | Compound 134 |

-continued

| Table Number | Component (a) Column Entry |
|---|---|
| D26 | Compound 135 |
| D27 | Compound 142 |

Compositions comprising compounds of Formula 1 useful for seed treatment can further comprise bacteria and fungi that have the ability to provide protection from the harmful effects of plant pathogenic fungi or bacteria and/or soil born animals such as nematodes. Bacteria exhibiting nematicidal properties may include but are not limited to *Bacillus firmus, Bacillus cereus, Bacillius subtiliis* and *Pasteuria penetrans*. A suitable *Bacillus firmus* strain is strain CNCM I-1582 (GB-126) which is commercially available as BioNem™. A suitable *Bacillus cereus* strain is strain NCMM I-1592. Both *Bacillus* strains are disclosed in U.S. Pat. No. 6,406,690. Other suitable bacteria exhibiting nematicidal activity are *B. amyloliquefaciens* IN937a and *B. subtilis* strain GB03. Bacteria exhibiting fungicidal properties may include but are not limited to *B. pumilus* strain GB34. Fungal species exhibiting nematicidal properties may include but are not limited to *Myrothecium* verrucaria, *Paecilomyces lilacinus* and *Purpureocillium lilacinum*.

Seed treatments can also include one or more nematicidal agents of natural origin such as the elicitor protein called harpin which is isolated from certain bacterial plant pathogens such as *Erwinia amylovora*. An example is the Harpin-N-Tek seed treatment technology available as N-Hibit™ Gold CST.

Seed treatments can also include one or more species of legume-root nodulating bacteria such as the microsymbiotic nitrogen-fixing bacteria *Bradyrhizobium japonicum*. These inocculants can optionally include one or more lipo-chitooligosaccharides (LCOs), which are nodulation (Nod) factors produced by *rhizobia* bacteria during the initiation of nodule formation on the roots of legumes. For example, the Optimize® brand seed treatment technology incorporates LCO Promoter Technology™ in combination with an inocculant.

Seed treatments can also include one or more isoflavones which can increase the level of root colonization by mycorrhizal fungi. Mycorrhizal fungi improve plant growth by enhancing the root uptake of nutrients such as water, sulfates, nitrates, phosphates and metals. Examples of isoflavones include, but are not limited to, genistein, biochanin A, formononetin, daidzein, glycitein, hesperetin, naringenin and pratensein. Formononetin is available as an active ingredient in mycorrhizal inocculant products such as PHC Colonize® AG.

Seed treatments can also include one or more plant activators that induce systemic acquired resistance in plants following contact by a pathogen. An example of a plant activator which induces such protective mechanisms is acibenzolar-S-methyl.

In the present fungicidal compositions, the Formula 1 compounds of component (a) can work synergically with the additional fungicidal compounds of component (b) to provide such beneficial results as broadening the spectrum of plant diseases controlled, extending duration of preventative and curative protection, and suppressing proliferation of resistant fungal pathogens. In particular embodiments, compositions are provided in accordance with this invention that comprise proportions of component (a) and component (b) that are especially useful for controlling particular fungal diseases (such as *Alternaria solani, Blumeria graminis* f. sp. *tritici, Botrytis cinerea, Puccinia recondita* f. sp. *tritici, Rhizoctonia solani, Septoria nodorum, Septoria tritici*).

Mixtures of fungicides may also provide significantly better disease control than could be predicted based on the activity of the individual components. This synergism has been described as "the cooperative action of two components of a mixture, such that the total effect is greater or more prolonged than the sum of the effects of the two (or more) taken independently" (see P. M. L. Tames, *Neth. J. Plant Pathology* 1964, 70, 73-80). In methods providing plant disease control in which synergy is exhibited from a combination of active ingredients (e.g., fungicidal compounds) applied to the plant or seed, the active ingredients are applied in a synergistic weight ratio and synergistic (i.e. synergistically effective) amounts. Measures of disease control, inhibition and prevention cannot exceed 100%. Therefore expression of substantial synergism typically requires use of application rates of active ingredients wherein the active ingredients separately provide much less than 100% effect, so that their additive effect is substantially less than 100% to allow the possibility of increase in effect as result of synergism. On the other hand, application rates of active ingredients that are too low may show not show much activity in mixtures even with the benefit of synergism. One skilled in the art can easily identify and optimize through simple experimentation the weight ratios and application rates (i.e. amounts) of fungicidal compounds providing synergy.

The presence of a synergistic effect between two active ingredients was established with the aid of the Colby equation (see Colby, S. R. "Calculating Synergistic and Antagonistic Responses of Herbicide Combinations", *Weeds*, (1967), 15, 20-22):

$$p = A + B - \left[\frac{A \times B}{100}\right].$$

Using the method of Colby, the presence of a synergistic interaction between two active ingredients is established by first calculating the predicted activity, p, of the mixture based on activities of the two components applied alone. If p is lower than the experimentally established effect, synergism has occurred. In the equation above, A is the fungicidal activity in percentage control of one component applied alone at rate x. The B term is the fungicidal activity in percentage control of the second component applied at rate y. The equation estimates p, the expected fungicidal activity of the mixture of A at rate x with B at rate y if their effects are strictly additive and no interaction has occurred.

The following TESTS demonstrate the control efficacy of compounds of this invention on specific pathogens. The pathogen control protection afforded by the compounds is not limited, however, to these species. See Index Tables A-F below for compound descriptions. The following abbreviations are used in Index Tables A-F: Me means methyl, n-Pr means n-propyl, i-Pr means isopropyl, c-Pr means cyclopropyl, i-Bu means isobutyl, c-Bu means cyclobutyl, t-Bu means tert-butyl and $NO_2$ means nitro. The abbreviation "Cmpd." stands for "Compound", and the abbreviation "Ex." stands for "Example" and is followed by a number indicating in which example the compound is prepared. The abbreviation "m.p." stands for melting point. The numerical value reported in the column "MS (M+1)", is the molecular weight of the observed molecular ion formed by addition of $H^+$ (molecular weight of 1) to the molecule having the greatest isotopic abundance (i.e. M). The presence of molecular ions containing one or more higher atomic weight isotopes of lower abundance (e.g., $^{37}Cl$, $^{81}Br$) is not reported. The reported MS peaks were observed by mass spectrometry using electrospray ionization (ESI) or atmospheric pressure chemical ionization (APCI).

INDEX TABLE A

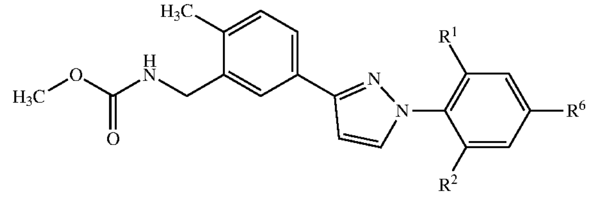

| Cmpd. No. | $R^1$ | $R^2$ | $R^6$ | m.p. (° C.) | MS (M + 1) |
|---|---|---|---|---|---|
| 1 (Ex. 2) | F | F | $NO_2$ | 131-134 | |
| 2 | F | F | C≡N | 171-174 | |

INDEX TABLE A-continued

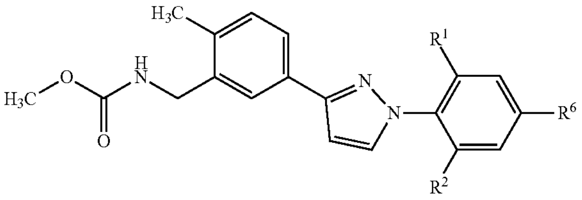

| Cmpd. No. | $R^1$ | $R^2$ | $R^6$ | m.p. (° C.) | MS (M + 1) |
|---|---|---|---|---|---|
| 3 (Ex. 1) | F | F | $OCH_3$ | 85-100 | 388 |
| 4 | F | F | H | 142-143 | 358 |
| 5 (Ex. 3) | F | F | $NH_2$ | 168-171 | 374 |
| 6 | F | F | Cl | 148-149 | 392 |
| 7 (Ex. 4) | F | F | Br | 138-139 | 436 |
| 8 (Ex. 13) | F | F | I | | 484 |
| 9 | F | F | $OCH_2$(c-Pr) | | 428 |
| 10 (Ex. 5) | F | F | OH | 178-180 | 374 |
| 11 | F | F | $OCH_2CH_3$ | 118-119 | 402 |
| 12 | F | F | O(i-Bu) | | 430 |
| 13 | F | F | O(c-Bu) | 126-128 | 428 |
| 14 (Ex. 6) | F | F | O(i-Pr) | 133-134 | 416 |
| 15 | F | F | $OCHF_2$ | 102-103 | 424 |
| 16 | F | F | F | | 376 |
| 17 | F | F | $OC(=O)OCH_3$ | | 432 |
| 18 | F | F | $OC(=O)CH_3$ | | 416 |
| 19 | F | $SCH_3$ | F | | 404 |
| 20 | $SCH_3$ | $SCH_3$ | F | | 432 |
| 21 | F | F | 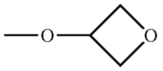 | | 430 |
| 22 | F | F | $OCH_2CF_3$ | | 456 |
| 23 | F | F | 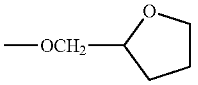 | | 458 |
| 24 | F | F | $NHC(=O)OCH_3$ | | 431 |
| 25 | F | F | $NHC(=O)CH_3$ | | 415 |
| 26 | F | $SCH_3$ | I | | 512 |
| 27 | F | F | $SCH_3$ | | 404 |
| 28 | F | $SCH_3$ | $SCH_3$ | | 432 |
| 29 | F | F | $OCF_2CHF_2$ | | 474 |
| 30 | F | F | $CH_3$ | 130-131 | 372 |
| 31 | F | F | $OCH_2$(c-Bu) | | 442 |
| 32 | F | F | 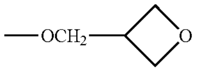 | | 444 |
| 33 | F | F | $OCH_2C{\equiv}CH$ | 143-144 | 412 |
| 34 | F | $OCH_3$ | $OCH_3$ | | 401 |
| 35 | $CH_3$ | $CH_3$ | $NO_2$ | | 395 |
| 36 | F | F | $NHCH_3$ | | 387 |
| 37 | F | Cl | $NO_2$ | | 419 |
| 38 | $CH_3$ | $CH_3$ | $NH_2$ | | 365 |
| 39 | Cl | F | $NH_2$ | | 389 |
| 40 | $CH_3$ | $CH_3$ | $OCH_3$ | | 380 |
| 41 | F | F | c-Pr | 89-91 | 398 |
| 42 (Ex. 15) | F | F | S(t-Bu) | | 446 |
| 43 (Ex. 16) | F | F | $SCHF_2$ | | 440 |
| 44 | Cl | Cl | H | | 390 |
| 45 | F | I | H | | 466 |
| 46 | Br | F | H | | 420 |
| 47 | Cl | F | H | | 374 |
| 48 | $CH_3$ | $CH_3$ | Br | | 428 |
| 49 | $CH_3$ | $CH_3$ | Cl | | 384 |
| 50 | Cl | F | Br | | 452 |
| 51 | Cl | F | Cl | | 408 |
| 52 | Br | I | H | | 526 |
| 53 (Ex. 14) | F | F | $C{\equiv}CH$ | | 382 |
| 54 | Cl | Cl | $NO_2$ | | 435 |
| 55 | Cl | Cl | $NH_2$ | | 405 |
| 56 | Cl | Cl | Br | | 468 |

INDEX TABLE A-continued

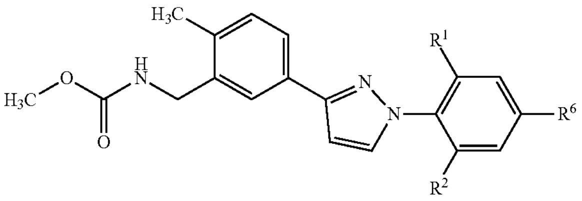

| Cmpd. No. | $R^1$ | $R^2$ | $R^6$ | m.p. (° C.) | MS (M + 1) |
|---|---|---|---|---|---|
| 57 | Cl | Cl | Cl | | 424 |
| 58 | Br | Br | H | | 480 |
| 59 | Cl | I | H | | 482 |
| 60 | Br | Cl | H | | 436 |
| 61 | Br | $CH_3$ | H | | 416 |
| 62 | F | F | $C(=CH_2)CH_3$ | | 398 |
| 63 | F | F | i-Pr | 96-98 | 400 |
| 64 | F | F | $CF_3$ | 106-108 | 426 |
| 65 (Ex. 17) | Cl | Cl | c-Pr | | 430 |
| 66 | F | F | O(c-Pr) | 124-128 | |
| 67 (Ex. 9) | F | F | C(=O)H | 156-160 | 386 |
| 68 (Ex. 11) | F | F | $C(=O)CH_3$ | | 400 |
| 69 | F | F | C(Me=NOH | 160-161 | 415 |
| 70 (Ex. 7) | F | F | $C(=O)OCH_3$ | 120-122 | 416 |
| 71 (Ex. 8) | F | F | $CH_2OH$ | 183-184 | 388 |
| 72 | F | F | CH=NOH | 134-139 | 401 |
| 73 | F | F | $OCH_2F$ | | 406 |
| 74 | F | F | 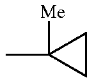 | | 412 |
| 75 | F | F | $CH_2C(=O)CH_3$ | | 414 |
| 76 | F | F | $CH(OMe)C(=O)CH_3$ | | 444 |
| 77 | F | F | $CH_2F$ | | 390 |
| 78 | F | F | $OCF_3$ | | 442 |
| 79 | F | F | $CH=NOCH_3$ | | 415 |
| 80 | F | F | $CH=NOCH_2CH_3$ | | 429 |
| 81 | F | F | $CH=NOCH_2CH=CH_2$ | | 441 |
| 82 | F | F | $CH=NOCH(CH_3)_2$ | | 443 |
| 83 (Ex. 12) | F | F | $C(Me)=NOCH_3$ | | 429 |
| 84 | F | F | $C(Me)=NOCH_2CH_3$ | | 443 |
| 85 | F | F | $C(Me)=NOCH_2CH=CH_2$ | | 455 |
| 86 | F | F | $C(Me)=NOCH(CH_3)_2$ | | 457 |
| 87 (Ex. 10) | F | F | $CHF_2$ | | 408 |
| 88 | F | F | 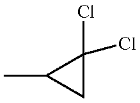 | | 466 |
| 89 | F | F | 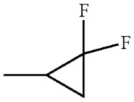 | | 434 |
| 90 | F | F | O(c-pentyl) | | 442 |
| 91 | F | F | O(c-hexyl) | | 456 |
| 92 | F | F | $OCH(Me)CH_2CH_3$ | | 430 |
| 93 | F | F | O(t-Bu) | | 430 |
| 94 | F | F | $OCH_2CH=CH_2$ | | 414 |
| 95 | F | F | $C(Me)_2OH$ | | 416 |
| 96 | F | F | $CH(OH)CH_3$ | | 402 |
| 97 | F | F | $CF(Me)_2$ | | 418 |
| 98 | F | F | 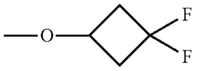 | 134-136 | 464 |
| 99 | F | F | $C(Me)=NOCH_3$ | | 429 |
| 133 | F | F | 1,3-dioxolan-2-yl | | 430 |
| 134 | F | F | 1,3-dioxan-2-yl | | 444 |
| 135 | Cl | Cl | i-Pr | | 432 |
| 136 | Br | Br | I | * | * |
| 137 | Br | Br | $C(=CH_2)CH_3$ | * | * |

INDEX TABLE A-continued
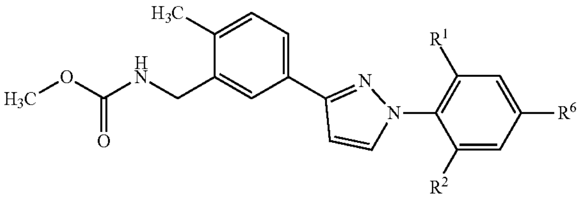
| Cmpd. No. | $R^1$ | $R^2$ | $R^6$ | m.p. (° C.) | MS (M + 1) |
|---|---|---|---|---|---|
| 138 | Cl | Cl | $CF(CF_3)_2$ | | 558 |
| 144 | F | F | $CH_2CH_3$ | 93-96 | |
| 145 | F | F | n-Pr | 85-88 | |
| 146 | F | F | $CH{=}CH_2$ | 92-95 | |
| 147 | F | F | $CH{=}CHCH_3$ | 130-133 | |
| 148 | F | F | 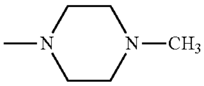 | 153-157 | |
| 149 | F | F | 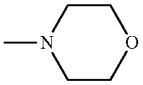 | 193-196 | |
| 150 | F | F | 1-pyrrolidinyl | 117-120 | |
| 151 | F | F | 1 -piperidinyl | 151-155 | |
| 152 | F | F | $N(CH_3)_2$ | 116-120 | |
*See Index Table G for $^1H$ NMR data.
INDEX TABLE B
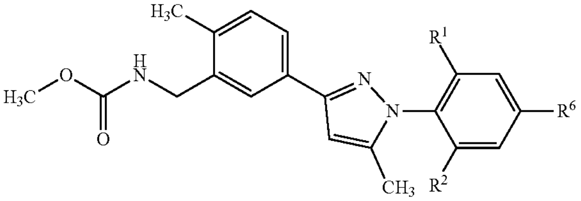
| Cmpd. No. | $R^1$ | $R^2$ | $R^6$ | m.p. (° C.) |
|---|---|---|---|---|
| 100 | F | F | H | 125-129 |
| 101 | Cl | Cl | H | 146-150 |
| 102 | F | F | $OCH_3$ | 128-132 |
INDEX TABLE C
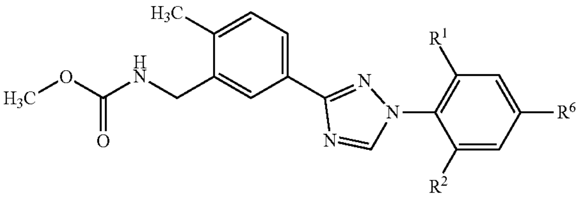
| Cmpd. No. | $R^1$ | $R^2$ | $R^6$ | m.p. (° C.) |
|---|---|---|---|---|
| 103 | F | F | $CF_3$ | 168-172 |
| 104 | F | F | Br | 175-179 |
| 105 | F | F | Cl | 166-170 |
| 106 | F | F | $NH_2$ | 136-140 |
| 107 | F | F | $NO_2$ | 179-183 |

INDEX TABLE D

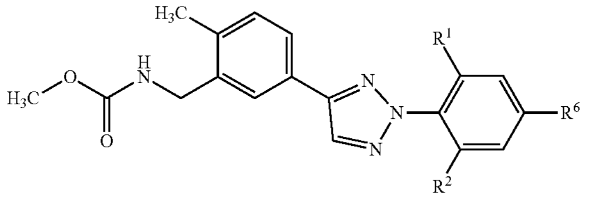

| Cmpd. No. | $R^1$ | $R^2$ | $R^6$ | m.p. (° C.) | MS (M + 1) |
|---|---|---|---|---|---|
| 108 | F | F | i-Pr | 102-106 | 102-106 |
| 109 | F | F | i-Bu | * | * |
| 110 | F | F | $C(=CH_2)CH_3$ | 111-115 | |
| 111 | F | F | $CH_3$ | 117-121 | |
| 112 | F | F | H | 122-126 | |
| 113 | F | F | c-Pr | 107-111 | |
| 114 | F | F | Br | 136-140 | |
| 115 (Ex. 19) | F | F | $NH_2$ | 144-148 | |
| 116 | F | F | I | 154-158 | |
| 117 (Ex. 20) | F | F | Cl | 108-112 | |
| 118 (Ex. 18) | F | F | $NO_2$ | 152-156 | |
| 139 | F | F | $CH(Me)CH_2CH_3$ | | 415 |
| 140 | F | F | $C(=O)CH_3$ | 151-155 | |
| 141 | F | F | $CF_3$ | 138-142 | |
| 142 | F | F | $C(Me)=NOCH_2CH_3$ | 104-108 | |
| 143 | F | F | $C(Me)=NOCH(CH_3)_2$ | 111-115 | |

* See Index Table G for $^1H$ NMR data.

INDEX TABLE E

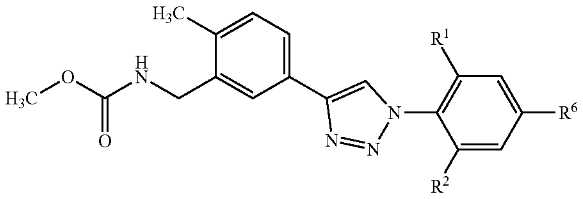

| Cmpd. No. | $R^1$ | $R^2$ | $R^6$ | m.p. (° C.) |
|---|---|---|---|---|
| 119 | F | F | $CH_3$ | 143-147 |
| 120 | Cl | $OCH_3$ | $OCH_3$ | 145-148 |
| 121 | F | F | Cl | 159-163 |
| 122 | F | Cl | F | 125-129 |
| 123 | Cl | Cl | $OCH_3$ | 148-152 |
| 124 | $CH_3$ | $CH_3$ | $OCH_3$ | 110-114 |
| 125 | F | F | I | 166-170 |
| 126 | F | F | Br | 160-164 |
| 127 | $OCH_3$ | $OCH_3$ | $OCH_3$ | * |
| 128 | Br | Br | $OCH_3$ | 167-171 |
| 129 | Br | $NO_2$ | $OCH_3$ | 158-162 |
| 130 | F | F | $OCH_3$ | 146-150 |
| 131 | F | F | $NH_2$ | 194-198 |
| 132 (Ex. 18) | F | F | $NO_2$ | 174-178 |

*See Index Table G for $^1H$ NMR data.

INDEX TABLE F

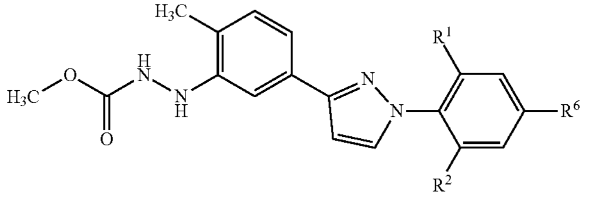

| Cmpd. No. | $R^1$ | $R^2$ | $R^6$ | m.p. (° C.) | MS (M + 1) |
|---|---|---|---|---|---|
| 153 | F | F | Cl | 153-156 | 393 |
| 154 | F | F | H | | 359 |
| 155 | F | F | i-Pr | | 401 |
| 156 | F | F | $CF_3$ | | 427 |

INDEX TABLE G

| Compound No. | $^1H$ NMR Data ($CDCl_3$ solution)[a] |
|---|---|
| 109 | δ 7.82 (m, 2H), 7.73 (d, 1H), 7.24 (d, 1H), 6.22 (s, 2H), 4.92 (br s, 1H), 4.44 (s, 2H), 3.89 (s, 3H), 3.76 (s, 6H), 3.72 (s, 3H), 2.38 (s, 3H). |
| 127 | δ 8.14 (s, 1H), 7.77 (s, 1H), 7.68 (d, 1H), 7.27 (s, 1H), 6.92 (d, 2H), 4.91 (br s, 1H), 4.44 (s, 2H), 3.72 (s, 3H), 2.55 (d, 2H), 2.39 (s, 3H), 1.92 (m, 1H), 0.96 (s, 3H), 0.95 (s, 3H). |
| 136 | δ 8.02 (s, 2H), 7.76 (s, 1H), 7.68 (d, 1H), 7.52 (m, 1H), 7.23 (d, 1H), 6.78 (m, 1H), 4.83 (br s, 1H), 4.42 (m, 2H), 3.71 (s, 3H), 2.37 (s, 3H). |
| 137 | δ 7.79 (m, 1H), 7.70 (m, 3H), 7.54 (d, 1H), 7.23 (d, 1H), 6.78 (d, 1H), 5.45 (s, 1H), 5.25 (s, 1H), 4.83 (br s, 1H), 4.42 (m, 2H), 3.70 (s, 3H), 2.37 (s, 3H), 2.15 (s, 3H). |

[a] $^1H$ NMR data are reported in ppm downfield from tetramethylsilane. Couplings are designated by (s)—singlet, (br s)—broad singlet, (d)—doublet, and (m)—multiplet.

Biological Examples of the Invention

General protocol for preparing test suspensions for Tests A-F: the test compounds were first dissolved in acetone in an amount equal to 3% of the final volume and then suspended at the desired concentration (in ppm) in acetone and purified water (50/50 mix by volume) containing 250 ppm of the surfactant PEG400 (polyhydric alcohol esters). The resulting test suspensions were then used in Tests A-F.

Test A

The test solution was sprayed to the point of run-off on wheat seedlings. The following day the seedlings were inoculated with a spore suspension of Zymoseptoria *tritici* (the causal agent of wheat leaf blotch) and incubated in a saturated atmosphere at 24° C. for 48 h, and then moved to a growth chamber at 20° C. for 17 days, after which time disease ratings were made.

Test B

The test solution was sprayed to the point of run-off on wheat seedlings. The following day the seedlings were inoculated with a spore suspension of *Puccinia recondita* f. sp. *tritici* (the causal agent of wheat leaf rust) and incubated in a saturated atmosphere at 20° C. for 24 h, and then moved to a growth chamber at 20° C. for 7 days, after which time disease ratings were made.

Test C

The test suspension was sprayed to the point of run-off on wheat seedlings. The following day the seedlings were inoculated with a spore dust of *Blumeria graminis* f. sp. *tritici*, (also known as *Erysiphe graminis* f. sp. *tritici*, the causal agent of wheat powdery mildew) and incubated in a growth chamber at 20° C. for 8 days, after which time visual disease ratings were made.

Test D

The test solution was sprayed to the point of run-off on soybean seedlings. The following day the seedlings were inoculated with a spore suspension of *Phakopsora pachyrhizi* (the causal agent of Asian soybean rust) and incubated in a saturated atmosphere at 22° C. for 24 h and then moved to a growth chamber at 22° C. for 8 days, after which time visual disease ratings were made.

Test E

The test suspension was sprayed to the point of run-off on tomato seedlings. The following day the seedlings were inoculated with a spore suspension of *Botrytis cinerea* (the causal agent of tomato *Botrytis*) and incubated in a saturated atmosphere at 20° C. for 48 h, and then moved to a growth chamber at 24° C. for 3 days, after which time visual disease ratings were made.

Test F

The test suspension was sprayed to the point of run-off on tomato seedlings. The following day the seedlings were inoculated with a spore suspension of *Alternaria solani* (the causal agent of tomato early blight) and incubated in a saturated atmosphere at 27° C. for 48 h, and then moved to a growth chamber at 20° C. for 3 days, after which time visual disease ratings were made.

Results for Tests A-F are given in Table A below. A rating of 100 indicates 100% disease control and a rating of 0 indicates no disease control (relative to the controls). A dash (-) indicates the compound was not tested.

TABLE A

| Cmpd. No. | Rate in ppm | Test A | Test B | Test C | Test D | Test E | Test F |
|---|---|---|---|---|---|---|---|
| 1 | 10 | 0 | 68 | 0 | 44 | 0 | — |
| 2 | 10 | 13 | 68 | 0 | 100 | 0 | — |
| 3 | 10 | 50 | 100 | 79 | 100 | 45 | — |
| 4 | 10 | — | 90 | — | 100 | — | — |
| 5 | 10 | — | 0 | — | 0 | — | — |
| 6 | 10 | 7 | 98 | 0 | 100 | 0 | 40 |
| 7 | 10 | — | 100 | — | 100 | — | — |
| 8 | 10 | — | 100 | — | 100 | — | — |
| 9 | 10 | — | 99 | — | 99 | — | — |
| 10 | 10 | — | 0 | — | 0 | — | — |
| 11 | 10 | — | 100 | — | 100 | — | — |
| 12 | 10 | — | 98 | — | 100 | — | — |
| 13 | 10 | — | 100 | — | 100 | — | — |
| 14 | 10 | — | 100 | — | 100 | — | — |
| 15 | 10 | 0 | 99 | 69 | 100 | 0 | 0 |
| 16 | 10 | — | 99 | — | 100 | — | — |
| 17 | 10 | — | 0 | — | 0 | — | — |
| 18 | 10 | — | 41 | — | 65 | — | — |
| 19 | 10 | — | 0 | — | 81 | — | — |
| 20 | 10 | — | 0 | — | 0 | — | — |
| 21 | 10 | — | 55 | — | 100 | — | — |
| 22 | 10 | — | 99 | — | 100 | — | — |
| 23 | 10 | — | 68 | — | 25 | — | — |
| 24 | 10 | — | 0 | — | 75 | — | — |
| 25 | 10 | — | 8 | — | 81 | — | — |
| 26 | 10 | — | 73 | — | 87 | — | — |
| 27 | 10 | — | 99 | — | 100 | — | — |
| 28 | 10 | — | 0 | — | 100 | — | — |
| 29 | 10 | — | 100 | — | 100 | — | — |
| 30 | 10 | — | 98 | — | 100 | — | — |
| 31 | 10 | — | 91 | — | 0 | — | — |
| 32 | 10 | — | 0 | — | 77 | — | — |
| 33 | 10 | — | 99 | — | 100 | — | — |
| 34 | 10 | — | 28 | — | 96 | — | — |
| 35 | 10 | — | 0 | — | 0 | — | — |
| 36 | 10 | — | 68 | — | 100 | — | — |
| 37 | 10 | — | 26 | — | 0 | — | — |
| 38 | 10 | — | 0 | — | 0 | — | — |
| 39 | 10 | — | 0 | — | 0 | — | — |
| 40 | 10 | — | 0 | — | 99 | — | — |
| 41 | 10 | — | 100 | — | 100 | — | — |
| 42 | 10 | — | 100 | — | 73 | — | — |
| 43 | 10 | — | 100 | — | 100 | — | — |
| 44 | 10 | — | 68 | — | 100 | — | — |
| 45 | 10 | — | 0 | — | 100 | — | — |
| 46 | 10 | — | 68 | — | 100 | — | — |
| 47 | 10 | — | 74 | — | 100 | — | — |
| 48 | 10 | — | 68 | — | 99 | — | — |
| 49 | 10 | — | 68 | — | 99 | — | — |
| 50 | 10 | — | 100 | — | 100 | — | — |
| 51 | 10 | — | 100 | — | 100 | — | — |
| 52 | 10 | — | 0 | — | 99 | — | — |
| 53 | 10 | — | 100 | — | 100 | — | — |
| 54 | 10 | — | 0 | — | 0 | — | — |
| 55 | 10 | — | 0 | — | 0 | — | — |
| 56 | 10 | — | 80 | — | 100 | — | — |
| 57 | 10 | — | 74 | — | 100 | — | — |
| 58 | 10 | — | 68 | — | 100 | — | — |
| 59 | 10 | — | 45 | — | 87 | — | — |
| 60 | 10 | — | 68 | — | 100 | — | — |
| 61 | 10 | — | 68 | — | 97 | — | — |
| 62 | 10 | — | 99 | — | 100 | — | — |
| 63 | 10 | 26 | 100 | 98 | 100 | 0 | 85 |
| 64 | 10 | 0 | 100 | 89 | 100 | 0 | 0 |
| 65 | 10 | — | 97 | — | 100 | — | — |
| 66 | 10 | — | 100 | — | 100 | — | — |
| 67 | 10 | — | 0 | — | 12 | — | — |
| 68 | 10 | — | 74 | — | 71 | — | — |
| 69 | 10 | — | 99 | — | 97 | — | — |
| 70 | 10 | — | 74 | — | 81 | — | — |
| 71 | 10 | — | 0 | — | 25 | — | — |
| 72 | 10 | — | 100 | — | 77 | — | — |
| 73 | 10 | — | 100 | — | 100 | — | — |
| 74 | 10 | — | 100 | — | 100 | — | — |
| 75 | 10 | — | 0 | — | 87 | — | — |

TABLE A-continued

| Cmpd. No. | Rate in ppm | Test A | Test B | Test C | Test D | Test E | Test F |
|---|---|---|---|---|---|---|---|
| 76 | 10 | — | 68 | — | 100 | — | — |
| 77 | 10 | — | 100 | — | 100 | — | — |
| 78 | 10 | — | 100 | — | 100 | — | — |
| 79 | 10 | — | 100 | — | 100 | — | — |
| 80 | 10 | — | 100 | — | 100 | — | — |
| 81 | 10 | — | 92 | — | 100 | — | — |
| 82 | 10 | — | 95 | — | 100 | — | — |
| 83 | 10 | — | 100 | — | 100 | — | — |
| 84 | 10 | — | 100 | — | 100 | — | — |
| 85 | 10 | — | 90 | — | 98 | — | — |
| 86 | 10 | — | 99 | — | 100 | — | — |
| 87 | 10 | — | 100 | — | 100 | — | — |
| 88 | 10 | — | 100 | — | 100 | — | — |
| 89 | 10 | — | 100 | — | 100 | — | — |
| 90 | 10 | — | 86 | — | 100 | — | — |
| 91 | 10 | — | 86 | — | 79 | — | — |
| 92 | 10 | — | 100 | — | 100 | — | — |
| 93 | 10 | — | 100 | — | 100 | — | — |
| 94 | 10 | — | 85 | — | 99 | — | — |
| 95 | 10 | — | 0 | — | 53 | — | — |
| 96 | 10 | — | 68 | — | 79 | — | — |
| 97 | 10 | — | 100 | — | 100 | — | — |
| 98 | 10 | — | 99 | — | 100 | — | — |
| 99 | 10 | — | 100 | — | 100 | — | — |
| 100 | 10 | — | 0 | — | 0 | — | — |
| 101 | 10 | — | 0 | — | 0 | — | — |
| 102 | 10 | — | 0 | — | 0 | — | — |
| 103 | 10 | — | 100 | — | 86 | — | — |
| 104 | 10 | — | 100 | — | 90 | — | — |
| 105 | 10 | — | 100 | — | 92 | — | — |
| 106 | — | — | — | — | — | — | — |
| 107 | 250 | 28 | 80 | 43 | 0 | 0 | 0 |
| 108 | 2 | — | 100 | — | 100 | — | — |
| 109 | 10 | — | 91 | — | 100 | — | — |
| 110 | 10 | — | 95 | — | 100 | — | — |
| 111 | 10 | — | 99 | — | 100 | — | — |
| 112 | | — | — | — | — | — | — |
| 113 | 10 | — | 100 | — | 100 | — | — |
| 114 | 10 | — | 100 | — | 100 | — | — |
| 115 | — | — | — | — | — | — | — |
| 116 | 10 | — | 100 | — | 100 | — | — |
| 117 | 10 | — | 100 | — | 100 | — | — |
| 118 | 250 | 1 | 0 | 0 | 0 | 0 | 0 |
| 119 | 10 | — | 100 | — | 0 | — | — |
| 120 | 10 | — | 0 | — | 0 | — | — |
| 121 | 10 | — | 68 | — | 0 | — | — |
| 122 | 250 | 71 | 99 | 0 | 100 | 0 | 0 |
| 123 | 10 | — | 0 | — | 0 | — | — |
| 124 | 10 | — | 0 | — | 0 | — | — |
| 125 | 10 | — | 68 | — | 0 | — | — |
| 126 | 10 | — | 57 | — | 0 | — | — |
| 127 | 10 | — | 0 | — | 0 | — | — |
| 128 | 10 | — | 0 | — | 0 | — | — |
| 129 | 10 | — | 0 | — | 0 | — | — |
| 130 | 10 | — | 68 | — | 0 | — | — |
| 131 | — | — | — | — | — | — | — |
| 132 | — | — | — | — | — | — | — |
| 133 | 10 | — | 99 | — | 100 | — | — |
| 134 | 10 | — | 89 | — | 100 | — | — |
| 135 | 10 | — | 86 | — | 100 | — | — |
| 136 | 10 | — | 19 | — | 59 | — | — |
| 137 | 10 | — | 0 | — | 77 | — | — |
| 138 | 10 | — | 74 | — | 87 | — | — |
| 139 | 10 | — | 99 | — | 100 | — | — |
| 140 | 10 | — | 41 | — | 71 | — | — |
| 141 | 10 | — | 99 | — | 100 | — | — |
| 142 | 10 | — | 86 | — | 100 | — | — |
| 143 | 10 | — | 74 | — | 100 | — | — |
| 144 | 10 | — | 100 | — | 100 | — | — |
| 145 | 10 | — | 100 | — | 100 | — | — |
| 146 | 10 | — | 100 | — | 100 | — | — |
| 147 | 10 | — | 99 | — | 100 | — | — |
| 148 | 10 | — | 0 | — | 0 | — | — |
| 149 | 10 | — | 83 | — | 99 | — | — |
| 150 | 10 | — | 68 | — | 0 | — | — |
| 151 | 10 | — | 68 | — | 19 | — | — |
| 152 | 10 | — | 98 | — | 99 | — | — |
| 153 | 10 | — | 68 | — | 91 | — | — |

TABLE A-continued

| Cmpd. No. | Rate in ppm | Test A | Test B | Test C | Test D | Test E | Test F |
|---|---|---|---|---|---|---|---|
| 154 | 10 | — | 0 | — | 25 | — | — |
| 155 | 10 | — | 91 | — | 100 | — | — |
| 156 | 10 | — | 85 | — | 54 | — | — |

The test results for TEST A through F presented above in Table A for compounds of Formula 1 illustrate the fungicidal activity of component (a) contributing to the plant disease control utility of compositions comprising component (a) in combination with component (b) and optionally at least one additional fungicidal compound according to the present invention.

TEST G below demonstrates the control efficacy of compositions of this invention on Asian soybean rust. The general protocol for preparing test compositions for TEST G was as follows: Compound 41, Compound 63, N-(2,2,2-trifluoroethyl)-2-[[4-[5-(trifluoromethyl)-1,2,4-oxadiazol-3-yl]phenyl]methyl]-4-oxazolecarboxamide (b54.11a), ethyl 1-[[4-[[(1Z)-2-ethoxy-3,3,3-trifluoro-1-propen-1-yl]oxy]phenyl]methyl]-1H-pyrazole-4-carboxylate (b54.11c), ethyl 1-[[4-[[2-(trifluoromethyl)-1,3-dioxolan-2-yl]methoxy]phenyl]methyl]-1H-pyrazole-4-carboxylate (b54.11d), azoxystrobin, benzovindiflupyr, bixafen, chlorothalonil, cyproconazole, epoxiconazole, fenpropidin, fenpropimorph, fluindapyr, flutriafol, fluxapyroxad, inpyrfluxam, picoxystrobin, prothioconazole, pydiflumetofen, tebuconazole and trifloxystrobin were obtained as unformulated, technical-grade materials. Copper hydroxide and mancozeb was obtained as a formulated product marketed under the trademarks KOCIDE 3000 and MANZATE, respectively. Unformulated materials were first dissolved in acetone and then suspended at the desired concentration (in ppm) in acetone and purified water (50/50 mix by volume) containing 250 ppm of the surfactant Trem® 014 (polyhydric alcohol esters). Formulated materials were dispersed in sufficient water to give the desired concentration, and neither organic solvent nor surfactant was added to the suspension. The resulting test mixtures were then used in TEST G. The tests were run on four individual plants and the results reported as the mean average of the four plants.

The presence of a synergistic effect between two active ingredients was established with the aid of the Colby equation (see Colby, S. R. "Calculating Synergistic and Antagonistic Responses of Herbicide Combinations", *Weeds*, (1967), 15, 20-22):

$$p = A + B - \left[\frac{A \times B}{100}\right].$$

Using the method of Colby, the presence of a synergistic interaction between two active ingredients is established by first calculating the predicted activity, p, of the mixture based on activities of the two components applied alone. If p is lower than the experimentally established effect, synergism has occurred. In the equation above, A is the fungicidal activity in percentage control of one component applied alone at rate x. The B term is the fungicidal activity in percentage control of the second component applied at rate y. The equation estimates p, the expected fungicidal activity of the mixture of A at rate x with B at rate y if their effects are strictly additive and no interaction has occurred.

Test G

The test mixture was sprayed to the point of run-off on soybean seedlings. The following day the seedlings were inoculated with a spore suspension of *Phakopsora pachyrhizi* (the causal agent of Asian soybean rust) and incubated in a saturated atmosphere at 22° C. for 24 h and then moved to a growth chamber at 22° C. for 8 days, after which time visual disease ratings were made.

Results for TEST G are given below in Tables B-1 through J-1 for Compound 41, and Tables B-2 through J-2 for Compound 63. Each table corresponds to a set of evaluations performed together at the same time. In each table, a rating of 100 indicates 100% disease control and a rating of 0 indicates no disease control (relative to the controls). Columns labeled "Obsd" indicate the average of results observed from test run on four individual plants. Columns labeled "Exp" indicate the expected value for each treatment mixture using the Colby equation.

TABLE B-1

Observed and Expected Effects of Compound 41 Alone and Mixtures with N-(2,2,2-Trifluoroethyl)-2-[[4-[5-(trifluoromethyl)-1,2,4-oxadiazol-3-yl]phenyl]methyl]-4-oxazolecarboxamide (b54.11a), Ethyl 1-[[4-[[(1Z)-2-ethoxy-3,3,3-trifluoro-1-propen-1-yl]oxy]phenyl]methyl]-1H-pyrazole-4-carboxylate (b54.11c), and Ethyl 1-[[4-[[2-(trifluoromethyl)-1,3-dixolan-2-yl]methoxy]phenyl]methyl]-1H-pyrazole-4-carboxylate (b54.11d) in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 29 | — |
| 0.764 | None | 0 | 62 | — |
| 0 | (b54.11a) | 0.471 | 59 | — |
| 0 | (b54.11a) | 0.764 | 75 | — |
| 0.346 | (b54.11a) | 0.471 | 63 | 71 |
| 0.346 | (b54.11a) | 0.764 | 79 | 82 |
| 0.764 | (b54.11a) | 0.471 | 71 | 84 |
| 0.764 | (b54.11a) | 0.764 | 88 | 91 |

TABLE B-1-continued

Observed and Expected Effects of Compound 41 Alone and Mixtures with N-(2,2,2-Trifluoroethyl)-2-[[4-[5-(trifluoromethyl)-1,2,4-oxadiazol-3-yl]phenyl]methyl]-4-oxazolecarboxamide (b54.11a), Ethyl 1-[[4-[[(1Z)-2-ethoxy-3,3,3-trifluoro-1-propen-1-yl]oxy]phenyl]methyl]-1H-pyrazole-4-carboxylate (b54.11c), and Ethyl 1-[[4-[[2-(trifluoromethyl)-1,3-dixolan-2-yl]methoxy]phenyl]methyl]-1H-pyrazole-4-carboxylate (b54.11d) in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | (b54.11c) | 0.303 | 53 | — |
| 0 | (b54.11c) | 0.489 | 68 | — |
| 0.346 | (b54.11c) | 0.303 | 72 | 66 |
| 0.346 | (b54.11c) | 0.489 | 83 | 77 |
| 0.764 | (b54.11c) | 0.303 | 85 | 82 |
| 0.764 | (b54.11c) | 0.489 | 74 | 88 |
| 0 | (b54.11d) | 1.422 | 55 | — |
| 0 | (b54.11d) | 2.276 | 64 | — |
| 0.346 | (b54.11d) | 1.422 | 61 | 68 |
| 0.346 | (b54.11d) | 2.276 | 79 | 74 |
| 0.764 | (b54.11d) | 1.422 | 81 | 83 |
| 0.764 | (b54.11d) | 2.276 | 92 | 86 |

TABLE B-2

Observed and Expected Effects of Compound 63 Alone and Mixtures with Ethyl 1-[[4-[[(1Z)-2-ethoxy-3,3,3-trifluoro-1-propen-1-yl]oxy]phenyl]methyl]-1H-pyrazole-4-carboxylate (b54.11c), and Ethyl 1-[[4-[[2-(trifluoromethyl)-1,3-dixolan-2-yl]methoxy]phenyl]methyl]-1H-pyrazole-4-carboxylate (b54.11d) in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 34 | — |
| 0.652 | None | 0 | 68 | — |
| 0 | (b54.11c) | 0.303 | 53 | — |
| 0 | (b54.11c) | 0.489 | 68 | — |
| 0.403 | (b54.11c) | 0.303 | 57 | 69 |
| 0.403 | (b54.11c) | 0.489 | 77 | 79 |
| 0.652 | (b54.11c) | 0.303 | 74 | 85 |
| 0.652 | (b54.11c) | 0.489 | 87 | 90 |
| 0 | (b54.11d) | 1.422 | 55 | — |
| 0 | (b54.11d) | 2.276 | 64 | — |
| 0.403 | (b54.11d) | 1.422 | 68 | 70 |
| 0.403 | (b54.11d) | 2.276 | 71 | 76 |
| 0.652 | (b54.11d) | 1.422 | 66 | 86 |
| 0.652 | (b54.11d) | 2.276 | 73 | 88 |

TABLE C-1

Observed and Expected Effects of Compound 41 Alone and Mixtures with Bixafen, Fluxapyroxad and Fluindapyr in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 19 | — |
| 0.764 | None | 0 | 45 | — |
| 0 | bixafen | 11.327 | 54 | — |
| 0 | bixafen | 19.525 | 55 | — |
| 0.346 | bixafen | 11.327 | 27 | 63 |
| 0.346 | bixafen | 19.525 | 49 | 62 |

TABLE C-1-continued

Observed and Expected Effects of Compound 41 Alone and Mixtures with Bixafen, Fluxapyroxad and Fluindapyr in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0.764 | bixafen | 11.327 | 51 | 75 |
| 0.764 | bixafen | 19.525 | 56 | 75 |
| 0 | fluxapyroxad | 2.757 | 19 | — |
| 0 | fluxapyroxad | 4.748 | 52 | — |
| 0.346 | fluxapyroxad | 2.757 | 26 | 34 |
| 0.346 | fluxapyroxad | 4.748 | 54 | 61 |
| 0.764 | fluxapyroxad | 2.757 | 55 | 55 |
| 0.764 | fluxapyroxad | 4.748 | 59 | 73 |
| 0 | fluindapyr | 8.820 | 61 | — |
| 0 | fluindapyr | 15.230 | 79 | — |
| 0.346 | fluindapyr | 8.820 | 45 | 68 |
| 0.346 | fluindapyr | 15.230 | 57 | 83 |
| 0.764 | fluindapyr | 8.820 | 44 | 79 |
| 0.764 | fluindapyr | 15.230 | 70 | 88 |

TABLE C-2

Observed and Expected Effects of Compound 63 Alone and Mixtures with Bixafen, Fluxapyroxad and Fluindapyr in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 15 | — |
| 0.652 | None | 0 | 46 | — |
| 0 | bixafen | 11.327 | 54 | — |
| 0 | bixafen | 19.525 | 55 | — |
| 0.403 | bixafen | 11.327 | 31 | 62 |
| 0.403 | bixafen | 19.525 | 61 | 61 |
| 0.652 | bixafen | 11.327 | 30 | 76 |
| 0.652 | bixafen | 19.525 | 49 | 75 |
| 0 | fluxapyroxad | 2.757 | 19 | — |
| 0 | fluxapyroxad | 4.748 | 52 | — |
| 0.403 | fluxapyroxad | 2.757 | 25 | 30 |
| 0.403 | fluxapyroxad | 4.748 | 65 | 59 |
| 0.652 | fluxapyroxad | 2.757 | 45 | 56 |
| 0.652 | fluxapyroxad | 4.748 | 60 | 74 |
| 0 | fluindapyr | 8.820 | 61 | — |
| 0 | fluindapyr | 15.230 | 79 | — |
| 0.403 | fluindapyr | 8.820 | 43 | 67 |
| 0.403 | fluindapyr | 15.230 | 77 | 82 |
| 0.652 | fluindapyr | 8.820 | 68 | 79 |
| 0.652 | fluindapyr | 15.230 | 41 | 89 |

TABLE D-1

Observed and Expected Effects of Compound 41 Alone and Mixtures with Mancozeb, Fenpropimorph and Tebuconazole in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 25 | — |
| 0.764 | None | 0 | 57 | — |
| 0 | mancozeb | 42.532 | 70 | — |
| 0 | mancozeb | 74.012 | 71 | — |
| 0.346 | mancozeb | 42.532 | 85 | 77 |

TABLE D-1-continued

Observed and Expected Effects of Compound 41 Alone and Mixtures with Mancozeb, Fenpropimorph and Tebuconazole in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0.346 | mancozeb | 74.012 | 92 | 78 |
| 0.764 | mancozeb | 42.532 | 94 | 87 |
| 0.764 | mancozeb | 74.012 | 94 | 88 |
| 0 | fenpropimorph | 242.823 | 33 | — |
| 0 | fenpropimorph | 458.587 | 44 | — |
| 0.346 | fenpropimorph | 242.823 | 41 | 49 |
| 0.346 | fenpropimorph | 458.587 | 61 | 58 |
| 0.764 | fenpropimorph | 242.823 | 63 | 71 |
| 0.764 | fenpropimorph | 458.587 | 93 | 76 |
| 0 | tebuconazole | 486.921 | 30 | — |
| 0 | tebuconazole | 841.166 | 55 | — |
| 0.346 | tebuconazole | 486.921 | 45 | 47 |
| 0.346 | tebuconazole | 841.166 | 84 | 66 |
| 0.764 | tebuconazole | 486.921 | 80 | 70 |
| 0.764 | tebuconazole | 841.166 | 68 | 81 |

TABLE D-2

Observed and Expected Effects of Compound 63 Alone and Mixtures with Mancozeb, Fenpropimorph and Tebuconazole in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 41 | — |
| 0.652 | None | 0 | 48 | — |
| 0 | mancozeb | 42.532 | 70 | — |
| 0 | mancozeb | 74.012 | 71 | — |
| 0.403 | mancozeb | 42.532 | 78 | 82 |
| 0.403 | mancozeb | 74.012 | 91 | 83 |
| 0.652 | mancozeb | 42.532 | 82 | 85 |
| 0.652 | mancozeb | 74.012 | 98 | 85 |
| 0 | fenpropimorph | 242.823 | 33 | — |
| 0 | fenpropimorph | 458.587 | 44 | — |
| 0.403 | fenpropimorph | 242.823 | 27 | 60 |

TABLE D-2-continued

Observed and Expected Effects of Compound 63 Alone and Mixtures with Mancozeb, Fenpropimorph and Tebuconazole in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0.403 | fenpropimorph | 458.587 | 71 | 67 |
| 0.652 | fenpropimorph | 242.823 | 70 | 65 |
| 0.652 | fenpropimorph | 458.587 | 72 | 71 |
| 0 | tebuconazole | 486.921 | 30 | — |
| 0 | tebuconazole | 841.166 | 55 | — |
| 0.403 | tebuconazole | 486.921 | 59 | 59 |
| 0.403 | tebuconazole | 841.166 | 83 | 74 |
| 0.652 | tebuconazole | 486.921 | 69 | 64 |
| 0.652 | tebuconazole | 841.166 | 88 | 77 |

TABLE E-1

Observed and Expected Effects of Compound 41 Alone and Mixtures with Cyproconazole in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 45 | — |
| 0.764 | None | 0 | 79 | — |
| 0 | cyproconazole | 37.333 | 44 | — |
| 0 | cyproconazole | 64.883 | 68 | — |
| 0.346 | cyproconazole | 37.333 | 60 | 82 |
| 0.346 | cyproconazole | 64.883 | 78 | 88 |
| 0.764 | cyproconazole | 37.333 | 84 | 93 |
| 0.764 | cyproconazole | 64.883 | 89 | 81 |

TABLE E-2

Observed and Expected Effects of Compound 63 Alone and Mixtures with Cyproconazole in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 54 | — |
| 0.652 | None | 0 | 59 | — |
| 0 | cyproconazole | 37.333 | 44 | — |
| 0 | cyproconazole | 64.883 | 68 | — |
| 0.403 | cyproconazole | 37.333 | 63 | 74 |
| 0.403 | cyproconazole | 64.883 | 76 | 85 |
| 0.652 | cyproconazole | 37.333 | 65 | 77 |
| 0.652 | cyproconazole | 64.883 | 80 | 87 |

TABLE F-1

Observed and Expected Effects of Compound 41 Alone and Mixtures with Epoxiconazole and Pydiflumetofen in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 47 | — |
| 0.764 | None | 0 | 63 | — |
| 0 | epoxiconazole | 46.795 | 23 | — |
| 0 | epoxiconazole | 89.631 | 70 | — |
| 0.346 | epoxiconazole | 46.795 | 68 | 59 |
| 0.346 | epoxiconazole | 89.631 | 75 | 84 |
| 0.764 | epoxiconazole | 46.795 | 66 | 71 |
| 0.764 | epoxiconazole | 89.631 | 79 | 89 |
| 0 | pydiflumetofen | 70.950 | 0 | — |
| 0 | pydiflumetofen | 135.850 | 73 | — |
| 0.346 | pydiflumetofen | 70.950 | 43 | 47 |
| 0.346 | pydiflumetofen | 135.850 | 75 | 86 |
| 0.764 | pydiflumetofen | 70.950 | 61 | 63 |
| 0.764 | pydiflumetofen | 135.850 | 68 | 90 |

TABLE F-2

Observed and Expected Effects of Compound 63 Alone and Mixtures with Epoxiconazole and Pydiflumetofen in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 61 | — |
| 0.652 | None | 0 | 43 | — |
| 0 | epoxiconazole | 46.795 | 23 | — |
| 0 | epoxiconazole | 89.631 | 70 | — |
| 0.403 | epoxiconazole | 46.795 | 55 | 70 |
| 0.403 | epoxiconazole | 89.631 | 62 | 88 |
| 0.652 | epoxiconazole | 46.795 | 52 | 56 |
| 0.652 | epoxiconazole | 89.631 | 71 | 83 |
| 0 | pydiflumetofen | 70.950 | 0 | — |
| 0 | pydiflumetofen | 135.850 | 73 | — |
| 0.403 | pydiflumetofen | 70.950 | 58 | 61 |
| 0.403 | pydiflumetofen | 135.850 | 75 | 89 |
| 0.652 | pydiflumetofen | 70.950 | 52 | 43 |
| 0.652 | pydiflumetofen | 135.850 | 70 | 85 |

TABLE G-1

Observed and Expected Effects of Compound 41 Alone and Mixtures with Benzovindiflupyr, Prothioconazole and Chlorothalonil in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 47 | — |
| 0.764 | None | 0 | 82 | — |
| 0 | benzovindiflupyr | 0.606 | 67 | — |
| 0 | benzovindiflupyr | 0.980 | 67 | — |
| 0.346 | benzovindiflupyr | 0.606 | 80 | 83 |
| 0.346 | benzovindiflupyr | 0.980 | 82 | 83 |
| 0.764 | benzovindiflupyr | 0.606 | 72 | 94 |
| 0.764 | benzovindiflupyr | 0.980 | 80 | 94 |

TABLE G-1-continued

Observed and Expected Effects of Compound 41 Alone and Mixtures with Benzovindiflupyr, Prothioconazole and Chlorothalonil in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | prothioconazole | 10.165 | 7 | — |
| 0 | prothioconazole | 16.339 | 65 | — |
| 0.346 | prothioconazole | 10.165 | 64 | 51 |
| 0.346 | prothioconazole | 16.339 | 85 | 82 |
| 0.764 | prothioconazole | 10.165 | 79 | 83 |
| 0.764 | prothioconazole | 16.339 | 84 | 94 |
| 0 | chlorothalonil | 138.129 | 59 | — |
| 0 | chlorothalonil | 222.081 | 85 | — |
| 0.346 | chlorothalonil | 138.129 | 69 | 78 |
| 0.346 | chlorothalonil | 222.081 | 89 | 92 |
| 0.764 | chlorothalonil | 138.129 | 76 | 93 |
| 0.764 | chlorothalonil | 222.081 | 92 | 97 |

TABLE G-2

Observed and Expected Effects of Compound 63 Alone and Mixtures with Benzovindiflupyr, Prothioconazole and Chlorothalonil in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 31 | — |
| 0.652 | None | 0 | 51 | — |
| 0 | benzovindiflupyr | 0.606 | 67 | — |
| 0 | benzovindiflupyr | 0.980 | 67 | — |
| 0.403 | benzovindiflupyr | 0.606 | 63 | 77 |
| 0.403 | benzovindiflupyr | 0.980 | 76 | 77 |
| 0.652 | benzovindiflupyr | 0.606 | 49 | 84 |
| 0.652 | benzovindiflupyr | 0.980 | 72 | 84 |
| 0 | prothioconazole | 10.165 | 7 | — |
| 0 | prothioconazole | 16.339 | 65 | — |
| 0.403 | prothioconazole | 10.165 | 45 | 36 |
| 0.403 | prothioconazole | 16.339 | 67 | 76 |
| 0.652 | prothioconazole | 10.165 | 70 | 54 |
| 0.652 | prothioconazole | 16.339 | 77 | 83 |
| 0 | chlorothalonil | 138.129 | 59 | — |
| 0 | chlorothalonil | 222.081 | 85 | — |
| 0.403 | chlorothalonil | 138.129 | 59 | 72 |
| 0.403 | chlorothalonil | 222.081 | 86 | 90 |
| 0.652 | chlorothalonil | 138.129 | 57 | 80 |
| 0.652 | chlorothalonil | 222.081 | 86 | 93 |

TABLE H-1

Observed and Expected Effects of Compound 41 Alone and Mixtures with Pydiflumetofen in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 7 | — |
| 0.764 | None | 0 | 39 | — |
| 0 | pydiflumetofen | 41.364 | 49 | — |
| 0 | pydiflumetofen | 128.793 | 36 | — |
| 0.346 | pydiflumetofen | 41.364 | 31 | 53 |
| 0.346 | pydiflumetofen | 128.793 | 38 | 41 |

TABLE H-1-continued

Observed and Expected Effects of Compound 41 Alone and Mixtures with Pydiflumetofen in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0.764 | pydiflumetofen | 41.364 | 45 | 69 |
| 0.764 | pydiflumetofen | 128.793 | 78 | 61 |

TABLE H-2

Observed and Expected Effects of Compound 63 Alone and Mixtures with Pydiflumetofen in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 3 | — |
| 0.652 | None | 0 | 46 | — |
| 0 | pydiflumetofen | 41.364 | 49 | — |
| 0 | pydiflumetofen | 128.793 | 36 | — |
| 0.403 | pydiflumetofen | 41.364 | 55 | 50 |
| 0.403 | pydiflumetofen | 128.793 | 41 | 38 |
| 0.652 | pydiflumetofen | 41.364 | 63 | 73 |
| 0.652 | pydiflumetofen | 128.793 | 75 | 66 |

TABLE I-1

Observed and Expected Effects of Compound 41 Alone and Mixtures with Copper hydroxide, Flutriafol, Fenpropidin, Azoxystrobin, Trifloxystrobin and Picoxystrobin in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 56 | — |
| 0 | copper hydroxide | 3610.778 | 87 | — |
| 0 | copper hydroxide | 7371.507 | 65 | — |
| 0.346 | copper hydroxide | 3610.778 | 84 | 94 |
| 0.346 | copper hydroxide | 7371.507 | 68 | 85 |
| 0 | flutriafol | 544.265 | 13 | — |
| 0 | flutriafol | 1124.021 | 52 | — |
| 0.346 | flutriafol | 544.265 | 36 | 62 |
| 0.346 | flutriafol | 1124.021 | 56 | 79 |
| 0 | fenpropidin | 78.393 | 45 | — |
| 0 | fenpropidin | 161.740 | 68 | — |
| 0.346 | fenpropidin | 78.393 | 58 | 76 |
| 0.346 | fenpropidin | 161.740 | 59 | 86 |
| 0 | azoxystrobin | 95.873 | 70 | — |
| 0 | azoxystrobin | 169.226 | 90 | — |
| 0.346 | azoxystrobin | 95.873 | 74 | 87 |
| 0.346 | azoxystrobin | 169.226 | 87 | 96 |
| 0 | trifloxystrobin | 20.511 | 46 | — |
| 0 | trifloxystrobin | 35.310 | 76 | — |
| 0.346 | trifloxystrobin | 20.511 | 72 | 76 |
| 0.346 | trifloxystrobin | 35.310 | 85 | 89 |
| 0 | picoxystrobin | 20.596 | 63 | — |
| 0 | picoxystrobin | 33.856 | 79 | — |
| 0.346 | picoxystrobin | 20.596 | 66 | 84 |
| 0.346 | picoxystrobin | 33.856 | 76 | 91 |

TABLE I-2

Observed and Expected Effects of Compound 63 Alone and Mixtures with Copper hydroxide, Flutriafol, Fenpropidin, Azoxystrobin, Trifloxystrobin and Picoxystrobin in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 52 | — |
| 0.652 | None | 0 | 71 | — |
| 0 | Copper Hydroxide | 3610.778 | 87 | — |
| 0 | Copper Hydroxide | 7371.507 | 65 | — |
| 0.403 | Copper Hydroxide | 3610.778 | 81 | 94 |
| 0.403 | Copper Hydroxide | 7371.507 | 77 | 83 |
| 0.652 | Copper Hydroxide | 3610.778 | 82 | 96 |
| 0.652 | Copper Hydroxide | 7371.507 | 79 | 90 |
| 0 | flutriafol | 544.265 | 13 | — |
| 0 | flutriafol | 1124.021 | 52 | — |
| 0.403 | flutriafol | 544.265 | 65 | 58 |
| 0.403 | flutriafol | 1124.021 | 87 | 77 |
| 0.652 | flutriafol | 544.265 | 70 | 74 |
| 0.652 | flutriafol | 1124.021 | 77 | 86 |
| 0 | fenpropidin | 78.393 | 45 | — |
| 0 | fenpropidin | 161.740 | 68 | — |
| 0.403 | fenpropidin | 78.393 | 66 | 74 |
| 0.403 | fenpropidin | 161.740 | 59 | 85 |
| 0.652 | fenpropidin | 78.393 | 55 | 84 |
| 0.652 | fenpropidin | 161.740 | 80 | 91 |
| 0 | azoxystrobin | 95.873 | 70 | — |
| 0 | azoxystrobin | 169.226 | 90 | — |
| 0.403 | azoxystrobin | 95.873 | 75 | 86 |
| 0.403 | azoxystrobin | 169.226 | 89 | 95 |
| 0.652 | azoxystrobin | 95.873 | 82 | 91 |
| 0.652 | azoxystrobin | 169.226 | 88 | 97 |
| 0 | trifloxystrobin | 20.511 | 46 | — |
| 0 | trifloxystrobin | 35.310 | 76 | — |
| 0.403 | trifloxystrobin | 20.511 | 71 | 74 |
| 0.403 | trifloxystrobin | 35.310 | 92 | 88 |
| 0.652 | trifloxystrobin | 20.511 | 70 | 84 |
| 0.652 | trifloxystrobin | 35.310 | 87 | 93 |
| 0 | picoxystrobin | 20.596 | 63 | — |
| 0 | picoxystrobin | 33.865 | 79 | — |
| 0.403 | picoxystrobin | 20.596 | 77 | 83 |
| 0.403 | picoxystrobin | 33.865 | 89 | 90 |
| 0.652 | picoxystrobin | 20.596 | 87 | 89 |
| 0.652 | picoxystrobin | 33.865 | 87 | 94 |

TABLE J-1

Observed and Expected Effects of Compound 41 Alone and Mixtures with Inpyrfluxam in Controlling Asian Soybean Rust

| Application Rate (ppm) of Compound 41 (i.e. Component (a)) | Component (b) | Application Rate (ppm) of Component (b) | Test G Obsd | Test G Exp |
|---|---|---|---|---|
| 0 | None | 0 | 0 | — |
| 0.346 | None | 0 | 50 | — |
| 0.764 | None | 0 | 74 | — |
| 0 | inpyrfluxam | 0.448 | 56 | — |
| 0 | inpyrfluxam | 1.059 | 79 | — |
| 0.346 | inpyrfluxam | 0.448 | 55 | 78 |
| 0.346 | inpyrfluxam | 1.059 | 82 | 89 |
| 0.764 | inpyrfluxam | 0.448 | 75 | 89 |
| 0.764 | inpyrfluxam | 1.059 | 83 | 95 |

TABLE J-2

Observed and Expected Effects of Compound 63 Alone and Mixtures with Inpyrfluxam in Controlling Asian Soybean Rust

| Application Rate (ppm) of Compound 63 (i.e. Component (a)) | Component (b) | Application Rate (ppm) of Component (b) | Test G Obsd | Test G Exp |
|---|---|---|---|---|
| 0 | None | 0 | 0 | — |
| 0.403 | None | 0 | 44 | — |
| 0.652 | None | 0 | 28 | — |
| 0 | inpyrfluxam | 0.448 | 56 | — |
| 0 | inpyrfluxam | 1.059 | 79 | — |
| 0.403 | inpyrfluxam | 0.448 | 65 | 75 |
| 0.403 | inpyrfluxam | 1.059 | 82 | 88 |
| 0.652 | inpyrfluxam | 0.448 | 65 | 68 |
| 0.652 | inpyrfluxam | 1.059 | 85 | 85 |

What is claimed is:

1. A fungicidal composition comprising:

(a) a compound of Formula 1, including stereoisomers, N-oxides, and salts thereof, which is

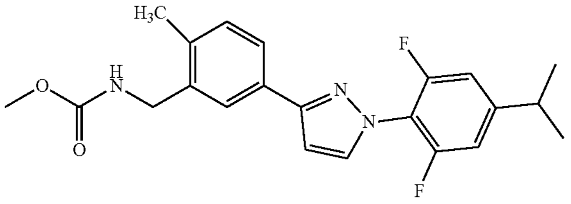

and (b) at least one additional fungicidal compound selected from the group consisting of:

(b3) demethylation inhibitor fungicides selected from difenoconazole, flutriafol, prothioconazole, and tebuconazole;

(b5) amine/morpholine fungicides selected from, fenpropidin, and fenpropimorph;

(b7) succinate dehydrogenase inhibitor fungicides selected from benzovindiflupyr, bixafen, fluindapyr, fluopyram, fluxapyroxad, inpyrfluxam, and pydiflumetofen;

(b9) anilinopyrimidine fungicides selected from cyprodinil;

(b11) quinone outside inhibitor fungicides selected from azoxystrobin, picoxystrobin, trifloxystrobin;

(b17) keto reductase inhibitor fungicides selected from fenhexamid;

(b21) quinone inside inhibitor fungicides selected from cyazofamid;

(b52) multi-site activity fungicides selected from mancozeb, and chlorothalonil; and (b54) N-(2,2,2-trifluoroethyl)-2-[[4-[5-(trifluoromethyl)-1, 2,4-oxadiazol-3-yl]phenyl methyl]-4-oxazolecarboxamide.

2. The composition of claim 1 wherein component (b) comprises at least one fungicidal compound from each of two different groups selected from (b3), (b5), (b7), (b9), (b11), (b17), (b21), (b52) and (b54).

3. The composition of claim 1 wherein component (b) includes at least one compound selected from azoxystrobin, bixafen, chlorothalonil, cyprodinil, difenoconazole, fenhexamid, fenpropimorph, fluopyram, flutriafol, fluxapyroxad, mancozeb, picoxystrobin, prothioconazole, pydiflumetofen, tebuconazole, and trifloxystrobin.

4. The composition of claim 3 wherein component (b) includes at least one compound selected from azoxystrobin, bixafen, chlorothalonil, difenoconazole, fenpropimorph, flutriafol, fluxapyroxad, picoxystrobin, prothioconazole, pydiflumetofen, tebuconazole and trifloxystrobin.

5. The composition of claim 1 further comprising at least one additional component selected from the group consisting of surfactants, solid diluents and liquid diluents.

6. A method for protecting a plant or plant seed from diseases caused by fungal pathogens comprising applying a fungicidally effective amount of the composition of claim 1 to the plant or plant seed.

7. A method for protecting a plant from a rust disease comprising applying to the plant or plant seed a fungicidally effective amount of the composition of claim 1 wherein component (b) includes at least one fungicidal compound selected from (b3) demethylation inhibitor fungicides, (b5) amine/morpholine fungicides, (b7) succinate dehydrogenase inhibitor fungicides, (b11) quinone outside inhibitor (QoI) fungicides and (b52) multi-site activity fungicides.

8. The composition of claim 1 wherein component (b) includes one compound selected from azoxystrobin, benzovindiflupyr, bixafen, difenoconazole, fenpropimorph, fluindapyr, fluopyram, flutriafol, fluxapyroxad, prothioconazole, pydiflumetofen and tebuconazole.

9. The composition of claim 8 wherein component (b) includes one compound selected from bixafen, difenoconazole, fluindapyr, flutriafol, fluxapyroxad, prothioconazole and tebuconazole.

10. The composition of claim 9 wherein component (b) is difenoconazole.

11. The composition of claim 9 wherein component (b) is fluindapyr.

12. The composition of claim 9 wherein component (b) is flutriafol.

13. The composition of claim 9 wherein component (b) is prothioconazole.

14. The composition of claim 9 wherein component (b) is tebuconazole.

15. The composition of claim 1 wherein component (b) is N-(2,2,2-trifluoroethyl)-2-[4-[5-(trifluoromethyl)-1,2,4-oxadiazol-3-yl]phenyl]methyl]-4-oxazolecarboxamide.

16. The composition of claim 1 wherein the weight ratio of component (a) to component (b) ranges from 125:1 to 1:125.

17. The composition of claim 16 wherein the weight ratio of component (a) to component (b) ranges from 25:1 to 1:25.

18. The composition of claim 17 wherein the weight ratio of component (a) to component (b) ranges from 5:1 to 1:5.

19. The method of claim 7 wherein the rust disease is Asian soybean rust caused by the fungal pathogen *Phakopsora pachyrhizi.*

* * * * *